United States Patent [19]
Smith, Jr. et al.

[11] Patent Number: 6,123,983
[45] Date of Patent: Sep. 26, 2000

[54] METHOD AND APPARATUS FOR MONITORING PLASMA PROCESSING OPERATIONS

[75] Inventors: Michael Lane Smith, Jr.; Joel O'Don Stevenson, both of Albuquerque; Pamela Peardon Denise Ward, Rio Rancho, all of N. Mex.

[73] Assignee: Sandia Corporation, Albuquerque, N. Mex.

[21] Appl. No.: 09/065,257

[22] Filed: Apr. 23, 1998

[51] Int. Cl.$^7$ .............................. G01J 3/30; G06F 19/00; C23C 14/00
[52] U.S. Cl. ..................... 427/10; 118/723 R; 356/316; 702/31; 702/84; 700/110; 700/121; 204/192.33; 204/298.32
[58] Field of Search .......................... 118/723 R; 438/9; 702/84, 188, 31, 23; 216/59, 60; 156/345; 204/192.33, 298.32; 427/8, 10; 700/110, 121; 356/316

[56] References Cited

U.S. PATENT DOCUMENTS

| | | |
|---|---|---|
| Re. 32,156 | 5/1986 | Tokuda et al. . |
| 3,985,712 | 10/1976 | Garst . |
| 4,278,060 | 7/1981 | Isobe et al. . |
| 4,289,188 | 9/1981 | Mizutani et al. . |
| 4,415,402 | 11/1983 | Gelernt et al. . |
| 4,493,745 | 1/1985 | Chen et al. . |
| 4,504,920 | 3/1985 | Mickowski . |
| 4,507,605 | 3/1985 | Geisel . |
| 4,541,718 | 9/1985 | Osada et al. . |
| 4,609,426 | 9/1986 | Ogawa et al. . |
| 4,609,810 | 9/1986 | O'Brien et al. . |
| 4,611,919 | 9/1986 | Brooks, Jr. et al. . |

(List continued on next page.)

OTHER PUBLICATIONS

"Real–Time Etch Plasma Monitor System", IBM Technical Disclosure Bulletin, vol. 25, No. 11A, pp. 5721–5723, H.A. Khoury (Apr. 1983).

"A Plasma Process Monitor/Control System", Surface and Interface Analysis, vol. 24, pp. 124–133, Joel O. Stevenson, Pamela P. Ward, Michael L. Smith, and Richard J. Markle (Feb. 1998).

"Process Uniformity for Plasma Etchback and Desmear in Printed Wiring Board Manufacturing", Sandia Report, SAND96–1954; UC–706, pp. 1–5, Pamela P. Ward, Michael L. Smith, Joel O. Stevenson, Rick Smedley (Aug. 1996).

"Sandia Computer Program Saves Money for Microchip and Circuit Board Makers", Handout at Ceremony at Sandia National Laboratories, pp. 1–3 (Oct. 1997).

*Primary Examiner*—Terrence R. Till
*Assistant Examiner*—Andrew Aldag
*Attorney, Agent, or Firm*—Holme Roberts & Owen LLP

[57] ABSTRACT

The invention generally relates to various aspects of a plasma process, and more specifically the monitoring of such plasma processes. One aspect relates in at least some manner to calibrating or initializing a plasma monitoring assembly. This type of calibration may be used to address wavelength shifts, intensity shifts, or both associated with optical emissions data obtained on a plasma process. A calibration light may be directed at a window through which optical emissions data is being obtained to determine the effect, if any, that the inner surface of the window is having on the optical emissions data being obtained therethrough, the operation of the optical emissions data gathering device, or both. Another aspect relates in at least some manner to various types of evaluations which may be undertaken of a plasma process which was run, and more typically one which is currently being run, within the processing chamber. Plasma health evaluations and process identification through optical emissions analysis are included in this aspect. Yet another aspect associated with the present invention relates in at least some manner to the endpoint of a plasma process (e.g., plasma recipe, plasma clean, conditioning wafer operation) or discrete/discernible portion thereof (e.g., a plasma step of a multiple step plasma recipe). A final aspect associated with the present invention relates to how one or more of the above-noted aspects may be implemented into a semiconductor fabrication facility, such as the distribution of wafers to a wafer production system.

22 Claims, 57 Drawing Sheets

U.S. PATENT DOCUMENTS

| | | |
|---|---|---|
| 4,615,761 | 10/1986 | Tada et al. . |
| 4,675,072 | 6/1987 | Bennett et al. . |
| 4,721,083 | 1/1988 | Hosaka . |
| 4,771,230 | 9/1988 | Zeh . |
| 4,846,928 | 7/1989 | Dolins et al. . |
| 4,847,792 | 7/1989 | Barna et al. . |
| 4,847,817 | 7/1989 | Au et al. . |
| 5,014,217 | 5/1991 | Savage . |
| 5,047,612 | 9/1991 | Savkar et al. . |
| 5,118,378 | 6/1992 | Moroi et al. . |
| 5,168,699 | 12/1992 | McCarty et al. . |
| 5,169,407 | 12/1992 | Mase et al. . |
| 5,200,023 | 4/1993 | Gifford et al. . |
| 5,210,704 | 5/1993 | Husseiny . |
| 5,223,683 | 6/1993 | Ishizaka . |
| 5,280,983 | 1/1994 | Maydan et al. . |
| 5,283,418 | 2/1994 | Bellows et al. . |
| 5,326,975 | 7/1994 | Barna . |
| 5,343,412 | 8/1994 | Birang . |
| 5,347,460 | 9/1994 | Gifford et al. . |
| 5,405,488 | 4/1995 | Dimitrelis et al. . |
| 5,424,633 | 6/1995 | Soiferman . |
| 5,428,444 | 6/1995 | Haddock et al. . |
| 5,450,205 | 9/1995 | Sawin et al. . |
| 5,455,061 | 10/1995 | Matossian et al. . |
| 5,467,013 | 11/1995 | Williams et al. . |
| 5,467,883 | 11/1995 | Frye et al. . |
| 5,471,401 | 11/1995 | Nicholson et al. . |
| 5,500,076 | 3/1996 | Jerbic . |
| 5,526,293 | 6/1996 | Mozumder et al. . |
| 5,546,322 | 8/1996 | Gifford et al. . |
| 5,551,982 | 9/1996 | Anderson et al. . |
| 5,552,016 | 9/1996 | Ghanayem . |
| 5,602,757 | 2/1997 | Haseley et al. . |
| 5,614,055 | 3/1997 | Faribairn et al. . |
| 5,641,375 | 6/1997 | Nitescu et al. . |
| 5,647,913 | 7/1997 | Blalock . |
| 5,647,953 | 7/1997 | Williams et al. . |
| 5,654,796 | 8/1997 | Mundt . |
| 5,656,902 | 8/1997 | Lowrance . |
| 5,658,423 | 8/1997 | Angell et al. . |
| 5,661,669 | 8/1997 | Mozumder et al. ............ 702/84 |
| 5,710,713 | 1/1998 | Wright et al. ............ 702/23 |
| 5,841,651 | 11/1998 | Fu ............ 216/59 |
| 5,871,658 | 2/1999 | Tao et al. ............ 216/60 |
| 5,907,820 | 5/1999 | Pan ............ 204/298.32 |
| 5,923,553 | 7/1999 | Yi ............ 702/84 |

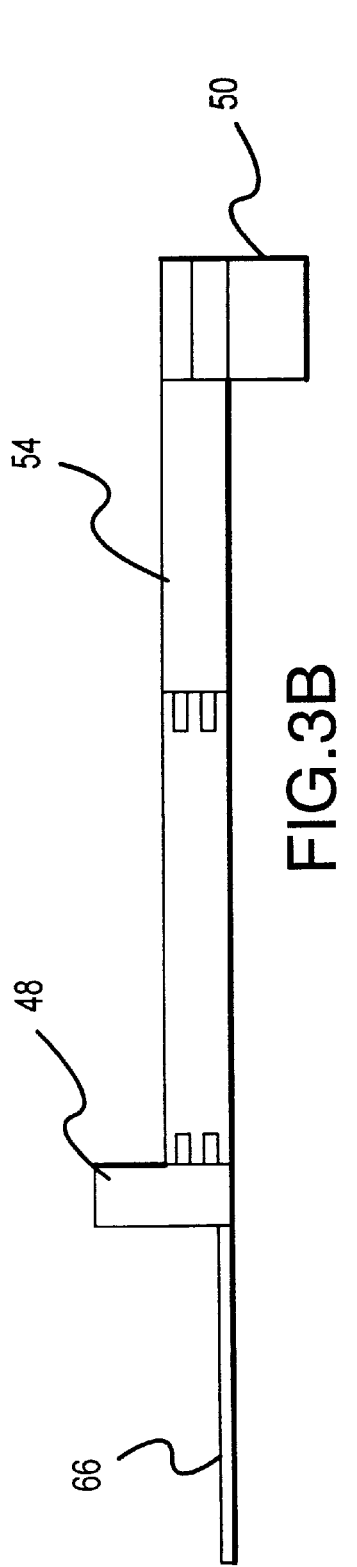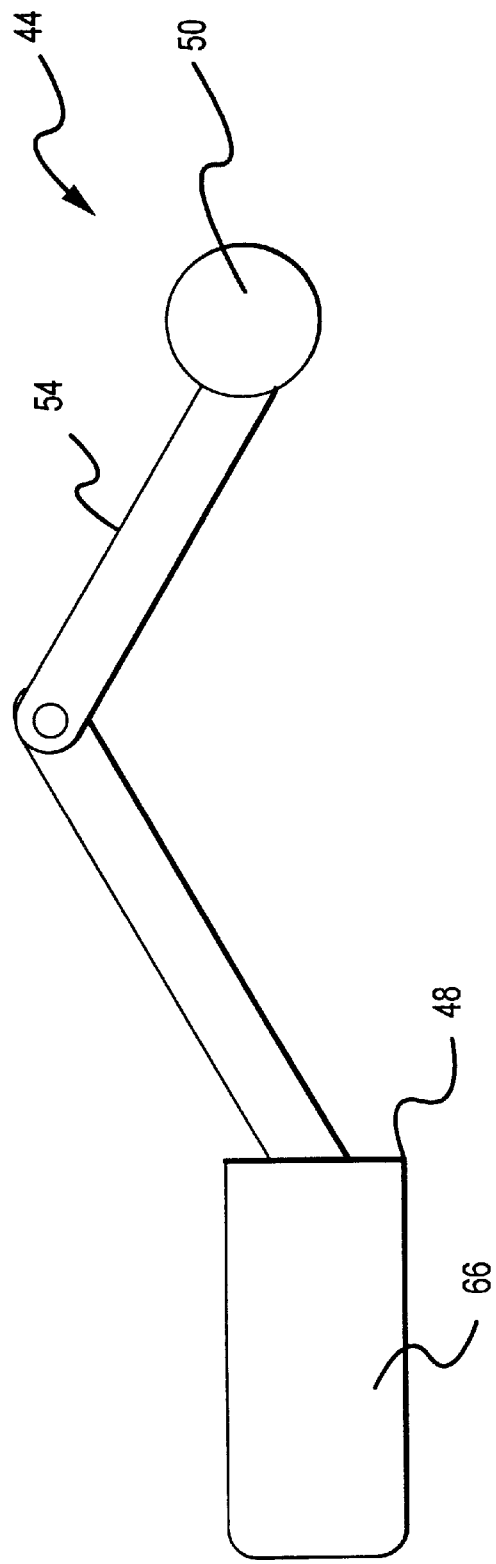
FIG.3B
FIG.3A

| TIME 322a | WAFER IDENTIFIER 322b | PLASMA PROCESS-SPECIES 322c | SPECTRA 322d | PLASMA PROCESS-STEP 322e | MAXIMUM TOTAL PLASMA PROCESS STEP TIME 322f | MAXIMUM TOTAL PLASMA PROCESS TIME 322g | PLASMA PROCESS-GENUS 322h |
|---|---|---|---|---|---|---|---|
| t1 354a | | | | | | | |
| t2 354b | | | | | | | |
| t3 354c | | | | | | | |
| t4 354d | | | | | | | |
| t5 354e | | | | | | | |
| t6 354f | | | | | | | |
| t7 354g | | | | | | | |
| t8 354h | | | | | | | |

| TIME | SPECTRA | ERROR | PROTOCOL | PLASMA PROCESS-GENUS | PLASMA PROCESS-SPECIES | PLASMA PROCESS-STEP |
|---|---|---|---|---|---|---|
| t1 | | | | | | |
| t2 | | | | | | |
| t3 | | | | | | |
| t4 | | | | | | |
| t5 | | | | | | |
| t6 | | | | | | |
| t7 | | | | | | |
| t8 | | | | | | |
| t9 | | | | | | |
| t10 | | | | | | |

FIG.12B

METHOD AND APPARATUS FOR MONITORING PLASMA PROCESSING OPERATIONS

GOVERNMENT RIGHTS

This invention was made with the United States Government support under Contract No. DE-AC04-94AL85000 awarded by the U.S. Department of Energy. The Government has certain rights in this invention.

FIELD OF THE INVENTION

The present invention generally relates to the field of plasma processes and, more particularly, to monitoring/evaluating such plasma processes.

BACKGROUND OF THE INVENTION

Plasma is used in various types of industrial-type processes in the semiconductor and printed wiring board industries, as well as in various other industries such as in the medical equipment and automotive industries. One common use of plasma is for etching away materials in an isolated or controlled environment. Various types of materials may be etched by one or more plasma compositions, including glasses, silicon or other substrate materials, organics such as photoresist, waxes, plastics, rubbers, biological agents, and vegetable matter, and metals such as copper, aluminum, titanium, tungsten, and gold. Plasma is also utilized for depositing materials such as organics and metals onto an appropriate surface by various techniques, such as via chemical vapor deposition. Sputtering operations may also utilize plasmas to generate ions which sputter away material from a source (e.g., metals, organics) and deposit these materials onto a target such as a substrate. Surface modification operations also use plasmas, including operations such as surface cleaning, surface activation, surface passivation, surface roughening, surface smoothing, micromachining, hardening, and patterning.

Plasma processing operations can have a significant effect on a company's profit margin. This is particularly true in the semiconductor and printed wiring board industries. Consider that a single semiconductor fabrication facility may have up to 200–300 processing chambers and that each processing chamber in commercial production may process at least about 15–20 wafers per hour. Further consider that an eight inch wafer which is processed in one of these chambers in some cases may be used to produce up to 1,500 semiconductor chips which are each worth at least about $125, and that each of these semiconductor chips are in effect "pre-sold." Therefore, a single wafer which has undergone an abnormal plasma process and which is scrapped will result in lost revenues of at least about $187,500.

The particular plasma process which acts on the wafer such that a semiconductor device may be formed therefrom is commonly referred to as a plasma recipe. Some skilled in the art refer to a plasma recipe as being a combination of one or more plasma steps, each of which is executed for a fixed period of time. However, "plasma recipe" as used in relation to the present invention means a plasma processing protocol which includes one or more different and distinct plasma steps (e.g., a certain combination of certain steps). "Different and distinct" means that each plasma step produces a different, predetermined result on the product being processed (e.g., a wafer). Differences between plasma steps may be realized by changing one or more process conditions, including without limitation the composition of the plasma, the temperature and pressure in the processing chamber, DC bias, pumping speeds, and power settings. The sequence of the plasma steps, as well as the result of each plasma step, also produces a desired overall or cumulative end result for the plasma recipe.

Plasma processes may be run on wafers in a commercial production facility in the following manner. A cassette or boat which stores a plurality of wafers (e.g., 24) is provided to a location which may be accessed by a wafer handling system associated with one or more processing chambers. One wafer at a time is processed in the chamber, although some chambers may accommodate more than one wafer at a time for simultaneous plasma processing. One or more qualification wafers may be included in each cassette, and the rest are commonly referred to as production wafers. Both the qualification and production wafers are exposed to the same plasma process in the chamber. However, no semiconductor devices are formed from a qualification wafer as qualification wafers are processed and retained solely for testing/evaluating the plasma process, whereas semiconductor devices are formed from the production wafers. Further processing operations of these now plasma processed production wafers may be required before semiconductor devices are actually formed from such production wafers.

Monitoring is employed by many plasma processes to evaluate one or more aspects of the process. One common monitoring technique associated with plasma recipes run on wafers is endpoint detection. Current endpoint detection systems attempt to identify when a single plasma step of a given plasma recipe is complete, or more specifically that point in time when the predetermined result associated with the plasma step has been produced on the product. A representative "predetermined" result is when a layer of a multi-layered wafer has been completely removed in a manner defined by a mask or the like. Although prior art systems exist for attempting to identify the endpoint of a single step of a multiple step plasma recipe, no known system is able to identify the endpoint of each step of a multiple step plasma recipe, or even any two steps of a multiple step recipe for that matter.

Having the ability to terminate a given plasma step at its endpoint or just after endpoint is reached would reduce costs in a number of ways. Obviously, the amount of gases which are used to generate the plasma may be reduced by terminating a given plasma step when it has achieved its desired result. More importantly, terminating a given plasma step at or very shortly after its endpoint has been reached prevents the wafer from being over-etched to an undesired degree. Over-etching a wafer removes more material from the wafer than desired, such as by etching away portions of the layer immediately following that which was to be etched, and may also result in the undesirable sputtering of materials onto other portions of the wafer. The resulting effect on the semiconductor device(s) formed from this wafer may reduce the quality of the semiconductor device(s), may go undetected until the semiconductor device(s) has been delivered to the customer which would not be desirable if the device(s) was defective or deficient in any way, or both. Finally, a certain degree of over-etching of a wafer may result in the wafer simply being scrapped.

Endpoint detection is desirable in theory for plasma processes. Certain deficiencies became evident as attempts were made to implement endpoint detection techniques in commercial fabrication facilities. Initially, all known endpoint detection techniques were developed by first chemically analyzing the subject plasma operation to identify a wavelength to key in on as being indicative of endpoint.

Fabrication facilities typically run a multiplicity of plasma recipes. As such, these known endpoint detection techniques increase costs due to the required retention of an experienced chemist. Moreover, these techniques often do not produce the intended result—that is the wavelength which is selected by the chemist may in fact not be at all indicative of endpoint when the plasma step is actually run since it is only "theory" based. A given endpoint detection technique may also be dependent upon the processing chamber on which the technique was developed. Accurate results may not be realized when the endpoint detection technique is used on other processing chambers. Therefore, it would be desirable to have a plasma monitoring system in which the amount of chemical "pre-analysis" is reduced and which would allow the plasma monitoring system to work to an acceptable degree on multiple processing chambers (i.e., a generic plasma monitoring system which was able to identify the relevant endpoint).

Commonly used endpoint detection techniques provide no information on how the plasma process has actually proceeded or the "health" of the plasma process—only if and when an endpoint of the subject plasma step has been reached. Other monitoring techniques which are commonly used in plasma processes suffer from this same type of deficiency. Pressures, temperatures, and flow rates of the feed gases used to form the plasma are commonly monitored. Various aspects relating to the electrical system associated with the plasma are also monitored, such as the power settings being utilized since this will affect the behavior of the plasma. However, these types of monitoring operations do not necessarily provide an indication of how the plasma process is actually proceeding. All of the "hardware" settings may be correct, but still the plasma may not be performing properly for a variety of reasons (e.g., an "unhealthy" plasma). Since errors in a plasma process are typically detected by some type of post processing, destructive testing technique, multiple wafers are typically exposed to the faulty plasma process before the error is actually identified and remedied. Therefore, it would be desirable to have a plasma monitoring system which provided a more accurate indication of how the current plasma process was actually proceeding on a more "real-time" basis, and thereby allowed for a reduction in the number of wafers which are exposed to abnormal plasma processes. Moreover, it would be desirable to have a plasma monitoring system which identified the existence of an error in the plasma process at least before the next wafer is exposed to such an "abnormal" plasma process.

Other areas of the semiconductor manufacturing process can adversely impact the profit margin of the commercial fabrication facility. Often an operator will run the wrong plasma recipe and the resulting wafers will be scrapped. It would be desirable for a plasma monitoring system to readily identify the plasma recipe being run on the given chamber to avoid this type of situation. Moreover, the length of each step of a given plasma recipe is typically set for a certain amount of time which accounts for the worst case condition (i.e., such that even the "slowest" running of the plasma step will be completed in this time frame). In many cases the step will actually be completed a significant time before this maximum setting is reached, causing the problems identified in the discussion of endpoint detection. Therefore, it would be desirable to have a plasma monitoring system which was able to identify the steps of a plasma recipe as it was being run within a processing chamber, and to utilize this information in relation to the control of the plasma process (e.g., to terminate the current step, initiate the next plasma step, or both).

Plasma processing of product (e.g., wafers) within the processing chamber will likely have an effect on the interior of the processing chamber which in turn may have an adverse effect on subsequent plasma recipes which are run on product within the chamber. Certain "byproducts" of a plasma process run on product in the chamber may be deposited on one or more interior surfaces of the chamber. These deposits may have some type of adverse effect on one or more plasma recipes which are being run in the processing chamber (e.g., a processing chamber may be used to run more than one type of plasma recipe). Deposits on the interior surfaces of the processing chamber may have the following exemplary effects on the performance of the chamber: a longer period of time may be required to reach the endpoint of one or more plasma steps of the plasma recipe; endpoint of one or more plasma steps may never be reached; and a result which is different than expected of the current plasma step may be undesirably realized (i.e., an unexpected/undesirable result). Processing chambers are typically removed from the production line on a scheduled, periodic basis for a cleaning operation to address the above-noted conditions, regardless of whether the chamber is actually in condition for a cleaning and even if the chamber was ready for cleaning well before this time. It would be desirable to have a plasma monitoring system which would provide an indication of when a processing chamber should be removed from production for cleaning.

Cleaning operations which are used to address the above-noted deposits include plasma cleans of the interior of the processing chamber, wet cleans of the interior of the processing chamber, and replacement of certain components of the processing chamber which may actually be consumed by the plasma processes conducted therein and are therefore commonly referred to as "consumables". A plasma clean addresses the above-noted deposits by running an appropriate plasma in the processing chamber typically without any product therein (e.g., no production wafers), and therefore with the chamber being in an "empty" condition. The plasma acts on these deposits in a plasma clean and reduces the thickness thereof by chemical action, mechanical action, or both. Resulting vapors and particulate matter are exhausted from the chamber during the plasma clean. It would be desirable to have a plasma monitoring system which would provide an accurate indication of both the health and endpoint of the plasma clean currently being conducted within the processing chamber.

In some cases a plasma clean alone will not adequately address the condition of the interior of the processing chamber. Another cleaning technique which may be employed, alone or in combination with a plasma clean, is commonly referred to as a "wet clean." Various types of solvents or the like may be used in a wet clean and are manually applied by personnel. In this regard, the subject processing chamber is depressurized, the chamber is opened to gain appropriate access, and the interior surfaces of the chamber are manually wiped down such that the solvents may remove at least some of the deposits by chemical action, mechanical action, or both. It would further be desirable to have a plasma monitoring system which would provide an accurate indication of when further execution of a plasma clean of the interior of the processing chamber will be substantially ineffective such that a wet clean may be more timely initiated or eliminated altogether.

Wet cleans and plasma cleans of the interior surfaces of the processing chamber may be ineffective in addressing deposits after a certain number of plasma processes have been conducted in the chamber. Sufficient degradation of the interior surfaces of the processing chamber may necessitate that certain components of the chamber be replaced. Components of the processing chamber which are typically replaced on some type of periodic basis are the showerhead, the wafer platform, the wafer pedestal, the quartz bell jar, and the quartz bell roof.

Additional processing of the interior surfaces of the chamber is typically undertaken after a wet clean has been performed, after one or more components of a processing chamber have been replaced and prior to resuming commercial use of the chamber (e.g., the processing of wafers in the chamber for commercial purposes), and in the case of a new chamber for that matter. No product is present in the processing chamber as a plasma is introduced into the now sealed processing chamber in this type of operation which is also commonly referred to as a plasma cleaning operation. Plasma cleaning operations in this instance address the solvent residuals from the wet clean, "prep" the new components of the chamber for plasma processing of product in the chamber, or both. It would be desirable to have a plasma monitoring system which would provide an accurate indication of both the health and endpoint of the plasma cleaning operation in this type of case.

Conditioning wafers may be run through the processing chamber before running production wafers through the processing chamber after any type of cleaning of the processing chamber, after any components of the chamber have been replaced, or in the case of a new chamber which has never had any plasma processes conducted therein. An entire plasma processes is typically run on one or more conditioning wafers disposed in the subject processing chamber in a conditioning wafer operation. Conditioning wafers may simply be "blanks" or may have some semiconductor device components thereon, and the running of entire plasma processes thereon may do nothing to the conditioning wafers or portions of the conditioning wafer may be etched. Nonetheless, no semiconductor devices are ever formed from a conditioning wafer and no integrated circuit of any kind is ever etched onto a conditioning wafer while running the plasma recipe thereon. Instead, conditioning wafers of this type are either refurbished (e.g., material is redeposited back into those areas which were etched during the conditioning wafer operation) and re-used again as a conditioning wafer or they are scrapped. The processing of these conditioning wafers further "preps" or "seasons" the chamber and is done for the purpose of placing the chamber in a certain condition for production. No devices are currently being used to identify when the processing of the conditioning wafers has achieved its intended purpose. Therefore, it would be desirable to have a plasma monitoring system which would provide an accurate indication of when the conditioning wafer operation may be terminated, as well as the health of such an operation.

SUMMARY OF THE INVENTION

The claims in the subject patent application are directed to the sixth aspect discussed in the preface to the Detailed Description section of the present patent application. The other aspects addressed in the noted preface are presented in one or more other related patent applications.

BRIEF DESCRIPTION OF THE DRAWINGS

FIGS. 3A–B are top and side views, respectively, of one embodiment of the wafer handling assembly incorporated in the wafer production system of FIG. 1;

FIG. 12A is one embodiment of a data management structure which may be used for the normal spectra subdirectory of FIG. 9;

FIG. 12B is one embodiment of a data management structure which may be used for the abnormal spectra and unknown spectra subdirectories of FIG. 9;

DETAILED DESCRIPTION

Preface

Figure 1:
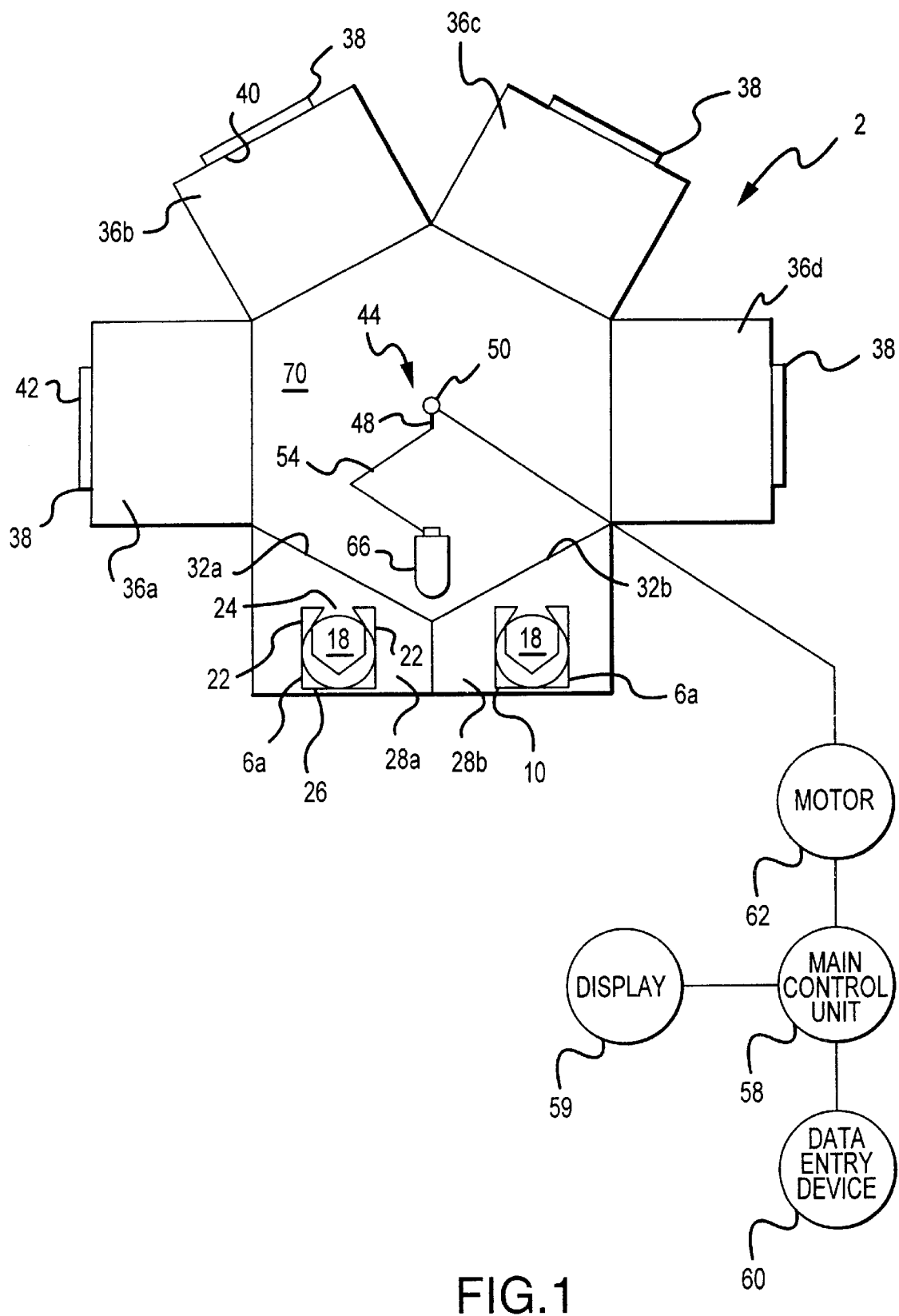
FIG. 1 is a schematic view of a wafer production system.

The present invention generally relates to various aspects of a plasma process. These aspects may be grouped into four main categories. One category relates in at least some manner to a calibration or initialization procedure, associated components, or both. The first aspect through the fourth aspect presented below are within this category. Another category relates in at least some manner to various types of evaluations which may be undertaken of a plasma process which was run, and more typically one which is currently being run, within the processing chamber (e.g., plasma health evaluations, plasma process/plasma process step identification, plasma "on" determinations). The fifth aspect through the eighth aspect presented below are within this second category. Yet another category associated with the present invention relates in at least some manner to the endpoint of a plasma process (e.g., plasma clean, conditioning wafer operation) or discrete/discernible portion thereof (e.g., a plasma step of a multiple step plasma recipe). The ninth aspect through the thirteenth aspect presented below are within this third category. Finally, the fourth category associated with the present invention relates to how one or more of the above-noted aspects may be implemented into a semiconductor fabrication facility. The fourteenth aspect through the seventeenth aspect presented below are within this fourth category.

A first aspect of the present invention is embodied in a plasma processing system having calibration capabilities in relation to the monitoring of plasma processing operations. The plasma processing system includes a processing chamber having a window with an inner surface which is exposed to plasma processes conducted within the chamber and an outer surface which is isolated from such processes. A plasma generator is associated with the plasma processing system to provide the plasma for the plasma processes. Any technique and corresponding structure for forming a plasma in the chamber is appropriate for this first aspect of the present invention. A first spectrometer assembly (e.g., one or more spectrometers of any type, such as scanning-type spectrometers and solid state spectrometers) is located outside of the chamber and is operatively interconnected with the window through a first fiber optic cable assembly (e.g., one or more fiber optic cables). A calibration light source is also located outside of the chamber and operatively interconnected with the window through a second fiber optic cable assembly (e.g., one or more fiber optic cables). Ends of the first and second fiber optic cable assemblies may be disposed on, but are preferably spaced from, the outer surface of the window to establish the noted operative interconnection in the nature of receiving data transmitted through the window.

In one embodiment of the first aspect of the present invention, "calibration" involves a comparison between data relating to the calibration light which is sent to the window by the calibration light source (e.g., a pattern, intensity, or both, of the corresponding optical emissions) and data relating to a first portion of this same calibration light which is reflected by the inner surface of the window on the processing chamber (e.g., a pattern, intensity, or both, of the first portion). The inner surface of the window of the processing chamber is that portion of the window which is typically affected by plasma processes conducted within the chamber. Changes on the inner surface of the window may have an effect on any evaluation of a plasma process being conducted within the chamber if such an evaluation is based upon the transmission of optical emissions through the window. These changes may be identified through the use of the noted calibration light since changes to the inner surface of the window will affect the reflection of the calibration light by the inner surface. Therefore, the "calibration" available from this embodiment of the first aspect of the invention may be used to calibrate an "optical emissions based" plasma monitoring system by making at least one adjustment in relation to such a system based upon the above-noted comparison. The types of "adjustments" which are contemplated by this embodiment of the first aspect are addressed in relation to the third aspect of the invention presented below.

Information on the window in relation to calibration in accordance with the first aspect of the present invention preferably includes information which is specific to the inner surface of the window on the processing chamber through which optical emissions are obtained. That is, calibrations in accordance with this first aspect are preferably in relation to only the inner surface of the window and not the outer surface of the window. Steps may be undertaken such that the portion of the calibration light which is reflected by the inner surface of the window is readily available for comparison with the calibration light in the form as it is being sent to the window in another embodiment of the subject first aspect. This may be accomplished through appropriately configuring the window. For instance, at least a portion of the window, which includes that area where the calibration light impacts the window, may have a generally wedge-shaped configuration (e.g., variable window thickness).

Another characterization of a window configuration in this embodiment is that at least a portion of the inner and outer surfaces of the window may be disposed in non-parallel relation. These types of configurations are particularly useful when the relevant ends of the first and second fiber optic cable assemblies are coaxially disposed or are at least disposed in parallel relation. In this regard, the ends of the first and second fiber optic cable assemblies may be disposed such that reference axes extending from the ends of these fiber optic cable assemblies will each impact the outer surface of the window at an angle other than perpendicular, but will each impact the inner surface of the window in at least substantially perpendicular fashion. As such, that portion of the calibration light which is reflected by the outer surface of the window will be directed away from the end of the first optic cable assembly and will not be "collected" thereby. However, at least part of that portion of the calibration light which is reflected by the inner surface of the window will be directed back to the end of the first fiber optic cable assembly such that it is available to the first spectrometer assembly and thereby available for the above-noted comparison.

Another way to collect that portion of the calibration light which is reflected by the inner surface of the window instead of that which is reflected by the outer surface of the window may be done with a conventional window or where the inner and outer surfaces of the window are at least substantially parallel (e.g., a uniform thickness window configuration). In this case, the ends of the first and second fiber optic cable assemblies may be laterally displaced and directed to the same general area on the window from at least generally equal but "opposite" acute angles (e.g., "pointing" toward the same general area at an angle other than perpendicular, but from generally an "opposite" direction). To illustrate this characterization, consider a reference plane which extends through the inner and outer surfaces of the window substantially perpendicularly thereto. The end of the second fiber optic cable assembly would be disposed on a first side of this reference plane, displaced therefrom, and directed toward the window and at least generally in the direction of the reference plane such that light leaving its end would impact the outer surface of the window at an angle other than perpendicular. The end of the first fiber optic cable assembly would be disposed on a second side of this same reference plane (opposite the first side), displaced therefrom, and directed toward the window and at least generally in the direction of the reference plane such that at least a portion of the calibration light which is reflected by the inner surface of the window would be "collected" by the first fiber optic cable assembly for provision to the first spectrometer assembly. The thickness of the window will define at least in part the amount by which that portion of the calibration light which is reflected by the inner surface of the window is offset from that portion of the calibration light which is reflected by the outer surface of the window, and thereby the "sensitivity" to the relative positionings between the ends of the first and second fiber optic cable assemblies to collect only light reflected by the inner surface of the window versus its outer surface.

Anti-reflective coatings may also be applied to the outer surface of the window to reduce the effects of that portion of the calibration light which is reflected by the outer surface of the window—that is such that a comparison may be made between the calibration light that is sent to the window with that portion of the calibration light which is reflected by the inner surface of the window. A window with parallel inner and outer surfaces could be used with an arrangement whereby the ends of the first and second fiber optic cable assemblies were coaxially disposed and oriented such that reference axes projecting from their respective ends impacted both the inner and outer surfaces in at least substantially perpendicular fashion. Application of an anti-reflective coating to the outer surface of the window would reduce the amount of light which is reflected from the outer surface of the window and directed back to the first fiber optic cable assembly for provision to the first spectrometer assembly in this instance. However, there would still be some reflection from the outer surface which would be provided to the first spectrometer assembly along with the desired reflection from the inner surface. Therefore, preferably such an anti-reflective coating is used in combination with the above-noted techniques which provide for some degree of separation of the calibration light reflected from the inner and outer surfaces of the window.

Another embodiment of the first aspect of the present invention relates to a fiber optic cable fixture assembly. One application of this fixture assembly is to maintain one or more of the relevant ends of the first and second fiber optic cable assemblies in a fixed positional relationship relative to the window. Another application of this fixture assembly is to detachably interconnect one or more of, and more preferably each of, the first fiber optic cable assembly, the second fiber optic cable assembly, and the window with the processing chamber (e.g., with one or more threaded fasteners). One embodiment of such a fixture assembly is particularly useful for the case where at least the ends of the first and second fiber optic cable assemblies are coaxial and where the window is configured to provide for separation of that portion of the calibration light which is reflected by the inner surface of the window from that portion of the calibration light which is reflected by the outer surface of the window (e.g., using a generally wedge-shaped configuration for the window). In this case, the fixture assembly would include a recessed region which interfaces with or projects toward at least a portion of the outer surface of the window. At least a portion of the surface of the fixture assembly which defines this recessed region would include a light absorbing material to account for that portion of the calibration light reflected by the outer surface of the window (i.e., to absorb light which is reflected by the outer surface if it impacts the body of the fixture assembly). A first port would extend through the fixture assembly and intersect the recessed region in an orientation such that a reference axis projecting from the ends of the first and second fiber optic cable assemblies each would intersect the outer surface of the window at an angle other than perpendicular, and further such that each would intersect the inner surface of the window at least at a substantially perpendicular angle. Therefore, this embodiment of the fixture assembly may be used to retain the window and first and second fiber optic cable assemblies in a fixed relative positional relationship which allows the first fiber optic cable assembly to collect only that portion of the calibration light which is reflected by the inner surface of the window—not from the outer surface of the window.

Another embodiment of the first aspect of the present invention relates to the use of at least two different types of light by the calibration light source. One of these calibration lights may include a plurality of discrete intensity peaks, while the other of these lights may be defined by a continuum of intensity or where there are no discernible peaks (e.g., a constant intensity, a continually changing intensity, or a combination of both). In addition, one of these calibration lights may be used to identify one type of condition requiring calibration (e.g., a wavelength shift associated with the optical emissions data obtained through the window) while the other may be used for another, different type of condition requiring calibration (e.g., an intensity shift associated with the optical emissions data obtained through the window, a complete filtering of some part of the optical emissions transmitted through the window). How these types of light sources may be used to identify these types of conditions is addressed below in relation to the second aspect. Any one or more of the features discussed below on the second aspect therefore may be utilized in combination with the various features addressed in this embodiment of the first aspect of the present invention as well.

A second aspect of the present invention relates to one or more "conditions" which may be identified during some type of a calibration of a plasma processing system. Each of the various embodiments of this second aspect are embodied in a plasma processing system which includes a processing chamber, some type of a plasma monitoring assembly which monitors/evaluates (in at least some manner) plasma-based processes conducted within the chamber through optical emissions data of the plasma in the chamber during the process, and a calibration assembly which is operatively interfaced with this plasma monitoring assembly.

One embodiment of the calibration assembly associated with the second aspect of the present invention calibrates the plasma monitoring assembly for one or more conditions. One of these conditions is a wavelength shift which may be experienced in relation to the optical emissions data obtained on the subject plasma process. Another of these conditions is an intensity shift which may be experienced in relation to the optical emissions data obtained on the subject plasma process. Yet another of these conditions is where certain of the optical emissions, which should be available on the subject plasma process, are being at least substantially completely filtered (e.g., blocked out) by the window. Finally, one of these conditions is where the window is having different effects on different portions of the optical emissions. This would be the case where there are differing intensity shifts or multiple dampening effects throughout the optical emissions data being obtained on the subject plasma process. Any combination of the foregoing conditions may be identified and calibrated for by the calibration assembly of the second aspect of the present invention.

The calibration assembly discussed above in relation to the first aspect of the present invention may be used to identify and calibrate the subject plasma monitoring assembly for any of the above-noted types of conditions in relation to the second aspect of the present invention. Wavelength shifts may be identified through using a calibration light having a plurality of discrete and displaced (at different wavelengths) intensity peaks. Any shifting in the wavelengths at which these peaks appear in the calibration light which is sent to the window (calibration light) in relation to that portion of the calibration light which is reflected by the inner surface of the window (reflected light) would be indicative of a wavelength shift and which could be addressed and more preferably at least substantially alleviated by calibration. Intensity shifts may also be identified with this type of light by noting how the intensity of the peaks vary between the calibration light and the reflected light. Some peaks in the reflected light may be dampened in relation to the calibration light more than others, which would indicate the existence of multiple dampening effects. Peaks which were present in the calibration light but which were absent in the reflected light would indicate that there is filtering at those wavelengths where the peaks are absent. Preferably, intensity shifts, complete filtering, and different dampening effects are identified through using a type of calibration light having a continuum of intensity which provides a more complete picture than the case where a calibration light having discrete intensity peaks is used for any of these purposes. That is, little or no information is provided on the "behavior" of the window in relation to those wavelengths which are located between the intensity peaks in the calibration light (i.e., the effect of the window on the intensity of these wavelengths), and therefore assumptions must be made. There is no need for such assumptions in the case of using a calibration light with a continuum of intensity for the above-noted purposes.

A third aspect of the present invention is directed to monitoring a plasma process through initializing a plasma monitoring assembly. The plasma monitoring assembly evaluates at least one aspect of a subject plasma process (e.g., one currently being conducted within a processing chamber) by obtaining optical emissions data through a window on the processing chamber. Optical emissions which are obtained on the subject plasma process include at least wavelengths from about 250 nanometers to about 1,000 nanometers which defines a first wavelength range, and at least at every 1 nanometer throughout this first wavelength range.

Initialization of the plasma monitoring assembly in a first embodiment of this third aspect includes directing a calibration light toward the window through which optical emissions are obtained, reflecting a first portion of the calibration light from the window, and comparing the original calibration light which was sent with this first portion. Consequently, any combination of the various features discussed above in relation to calibration in accordance with the first and second aspects may be implemented in this third aspect as well. When the comparison of the calibration light with the first portion of the reflected light yields a first result (e.g., an intensity shift(s), a wavelength shift, filtering, or any combination thereof), at least one adjustment is made in relation to the plasma monitoring assembly.

Adjustments which may be made in relation to the plasma monitoring assembly in this first embodiment of this third aspect include physical adjustments to the plasma monitoring assembly. For instance, in the case where a spectrometer assembly is used to obtain optical emissions data and includes at least one scanning type spectrometer, the grating, one or more of its mirrors, or both may be moved (e.g., pivoted) to calibrate the plasma monitoring assembly. Any calibration of the plasma monitoring assembly involving a physical adjustment of the spectrometer assembly in this manner will typically be to address a wavelength shift which is typically due to "drifting" of the spectrometer assembly, although this type of physical adjustment may be used to address wavelength shifts from other sources. Another type of adjustment which may be made in relation to the plasma monitoring assembly is a calibration of the optical emissions which are collected or obtained on the subject plasma process, or more typically data which is representative of these optical emissions. In this regard, the "adjustment" may include the implementation of a single calibration factor or multiple calibration factors in the plasma monitoring assembly. A single calibration factor is typically utilized when there is a "uniform" intensity shift across the optical emissions to be evaluated (e.g., ±"x" intensity units possibly being considered "uniform"), whereas multiple calibration factors are typically utilized when there is a different degree of dampening across the optical emissions to be evaluated.

The calibration factor(s) may then be implemented to have the desired effect on the output of the spectrometer assembly. Another way to calibrate in this manner is to normalize the optical emissions to be evaluated (or data representative thereof) based upon the comparison of the calibration light and the first portion of the calibration light reflected by the window.

Initialization of the plasma monitoring assembly in a second embodiment of this third aspect includes the steps of monitoring the window on the processing chamber through which optical emissions are obtained. The second embodiment further includes the step of determining if the window is filtering out optical emissions within a first wavelength region which is contained within the first wavelength range of about 250 nanometers to about 1,000 nanometers, which again defines the optical emissions being obtained and made available for evaluation by the plasma monitoring assembly. As such, the various features discussed above in relation to the second aspect of the invention in relation to "filtering" may be included in this second embodiment of the third aspect as well. Finally, the second embodiment of the third aspect includes the step of having the plasma monitoring assembly ignore any optical emissions within any first wavelength region or that region(s) where filtering has been detected. Notification may be provided that a filtering condition has been identified. Moreover, a recommendation that the window be replaced may be issued in this situation.

The monitoring step of the second embodiment of the third aspect may include the step of directing a calibration light toward the window, reflecting a first portion of this calibration light from the window, and comparing the calibration light with this first portion. As such, any one or more of the features discussed above in relation to the first and second aspects of the present invention may be utilized by this second embodiment of the third aspect as well. The second embodiment may also include the step of making at least one adjustment in relation to the plasma monitoring assembly when certain conditions are identified by the above-noted calibration procedure. As such, any one or more of the features discussed above in relation to the first embodiment of this third aspect may also be utilized by this second embodiment of the third aspect of the present invention.

Initialization of the plasma monitoring assembly in a third embodiment of the above-noted third aspect of the present invention includes the steps of monitoring the window on the processing chamber through which optical emissions on the subject plasma process are obtained. The third embodiment further includes the step of determining if the window is having a first effect (e.g., dampening) on a first wavelength region which is contained within the first wavelength range of about 250 nanometers to about 1,000 nanometers (which defines the optical emissions being obtained and made available for evaluation by the plasma monitoring assembly), as well as a second effect (e.g., dampening) on a second wavelength region which is also contained within the first wavelength range but outside of the first wavelength region associated with the first effect. As such, the various features discussed above in relation to the second aspect of the invention in relation to identifying different dampening effects may be included in this third embodiment of the third aspect as well. Finally, the third embodiment of the third aspect includes the step of making at least one adjustment in relation to the plasma monitoring assembly if any of these first and second types of effects are identified. As such, any one or more of the features discussed above in relation to the first embodiment of the third aspect may be utilized by this third embodiment of the third aspect as well.

The monitoring step of the third embodiment of the third aspect may include the step of directing a calibration light toward the window, reflecting a first portion of this calibration light from the window, and comparing the calibration light with this first portion. As such, any one or more of the features discussed above in relation to the first and second aspects of the present invention may be utilized by this third embodiment of the third aspect as well. The third embodiment may also include the step of making at least one adjustment in relation to the plasma monitoring assembly when certain conditions are identified by the above-noted calibration procedure. As such, any one or more of the features discussed above in relation to the first embodiment of this third aspect may also be utilized by this third embodiment of the third aspect of the present invention.

A fourth aspect of the present invention relates to a method for monitoring a plasma process which includes monitoring a window on the processing chamber in which the plasma process is conducted. In this regard, a quantity of product is loaded into the processing chamber (e.g., at least one wafer), the plasma process is thereafter conducted on this product (e.g., a plasma recipe), and data on the plasma process (e.g., optical emissions of the plasma in the chamber during the process) is obtained through the window on the processing chamber. The plasma process is evaluated based upon both the data which is obtained through the processing chamber window and the monitoring of the window.

In a first embodiment of the above-noted fourth aspect, the monitoring of the window more specifically includes the step of monitoring an actual condition of the window. The condition of the window in the case of the subject second embodiment is monitored other than through data which is obtained on the plasma process. That is, the data which is obtained on the plasma process being conducted within the processing chamber is not utilized in any manner by the step of monitoring the condition of the window in this first embodiment of the fourth aspect of the present invention.

Various features may be utilized by the above-noted first embodiment of the fourth aspect of the present invention, and these features may be used alone in the above-noted first embodiment as well as in any combination. Monitoring of the condition of the window during execution of the plasma process within the chamber may be prohibited as an additional feature of the subject first embodiment. That is, the monitoring of the condition of the window and the running of the plasma process may be executed at different and non-overlapping times. Typically, the monitoring of the condition of the window will be done prior to running of the subject plasma process within the chamber to determine the effect that the inner surface of the window will have on the subject plasma process data which is obtained through the window. As such, one or more of the features discussed above in relation to the second aspect of the present invention on "identifiable conditions" (e.g., wavelength shift, intensity shift, filtering, "uniform" dampening effects (intensity), multiple dampening effects (intensity)), as well as how these conditions may be identified (e.g., sending a calibration light toward the window and comparing this light with that portion of the calibration light which is reflected by the inner surface of the window), may be implemented in this first embodiment of fourth aspect of the present invention as well. At least one adjustment may be made in relation to the plasma monitoring assembly once one or more of these "conditions" is identified. The various types of "adjustments" are addressed above in relation to the third aspect of the present invention, and any one or more of those features may be included in this first embodiment of the fourth aspect as well.

A second embodiment of the subject fourth aspect characterizes the monitoring of the window in a different manner than as discussed above in relation to the first embodiment. In this regard, the monitoring step of this second embodiment includes the steps of directing a calibration light toward the window, reflecting a first portion of this calibration light from the inner surface of the window, and comparing the calibration light as it was sent to the window with that portion of the calibration light which was reflected by the inner surface of the window. As such, one or more of the features presented above in relation to the first and second aspects of the invention may be included in this second embodiment of the fourth aspect as well. The types of conditions which may be identified through this monitoring of the processing chamber window are presented above in relation to the second aspect of the present invention, and any one or more of these features may be included in this second embodiment of the fourth aspect as well.

A fifth aspect of the present invention relates to determining when plasma exists or is "on" within a processing chamber based upon machine-based optical analysis (i.e., not by a human eye). More specifically, the fifth aspect relates to obtaining optical emissions from within the processing chamber, evaluating these optical emissions, generating a plasma in the processing chamber, and identifying when plasma exists within the processing chamber through a machine-based evaluation of the optical emissions from within the processing chamber.

Various features may be utilized by the above-noted fifth aspect of the present invention, and these features may be used alone as well as in any combination. For instance, the identification of when plasma exists within the chamber through optical analysis may implement various techniques. The time at which the plasma comes on within the chamber may be identified by determining when the optical emissions from within the processing chamber exceeds a certain predetermined output (e.g., when the intensity of the optical emissions or a certain portion thereof within the chamber exceeds a certain amount). The identification of when plasma exists through optical analysis may also be directed toward evaluating how the optical emissions change over time. For instance, when no plasma exists within the chamber, there will be no corresponding optical emissions being emitted from the chamber. Therefore, the identifying step may simply be directed toward noting any change from a "dark" condition to a "light" condition. Another way to determine when plasma exists within the chamber through an optical analysis is to determine when the optical emissions from within the chamber include at least a certain number of discrete intensity peaks, each of which has at least a certain intensity. Finally, the presence of plasma within the chamber may be identified by determining when the current optical emissions from within the chamber match at least one output recorded on a computer-readable medium which was previously obtained from the chamber at a time when plasma was known to exist within the chamber.

Another feature which may be incorporated in the subject fifth aspect relates to the processing of a product after the plasma exists within the chamber. In one embodiment, the window on the chamber may be monitored in accordance with the fourth aspect of the invention discussed above. These monitoring operations may be automatically terminated at a time when plasma is first identified within the chamber through the noted optical analysis provided by this fifth aspect. In another embodiment, plasma processes conducted within the chamber may be monitored by a plasma monitoring assembly. Calibration of this plasma monitoring assembly may be made available in accordance with the third aspect of the invention discussed above. These calibration operations may be automatically terminated when plasma is identified within the chamber through the noted optical analysis provided by this fifth aspect.

A sixth aspect of the present invention relates to a plasma spectra directory which contains at least optical emissions data from plasma processes previously conducted within the processing chamber and which are used to evaluate plasma processes subsequently conducted in this very same processing chamber. The plasma spectra directory is stored on a computer-readable storage medium and for ease of description includes a first data structure having a plurality of data entries. Each of these data entries includes data representative of optical emissions from at least one time during the subject plasma process, and this data is associated with one of a first category, a second category, and a third category.

The data entries associated with the first category are those plasma processes which have been run in the chamber and which define a "standard" against which subsequent plasma processes are judged. Plasma processes which are run in the processing chamber are evaluated to determine if they "correspond" or "match" with at least one data entry associated with the first category. These types of plasma processes associated with the first category thereby may be characterized as "normal" runs. In this case, plasma processes which are associated with the first category are at least assumed to have proceeded without substantially any error, and may be tested in some manner to confirm that they did in fact proceed without any substantial error or aberration.

The optical emissions of the plasma in the processing chamber will typically reflect whether a given plasma process is proceeding in a "normal" fashion. In this regard, optical emissions associated with a data entry of the first category preferably include at least wavelength; from about 250 nanometers to about 1,000 nanometers at least at every 1 nanometer throughout this range and at least at every 1 second from the subject plasma process. Although evaluations of plasma processes subsequently conducted in the subject processing chamber need not utilize all of this data, it will be available if desired/required. Moreover, typically data on the entirety of the subject plasma process, or at least that portion of the process after the plasma has stabilized, is included in data entries associated with the first category.

Virtually any type of plasma process may be included in data entries associated with the first category as long as its optical emissions data provides an indication that the plasma process is proceeding in a certain fashion. One or more plasma recipes (run on production wafers, qualification wafers, or both), plasma cleanings (before or after a wet clean), and conditioning water operations may each be included in the plasma spectra directory and associated with the first category. Multiple "species" of these types of plasma processes may also be included in the plasma spectra directory in association with the first category (e.g., different types of plasma recipes). Multiple data entries of the same "species" may also be included in the plasma spectra directory in association with the first category as well (e.g., multiple entries of the same plasma recipe run on the same type of product).

The data entries associated with the second category of the subject sixth aspect are those plasma processes (e.g., plasma recipes, plasma cleans, conditioning wafer operations) which have been run in the processing chamber and which have encountered at least one error Dr aberration. This error or aberration will typically be represented by a change in the optical emissions of the plasma in the processing chamber, and the cause may be identified by a review of these optical emissions. Typically this review is after termination of the subject plasma process. Obtaining optical emissions data within the above-noted wavelength range increases the likelihood that optical emissions data which is representative of the error or aberration will in fact be available for inclusion in a data entry which is associated with the second category.

The identification or cause of the error or aberration is included in some manner with the data entry which is associated with the second category. Various actions may be initiated based upon this information. An alert or the like (audio, visual, or both) may be issued to apprise personnel that an error has been encountered in the subject plasma process in the subject processing chamber. Specific information on the error may also be made available, as well as one or more ways to address or correct the error or aberration. Finally, corrective actions may be automatically undertaken if desired.

Typically, the entire run in which the error occurred is not included in the data entry associated with the second category. Instead, only those optical emissions which reflect the existence of the subject error or aberration are typically included in such a data entry. This may include optical emissions data from only a single point in time during the subject plasma process or from multiple times. Optical emissions included in any data entry associated with the second category may also be of the above-noted wavelength range. However, if the error or aberration is only reflected in a certain portion of the optical emissions which are obtained on the subject plasma process, only this portion need be included in the plasma spectra directory for the subject data entry associated with the second category.

The data entries associated with the third category in relation to the subject sixth aspect are those plasma processes which have been run in the processing chamber and which are "unknown" to the plasma spectra subdirectory. That is, the optical emissions from the subject plasma process have failed to correspond with any data entry associated with the first category or with the second category. Moreover the reason as to why this is the case has yet to be determined, or more accurately the cause has yet to be associated with a data entry on the computer-readable storage medium. Two situations will typically encompass each case where a data entry is recorded in the plasma spectra directory and associated with the third category. Plasma processes which have not yet been recorded in the plasma spectra directory and associated with the first category are one such situation. In this case, the entirety of the subject plasma process may be recorded in the plasma spectra directory and associated with the third category. Once this data entry is identified as being a new plasma process which did or was assumed to have proceeded without substantially any error or aberration, the data entry may be "transferred" from the third category to the first category. Plasma processes which lave encountered an error which has not been recorded in the plasma spectra directory and associated with the second category will also be recorded in a data entry under the third category. Typically, only data from the initial occurrence of the error or aberration until the end of the plasma process will be recorded in a data entry associated with the third category in this situation. Subsequent evaluation of the optical emissions data from this plasma process may reveal that a "new" error was encountered. If the cause of the error is identified, all or a portion of the data from the subject data entry associated with the third category may then be "transferred" to the second category.

A seventh aspect of the present invention relates to various analytical techniques which may be used to evaluate a plasma process in at least some manner. In a first embodiment of this seventh aspect, a computer-readable storage medium includes a plurality of data entries. At least one of these data entries is associated with the type of first category discussed above in relation to the sixth aspect, while at least one of these data entries is associated with the type of second category also discussed above in relation to the sixth aspect. The evaluation technique embodied by this first embodiment of the seventh aspect first determines if the subject plasma process corresponds with any data entry associated with the first category. Any such correspondence may be used to characterize the subject plasma process as "normal" or the like. If the subject plasma process at any time fails to correspond with at least one data entry under the first category, this first embodiment of the seventh aspect will then "search" those data entries under the second category to see if the subject plasma process has encountered a known error or aberration. Therefore, data entries under the second category are not searched in each case.

Various features may be utilized by the above-noted first embodiment of the seventh aspect of the present invention, and these features may be used alone in the above-noted first embodiment as well as in any combination. Initially, each of the various features/concepts discussed above in relation to the sixth aspect are equally applicable to and may be incorporated in this first embodiment of the subject seventh aspect. There are also various ways of determining whether the optical emissions data of the subject plasma process conforms or corresponds with a given data entry. Conformance or correspondence may be based upon determining if the pattern of the current optical emissions is a "match" with the pattern of the relevant optical emissions from the data entry. What are the "relevant" optical emissions may also be subject to a number of characterizations. For instance, the time associated with the current optical emissions may be used as a criterion to determine whether these emissions correspond with a given data entry. That is, the time at which the subject optical emissions were obtained would be used to identify which optical emissions from a given data entry would be used for the subject comparison (i.e., select the optical emissions from the data entry which were obtained at the same time as the subject optical emissions). Alternatively, the subject plasma process may simply be evaluated to determine if it is progressing in the same fashion as at least one of the data entries associated with the first category, although not necessarily at the same rate. Time would not be a limiting criterion in this case.

Various actions may be initiated if the current plasma process corresponds with a data entry associated with the second category, either manually or automatically. For instance, the subject plasma process may be terminated, an alert may be issued that an error has been encountered, further use of the processing chamber for processing product may be suspended, adjustment of the plasma process may be undertaken in an attempt to remedy the subject error(s), or any combination thereof.

A second embodiment of the subject seventh aspect utilizes a computer-readable storage medium which includes a first data entry which is associated with a first category of the type identified above in relation to the sixth aspect. This data entry includes a plurality of first data segments from a plurality of different times during one plasma process previously conducted in the processing chamber. Each data segment includes optical emissions of the plasma in the chamber for wavelengths of at least about 250 nanometers to about 1,000 nanometers which defines a first wavelength range, and at least at every 1 nanometer throughout this first wavelength range. This second embodiment entails obtaining current optical emissions from another plasma process run in this same processing chamber which are also within the first wavelength range and at least at every 1 nanometer throughout this first wavelength range. A comparison is undertaken between the current optical emissions and those associated with at least one first data segment of the first data entry throughout the first wavelength range and at least at every 1 nanometer throughout the first wavelength range. The features discussed in relation to this second embodiment may be incorporated with those discussed above in relation to the first embodiment of the subject seventh aspect.

A third embodiment of the subject seventh aspect also utilizes a computer-readable storage medium. A first plasma process is run in the processing chamber. Optical emissions of the plasma in the chamber are obtained for wavelengths of at least about 250 nanometers to about 1,000 nanometers which defines a first wavelength range, and at least at every 1 nanometer throughout this first wavelength range. This data is obtained at a plurality of times during this first plasma process and such is recorded in a first data entry on the computer-readable storage medium. A second plasma process is conducted after termination of the first and similar data is obtained. The second plasma process is evaluated based upon at least a portion of the optical emissions data from the second plasma process. In some cases it may be desirable to compare the optical emissions from the second plasma process with those optical emissions from the first plasma process throughout the entirety of the first wavelength range and at least at every 1 nanometer throughout this first wavelength range. However, in some cases this may not be practical, desirable, or necessary. In this regard, the progress of the second plasma process in relation to the first plasma process recorded in the first data entry on the computer-readable storage medium may be based upon an evaluation of at least a 50 nanometer bandwidth and at least every 1 nanometer throughout this smaller bandwidth.

A smaller wavelength region may be selected for evaluating the second plasma process in relation to the first plasma process in a variety of manners. The particular wavelength(s) at which error(s) have been previously encountered in running this same plasma process may be used to select that portion of the first wavelength range which should be used in the subject evaluation (e.g., ±25 nanometers of each wavelength which is indicative of an error or aberration). Moreover, a wavelength region may be selected which includes each of the errors previously encountered on the same type of plasma process. The "width" of the region may be defined by the two extreme wavelengths, although it would be preferred to include a "buffer" of sorts on each of these ends (e.g., expand the range by 25 nanometers on each end). Finally, the particular wavelength(s) which is indicative of the endpoint of the subject plasma process or discrete/discernible portion thereof may be used to select that portion of the first wavelength range which should be used in the subject evaluation (±25 nanometers of each such wavelength). Individual endpoint indicator wavelengths are discussed in more detail below in relation to the ninth aspect of the present invention.

An eighth aspect of the present invention relates to identifying the type of plasma process conducted within the processing chamber. This aspect may be used to identify whether a plasma process is a certain type of plamsa recipe being run on a certain type of production wafer, a certain type of plasma recipe being run on a certain type of qualification wafer a certain type of plasma recipe being run on a certain type of conditioning wafer, or a plasma clean being run in a chamber. A first embodiment of this eighth aspect is able to identify the particular type of a plasma recipe being run on product (e.g., production wafer, qualification wafer) in a processing chamber based upon the storage of at least two plasma recipes on a computer-readable storage medium. In this regard, the computer-readable storage medium includes a plurality of data entries. A first of these data entries includes relevant data from a plurality of times during a first plasma recipe run on product in the processing chamber (and preferably of the entirety of this first plasma recipe at least after stabilization of the plasma). A second of these data entries includes relevant data from a plurality of times during a second plasma recipe (different from the first plasma recipe) run on product in the same processing chamber (and preferably of the entirety of this second plasma recipe at least after stabilization of the plasma). Data on a subject plasma recipe which is being run on product in the same processing chamber is obtained. This data is used to determine if the current plasma recipe is of the same type as the first or second plasma recipe stored on the computer-readable storage medium. Preferably, this determination is completed prior to termination of the current plasma recipe and at least before the next product is loaded into the chamber. This first embodiment of the eighth aspect may be used to determine not only the identity of the subject plasma process, but the type of product (e.g., whether a production wafer or a qualification wafer) that is being processed by including relevant data from prior plasma processes on the computer-readable storage medium. That is, by including a plasma recipe "A" run on a certain type of production wafer in one data entry and the same plasma recipe "A" on a certain type of qualification wafer in another data entry, the ability exists to determine if the current plasma recipe is being run on a production versus a qualification wafer.

Various features may be utilized by the above-noted first embodiment of the eighth aspect of the present invention, and these features may be used alone in the above-noted first embodiment as well as in any combination. Initially, the data obtained on the current plasma process may be optical emissions of the plasma in the processing chamber. These optical emissions may include at least wavelengths from about 250 nanometers to about 1,000 nanometers (inclusive) which defines a first wavelength range, and optical emissions may be obtained at least at every 1 nanometer throughout this first wavelength range. Optical emissions of the subject plasma process may be compared with one or both of the first and second plasma recipes stored on the computer-readable storage medium to see if there is sufficient correspondence therebetween. As such, the techniques discussed above in relation to the seventh aspect may be implemented in this first embodiment of the eighth aspect as well.

A second embodiment of the subject eighth aspect is directed toward inputting the plasma recipe to be run in the chamber and using the principles discussed above in relation to the first embodiment of the eighth aspect to verify that no errors were made when inputting the subject plasma recipe. That is, the identify of the subject plasma process is determined in accordance with the first embodiment of this eighth aspect. Therefore, each of the various features discussed above in relation to the first embodiment of the eighth aspect may be incorporated in this second embodiment of the eighth aspect as well. The identification of the subject plasma process through optical analysis in accordance with the foregoing is then conveyed in some manner to the appropriate personnel (e.g., on a display). If the wrong plasma process was input for a certain wafer or "lot" of wafers, the identification of the subject plasma process and the conveyance of this identity to the appropriate personnel would apprise the personnel of this situation.

A third embodiment of the subject eighth aspect is directed to identifying ac subject plasma recipe based upon at least two plasma recipes which are stored on a computer-readable storage medium and which were previously run in the same processing chamber. The first execution of the subject plasma recipe is initiated and is of the type associated with either the first or second plasma recipe. At least one characteristic of the plasma is monitored during the execution of each subject plasma recipe. Both the first and second plasma recipes are available for comparison against the first execution of the subject plasma recipe. However, after the first execution of plasma recipe is identified as being either the first or second plasma recipe from the computer-readable storage medium (identified plasma recipe), subsequent executions of the subject plasma recipes are evaluated at least initially only in relation to the identified plasma recipe on the computer-readable storage medium. This embodiment is particularly pertinent to the case where the first wafer of a cassette or boat of wafers is evaluated in accordance with the foregoing since the same plasma recipe is typically run on the entire cassette. Therefore, once the third embodiment of the eighth aspect determines the identify of the plasma recipe being run on the first wafer, all subsequent wafers in the cassette are at least initially evaluated against only one plasma recipe on the computer-readable storage medium. Enhanced evaluation speed therefore may be realized. If any such subsequent executions of the subject plasma recipe deviate from the identified plasma recipe on the computer-readable storage medium, one variation of this third embodiments makes other plasma recipes on the computer-readable storage medium available for evaluation of the then current plasma recipe. Another possibility would be to check for any data entry of the same plasma recipe that was run on a qualification wafer versus a production wafer if there was a failure of the current plasma recipe to correspond with the plasma recipe stored on the computer-readable storage medium (i.e., assuming that the first wafer was a production wafer and had its plasma recipe identified). In this case, the logic would be to evaluate the entire cassette first against the plasma recipe for the production wafer stored on the computer-readable storage medium, and then against the same plasma recipe but for a qualification wafer stored on the computer-readable storage medium if necessary.

A ninth aspect of the present invention relates to engaging in research to identify one or more indicators of a first endpoint which is when the plasma process (e.g., plasma recipe, plasma clean, conditioning wafer operation) or portion thereof (e.g., plasma step of a plasma recipe) has achieved a first predetermined result (e.g., the etching away of a certain layer from a multi-layer structure such as a wafer). In this regard, a first plasma process is run in the processing chamber. Optical emissions of the plasma are obtained at a plurality of times during this first plasma process. These optical emissions include at least wavelengths from about 250 nanometers to about 1,000 nanometers (inclusive) which defines a first wavelength range.

Optical emissions are preferably obtained at least at every 1 nanometer throughout this first wavelength range. These optical emissions are evaluated or analyzed and at least one endpoint indicator is selected based upon this analysis.

Various features may be utilized by the ninth aspect of the present invention, and these features may be used alone in relation to this ninth aspect as well as in any combination. For instance, the subject analysis may include generating a plot of intensity versus time for a plurality of individual wavelengths which are within the first wavelength range. Preferably, plots are generated for each wavelength which is available based upon the data collecting resolution of the relevant "collecting" structure (e.g., spectrometer(s)). These plots are analyzed after the conclusion of the running of the plasma process, preferably in view of information as to about what time the first endpoint should have occurred (e.g., calculated based upon knowledge of process conditions and thickness of layer to be etched away). Any wavelength having a plot with a distinctive change in intensity around that time where the first endpoint should have occurred may be identified as a possible endpoint indicator candidate.

Further features of the subject ninth aspect relate to the above-noted plots. Initially, the use of the above-described methodology requires no knowledge of the chemistry involved in the subject plasma process. Instead, data is taken over a large wavelength range and at a data collecting resolution which should include at least one indicator of the first endpoint (e.g., at least one specific wavelength which undergoes a change which corresponds with the occurrence of the first endpoint). A pattern of the plot(s)of the individual wavelength(s) which is selected as being a possible candidate for an endpoint indicator of the first endpoint may in turn be used as the endpoint indicator. Moreover, the subject plot may be defined by an equation or function up to that time at which the first endpoint occurs (e.g., a linear function, a first order polynomial, a second order polynomial). When the current plasma recipe no longer "fits" this function, endpoint may be called. First and second derivatives of this function may provide for a more expeditious determination of endpoint and are contemplated by this ninth aspect as well.

Multiple executions of the same plasma process may be required to increase the confidence level associated with the endpoint indicators which are selected as being indicative of the first endpoint. When the above-noted plots are used, a comparison of the plots between two or more runs may identify a pattern which stays the same, but which undergoes some type of change. This change may be a temporal shift, a shift in the intensity associated with the pattern, a uniform enlargement of the pattern, a uniform reduction in the pattern, or any combination thereof. Patterns which undergo this type of change are an indicator that the corresponding wavelength is in fact indicative of the first endpoint. One "controlled" way of inducing such a shift is to process two or more, products having different thicknesses. There should be a temporal shift if the particular wavelength is in fact indicative of the first endpoint in this case. That is, the corresponding plot should have a change which shifts in accordance with the change in thickness.

The analysis used to select at least one indicator of the first endpoint may also include examining the optical emissions to identify the existence of intensity peaks, and determining if any of these intensity peaks at least substantially disappear at about a time where the first endpoint should occur. Any such wavelength associated with these types of intensity peaks may be an indicator of the first endpoint.

Similarly, the analysis used to select at least one indicator of the first endpoint may include examining the optical emissions to determine if any intensity peaks develop at about a time when the first endpoint should occur. Any such wavelength associated with these types of intensity peaks may also be an indicator of the first endpoint. In addition, the analysis used to select at least one indicator of the first endpoint may include examining the optical emissions to determine if any intensity peak reaches a steady state at about a time when the first endpoint should occur. Any such wavelength associated with these types of intensity peaks may also be an indicator of the first endpoint. Finally, the analysis used to select at least one indicator of the first endpoint may include examining the optical emissions to determine if any intensity peak, which has been at a steady state, undergoes change at about a time when the first endpoint should have occurred. Any such wavelength associated with these types of intensity peaks may also be an indicator of the first endpoint. Any combination of the foregoing may be used to select an endpoint indicator.

A tenth aspect of the present invention relates to monitoring at least two aspects of a plasma process, one of which may be the "health" of the plasma process and another of which may be at least one endpoint associated with the plasma process. This tenth aspect is applicable to any plasma process, including plasma recipes which are run on product (e.g., production wafers, qualification wafers) in a processing chamber, plasma cleanings (e.g., with or without a wet clean), and conditioning wafer operations.

By further way of introduction, substantially the entirety of the plasma process may be evaluated in relation to its "health", except possibly the initial portion of the plasma process where the plasma is typically unstable. In contrast, the evaluation of the plasma process in relation to identifying an endpoint need not be initiated until closer to the time at which the subject endpoint should be reached. Moreover, the frequency at which the plasma health is evaluated need not be the same as the frequency at which the evaluation is undertaken to identify the subject endpoint. For instance, the plasma health may be assessed less frequently than the evaluation relating to identifying the subject endpoint.

In a first embodiment of the above-noted tenth aspect, a plasma process is conducted within the processing chamber and at least a first endpoint is associated with this plasma process. The plasma process is monitored to identify the occurrence of the first endpoint. Any endpoint detection technique may be used for this first embodiment of the tenth aspect, including those addressed below in relation to the eleventh through the thirteenth aspects of the present invention. The "condition" of the plasma is also evaluated during, and more preferably throughout the entirety of, the plasma process (again excluding possibly the initial portion when the plasma is typically unstable). One way of defining the "condition" associated with this first embodiment of the tenth aspect is equating the same with the cumulative result of all parameters having an effect on the plasma in the processing chamber. This may be done by evaluating optical emissions of the plasma in the chamber which includes at least wavelengths from about 250 nanometers to about 1,000 nanometers which defines a first wavelength range, and at least at every 1 nanometer throughout this first wavelength range and at least at a plurality of different times during the subject plasma process. Another way of characterizing the monitoring of the "health" of the current plasma process is to determine if it is proceeding in accordance with at least one plasma process previously conducted within the same processing chamber. Therefore, the features discussed above in relation to the seventh aspect of the present invention may be utilized in this tenth aspect of the present invention as well.

A second embodiment of this tenth aspect involves generating a plasma in the processing chamber and running a first plasma step in the chamber. Associated with this first plasma step is a first endpoint which is when the first plasma step has produced a first predetermined result. At least one characteristic of the plasma in the chamber is evaluated during the first plasma step using a first time resolution. Although typically equal increments will be utilized in this evaluation, such is not required by this second embodiment of the tenth aspect. An evaluation is also undertaken to identify an occurrence of the first endpoint using a second time resolution which is different than the first. The above-noted "at least one characteristic" may be the condition of the plasma during the subject plasma process, although it need not be the case.

An eleventh aspect of the present invention generally relates to monitoring a plasma process to identify an occurrence of a first endpoint associated with the plasma process. More specifically, at least two different techniques are used to evaluate the current plasma process to identify the first endpoint in this eleventh aspect. Endpoint may be called when only one of these techniques identifies the occurrence of the first endpoint, or may be called after each of these techniques identifies the occurrence of the first endpoint. This eleventh aspect of the present invention is applicable to any plasma process having at least one endpoint associated therewith (e.g., plasma recipes which are run on product in a processing chamber, plasma cleanings, and conditioning wafer operations).

One of the techniques which may be used in the subject eleventh aspect involves a comparison of the current optical emissions of the plasma in the chamber with optical emissions of the plasma in the chamber from a previous time in the same process, preferably the immediately preceding time at which optical emissions were obtained. In one embodiment, these optical emissions include at least wavelengths from about 250 nanometers to about 1,000 nanometers at least at about every 1 nanometer. When these optical emissions are substantially a "match" (e.g., when the differential of the pattern of current optical emissions and the pattern of previous-in-time optical emissions is substantially free of peaks), particularly after an initial portion of the plasma has been completed, endpoint may be deemed to have been reached. Stated another way, when there is no longer any substantial change in the optical emissions, endpoint may be deemed to have been reached.

Another technique for identifying endpoint which may be used in the subject eleventh aspect involves a comparison of the current optical emissions of the plasma in the chamber with a standard. This "standard" may be optical emissions of the plasma in the chamber from a previous execution of this same plasma process in the same processing chamber at a time when endpoint was at least deemed to have been reached. Moreover, this standard may be stored on a computer-readable storage medium. In one embodiment, these optical emissions include at least wavelengths from about 250 nanometers to about 1,000 nanometers at least at about every 1 nanometer. When these optical emissions are substantially a "match" (e.g., when the differential of the pattern of current optical emissions and the pattern of previous-in-time optical emissions is substantially free of peaks), particularly after in initial portion of the plasma has been completed, endpoint may be deemed to have been reached.

Yet another technique which may be used in the subject eleventh aspect of the present invention includes determining if there is at least a first change in the impedance of the processing chamber which is reflected in the optical emissions of the plasma in the processing chamber. A "modal" change in the plasma may be indicative of a change in impedance which in turn is indicative of endpoint. This "modal" change may be a rather sudden and significant increase or decrease in the intensity of the entirety of the plasma or of a particular wavelength(s).

Another technique which may be used to identify endpoint in relation to the subject eleventh aspect includes evaluating at least one individual wavelength of light forming the plasma of the subject plasma process. This one wavelength of light may be evaluated to determine when a plot of intensity versus time deviates by more than a predetermined amount from a predetermined equation (e.g., when there is no longer a "fit" between the current data and the subject equation). Therefore, the features discussed above in relation to the ninth aspect of the present invention are also relevant to this portion of the eleventh aspect as well. Moreover, any one or more individual wavelengths of light may be evaluated to determine when the change in slope over time of the wavelength(s) changes by more than a predetermined amount. Second order derivatives may be used as well.

A twelfth aspect of the present invention is directed toward a technique for identifying the occurrence of a first endpoint associated with a plasma process (e.g., plasma recipe, plasma clean, conditioning wafer operation) or a discrete/discernible portion thereof (e.g., a plasma step of a multiple step recipe or process). Optical emissions of the plasma in the chamber from the process are obtained. These optical emissions include at least wavelengths from about 250 nanometers to about 1,000 nanometers which defines a first wavelength range. The data resolution which is used in collecting the optical emissions is no more than about 1 nanometer. This means that optical emissions are obtained at least at every 1 nanometer throughout the first wavelength range.

Identification of the first endpoint involves a comparison of the most current optical emissions of the plasma in the chamber with a first output. This first output may be optical emissions of the plasma in the chamber from a previous time in the same plasma process, preferably the immediately preceding time at which the optical emissions were obtained in relation to the now current optical emissions. This first output may also be optical emissions from the same type of plasma process which was previously conducted in the same processing at a time when endpoint should have occurred. In this case the first output could be stored on a computer-readable storage medium. When the above-noted comparison indicates that the current optical emissions and the first output are at least substantially a "match", particularly after an initial portion of the plasma has been completed, the first endpoint is deemed to have been reached. Confidence in the calling of the first endpoint by the above-noted technique may be enhanced by using a second technique and not calling the first endpoint until both of the techniques have "seen" the first endpoint. Any of the techniques discussed above in relation to the eleventh aspect of the invention may be utilized in this twelfth aspect for this purpose.

A thirteenth aspect of the present invention relates to identifying the occurrence of multiple endpoints in a single plasma process. Many plasma recipes will include a number of different plasma steps. Each of these plasma steps typically has an identifiable endpoint associated therewith. Therefore, the eleventh aspect of the present invention allows for the identification of at least two of these endpoints and including each endpoint associated with the subject plasma process. Each of the techniques identified in eleventh aspect discussed above may be utilized in this thirteenth aspect.

When to clean a processing chamber is the subject of the fourteenth aspect of the present invention. Product is loaded in the processing chamber. The processing chamber is sealed and a first plasma process is thereafter run on the product. Data relating to the plasma process is obtained. From this data a determination is made regarding the condition of the chamber. Specifically, a determination is made as to whether the interior of the chamber is sufficiently "dirty" from plasma processes previously run in the chamber to warrant cleaning the chamber. Personnel may be notified, actions may be initiated, or both, if this "dirty chamber" condition is identified. Appropriate actions include terminating the current plasma process, issuing an alert, suspending execution of any further plasma processes in the chamber until it is appropriately cleaned, or any combination thereof.

Various features may be utilized by the fourteenth aspect of the present invention, and these features may be used alone in relation to this fourteenth aspect as well as in any combination. The data which is obtained on the current plasma process may be optical emissions of the plasma in the chamber. Wavelengths obtained may include at least from about 250 nanometers to about 1,000 nanometers which defines a first wavelength range. Data may be obtained at least at every 1 nanometer throughout the noted first wavelength range.

Numerous techniques may be implemented to determine if the processing chamber should be cleaned using the data obtained on the plasma in the chamber. Description of these techniques will be in relation to optical emissions data. The current optical emissions (from the current time in the process) may be compared with a standard which is stored on a computer-readable storage medium. This standard may be optical emissions of plasma from the same chamber, but from a plasma process previously run in the chamber where the chamber was determined or assumed to be in need of cleaning. When the current optical emissions are at least substantially a match with this standard, the chamber will be deemed to be in need of cleaning. "Matches" may be based upon any pattern recognition technique. Determining the differential between the current optical emissions and the standard may also be used for this purpose.

Another way of determining when to clean the chamber using data obtained on the plasma involves endpoint detection. Each of the endpoint detection techniques discussed above in relation to the tenth through the thirteenth aspects of the present invention use data relating to the plasma in the chamber to identify endpoint. When any step of a multiple step plasma process takes longer than a pre-set maximum time limit, the chamber may be deemed to be in need of cleaning. If the total time to complete an entire plasma process takes longer than a pre-set maximum time limit, the chamber may also be deemed to be in need of cleaning. Endpoint detection techniques may be used in each of these cases. In the case of a multiple step plasma process, the endpoint may be identified for each of the steps of a multiple step process, or simply the endpoint of the last step in the subject plasma process may be identified, to determine the total time spent on the process.

Plasma cleaning operations are embodied within a fifteenth aspect of the present invention. A plasma clean removes materials from the interior of the processing chamber by having plasma exist within an "empty" chamber. No product (e.g., wafers) is contained within the chamber during a plasma clean.

Optical emissions of the plasma in the "empty" chamber are obtained at a plurality of times during the process in a first embodiment of this fifteenth aspect. A pattern of at least a portion of the optical emissions is compared with a first standard pattern during at least a portion of the process (e.g., a plot of intensity versus time). This first standard pattern may be recorded on a computer-readable storage medium. Furthermore, this first standard pattern may be from optical emissions of plasma in a plasma process previously conducted within the same processing chamber at a time when the plasma clean had reached its endpoint. When the pattern of optical emissions from at least one time during the process and the first standard pattern are within a predetermined amount of each other, the plasma process is terminated. "Predetermined amount" contemplates using pattern recognition techniques, as well as taking a differential and noting when this differential is at least substantially free from any substantial intensity peaks.

Various features may be utilized by the first embodiment of the fifteenth aspect of the present invention, and these features may be used alone in relation to this fifteenth aspect as well as in any combination. Wavelengths including at least those from about 250 nanometers to about 1,000 nanometers (first wavelength range), at least at every 1 nanometer throughout the first wavelength range, may be obtained and utilized for the comparison with the first standard pattern. All of these optical emissions may be utilized, or only a portion thereof. That is, the first embodiment of this fifteenth aspect includes comparing the pattern of a specific wavelength(s) within the optical emissions of the plasma with the first standard pattern which will include the corresponding wavelength(s). Moreover, the first embodiment also includes comparing the pattern of the entirety of the optical emissions obtained on the current plasma process with the first standard pattern.

Difficulties may be encountered when using a particular wavelength for the first standard pattern. One such difficulty may be finding this particular wavelength in the optical emissions of the current plasma process due, for instance, to a wavelength shift. Additional features may be utilized in the first embodiment of the fifteenth aspect to address this type of a situation. In this regard, the first standard pattern may be part of a first standard optical emissions segment which includes a plurality of wavelengths. The intensity peak associated with the subject wavelength of the first standard pattern may be identified in relation to its intensity (e.g., it is the "largest" intensity peak around a certain wavelength), one or more other intensity peaks (e.g., the subject wavelength is the "middle" peak in a certain wavelength region), or both. Noting these characteristics of the wavelength for the first standard pattern in the first standard optical emissions segment may then be used to identify the subject wavelength in the current optical emissions segment.

The first embodiment of the subject fifteenth aspect may also be terminated if the subject plasma process has reached a predetermined maximum time limit before the current pattern and first standard pattern are within a predetermined amount of each other. Typically this will mean that the current plasma process was ineffective in addressing the interior of the processing chamber. In this type of a case, a wet clean of the chamber may be initiated. Thereafter, another plasma cleaning operation may be initiated to address the residuals of the wet clean.

Monitoring the time rate of change of optical emissions of the plasma in this chamber is the subject of a second embodiment of the fifteenth aspect relating to plasma cleans. In this regard, the differential between the optical emissions at a current time in the process and the optical emissions from a previous time in the same plasma process (preferably an immediately preceding time) is determined. When this differential is no more than a first amount, the current plasma process is terminated. Therefore, this second embodiment equates the time at which the plasma clean should be terminated with a situation where the current plasma process is no longer changing the condition of the interior of the processing chamber at a desired rate. All or a portion of those "additional" features addressed above in relation to the first embodiment may be implemented in this second embodiment as well.

Conditioning wafer operations are addressed in a sixteenth aspect of the present invention. At least one conditioning wafer is loaded in a processing chamber and a plasma process is run thereon. Typically the plasma process will etch a pattern on the conditioning wafer which is something other than an integrated circuit or a pattern which would not be associated with a semiconductor device. Plasma processing of the conditioning wafer is monitored through obtaining optical emissions of the plasma in the chamber. A number of conditioning wafers are processed in this manner until the conditioning wafer operation is terminated based upon the results of the monitoring of one of the plasma processes conducted on a conditioning wafer. Thereafter, a production wafer operation is initiated whereby at least one production wafer is loaded in the chamber and a plasma recipe (e.g., one or more plasma steps) is run thereon. These production wafers are removed from the chamber and at least one semiconductor device is formed therefrom. Further processing of the production wafer may be required before the actual semiconductor device is available. Therefore, this distinguishes a production wafer from a conditioning wafer since no semiconductor devices are formed from conditioning wafers. Instead, conditioning wafers are either typically scrapped or refurbished for further use as a conditioning wafer.

Various features may be utilized by the sixteenth aspect of the present invention, and these features may be used alone in relation to this sixteenth aspect as well as in any combination. The health of the conditioning wafer operation, the health of the production wafer operation, or both may be evaluated. Any of the techniques discussed above in relation to the seventh and tenth aspects of the invention thereby may be implemented in this sixteenth aspect as well. Optical emissions obtained on the conditioning wafer operation, the production wafer operation, or both may include at least wavelengths from about 250 nanometers to about 1,000 nanometers, and such optical emissions may be obtained at least at every 1 nanometer throughout this range. All or a portion of this data may be utilized in a comparison upon which termination of the conditioning wafer operation is based.

Endpoint detection techniques may be used to terminate the conditioning wafer operation. Therefore, any of the endpoint detection techniques discussed above in relation to the ninth through the thirteenth aspects may be implemented in this sixteenth aspect as well. Termination of the conditioning wafer operation may also be based upon when consecutive runnings of the plasma process on conditioning wafers are within a certain amount of each other as determined through the data obtained on the process. That is, the termination of the conditioning wafer operation may be equated with the conditioning wafer operation having reached a steady state (e.g., the processing of one conditioning wafer looks at least effectively the same as the processing of the next conditioning wafer) determined in accordance with an evaluation of optical emissions data. Termination of the conditioning wafer operation may also be based solely on the data obtained on the conditioning wafer operation. That is, no wafer need be analyzed before the production wafer operation is initiated. One or more of a plasma cleaning operation, a wet cleaning operation, or a replacement of consumables may also be initiated before the initiation of the conditioning wafer operation as well.

Management of the distribution of wafers to a wafer production system including at least two processing chambers is addressed by a seventeenth aspect of the present invention. In a first embodiment, at least two chambers are involved in the plasma processing of wafers disposed therein. Each plasma process conducted within these chambers is monitored in at least some respect. Wafers will continue to be sequentially processed in these chambers unless the monitoring of the current plasma process on the wafer(s) in one of these chambers detects the existence of one or more conditions. These conditions include the existence of a "dirty chamber", a known error condition, an unknown condition, or a combination thereof as these terms have been used in relation to the sixth and fourteenth aspects discussed above. The distribution of wafers to this particular chamber may be suspended immediately after this type of condition is identified, or suspension may be delayed until a certain number of these types of conditions are encountered in multiple plasma processes. That is, a given chamber may not be taken "off line" until this same condition (or another of the conditions) have been identified in multiple runs.

When the suspension of processing of wafers in a given chamber is based upon the identification of a "dirty chamber" condition, the chamber may be cleaned in some manner. Plasma cleans, wet cleans, replacement of consumables, or any combination thereof are contemplated as an appropriate "cleaning" in the context of this first embodiment of the seventeenth aspect. Once the chamber has been cleaned, the distribution of wafers for running plasma processes thereon may be reinitiated. Encountering a known error during the plasma processing of a wafer(s) in one of the chambers may result in the modification of one or more process control parameters to address this error. Finally, when an unknown condition is encountered, the first embodiment contemplates analyzing the plasma process after termination thereof in an attempt to identify the corresponding cause.

A second embodiment of the seventeenth aspect relates to the running of plasma processes on product in at least three chambers. The wafers are distributed to these chambers using a first sequence. Modification of this sequence is initiated if the monitoring of the plasma process in one of the chambers identifies the existence of a certain condition. Any of those identified above in relation to the first embodiment would be applicable to this second embodiment as well. In this regard, the corresponding features from the first embodiment may be implemented in this second embodiment as well.

Finally, a third embodiment of this seventeenth aspect involves the distribution of wafers to at least two processing chambers for the running of a plasma process thereon. The time required to complete each plasma process is monitored. The distribution sequence which is utilized is based upon this monitoring of time. For instance, the distribution sequence may involve maximizing the use of the "fastest" processing chamber.

The present invention will now be described in relation to the accompanying drawings which assist in illustrating its various pertinent features. One application of the present invention is for processes which utilize plasma to provide at least one function or to achieve at least one predetermined result, and the present invention will hereafter be described in this context. More specifically, the present invention will be described in relation to the running of plasma processes on wafers or the like from which semiconductor devices are formed (e.g., etching where the "predetermined result" may be the removal of one or more layers, chemical vapor deposition where the predetermined result may be the buildup of one or more films, sputtering where the predetermined result may be the addition or removal of material).

Wafer Production System 2—FIG. 1

A wafer production system 2 is illustrated in FIG. 1 and is generally for executing one or more plasma-based processes (single or multiple step) on wafers 18. Semiconductor devices may be formed from wafers 18 processed by the system 2, including integrated circuit chips. The system 2 generally includes a wafer cassette 6 which stores a plurality of wafers 18 and allows these wafers 18 to be readily transported to and from the system 2. One wafer cassette 6 is disposed in each of the two load lock chambers 28 of the wafer production system 2. A wafer handling assembly 44 is advanced into the respective load lock chamber 28, removes at least one of the wafers 18 from the wafer cassette 6, and transfers the wafer(s) 18 to one of the plurality of processing chambers 36 of the wafer production system 2 (four chambers 36a–d being illustrated). Other arrangements may be utilized for purposes of the present invention.

Control of the wafer handling assembly 44, as well as various other components of the wafer production system 2, is provided by a main control unit 58 (hereafter "MCU 58"). In one embodiment, the MCU 58 is a computer having at least one computer-readable storage medium and at least one processor, such as a desktop PC or a main-frame having satellite terminals. Appropriately integrating the MCU 58 with one or more other components of the wafer production system 2 allows the MCU 58 to be the main controller for the chamber 36. Integration may include operatively interfacing the MCU 58 with these various components and including the wafer handling assembly 44. Other hardware may also be operatively interconnected with the MCU 58, such as a display 59 for providing visual-based information to operations personnel (e.g., a CRT or computer monitor), as well as a data entry device 60 (e.g., mouse, light pen, keyboard) for allowing operations personnel to enter information used by or relating to the wafer production system 2.

Plasma within the chambers 36 processes the enclosed wafer(s) 18 in some manner (e.g., etching to remove a predetermined layer of material). A transparent window 38 is provided on each chamber 36 to allow optical emissions data to be obtained on the plasma recipe being run on the wafer(s) 18 in the respective chamber 36. Once the plasma process is completed, the wafer handling assembly 44 removes the wafer(s) 18 from the respective processing chamber 36 and transfers the wafer(s) 18 back to one of the wafer cassettes 6 in the associated load lock chamber 28. When all of the wafers 18 within one of the cassettes 6 have been plasma processed, the wafer cassette 6 is removed from the load lock chamber 28 and replaced with another cassette 6 with new wafers 18 to be plasma processed. This may be done manually by operations personnel or in an automated manner by robots or the like.

Figure 2:
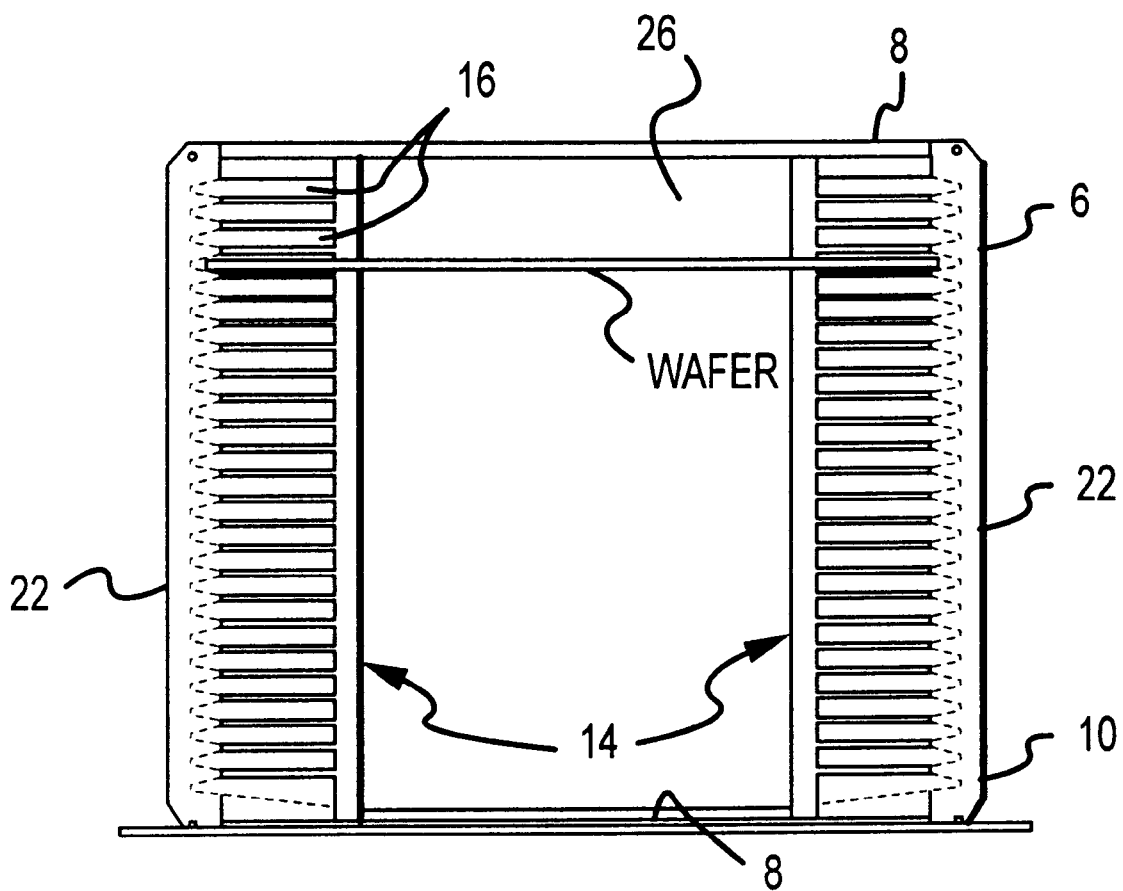
FIG. 2 is a perspective view of one embodiment of the wafer cassette incorporated in the wafer production system of FIG. 1.

Wafer Cassette 6—FIG. 2

More details regarding the embodiment of the wafer cassette 6 which is incorporated in the wafer production system 2 of FIG. 1 are presented in FIG. 2. The wafer cassette 6 includes a frame 10 defined by a pair of laterally spaced sidewalls 22 which are interconnected by a back panel 26, as well as a pair of end panels 8. The front of the frame 10 is substantially open such that the wafer handling assembly 44 may be advanced within and retracted from the wafer cassette 6 to remove wafers 18 from and provide wafers 18 to the associated wafer cassette 6. A plurality of longitudinally spaced and laterally disposed partitions 16 (e.g., each partition 16 being disposed at least generally perpendicular to the longitudinal axis of the cassette 6) are provided within the frame 10 for purposes of maintaining separation of adjacent wafers 18. Each pair of adjacent partitions 16 defines a pocket 14 in which a single wafer 18 may be placed. Loading of wafers 18 within the wafer cassette 6 which are to be plasma processed may be accomplished by disposing the one of the end panels 8 of the cassette 6 on an appropriate supporting surface and manually loading wafers 18 into the cassette 6, with only one wafer 18 being disposed in any of the pockets 14. Once the wafer cassette 6 is loaded with wafers 18 to the desired degree, the cassette 6 may be transported to the appropriate load lock chamber 28. The wafer cassette 6 is then disposed on one of its ends 8 in a position such that its substantially open front faces and is accessible by the wafer handling assembly 44. Other configurations for wafer cassettes 6 may be utilized by the wafer production system 2, and automation may be implemented in any one or more of the loading of wafers 18 into the cassette 6 and the transport of the cassette 6 to and from the load lock chambers 28 of the wafer production system 2.

Wafer Handling Assembly 44—FIGS. 3A–3B

Additional details regarding the wafer handling assembly 44 which is incorporated in the wafer production system 2 of FIG. 1 are illustrated in FIGS. 3A–B. Other types of wafer handling assemblies may be utilized by the wafer production system 2, such as the types, disclosed in U.S. Pat. No. 5,280,983 to Maydan et al., issued Jan. 25, 1994, and entitled "SEMICONDUCTOR PROCESSING SYSTEM WITH ROBOTIC AUTOLOADER AND LOCK" and U.S. Pat. No. 5,656,902 to Lowrance, issued Aug. 12, 1997, and entitled "TWO-AXIS MAGNETICALLY COUPLED ROEBOT", both of which patents are incorporated by reference in their entirety herein. The wafer handling assembly 44 of FIGS. 3A–B generally includes a robotic wafer handler 48 which is disposed within a central chamber 70 of the wafer production system 2. Load lock chambers 28 and processing chambers 36 are thereby disposed about the wafer handling assembly 44. Movement of the robotic wafer handler 48 is realized through a wafer handler control motor 62 which is operatively interfaced with the wafer handler 48, and which in turn is operatively interfaced with and controlled by the MCU 58 (FIG. 1). The wafer handler 48 includes a pivot 50 such that the wafer handler 48 may be pivoted or rotated about the pivot 50 to position the wafer handling assembly 44 to appropriately interface with one of the load lock chambers 28 or processing chambers 36. Wafers 18 are removed from and provided to the respective load lock chamber 28 or processing chamber 36 by a wafer blade 66 which interfaces with one of the wafers 18 when disposed in one of the pockets 14 of the wafer cassette 6. A vacuum chuck or the like may be incorporated on the wafer blade 66 to retain the wafer 18 on the blade 66 (not shown). The wafer blade 66 is interconnected with an arm assembly 54 which extends and retracts via pivotal-like action to axially advance and retract (he wafer blade 66 to the appropriate position.

Figure 4:
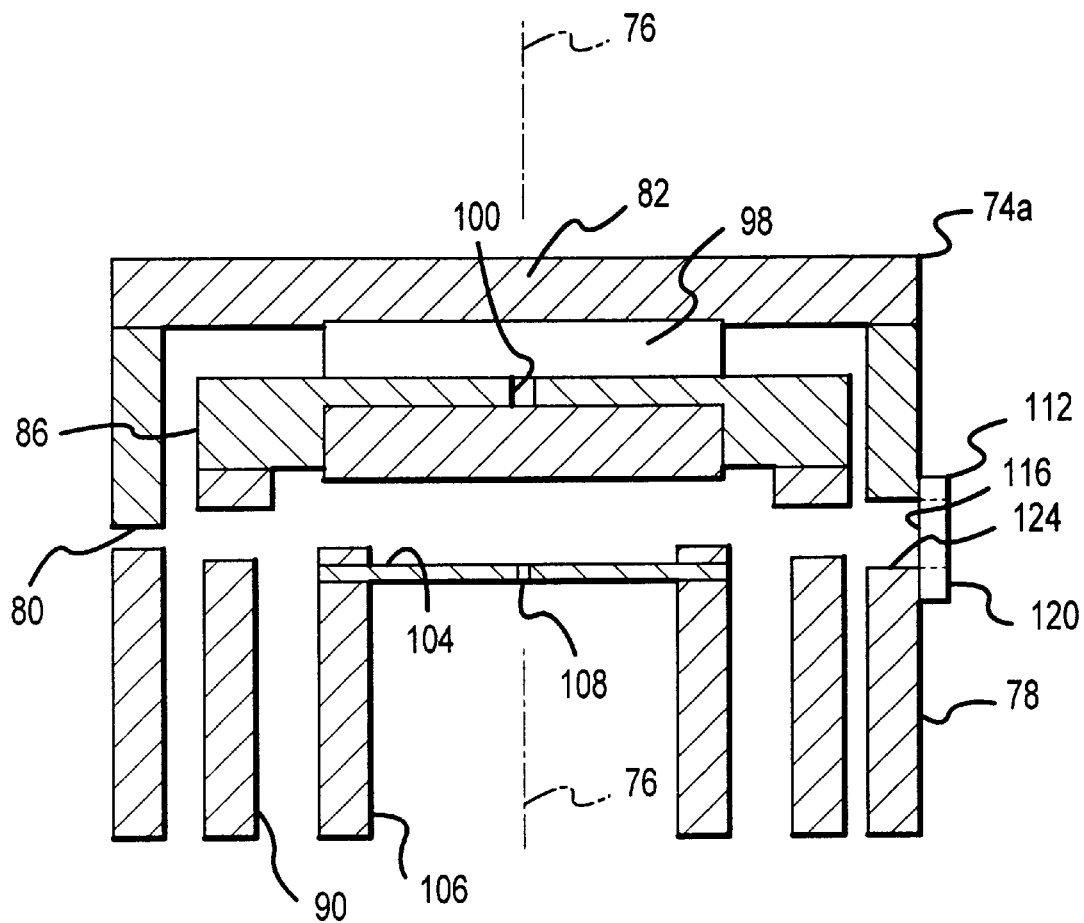
FIG. 4 is a cross-sectional view of one embodiment of a plasma processing chamber which may be incorporated in the wafer production system of FIG. 1, namely a dry etching chamber.
Figure 5:
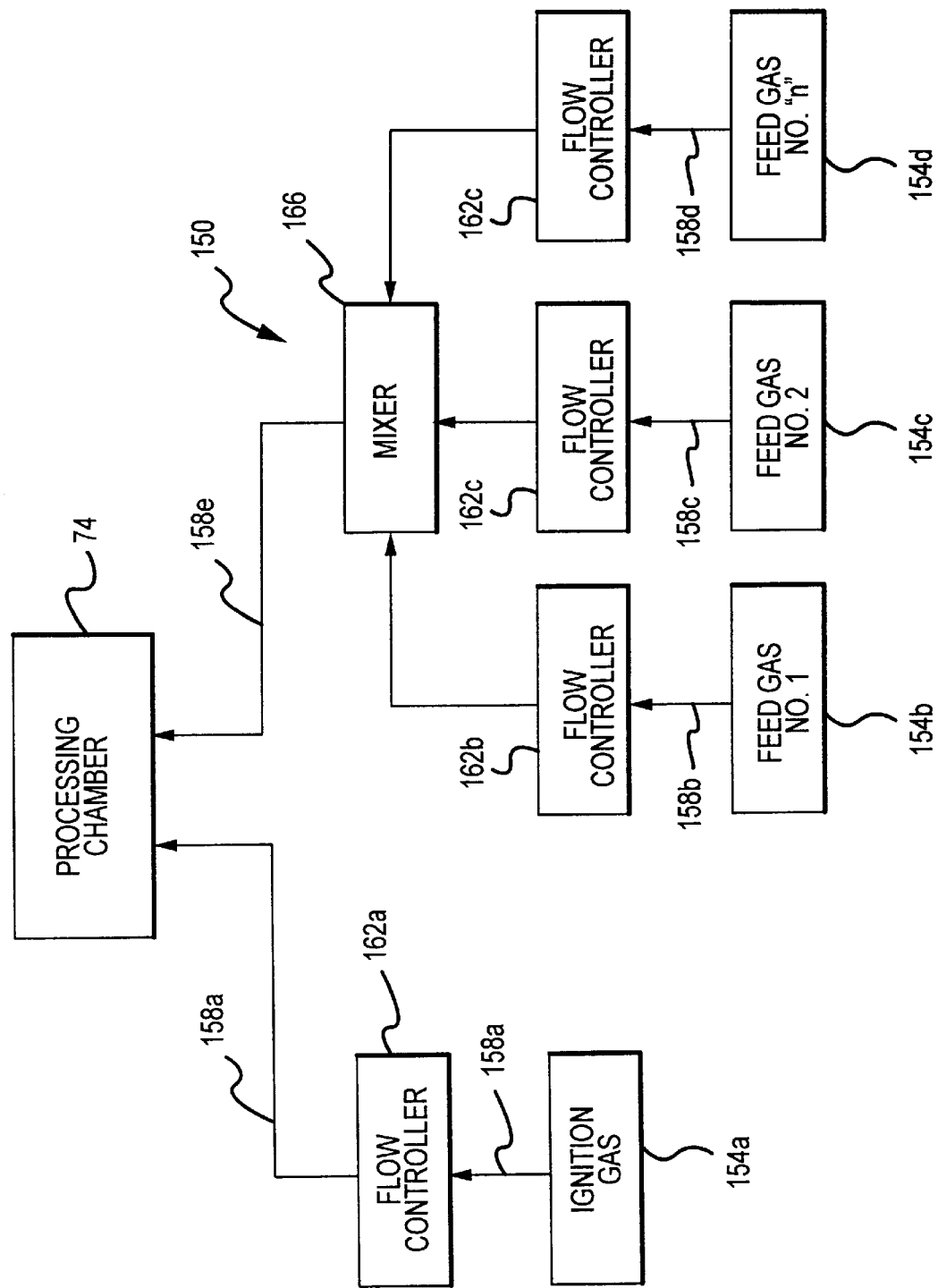
FIG. 5 is a schematic view of one embodiment of a gas delivery system for the processing chamber of FIG. 4.

Processing Chamber 72—FIGS. 4 and 5

One embodiment of a processing chamber which may be incorporated in the wafer production system of FIG. 1 as one of the chambers 36 is presented in more detail in FIG. 4. Other types/configurations of processing chambers may be utilized by the wafer production system 2 for purposes of the present invention as well, including those disclosed in U.S. Pat. No. 5,614,055 to Fairbairn et al., issued Mar. 25, 1997, and entitled "HIGH DENSITY PLASMA CVD AND ETCHING REACTOR", and U.S. Pat. No. 5,641,375 to Nitescu et al., issued Jun. 24, 1997, and entitled "PLASMA ETCHING REACTOR WITH SURFACE PROTECTION MEANS AGAINST EROSION OF WALLS", both patents of which are incorporated by reference in their entirety herein.

The processing chamber 74 of FIG. 4 is specifically adapted for performing a plasma etching operation on a wafer(s) 18 when disposed therein (i.e., to remove one or more layers from the wafer(s) 18 disposed in the chamber 36). The processing chamber 74 includes chamber sidewalls 78 which are disposed about a central, longitudinal axis 76 of the chamber 74. Access to the processing chamber 74 may be provided by a chamber cover 82 which is interconnected with the chamber sidewalls 78 in such a manner that at least in certain instances, at least a portion of the chamber cover 82 may be moved away from the chamber sidewalls 78. In the illustrated embodiment, the chamber cover 82 is removed only to gain access to the interior of the processing chamber 74 for maintenance, cleaning, or both. A window port 124 extends through a portion of the chamber sidewall 78 and is aligned with a transparent window 112. The window 112 includes an inner surface 116 and an outer surface 120, and provides a way for the plasma to be viewed exteriorly of the processing chamber 74 and further to provide a mechanism for obtaining optical emissions data on the plasma recipe being run on the wafer(s) 18 within the chamber 74.

Protection of the chamber sidewalls 78 and the chamber cover 82 from the effects of plasma processes being conducted within the chamber 74 is provided by a bell jar 90 and a bell roof 86 which are each formed from transparent, dielectric materials (e.g., quartz, sapphire). The bell jar 90 is spaced radially inward (e.g., in the direction of the central, longitudinal axis 76 of the chamber 74) from the inner surface of the chamber sidewalls 78. The bell roof 86 is disposed above the bell jar 90 and is axially movable in a direction which is at least substantially parallel with the central, longitudinal axis 76 of the chamber 74 through interconnection with an elevator 98. Movement of the elevator 98 may be desirable for one or more purposes. For instance, this movement may be used to change the spacing between a showerhead 94 and a wafer pedestal 106/wafer platform 102 which in one embodiment are the electrodes or "plasma generator" for the chamber 74.

The wafer pedestal 106 is disposed radially inwardly of the bell jar 90 in spaced relation therewith, and the wafer platform 104 is disposed on top of the wafer pedestal 106. In one embodiment, both the wafer pedestal 104 and wafer platform 106 are formed From silicon-based materials since the wafers 18 are also commonly formed from silicon-based materials. The wafer 18 is introduced into the processing chamber 74 through a wafer access 80 which extends through the chamber sidewall 78, and is disposed in a flat orientation on the upper surface of the wafer platform 104. Various mechanisms may be used to retain the wafer 18 on the wafer platform 104 during the running of the plasma process on the wafer 18 in the chamber 74, such as by drawing a vacuum through a vacuum port 108 which is formed on the wafer platform 104 or by using electrostatic charges (not shown). Transport of the wafer 18 into the processing chamber 74 is again provided by the wafer blade 66 of the wafer handling assembly 44 (FIGS. 1 and 3A–B). After the wafer blade 66 is retracted from the processing chamber 74, a vacuum is generated within the processing chamber 74 before the plasma process is initiated.

The showerhead 94 is interconnected with the elevator 98 such that it is axially movable therewith, and in one embodiment is also formed from a silicon-based material for the above-noted reasoning. The showerhead 94 includes one or more apertures (not shown) for the purpose of dispersing feed gases within the vacuum chamber 84 in a manner to define a desired gas flow pattern for the plasma. Gases are provided to the showerhead 94 through a gas inlet port 100 formed in the quartz bell roof 86. With appropriate gases being contained within the processing chamber 74 and under other appropriate conditions (e.g., pressure, temperature, flow rate), an appropriate voltage may be applied to one or more of the wafer pedestal 106 and the showerhead 94 to create the plasma within the chamber 74 above the wafer platform 104. The wafer pedestal 106 and wafer platform 104, as well as the showerhead 94, thereby also function as electrodes in the illustrated embodiment as noted. The electrical field generated by these electrodes also functions to effectively confine the plasma to the space between the electrodes.

FIG. 5 illustrates one embodiment of a gas delivery system 150 which may be used to provide gases to the processing chamber 74 of FIG. 4 for a given plasma process operation. Other systems may be utilized as well. The gas delivery system 150 includes a plurality of storage tanks 154, each of which is fluidly interconnected with the processing chamber 74 either directly or indirectly. Storage tanks 154*b–d* are available for containing one or more types of feed gases which will define the gas composition of the plasma within the vacuum chamber 84. Each storage tank 154*b–d* is fluidly interconnected with a mixer 166 by gas lines 158*b–d* where the feed gases may be appropriately mixed prior to being provided to the processing chamber 74 through the showerhead 94 via the gas line 158*e*. Mixing of the feed gases could also occur in a manifold (not shown) into which each of the feed gases would separately flow and which could be contained within or be part of the processing chamber 74. The manifold would then interface with the gas inlet port 100, and this type of manifold may also be used in combination with the mixer 166. In some cases the composition of the feed gases provided to the processing chamber 74 to define the plasma may be difficult to ignite. This situation is remedied by including an appropriate gas in the storage tank 154*a*. A gas composition which is more readily ignitable than the composition of the feed gases is contained within the storage tank 154*a*. Ignition of the plasma would then be affected by directing a flow of the ignition gas from the storage tank 154*a* into the processing chamber 74, along with a flow of the desired feed gases from the storage tanks 154*b–d*, and using the ignition of the ignition gas to then ignite the feed gases to generate the plasma.

Figure 6:
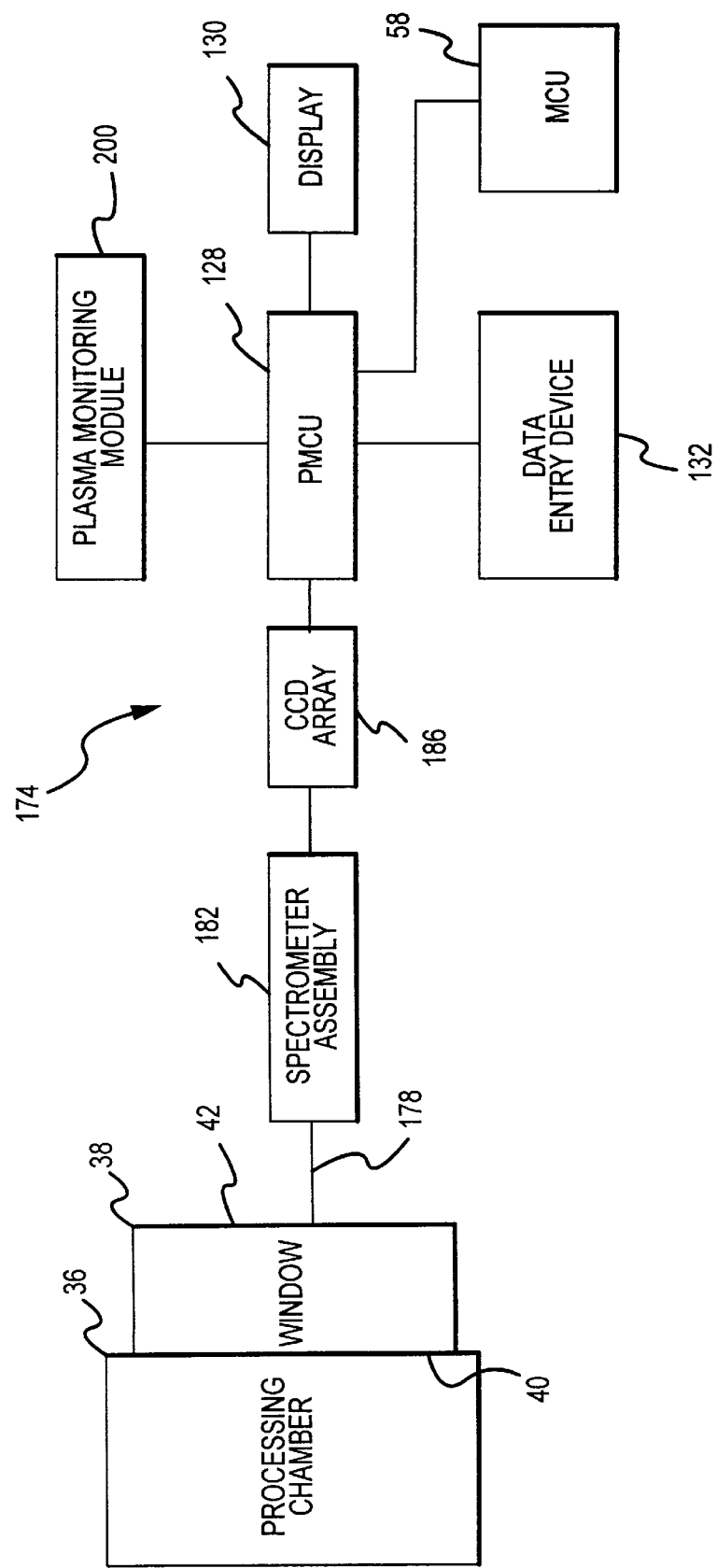
FIG. 6 is a schematic view of one embodiment of a plasma monitoring assembly which may be incorporated in the wafer production system of FIG. 1.
Figure 7:
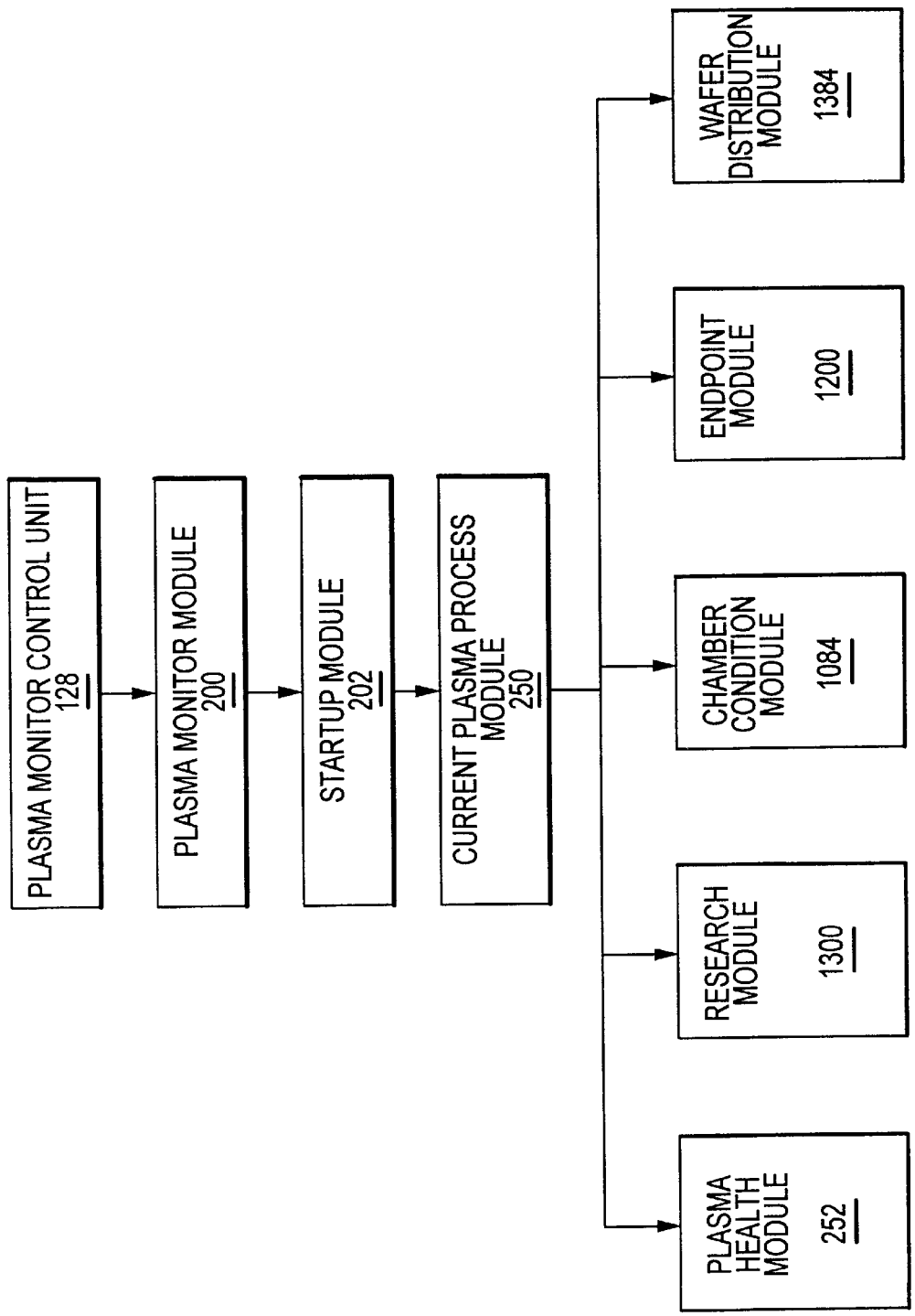
FIG. 7 is a flowchart of one embodiment of the plasma monitoring module used by the plasma monitoring assembly of FIG. 6.

Plasma Monitoring Assembly 174—FIGS. 6 and 7

The above-described components are obviously important to the overall function of the wafer production system 2. However, the present invention is more specifically directed to the monitoring or evaluation of the plasma itself. Therefore, the following components may be incorporated in any type of plasma-based system, including the foregoing.

One embodiment of an assembly for monitoring/evaluating plasma processes and which may be incorporated in the wafer production system 2 of FIG. 1 is illustrated in FIG. 6. The plasma monitoring assembly 174 operatively interfaces with the window 38 of the processing chamber 36 by receiving optical emissions of the plasma which pass out of the processing charrber 36 through the window 38. These optical emissions are "collected" by an appropriate fiber optic cable 178 which is positioned at or near the outer surface 42 of the window 38. Fixtures which illustrate ways of maintaining a fiber optic cable and a window of a processing chamber in a fixed positional relationship are presented in FIGS. 36 and 39. Optical emissions of the plasma within the processing chamber 36 during processing of a wafer 18 enter the fiber optic cable 178 and are directed to a spectrometer assembly 182. Both scanning-type and solid state spectrometers may be used as the spectrometer assembly 182. The assembly 182 may also include one or more appropriately interconnected spectrometers, each of which obtains optical emissions data from a different region. The spectrometer assembly 182 separates these optical emissions into a plurality of individual wavelengths and provides these separate optical components to an array 186 of charge coupled devices (hereafter "CCD array 186") for conversion to a corresponding electrical signal.

A computer-readable signal is provided by the CCD array 186 to a plasma monitor control unit 128 (hereafter "PMCU 128") which is the primary control mechanism of the plasma monitoring assembly 174. In one embodiment, the PMCU 128 is a computer which may be configured to include, but not limited to, at least one motherboard, at least one analog-to-digital conversion board, at least one central processing unit (CPU) for each motherboard, and one or more types of computer-readable storage mediums such as at least one floppy disk drive, at least one hard disk drive, and at least one CD ROM drive. Other hardware may be operatively interconnected with the PMCU 128, such as a display 130 for providing visual/audio-based information to operations personnel (e.g., a CRT, LCD, or computer monitor), as well as one or more data entry devices 132 (e.g., mouse, light pen, keyboard) for allowing personnel to enter information used by or relating to the plasma monitoring assembly 174. One PMCU 128 may be provided for each chamber 36, or the PMCU 128 may be configured to service multiple chambers 36. The PMCU 128 is also operatively interfaced or interconnected with the MCU 58 of the wafer production system 2 such that the PMCU and MCU 58 may communicate with each other.

The PMCU 128 includes a plasma monitoring module 200 and each of its sub-modules may be stored on a computer-readable storage medium associated with the PMCU 128 (e.g., on a portable computer diskette(s), on a hard drive, on a CD(s)). The plasma monitoring module 200 and these submodules are illustrated in FIG. 7. One sub-module is a startup module 202 which provides a way of accessing other sub-modules through a current plasma process module 250. The current plasma process module 250 of the plasma monitoring module 200 facilitates the monitoring or evaluation of the various types of plasma processes which may be conducted within the chamber 36 through the evaluation of optical emissions data of the plasma in the chamber 36. In the case of the FIG. 6 embodiment, optical emissions data are collected and delivered by the fiber optic cable 178 to the spectrometer assembly 182 which divides the light up into its individual optical components. Data representative of these optical emission components are then made available to the current plasma process module 250 through the CCD array 186 as described above.

Evaluation or monitoring of the current plasma process through the current plasma process module 250 is facilitated by collecting optical emissions from the plasma preferably to include at least wavelengths from within the UV range to within the near infrared range, and thereby including the visible light spectrum. In one embodiment, optical emissions of the plasma in the processing chamber 36 which are obtained and available for evaluation (e.g., by the current plasma process module 250, manually by the appropriate personnel) include at least those wavelengths from about 250 nanometers to about 1,000 nanometers (inclusive), and more preferably at least those wavelengths from about 150 nanometers to about 1,200 nanometers (inclusive). Hereafter the above-noted desired range or bandwidth of optical emissions data which are obtained/collected of the plasma in the chamber 36, and which includes each of the above-noted ranges or bandwidths, will be referred to as the "Preferred Optical Bandwidth."

Optical or wavelength resolutions within and throughout the Preferred Optical Bandwidth are preferably no more than about 1 nanometer, and even more preferably no more than about 0.5 nanometers (presently contemplating a wavelength resolution of 0.4). The term "wavelength resolution" in this context means the amount of separation between adjacent wavelengths in the subject optical emissions data which is collected. Therefore, if the wavelength resolution being used to collect optical emissions data from the plasma in the chamber 36 is 1 nanometer, no more than a 1 nanometer spacing will exist between any two data points within and throughout the Preferred Optical Bandwidth. Although equal spacings will typically be utilized in relation to the wavelength resolution within and throughout the Preferred Optical Bandwidth, this need not be the case such that "wavelength resolution" encompasses equal spacings, unequal spacings, and combinations thereof. Hereafter, the above-noted magnitude for the optical or wavelength resolution will be referred to as the "Preferred Data Resolution."

Another factor relating to the effectiveness of the current plasma process module 250 in relation to the amount of optical emissions data of the plasma in the chamber 36 is the times at which this data is taken during the subject plasma process. Optical emissions data of the plasma in the chamber 36 are preferably obtained at least every 1 second, and more preferably at least every ⅓ second. Although equal spacings will typically be utilized in relation to the times at which optical emissions data is collected on the plasma in the chamber 36, this need not be the case such that equal time spacings, unequal spacings, and combinations thereof may be utilized. Hereafter, the above-noted timing magnitudes for obtaining optical emissions data of the plasma in the chamber 36 will be referred to as the "Preferred Data Collection Time Resolution."

The spectrometer assembly 182 illustrated in FIG. 6 should be capable of meeting the above-noted criteria, and a number of implementations may be utilized. For instance the spectrometer assembly 182 may be of the scanning type in which the spectrometer assembly 182 would include structure to scan the spectrum to obtain data encompassing the Preferred Optical Bandwidth using the Preferred Data Resolution and at the Preferred Data Collection Time Resolution (e.g., scan a first optical emissions segment or region of the 250–550 nanometer wavelengths, scan a second segment of the 500–750 nanometer wavelengths, and scan a third segment of the 700–950 nanometer wavelengths, each of which overlaps so that the possibility of losing data is reduced and further to facilitate alignment of spectral segments). The spectrometer assembly 182 may also be a solid state device. Multiple subunits or processing cards may be connected in parallel relation to function similar to the scanning type noted above. That is, each subunit or processing card of the solid state device would then provide information on a specific optical emissions segment or region within the Preferred Optical Bandwidth using the Preferred Data Resolution and at the Preferred Data Collection Time Resolution.

Figure 8:
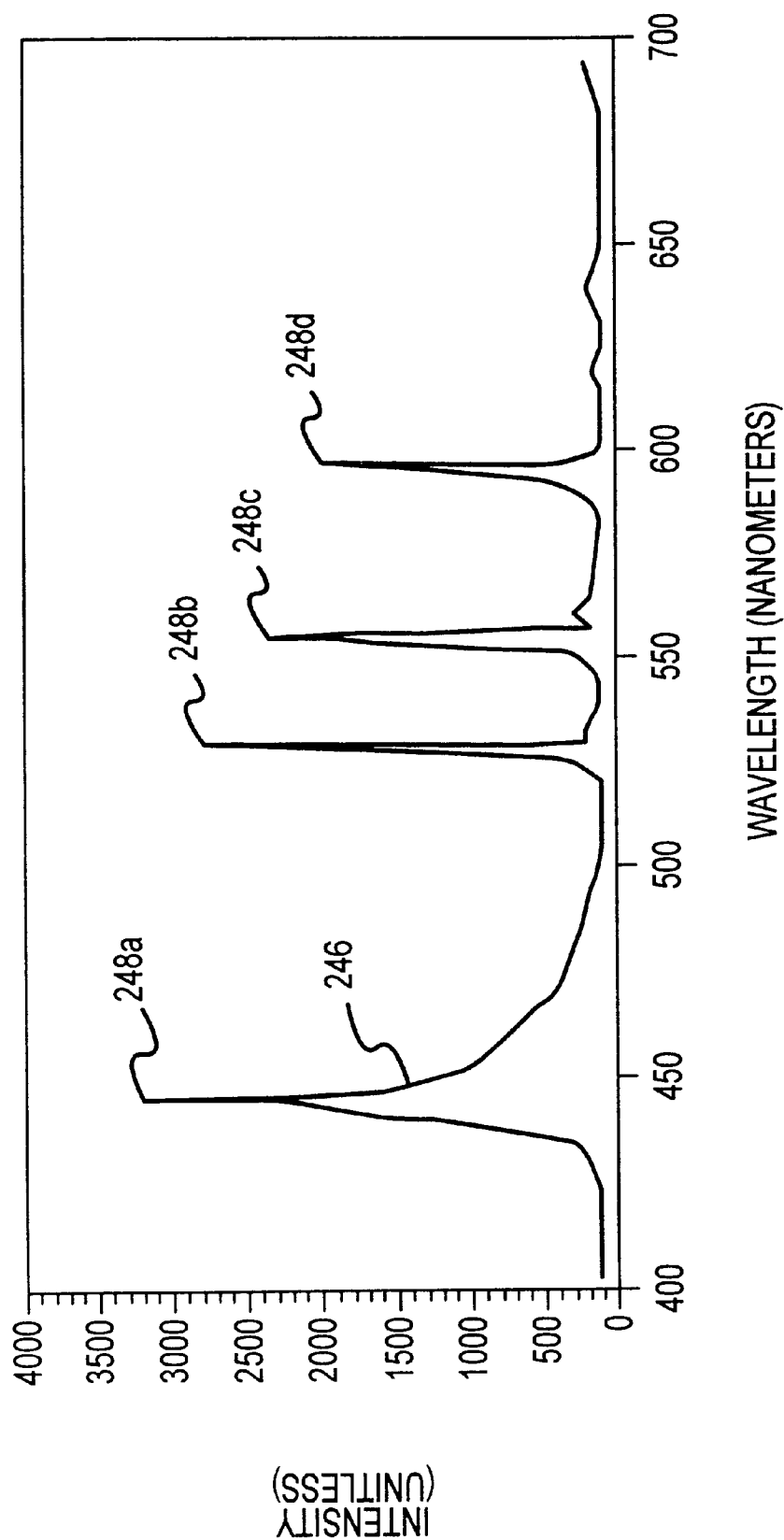
FIG. 8 is a spectral pattern of one embodiment of a plasma recipe which may be run on the system of FIG. 1.

Exemplary Plasma Recipe Spectra—FIG. 8

A representative or exemplary spectra in computer-readable form which may be made available to the current plasma process module 200 of FIG. 7 for analysis is presented in FIG. 8. Only a portion of the Preferred Optical Bandwidth is represented by the spectra 246. However, it serves to illustrate certain principles associated with the present invention since the evaluation of the current plasma process need not be of the entire Preferred Optical Bandwidth in each case. The spectra 246 contains data within the wavelength range of 400 nanometers to about 700 nanometers and at a certain fixed point in time in a plasma process being conducted within the processing chamber 36 of FIG. 1 (e.g., at a current time $t_n$). Various characteristics of the spectra 246 of FIG. 8 may be used in the analysis undertaken by the current plasma process module 250 of FIG. 7. These characteristics include the overall pattern of the spectra 246, one or more of the location and intensity of one or more of intensity peaks 248 in the spectra 246, and one or more of the relative location and relative intensity of one or more of the intensity peaks 248.

The current plasma process module 250 of FIG. 7 operatively interfaces with a collection of spectra obtained from one or more plasma processes previously conducted within the subject processing chamber 36. Generally, the current plasma process module 250 receives data from the current plasma process being conducted within the plasma processing chamber 36, and in all but one case (the research module 1300) compares this data or at least a portion thereof with data from one or more plasma processes previously conducted within this very same plasma processing chamber 36 to evaluate or monitor the current plasma process. This comparison provides certain information regarding the current plasma process depending upon which sub-module(s) of the current plasma process module 250 is being utilized. Each of these sub-modules will be discussed in more detail below in relation to the relevant figures. However, understanding how the data is organized for access by the current plasma process module 250 may facilitate a more complete understanding of these submodules.

Plasma Spectra Directory 284—FIGS. 9–12B

Figure 9:
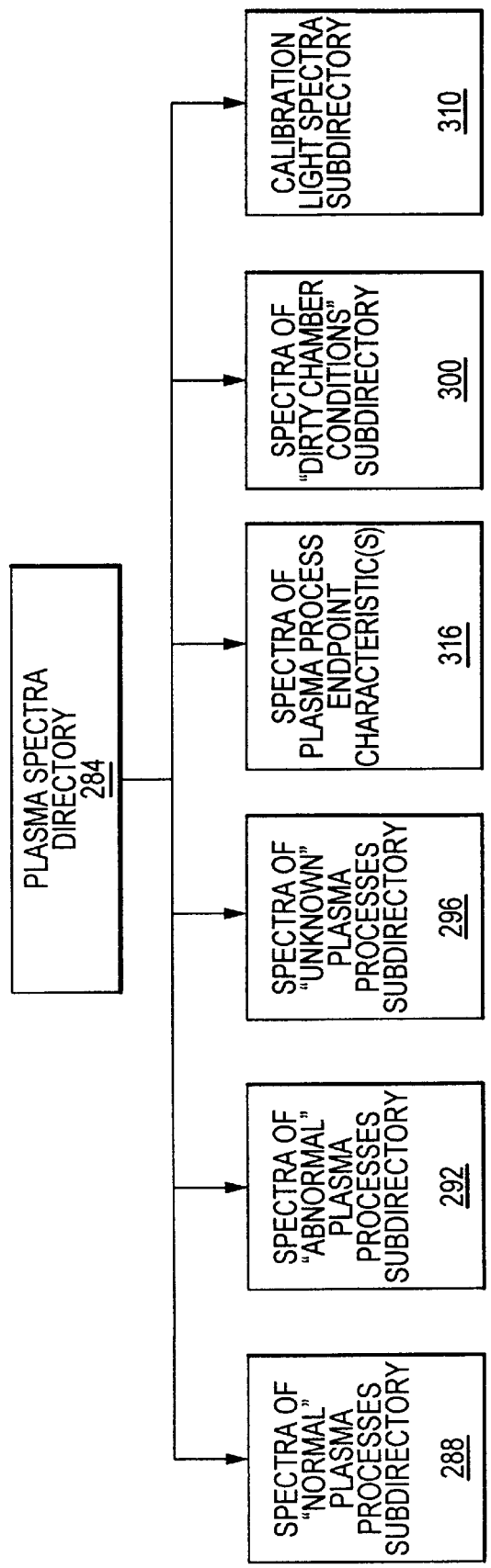
FIG. 9 is a flowchart of one embodiment of a plasma spectra directory and its various subdirectories which may be used in plasma monitoring operations.

One embodiment of how the collection of data on prior plasma processes may be organized for use by the current plasma process module 250 is illustrated in FIG. 9. The plasma spectra directory 284 of FIG. 9 includes a number of subdirectories or subsets of categorically similar data, is typically specific to a single processing chamber 36 (although the same directory 284 could be used for multiple chambers 36 if the data within the directory 284 was indexed in some way to the specific chamber 36), is accessed by one or more of the submodules of the current plasma process module 250, and is preferably stored in a computer-readable medium of or associated with the PMCU (e.g., one or more computer diskettes, hard drive, one or more CDs). Relevant data which is included in each data entry in each of these subdirectories of the plasma spectra directory 284 is a spectra (optical emissions data), and in all but one case (spectra of calibration light subdirectory 310) is a spectra of the plasma in the processing chamber 36 at the relevant time and typically within the Preferred Optical Bandwidth and at the Preferred Data Resolution unless otherwise noted herein.

Plasma processes which are to be used as a standard of sorts for evaluating/monitoring plasma processes currently being run in the processing chamber 36, or to assess the health or condition of the plasma during such plasma processes, are stored in a subdirectory of the plasma spectra directory 284 of FIG. 9 which is entitled the "Spectra of "Normal" Plasma Processes" and identified by reference numeral 288 (hereafter "normal spectra subdirectory 288"). Actual spectral data from one or more plasma processes which have been conducted in the processing chamber 36 are stored in the normal spectra subdirectory 288 associated with this chamber 36. Various categories cr genera of plasma processes may be stored in the normal spectra subdirectory 288, such as the above-noted plasma recipes, plasma cleaning operations or plasma cleans (with or without previously conducting a wet clean), and conditioning wafer operations, and one or more executions of plasma processes within each of these categories may also be stored in the subdirectory 288. Each category of plasma process may be organized in a "folder" or the like of the normal spectra subdirectory 288, or may have a code which identifies it as being representative of a particular category/genus of plasma process to group categorically similar processes together (e.g, a folder for "normal" plasma recipes, a separate folder for "normal" plasma cleans which are run without first wet cleaning the chamber 36, a separate folder for "normal" plasma cleans which are run after a wet clean of the chamber 36, and a separate folder for "normal" conditioning wafer operations).

Spectral data is used by the current plasma process module 250 to determine if subsequent plasma processes conducted in this very same processing chamber 36 are proceeding in accordance with at least one of the plasma processes stored in the normal spectra subdirectory 288. Entries in the normal spectra subdirectory 288 are thereby used as a "model" or "standard" for the evaluation of plasma processes conducted in this very same processing chamber 36 at some future time. How data is actually entered in the normal spectra subdirectory 288 will be discussed in more detail below in relation to the startup module 202 and FIGS. 13–14. Suffice it to say for present purposes that entries in the normal spectra subdirectory 288 are from actual plasma processes conducted in the subject chamber 36. These plasma processes are either confirmed (e.g., by post-plasma processing testing) or assumed (and typically later confirmed) to have proceeded in a desired or predetermined manner, or more specifically without any substantial/ significant errors or aberrations. No pre-analysis or knowledge of any plasma process is required to use the current plasma process module 250 and the normal spectra subdirectory 288 to evaluate a plasma process currently being conducted in the processing chamber 36. Spectral data from a plasma process ABC conducted in a3 given chamber 36 may be recorded in the normal spectra subdirectory 288 one day simply for purposes of determining if any subsequent running of this same plasma process ABC in this same chamber 36 has proceeded in accordance with the spectral data from the plasma process ABC previously recorded in the normal spectra subdirectory 288.

Errors or aberrations which have been previously encountered while running a plasma process in the processing chamber 36 are contained within a subdirectory of the plasma spectra directory 284 of FIG. 9 which is entitled "Spectra of "Abnormal" Plasma Processes" and identified by reference numeral 292 (hereafter "abnormal spectra subdirectory 292"). Data relating to any of the plasma processes referenced above in relation to the normal spectra subdirectory 288 may also be stored in the abnormal spectra subdirectory 292, and the above-noted organizational techniques may be utilized here as well. Entries to the abnormal spectra subdirectory 292 are made when a given plasma process conducted in the processing chamber 36 does not proceed in the desired or predetermined manner (e.g., when the process has not proceeded according to the relevant plasma process(es) of the normal spectra subdirectory 288), and further when the cause or causes of the error or aberration has been identified to the plasma spectra directory 284. This typically requires analysis of at least that portion of the spectral data from the time when the error or aberration in the subject plasma process first occurred, as well as possibly spectral data from the remainder of the subject plasma process. Errors or aberrations in a plasma process will typically be evident in the spectra of the plasma in the processing chamber 36. Moreover, by obtaining data on the current plasma process in the Preferred Optical Bandwidth, at the Preferred Data Resolution, and at the Preferred Data Collection Time Resolution, the chances of obtaining optical emissions data which is indicative of the subject error or aberration is enhanced.

When spectral data on a current plasma process being conducted in the processing chamber 36 deviates from the corresponding spectral data in the normal spectra subdirectory 288 in the determination of the current plasma process module 250, the module 250 may then compare this "deviating spectral data" on the current plasma process with spectral data in the abnormal spectra subdirectory 292. Any number of actions may be initiated if the current plasma process module 250 identifies a "match" between the spectral data from the plasma process currently being conducted in the processing chamber 36 and spectral data in the abnormal spectra subdirectory 292. These actions may include issuing an appropriate alert(s) of the error condition, addressing one or more aspects of or relating to the control of the chamber 36, or both as will be discussed in more detail below in relation to the process alert module 428 of FIG. 14.

Spectral data from a plasma process which is currently being conducted in the subject processing chamber 36, which does not "match" any plasma process stored within the normal spectra subdirectory 288, and which further does not "match" with corresponding spectral data in the abnormal spectra subdirectory 292, is recorded in a subdirectory of the plasma spectra directory 284 which is entitled "Spectra of "Unknown" Plasma Processes" and identified by reference numeral 296 (hereafter "unknown spectra subdirectory 296"). There are a number of circumstances when data from a plasma process which is being currently conducted in the processing chamber 36 will be recorded in the unknown spectra subdirectory 296. Any error or aberration which is "new" to the current plasma process module 250 (i.e., spectral data, indicative of an error or aberration, which has not been previously recorded in the abnormal spectra subdirectory 292) will result in relevant data from the current plasma process being recorded in the unknown spectra subdirectory 296. Another circumstance where data may be entered in the unknown spectra subdirectory 296 is when the current plasma process being conducted in the processing chamber 36 is actually a new plasma process in relation to the current plasma process module 250. That is, the subject plasma process may very well be proceeding in accordance with the desired or predetermined manner, but data on this particular plasma process has not have been previously recorded in the normal spectra subdirectory 288 of FIG. 9. As such, the spectral data of the current plasma process would not match any plasma process in the normal spectra subdirectory 288, and should not match any corresponding spectral data in the abnormal spectra subdirectory 292. When an "unknown" condition is encountered during operations, an appropriate alert may be issued, control of the current process may be addressed, or both.

Spectral data recorded in the unknown spectra subdirectory 296 from prior plasma processes will typically be analyzed by personnel at some point in time after the process has been terminated. If the spectral data from a plasma process recorded in the unknown spectra subdirectory 296 is identified as being a new plasma process, and if a determination is made to use this spectral data as a standard for evaluating further runnings of this same plasma process on this same processing chamber 36, this spectral data may be transferred to the normal spectra subdirectory 292. Entries may also be made to the abnormal spectra subdirectory 292 from the unknown spectra subdirectory 296. Analysis of the spectral data from a particular plasma process which is recorded in the unknown spectra subdirectory 296 may lead to the conclusion that the spectral data is associated with one or more particular errors/aberrations which is identifiable by its spectral data. The relevant spectral data from the unknown spectra subdirectory 296 may then be transferred to the abnormal spectra subdirectory 292.

The plasma spectra directory 284 of FIG. 9 also contains data which is indicative of when the endpoint has been reached of an entire plasma process or a discernible portion thereof such as a plasma step of a single or multi-step plasma recipe or other plasma process. "Endpoint" in the context of a plasma process or a discernible portion thereof is that time in the plasma process when the plasma within the processing chamber 36 has achieved a certain predetermined result. Each plasma step in a plasma recipe typically has one or more characteristics in its corresponding spectra which will indicate that the desired predetermined result has been achieved, as typically does the end of a plasma clean which was initiated without first wet cleaning the chamber 36, a plasma clean which was initiated after wet cleaning the chamber 36, and a conditioning wafer operation. Spectral data of a plasma process conducted in a chamber 36 may be analyzed after the plasma process is terminated to identify one or more spectra (or portions thereof such as one or more individual wavelengths) which are indicative that endpoint of the subject plasma process or plasma process step has been reached. Spectral data which is indicative of endpoint from the various above-noted categories of plasma processes may be stored in a subdirectory of the plasma spectra directory 284 of FIG. 9 which is entitled "Spectra of Endpoint Characteristic(s)" and identified by reference numeral 316 (hereafter "endpoint subdirectory 316"). The current plasma process module 250 may use the information contained in the endpoint subdirectory 316 to issue an appropriate alert(s) of the identification of an endpoint condition, to address one or more aspects of or relating to the control of the chamber 36, or both.

Multiple runnings of plasma processes within the chamber 36 may "age" the chamber 36 due to the nature of the plasma processes, and this aging may adversely affect the performance of the chamber 36 in some manner. Indications that the chamber 36 may be in need of some type of cleaning may be reflected by the spectra of the plasma in the chamber 36. Spectral data may be included in the plasma spectra directory 284 of FIG. 9 which corresponds with a condition where "cleaning" of the interior of the processing chamber 36 would be desirable. "Dirty chamber condition" spectral data may be recorded in the abnormal spectra subdirectory 292, in which case the "dirty chamber condition" would then be characterized as a known error or aberration consistent with the discussion above on the abnormal subdirectory 292. Alternatively, a separate subdirectory may be employed as illustrated in FIG. 9 in the nature of a "Spectra of "Dirty Chamber Conditions" Subdirectory" and identified by reference numeral 300 (hereafter "chamber condition subdirectory 300"). The current plasma process module 250 may use this information on "dirty chamber conditions" to identify when a processing chamber 36 is in condition for cleaning, and further such that appropriate actions may thereafter be undertaken.

A final subdirectory of the plasma spectra directory 284 of FIG. 9 is a calibration light spectra subdirectory 310 which does not contain spectra of plasma from the chamber 36. Instead, one or more spectra of one or more calibration lights are stored in the subdirectory 310. Generally, a calibration light, whose spectra is in the calibration light subdirectory 310, is directed at the window 38 of the processing chamber 36. A comparision is made between the spectral pattern of the calibration light from the subdirectory 310 and the spectral pattern of that portion of the calibration light which is reflected by the inner surface 40 of the window 38 on the processing chamber 36. The results of the comparison are used to determine the type and amount of calibration which should be implemented in relation to the operation of the current plasma process module 250 as will be discussed in more detail below in relation to the calibration module 562 and FIGS. 40–48.

The above-described structure of the plasma spectra directory 284 and its various subdirectories presented in FIG. 9 is just that—a general structure which organizes categorically similar data for use by the current plasma process module 250 and its various sub-modules. The manner in which the data used by the current plasma process module 250 is actually stored is not particularly relevant for purposes of the present invention. However, it should be appreciated that data should be stored in a manner which allows the current plasma process module 250 to execute its monitoring/evaluation function in a timely fashion. Preferably, this is on at least a substantially "real-time" basis and sub-second acquisition, analysis, and control is available through the module 250. More specifically, acquisition of data, analysis of this same data, and initiation of a protocol (s) based upon this analysis may all be completed in less than a second through the current plasma process module 250.

Figure 10:
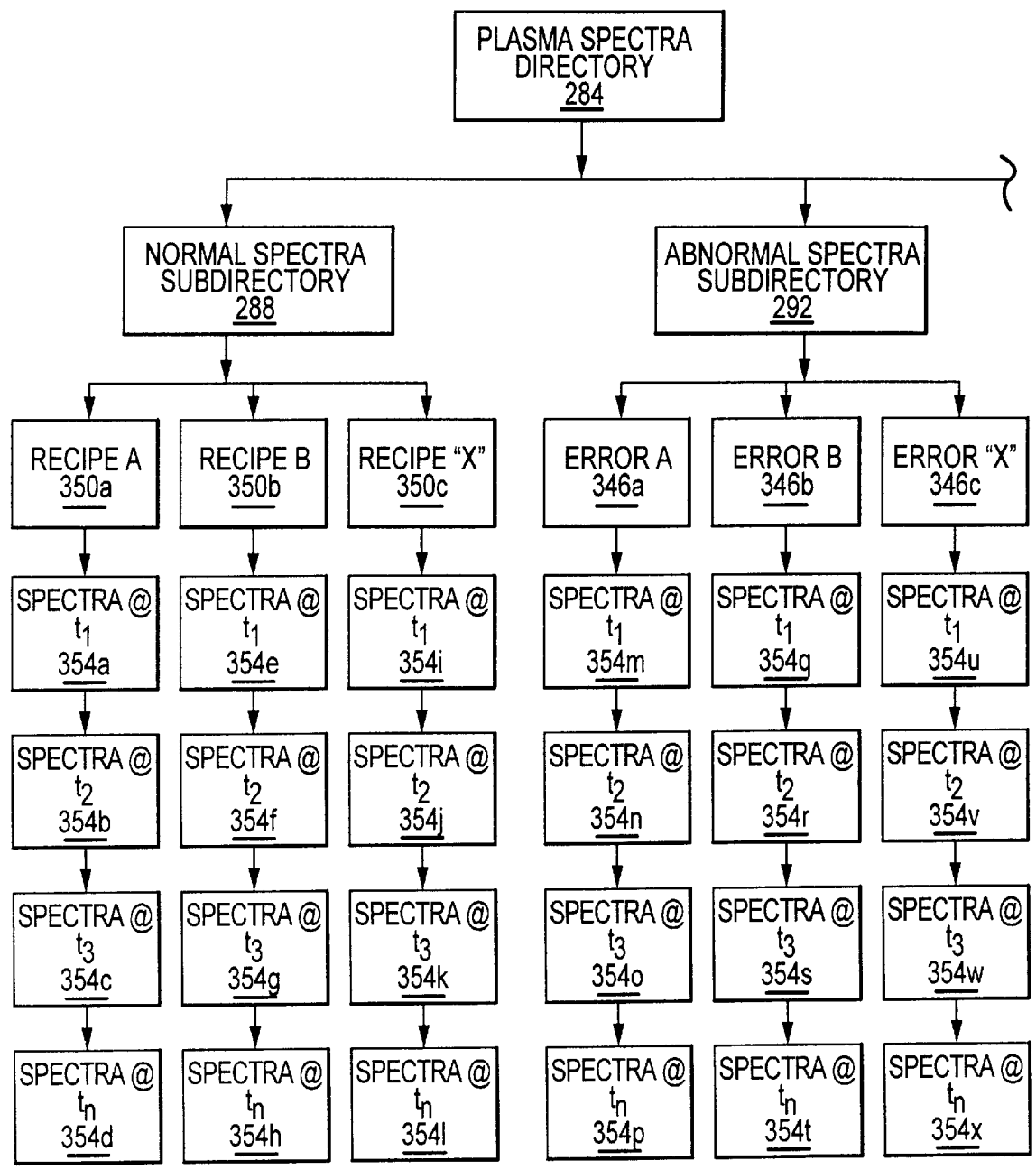
FIG. 10 is a flowchart of one embodiment of a general data management structure which may be utilized for the various subdirectories of the plasma spectra directory of FIG. 9.

Continuing to discuss the storage of spectral data used by the current plasma process module 250 in relation to the directory/subdirectory structure discussed above in relation to FIG. 9, one embodiment of how data may be stored in this directory/subdirectory structure is illustrated in FIG. 10. The plasma spectra directory 284 may have the same subdirectories as presented in FIG. 9, although only the normal spectra subdirectory 288 and abnormal spectra subdirectory 292 are illustrated for convenience and only data on one category of plasma process which may be stored in the normal subdirectory 288 is illustrated (plasma recipes). Review of the normal spectra subdirectory 288 of FIG. 10 indicates that spectra on multiple plasma recipes, which have been previously run on product in the processing chamber 36 which is associated with the plasma spectra directory 284, are each stored in their own main data entry 350. This would also be the case with other categories of plasma processes stored in the normal subdirectory 288. That is, each main data entry 350 is reserved for storing information which is used to evaluate plasma processes which are to be conducted in this same processing chamber 36.

Each main data entry 350 for a given plasma process has a plurality of data segments 354 associated therewith, and each of these data segments 354 will include at least a spectra (e.g., FIG. 8) of the plasma in the processing chamber 36 at a certain point in time and preferably within the Preferred Optical Bandwidth at the Preferred Data Resolution. The spectra associated with each data segment 354 may be stored as a single spectra which covers the Preferred Optical Bandwidth, or may be stored as multiple spectra which collectively cover the Preferred Optical Bandwidth. Spectra for the data segments 354 are taken periodically throughout the running of a plasma process within the processing chamber 36 through the window 38 on the chamber 36 (e.g., by the plasma monitoring assembly 174 of FIG. 6 or any of the embodiments illustrated in FIGS. 31 and 37 below) using the Preferred Data Collection Time Resolution. Although the entirety of the plasma process may be recorded in the normal spectra subdirectory 288 in this manner, sometimes the plasma is rather unstable when it first comes on in the chamber 36. Therefore, it may be desirable to not retain optical emissions data in the normal spectra subdirectory 288 from this unstable time period.

Entries of plasma processes in the normal spectra subdirectory 288 may consist of a plurality of totally different types or species of plasma processes within a given category or genus as also illustrated in FIG. 10. Plasma recipe A is stored under main data entry 350a, which is different from a plasma recipe B which is stored under main data entry 350b, which is different from a plasma recipe "X" which is stored under main data entry 350c. Multiple runnings of the same plasma recipe or process may also be recorded in the normal spectra subdirectory 288 as well if desired (not shown). For instance, spectral data from two separate runnings of plasma recipe A on the same type of product in the associated processing chamber 36 may actually be included in the normal spectra subdirectory 288. Evaluation of a current plasma recipe being run on product in the subject processing chamber 36 would then potentially involve the comparison of optical emissions data on the current process in relation to both of these main data entries 350.

Figure 11:
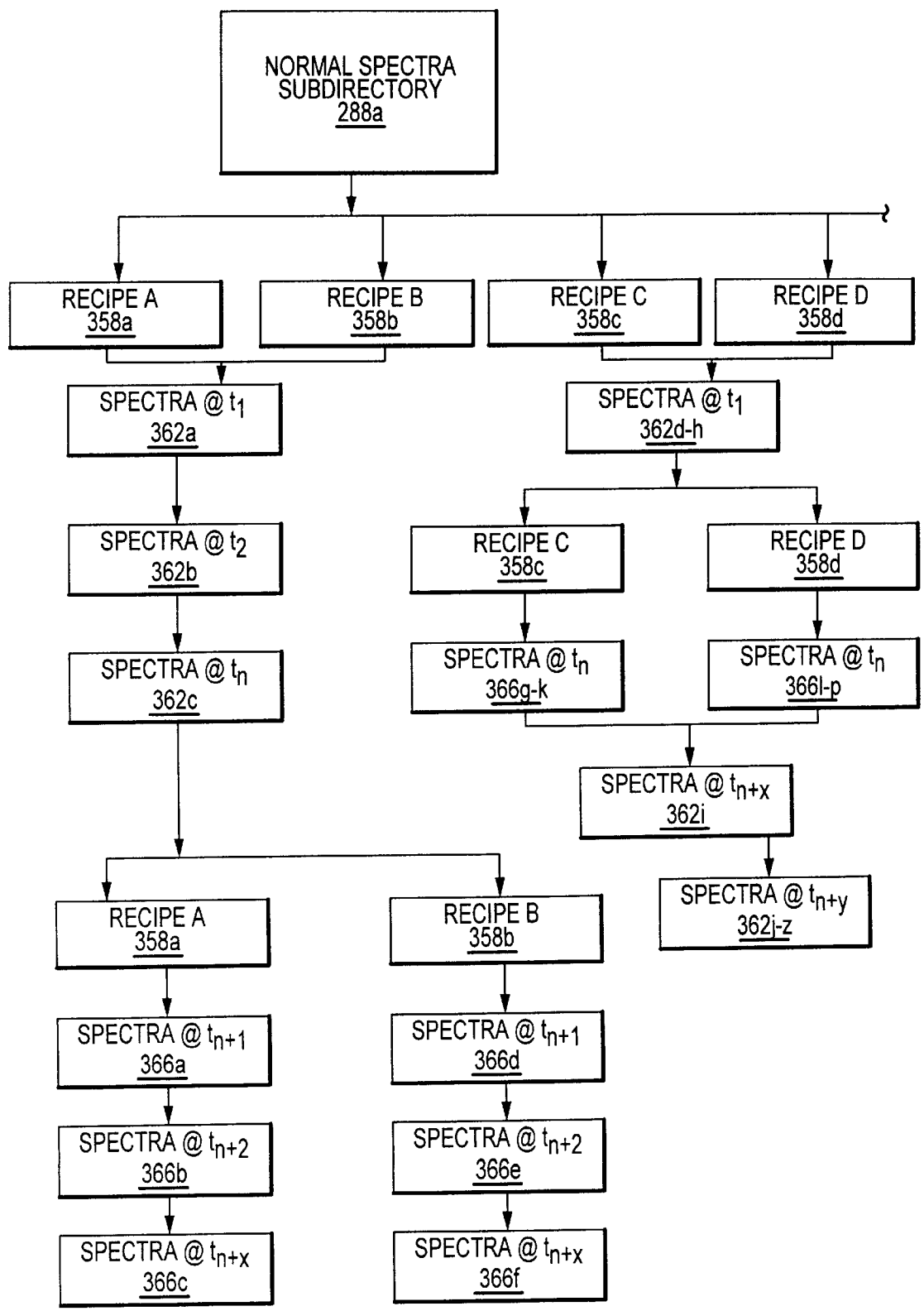
FIG. 11 is a flowchart of one embodiment of how data within the general data management structure of FIG. 10 may be condensed/consolidated.

The optical emissions data within the normal spectra subdirectory 288 of FIG. 10 may be consolidated or condensed to eliminate the storage of redundant data, to increase the speed of the search of the normal spectra subdirectory 288 by the current plasma process module 250, or both. FIG. 11 illustrates one way in which this may be accomplished in the case of the normal spectra subdirectory 288a for one example where Plasma Recipes A–D are stored in the directory 288a. The same principles would apply to any type of plasma process which is stored in the normal spectra subdirectory 288.

Plasma Recipe A under main data entry 358a and Plasma Recipe B under main data entry 358b each have the same spectra for purposes of the current plasma process module 250 from time $t_1$ (the first time data is recorded in the subdirectory 288a for the subject plasma recipe) to time $t_n$ (the "nth" time data is recorded in the subdirectory 288a for the subject plasma recipe). Instead of storing the spectra over this time range twice in the normal spectra subdirectory 288a (once under main data entry 358a for Plasma Recipe A and once under main data entry 358b for Plasma Recipe B), the multiple spectra from this time range are stored only once in common data segments 362a–c. More than 3 common data segments 362 may obviously be used. Nonetheless, common data segments 362a–c are thereby associated with both Plasma Recipe A of main data entry 358a and Plasma Recipe B of main data entry 358b. At time $t_{n+1}$ (i.e., the first time data is recorded in the normal spectra directory 288a after the time $t_n$) and until the end of the plasma recipe in the example presented by FIG. 11, however, the spectra of Plasma Recipe A under main data entry 358a and the spectra Plasma Recipe B under main data entry 358b differ for purposes of the current plasma process module 250. As such, Plasma Recipe A under main data entry 358a and Plasma Recipe B under main data entry 358b each then include their own individual data segments 366a–c and 366d–f, respectively, over the time period from $t_{n+1}$ to $t_{n+x}$ (the "xth" time data is recorded in the normal spectra subdirectory 288a after the time $t_n$). Each of the Plasma Recipes A and B end at the same time for purposes of the example of FIG. 11 (i.e., at time $t_{n+x}$), although in a commercial setting this may not be the case.

The normal spectra subdirectory 288b of FIG. 11 also has main data entries 358c and 358d for Plasma Recipes C and D, respectively. The same data storage concept used in relation to Plasma Recipes A and B is likewise employed for Plasma Recipes C and D in the normal spectra subdirectory 288a. The spectra of Plasma Recipe C under data main entry 358c and Plasma Recipe D under main data entry 358d are the same for purposes of the current plasma process module 250 from time $t_1$ to time $t_n$. Instead of storing the spectra over this time range twice in the normal spectra subdirectory 288b (once under main data entry 358c for Plasma Recipe C and once under main data entry 358d for Plasma Recipe B), the multiple spectra from this time range are stored only once in common data segments 362d–h in the normal spectra subdirectory 288a. Common data segments 362d–h are thereby associated with both Plasma Recipe C of main data entry 358c and Plasma Recipe D of main data entry 358d. At time $t_n$ and until the time $t_{n+x}$ of the plasma recipe in the example presented by FIG. 11, however, the spectra of Plasma Recipe C under main data entry 358c and the spectra of Plasma Recipe D under main data entry 358d differ for purposes of the current plasma process module 250. As such, Plasma Recipe C under main data entry 358c has its own individual data segments 366g–k over the time period from $t_{n+1}$ to $t_{n+x}$, while Plasma Recipe D under main data entry 358d in turn has its own individual data segments 366l–p over this same time period. At time $t_{n+x}$ and until the end of the plasma recipe in the example presented by FIG. 11 at $t_{n+y}$, however, the spectra of Plasma Recipe C under main data entry 358c and the spectra of Plasma Recipe D under main data entry 358d again are the same for purposes of the current plasma process module 250. As such, Plasma Recipe C under main data entry 358c and Plasma Recipe D under main data entry 358d have common data segments 362i–z over the time period from $t_{n+x}$ to $t_{n+y}$. Each of the Plasma Recipes C and D end at the same time for purposes of the example of FIG. 11, although in a commercial setting this again may not be the case.

Each data segment 354 of each plasma process stored under a main data entry 350 in the normal spectra subdirectory 288 of FIG. 10 may contain a multiplicity of data types relevant to the monitoring of the current plasma process with the current plasma process module 250. A representative example is presented in FIG. 12A where these various data types of data are presented in data fields 322 which are associated with each data segment 354. Spectral patterns of the plasma in the processing chamber 36 is a significant data type for comparing the current plasma process with the plasma spectra directory 284, and these spectra are stored in a spectra field 322*d* in the normal spectra subdirectory 288 of FIG. 12A. Each data segment 354 in the normal spectra subdirectory 288 also includes a time field 322*a* where the time associated with the spectra in the spectra field 322*d* is recorded (e.g., the time into the plasma process when the spectra is taken). Data in the time field 322*a* may be used in various ways by the current plasma process module 250 as will be discussed in more detail below.

Further information is at least associated with each main data entry 350 in the normal spectra subdirectory 288. "Associated" in this context means that this information may be provided once for each main data entry 350 for a given plasma process or for only a few times which is less than the total number of data segments 354 under a particular main data entry 350, but it also encompasses a situation where this information is actually provided for each data segment 354 of the subject main data entry 350 which is not as desirable because of redundancies. Fields for these types of information include: a plasma process "genus" field 322*h* (e.g., to identify whether the main data entry 350 is a plasma recipe, plasma clean, or conditioning wafer operation); a wafer identifier field 322*b* (e.g., for information which corresponds with an identifier, such as a number or code, which appears on the wafer 18 which is to have a plasma recipe run thereon and which is used for tracking purposes); a plasma process "species" field 322*c* (a subset of a plasma process "genus", such as different types of plasma recipes (e.g., plasma recipe A and plasma recipe B)); a plasma process step field 322*e* (e.g., to identify the step of a particular plasma recipe or any other plasma process which provides a different function or achieves a different result than other portions of the process); a maximum total plasma process step time field 322*f* (e.g., the maximum amount of time allowed to complete a given plasma step of a multi-step plasma recipe or other process); and a maximum total plasma process time field 322*g* (e.g., the maximum amount of time allowed to complete an entire plasma process (each of its steps)). Certain of this information will be inapplicable to certain genus of plasma processes and/or certain species of plasma processes within a certain plasma process genus. Information provided to the above-noted fields may be input with the data entry device 132 of FIG. 6, although the information for the wafer identifier field 322*b* may be automatically read from the wafer 18 and input to the subject main data entry 354 (e.g., scanner).

The plasma spectra directory 284 of FIG. 10 also illustrates one way of storing data for entries in the abnormal spectra subdirectory 292. A review of the abnormal spectra subdirectory 292 of FIG. 10 indicates that spectral data on multiple known errors or aberrations are each stored in a main data entry 346 for evaluating future plasma processes which are conducted in the same processing chamber 36 where these errors or aberrations occurred. As noted above, these errors in the main data entries 346 have preferably been identified (e.g., the cause(s) of the error has been determined), and are thereby a "known" condition which may be encountered when running a plasma process in the processing chamber 36. Each main data entry 346 having one specific error therein is illustrated as having a plurality of data segments 354 associated therewith, and each of these data segments 354 will include at least a spectra (e.g., FIG. 8) of the plasma from the processing chamber 36 which is a deviation from the relevant spectra of the corresponding plasma process in the normal spectra subdirectory 288 and which is indicative of the subject error or aberration. The spectra associated with each data segment 354 under the abnormal spectra subdirectory 292 may be of the Preferred Optical Bandwidth using the Preferred Data Resolution. Alternatively, the spectra associated with the data segments 354 under the abnormal spectra subdirectory 292 may only include that portion of the spectrum which contains the characteristic(s) which are indicative of the error in question (i.e., an optical emissions segment which is contained within, but smaller than, the Preferred Optical Bandwidth).

Further information relevant to the abnormal spectra subdirectory 292 is illustrated in FIG. 10. Spectral patterns for the data segments 354 under each main data entry 346 of the abnormal spectra subdirectory 292 are illustrated as having been recorded periodically during the running of the entire plasma process within the processing chamber 36 (e.g., using the Preferred Data Collection Time Resolution). Data on the entire plasma process could be retained in the abnormal subdirectory 292. In this case the time $t_1$ referenced in the data segments 354*m*, 354*q*, and 354*u* would be the first spectra obtained of the subject plasma process, while the time $t_n$ would be the last spectra obtained of the subject plasma process at the termination thereof (e.g., endpoint of the last step in the process, or the endpoint of the plasma process if there is not more than one step). This situation may result in the storage of unnecessary data in the abnormal spectra subdirectory 292. Consider a situation where a plasma recipe is being run on product within the processing chamber 36 and has proceeded according to the normal spectra subdirectory 288 for the first 90 seconds of the plasma recipe. Assume that only about 10 additional seconds are required to complete the plasma recipe (i.e., to achieve the result associated with the last step of the recipe). Also assume that an error occurs at the 91 second mark in the current plasma recipe. Unless the data on the first 90 seconds of the plasma recipe provides some type of indication as to the upcoming error which again occurred at the 91 second mark in the current plasma recipe of this example, this data will not be useful for retention in the abnormal spectra subdirectory 292. In this case the spectra at the time $t_{91}$ could be the first spectra which did not "match" with any of the plasma recipes in the normal spectra subdirectory 288. No other spectra need be included under the main entry 346 if this one spectra sufficiently identifies the error (not shown). However, it may be desirable to record in the abnormal spectra subdirectory 292 all spectra which are obtained after the error has been identified and up until the plasma process is terminated at the time $t_n$, or at least a few spectra at various time intervals. Flexibility is provided by the abnormal subdirectory 292 in that the amount of data included under each of the main data entries 346 in which the errors are contained may be independently selected. Therefore, the data segments 354 under each main data entry 346 of the abnormal spectra subdirectory 292 may not necessarily provide a complete history of a plasma process in which an error occurred.

Multiple data types may be included in each data segment 354 associated with each error in each main data entry 346 of the abnormal spectra subdirectory 292 of FIG. 10. A representative example is presented in FIG. 12B where these various data types are contained within data fields 338 which are associated with each data segment 354 under each main data entry 346 of the subdirectory 292. Spectral patterns of the plasma in the processing chamber 36 are a significant data type for comparing the current plasma process with the plasma spectra directory 284, and these spectra are stored in a spectra field 338*b* of the abnormal spectra subdirectory 292 of FIG. 12B of each data segment 354. Moreover, the category or genus of the subject plasma process may be identified in a plasma process genus field 338e (e.g., plasma recipe, plasma clean, conditioning wafer operation), a particular type or species of a given category or genus of plasma process may be identified in a plasma process species field 338f (e.g., a particular type of plasma recipe), and the type of plasma step may be identified in a plasma process step field 338g.

Data in addition to the above-described spectra may be associated with each of the data segments 354 under each main data entry 346 for known error/aberrations within the abnormal spectra subdirectory 292. Each data segment 354 of each main data entry 346 may also include a time field 338a for containing information on the time which is associated with the spectra in the subject data segment 354. Other information associated with the data segments 354 under each main data entry 346 for known error/aberrations within the abnormal spectra subdirectory 292 includes information which identifies the error. Any textual identification or description of the error stored under a main data entry 346 may be included in an error field 338c of the abnormal spectra subdirectory 292. This information would typically be manually entered by personnel using the data entry device 132 (e.g., FIG. 6) after the spectra was analyzed and the cause(s) of the error(s)/aberration(s) was identified.

The current plasma process module 250 includes error identification capabilities as will be discussed in more detail below. Once the current plasma process module 250 identifies a match between the current optical emissions data and a relevant spectra or portion thereof in the abnormal spectra subdirectory 292, information on the corresponding error/aberration may be issued based upon information in the error field 338c. Moreover, corrective actions may be undertaken based upon the contents of this same error field 338c. In this regard, each data segment 354 under each main data entry 346 for known error/aberrations within the abnormal spectra subdirectory 292 may also include a protocol field 338d. Information contained within the protocol field 338d will somehow relate to how the subject error or aberration may or should be addressed, or more specifically what action or actions may or should be undertaken to address the error. Single or multiple protocols may be stored in any one protocol field 338d (e.g., more than one protocol may be appropriate to address a certain condition). Once the current plasma process module 250 identifies a match between the current spectra and a relevant spectra in the abnormal spectra subdirectory 292, how the corresponding error/aberration is addressed may be based upon information contained in the subject protocol field 338d.

Data regarding process control parameters or conditions associated with the processing chamber 36 may also be included in each of the above-described subdirectories of the plasma spectra directory 284 for a specific data entry, particularly in the case of the abnormal spectra subdirectory 292 and the unknown conditions subdirectory 296. These would include conditions which are typically monitored in a plasma process, such as the types of feed gases being used or the composition of the plasma, temperatures within one or more regions of the chamber 36, the pressure within the processing chamber 36, power settings, and gas flow rates.

Figure 13:
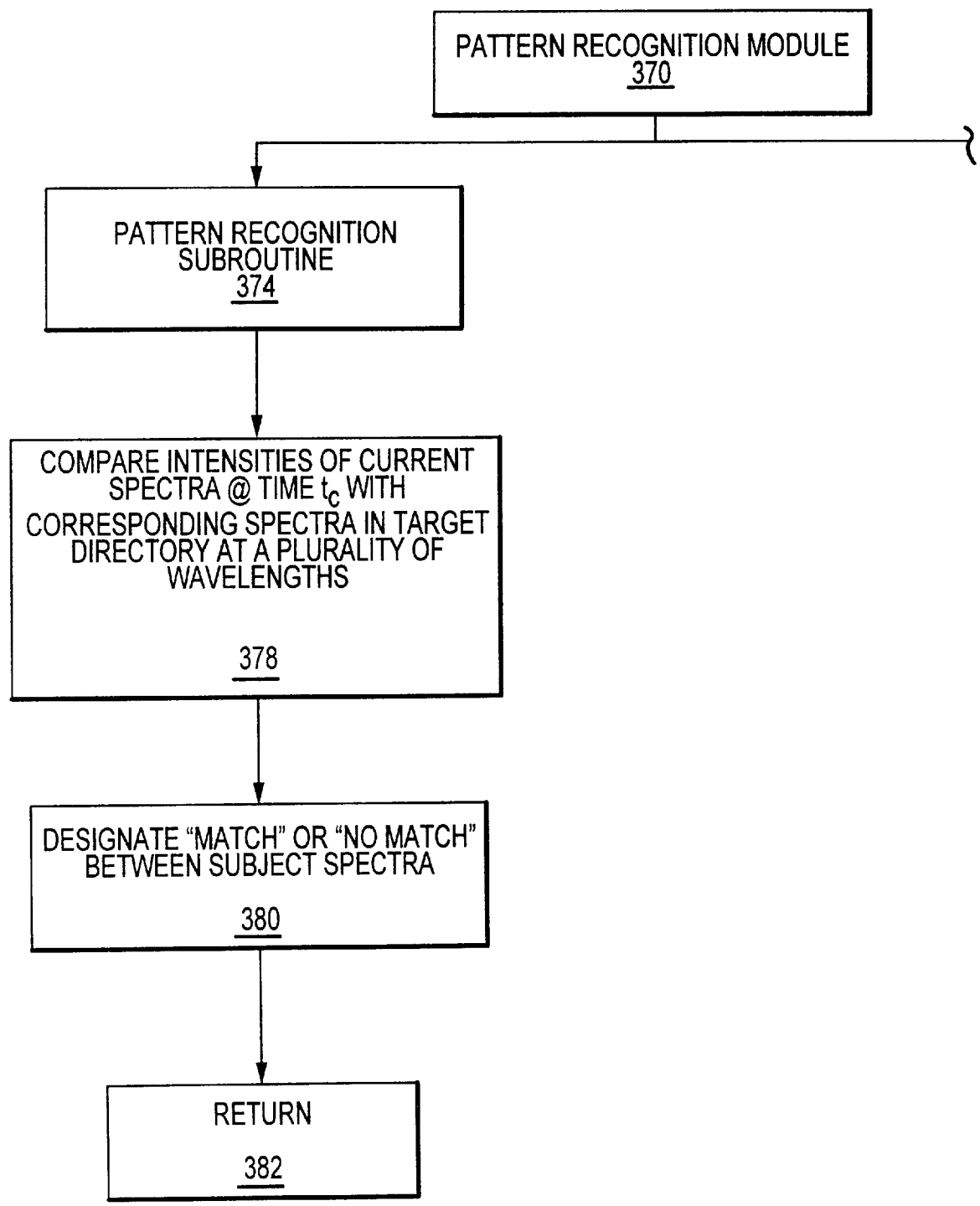
FIG. 13 is a flowchart of one embodiment of a pattern recognition module which may be used by the current plasma process module of FIGS. 7 and 32 in the evaluation of a plasma process being run in the processing chamber of FIG. 1.

Pattern Recognition Module 370—FIG. 13

Certain key principles of the present invention are simply based on whether one spectral pattern matches another spectral pattern (e.g., does the spectral pattern of the plasma in the chamber 36 "match" the pattern of the relevant spectra in the relevant subdirectory of the plasma spectra directory 288). In many cases this determination may be made through the pattern recognition module 370 which is presented in FIG. 13. Various "pattern recognition techniques" may be employed by the pattern recognition module 370 to provide the above-noted function. One such pattern recognition technique is embodied by the flowchart depicted in FIG. 13 and may be generally characterized as a point-by-point pattern recognition technique. The point-by-point pattern recognition technique which is embodied by the pattern recognition subroutine 374 of FIG. 13 is contained within step 378. The intensity at a first wavelength in the current spectra at the current time $t_c$ (a fixed point in time) is compared with the intensity at this same first wavelength of the relevant spectra from a Target Directory. Whichever sub-module of the current plasma process module 250 calls the pattern recognition module 370 will designate which particular subdirectory of the plasma spectra directory 284 is to be searched by the module 370 for "matching" patterns (and thereby defines the Target Directory). The sub-module which calls the pattern recognition module 370 may also establish what will constitute a "matching" pattern. That is, what may be a "matching spectra" in relation to one sub-module of the current plasma process module 250 may not be a "matching spectra" in relation to another of its sub-modules.

If the intensities of the two subject spectra are within a "match limit" of each other at this first wavelength in the subject optical emissions, the patterns of the two subject spectras are initially considered a "match" and the analysis is repeated at a second wavelength which is displaced and different from the first wavelength and which defines a second "point" on which the above-noted point-by-point analysis is repeated. The particular "match limit" which is used by the pattern recognition subroutine 374 may be specific to which sub-module of the current plasma process module 250 calls the pattern recognition subroutine 374 as noted. The above-described point-by-point analysis is repeated by "advancing along" the entirety of the current spectra at typically pre-selected wavelength increments (e.g., every nanometer). Typically, a fixed wavelength increment will be utilized by step 378, such that the comparison between the two subject spectra will be made at every "x" nanometers throughout the entirety of the entire "bandwidth" of the spectra. However, there need not be equal spacings between each of the "points" examined by the pattern recognition subroutine 374.

Another match criterion which may be used in combination with the above-noted point-by-point comparison relates to how many of the examined points must be within the "match limit" in order for the two subject spectra to be considered a match. The sub-module which calls the pattern recognition subroutine 374 may require each "point" examined in the subject point-by-point analysis to be within the selected match limit in order for the two spectra to be considered a match. Alternatively, something less than 100% may also be utilized. For instance, having at least 95% of the points being within the match limit may equate with the two subject spectras being considered a match. Furthermore, the average variation of the multiplicity of points examined by the pattern recognition subroutine 374 may be calculated and compared with an average associated with the relevant spectra from the Target Directory to determine if it is within a predefined tolerance. Any combination of the foregoing may be implemented for determining what is a "match."

A number of factors will affect the accuracy which may be attributed to the results achieved by the execution of step 378 in the pattern recognition subroutine 374 of FIG. 13. One such factor is the "match limit" which will be discussed in relation to the point-by-point comparison technique, but which will be equally applicable to the averaging discussed above. In this case, the "match limit" is the amount that the intensity associated with a point in the current spectra at a certain point in time $t_c$ will be allowed to deviate from the intensity of the relevant spectra from the Target Directory, and yet still be considered a "match" for purposes of the pattern recognition subroutine 374. Two types of "match limits" which may be utilized include a raw difference basis and a percentage difference basis. In the case of a "raw difference basis", a fixed number of intensity units is established and input to the pattern recognition subroutine 374 and which thereby defines the boundary of a "match" (e.g., the "raw difference basis" limit may be established at ±"x" intensity units where "x" is a value which is input to the pattern recognition subroutine 374, such that the intensity at each wavelength of the current spectra checked by the pattern recognition subroutine 374 must be within ±"x" intensity units of the intensity at each of the corresponding wavelengths of the relevant spectra from the Target Directory in order to be considered a "match"). In the case of having a "match limit" based upon a "percentage difference basis," a fixed percentage is established and input to the pattern recognition subroutine 374 and which thereby defines the boundary of a "match" between corresponding intensities of the current spectra and the relevant spectra from the Target Directory (e.g., the "raw difference basis" limit may be established at ±"x" percent, such that the intensity at each wavelength of the current spectra checked by the pattern recognition subroutine 374 must be within ±"x" percent of the intensity at each of the corresponding wavelengths of the relevant spectra from the Target Directory in order to be considered a "match"). Both the "raw difference" and "percentage difference" may be used simultaneously as a "match limit" by the pattern recognition subroutine 374 as well (i.e., both criterion must be satisfied in order for the spectras to be considered a "match"). The "match limits" are equally applicable to when the above-noted averaging technique is used as well. Regardless of which type of "match limit" is employed, it is entered for use by the pattern recognition subroutine 374.

Another factor which affects the accuracy which may be attributable to the results of the pattern recognition subroutine 374 of FIG. 13 is the analytical wavelength resolution used in the above-described point-by-point analysis. "Analytical Wavelength Resolution" in this context means the wavelength increments at which the above-described point-by-point analysis will be performed throughout the subject spectra. Although the plurality of wavelengths for the above-noted point-by-point analysis could be random throughout the bandwidth of the subject spectra, preferably a pattern is used such as a fixed wavelength increment. For instance, if the analytical wavelength resolution is established at 1 nanometer and input to the pattern recognition subroutine 374, the above-noted point-by-point analysis of step 378 would be performed at each 1 nanometer increment across the entirety of the Preferred Optical Bandwidth. Preferably the Analytical Wavelength Resolution used by the pattern recognition subroutine 374 is no more than about 2 nanometers, and even more preferably no more than about 0.5 nanometers. Hereafter, this will be referred to as the "Preferred Analytical Wavelength Resolution."

Summarizing step 378 of the pattern recognition subroutine 374 of FIG. 13 in the case where the current spectra extends from 200 nanometers to 900 nanometers and where the Analytical Wavelength Resolution is 1 nanometer, a comparison is made of the intensities at the 200 nanometer wavelength from the current spectra at the current time $t_c$ (from the current plasma process being run within the processing chamber 36) and from the relevant spectra from the Target Directory. If the difference between these two intensities is within the "match limit" input to the pattern recognition subroutine 374, whether using a raw difference theory, a percentage difference theory, or a combination of a raw difference theory and a percentage difference theory (e.g., the difference in intensity must be no more than a certain, input number of intensity units and must also be within a certain, input number of percentage points of each other in the case of a combination), the 200 nanometer wavelength "point" of the current spectra and the relevant spectra from the Target Directory will be characterized as a "match" at the current time $t_c$. The point-by-point analysis will then continue at the 201 nanometer wavelength in the above-described manner, and will be repeated at each 1 nanometer increment until reaching the last 900 nanometer wavelength. Results of the point-by-point comparison of step 378 for the current spectra at the current time $t_c$ will then be provided to step 380 of the pattern recognition subroutine 374 of FIG. 13 for use by the sub-module of the current plasma process module 250 which called the pattern recognition module 370. Control of the plasma monitoring operations is then returned by step 382 of the pattern recognition subroutine 374 to the submodule of the current plasma process module 250 which called the pattern recognition module 370.

Some plasma processes change very rapidly and some plasma processes are of relatively short duration (e.g., some plasma steps of a plasma recipe are no more than about 5 seconds). Therefore, spectral data should be taken at least every 1 second and the analysis of this data should be completed by the pattern recognition subroutine 374 as fast as possible. In the case where the plasma process is a plasma recipe which will be discussed in more detail below in relation to the plasma health subroutine 253 of FIG. 21, the identification of the current plasma recipe and the analysis of the performance of the processing chamber 36 (e.g., plasma health) should be completed at least before the next wafer 18 is loaded into the chamber 36 for another running of a plasma recipe on this product within the chamber 36. The pattern recognition subroutine 374 of FIG. 13 is able to meet the demands through simplifying the analysis of the spectra of the plasma in the processing chamber 36. The sum total of the analysis provided by the pattern recognition subroutine 374 is simply whether the pattern of the current spectra "matches" the pattern of the relevant spectra from the Target Directory. There is no need to locate or define peaks in the spectra of the plasma from the process currently being conducted in the processing chamber 36 in the analysis used by the pattern recognition subroutine 374 at each of the limits. Nor is any attempt made by the pattern recognition subroutine 374 to identify the various chemical species currently in the plasma in the processing chamber 36 through spectral analysis. Again, the only determination made by the subroutine 374 is whether the current spectral pattern "matches" the relevant spectral pattern in the Target Directory. In one embodiment the pattern recognition subroutine 374 is able to execute step 378 for a spectra defined by wavelengths at least within the range of about 150 nanometers to about 1,200 nanometers with an analytical wavelength resolution of no more than about 1 nanometer (i.e., execute the point-by-point analysis at least at every 1 nanometer increment) in no more than about 1 second, and preferably in no more than about 0.5 seconds.

Figure 14:
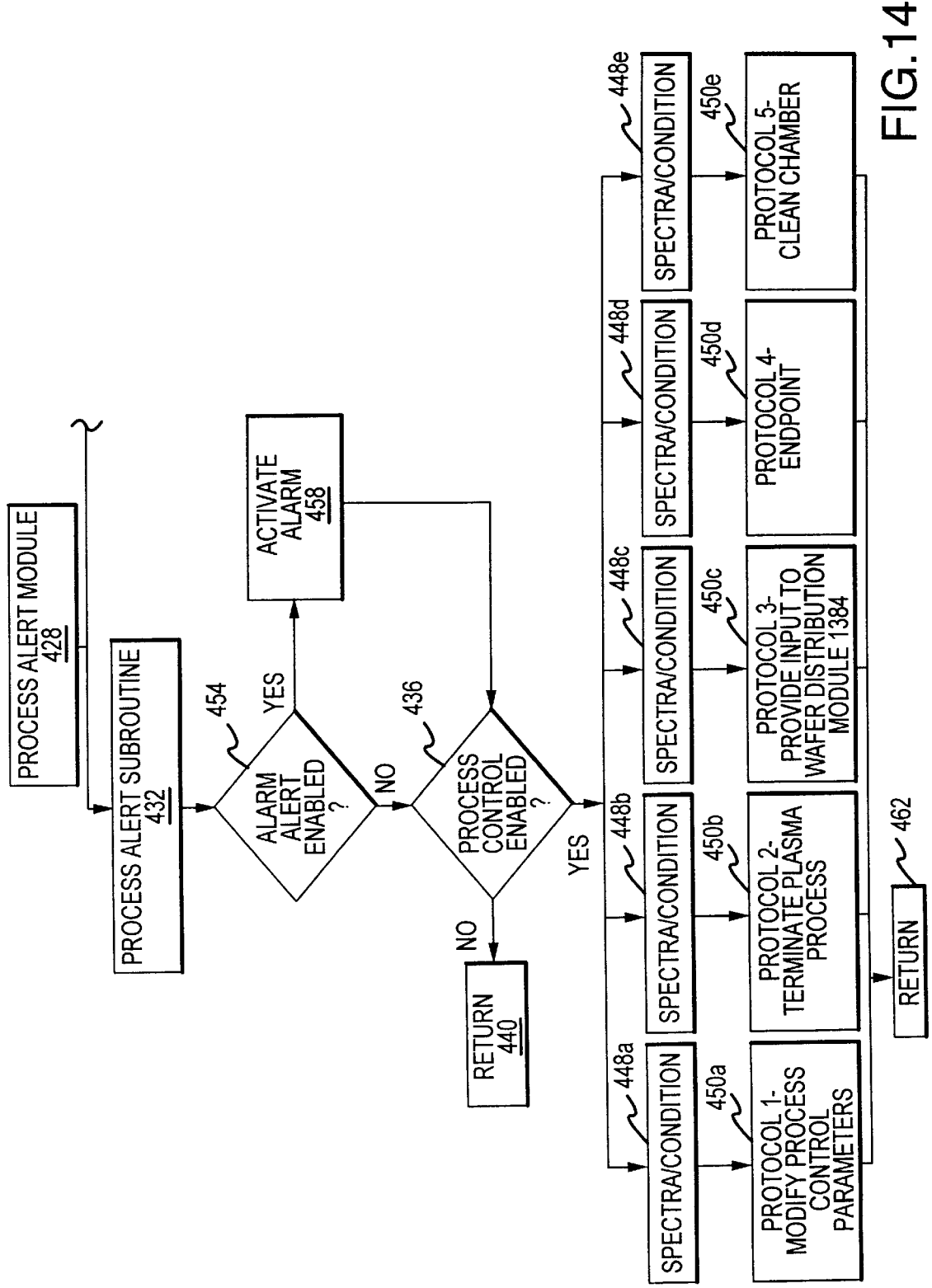
FIG. 14 is a flowchart of one embodiment of a process alert module which may be used by the current plasma process module of FIGS. 7 and 32 in the evaluation of a plasma process being run in the processing chamber of FIG. 1.

Process Alert Module 428—FIG. 14

Various conditions which may be encountered by the current plasma process module 250 may result in the transfer of control to or the sharing of control with the process alert module 428 of FIG. 14. One or more subroutines may be included under the process alert module 428. Each of these subroutines may present various options in relation to how the relevant condition or situation is addressed which resulted in the activation of the process alert module 428. In the case of the process alert subroutine 432 of FIG. 14, two categories of "actions" are made available—the issuing of one or more alerts and addressing the control of the subject plasma process in some manner.

One or more alarms, alerts, or the like may be activated if the alarm alert function of the process alert subroutine 432 of FIG. 14 is enabled at its step 454 in relation to the subject condition or situation. At least one visual alarm may be activated in step 458 of the process alert subroutine 432. Exemplary visual alarms include displaying a general indication of the existence of the relevant condition (e.g., a flashing light), a more specific indication of the subject condition (e.g., providing a textual description of the identified condition or situation), or both. Appropriate locations where information relating to the subject condition may be presented include the display 130 associated with the particular processing chamber 36 where the subject condition was encountered, the display 59 associated with the wafer production system 2 which may be characterized as a master control panel of sorts for the wafer production system 2, any master control panel for the entire fabrication facility incorporating the wafer production system 2, any computer network on which the wafer production system 2 is included, or on any combination of the foregoing. Other visual indications may be employed alone or in combination with any of the foregoing. Audio and any other types of alarms may also be employed.

Another option available under the process alert subroutine 432 of FIG. 14 relates at least in some manner to the control of the plasma process and which may be accessed through step 436 of the process alert subroutine 432. Any spectra which is associated with a condition, or the identification of the condition itself, which will trigger the activation of the process alert subroutine 432 may be included in or associated with a step 448 of the subroutine 432. One or more protocols which have been established for when this spectra or condition is encountered in the chamber 36 may be included in an associated step 450. Multiple spectra or conditions may be included in any one step 448. The commonality between these spectra/conditions included in or associated with a step 448 is the categorically similar protocol included in its associated step 450.

Five categorical protocols are presented in FIG. 14. Step 450a presents a protocol category which is the modification of one or more process control parameters. One or more spectra from the abnormal spectra subdirectory 292, one or more conditions, or both, may be included in step 448a of the process alert subroutine 432 which will access step 450a. Step 450a is directed toward a protocol category which is to attempt to "address" (e.g., correct/remedy) the subject condition in the current plasma process being run in the chamber 36. The protocol associated with step 450a of the process alert subroutine 432 more specifically provides for the modification or adjustment of one or more process control parameters in a manner which has been previously determined to be appropriate to address the subject condition. Adjustment of the process control parameters associated with the current plasma process may be automatically undertaken if desired by the facility incorporating the wafer production system 2 through operatively interfacing the process alert subroutine 432 with the appropriate process controller(s) (e.g., by sending an appropriate signal from the PMCU 128 to the MCU 58 of FIG. 1 which controls the wafer production system 2). Manual adjustment of one or more process control parameters is also contemplated by step 450a of the process alert subroutine 432. Execution of step 450a in this case would entail informing the appropriate personnel of the protocol(s) associated with the subject condition such that these personnel could manually initiate the appropriate action if desired.

Notwithstanding the presentation of a single "modify process control parameters" protocol in FIG. 14, it should be appreciated that different process control modifications may be initiated for different spectra/conditions associated with step 448a. One or more spectra may be associated with a condition which requires modification of the process control parameters in one way, while one or more spectra associated with another condition may require modification of the process control parameters in another way. Moreover, any one or more spectra or one or more conditions associated with step 448a may have one or more process control protocols associated therewith. For instance, in the case where step 450a is not directly integrated with the relevant process controller(s), a listing of possible corrective actions which may be undertaken to address the associated condition(s) may be provided for consideration by the appropriate personnel. Integrating step 450a with one or more controllers associated with the wafer production system 2 may still utilize multiple process control protocols for any one or more spectra/conditions. Attempts to address the subject condition associated with step 448a may first be pursued through a first protocol associated with this condition and step 450a. If this is unsuccessful in addressing the subject condition, a second protocol associated with the subject condition and step 450a may then be undertaken and so forth.

Another categorical protocol which may be included in the process alert subroutine 432 of FIG. 14 relates to terminating the current plasma process. One or more spectra which are representative of one or more conditions, or the identification of the condition(s) itself, may be included in or associated with step 448b of the subroutine 432 which accesses step 450b. Step 450b contains one or more protocols which are directed toward terminating the subject plasma process, although typically termination of the current plasma process will simply entail terminating the gas flow to the chamber 36 and the electrical componentry which are responsible for creating the plasma. Termination of the current plasma process may be automatically undertaken if desired by the facility incorporating the wafer production system 2 through operatively interfacing the process alert subroutine 432 with the appropriate process controller(s) (e.g., by the PMCU 128 sending an appropriate signal to the MCU 58). Manual termination of the current plasma process is also contemplated by step 450b. Execution of step 450b in this case may then simply entail apprising the appropriate personnel that a condition has been identified where termination of the current plasma process being run in the processing chamber 36 is recommended such that the appropriate action may be manually undertaken if desired.

Cleaning operations may also be initiated through the process alert subroutine 432 of FIG. 14. One or more spectra from the abnormal spectra subdirectory 292 or the chamber condition subdirectory 300, or again simply the identification of the relevant condition, may be included in/associated with step 448e of the subroutine 432 which in turn accesses step 450e. Step 450e contains a protocol which is directed toward initiating some type of a cleaning of the interior of the processing chamber 36. Cleaning operations may be automatically undertaken if desired by the facility incorporating the wafer production system 2 through operatively interfacing the process alert subroutine 432 with the appropriate process controller(s) (e.g., by the PMCU 128 sending an appropriate signal 90 to the MCU 58). Manual implementation of these actions is also contemplated by step 450e. In this regard, the execution of step 450e in the process alert subroutine 432 of FIG. 14 may simply entail apprising personnel that it is recommended that the current plasma process being run in the processing chamber 36 be terminated due to the detected dirty chamber condition, and that a cleaning operation be subsequently manually initiated.

One or more spectra/conditions associated with step 448e may be associated with different protocols in step 450e. For instance, one protocol of step 450e corresponding with one or more spectra/conditions associated with step 448e may relate to a plasma cleaning operation which may be initiated in accordance with the foregoing. Other spectra or conditions associated with step 448e may access a protocol of step 450e which relates to a wet clean which may be initiated in accordance with the foregoing.

Spectra or conditions within the chamber 36 which are of a nature such that the wafer distribution sequence should be affected in some manner by their existence may be included in or associated with step 448c. The protocol set forth in step 450c thereby addresses tie manner in which wafers 18 are distributed to the various processing chambers 36 of the wafer production system 2 through the wafer distribution module 1384 which will be discussed in more detail below in relation to FIGS. 59–60. Addressing the sequence of distribution of wafers 18 to the processing chambers 36 of the wafer production system 2 may be automatically undertaken if desired by the facility incorporating the wafer production system 2 through operatively interfacing the process alert subroutine 432 with the appropriate process controller(s) (e.g., wafer distribution module 1384, MCU 58). Manual techniques are also contemplated by step 450c in that the execution of step 450c of the process alert subroutine 432 may simply entail apprising personnel that it is recommended that the distribution sequence to the chambers 36 of the system 2 be manually addressed because of the existence of the subject condition.

Finally, plasma process/plasma process step endpoint may be addressed through the process alert subroutine 432 of FIG. 14. In this regard, one or more spectra indicative of the endpoint of the subject plasma process or discrete portion thereof (e.g., plasma process step), or the identification of the plasma process/process step itself, may be included in or associated with step 448d. The protocol set forth in step 450d addresses how the identification of the occurrence of the particular endpoint should be addressed. This may include terminating the subject plasma process/process step, initiating the next plasma process/step (e.g., if the subject plasma step is not the last step of a given plasma recipe or other process), or both depending upon the nature of the plasma process. Automation and manual techniques are contemplated by step 450d as in the above-noted cases.

The control of the plasma monitoring operations is relinquished by the process alert subroutine 432 of FIG. 14 through steps 440 (if only the alarm alert function is enabled at step 454) or 462 (if the process control feature is enabled at step 436). Depending upon the circumstances, control may be returned to the particular sub-module of the current plasma process module 250 which called the process alert module 370. Another option which may be employed is to return control of the plasma monitoring operations in a particular case or in all cases to the startup module 202 of FIG. 7 through execution of steps 440 or 462.

Figure 15:
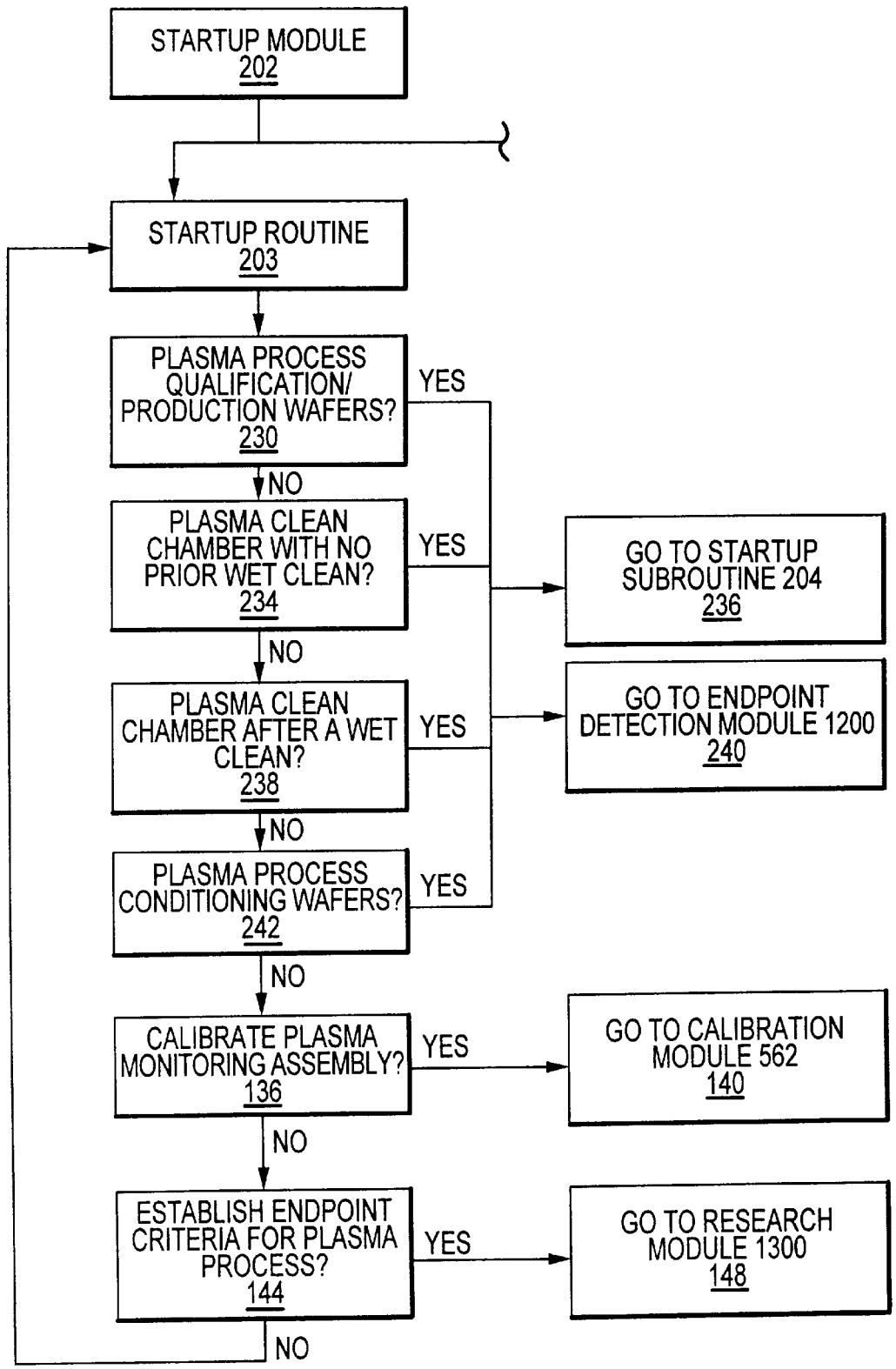
FIG. 15 is a flowchart of one embodiment of a startup module to access the current plasma process module of FIGS. 7 and 32 for the evaluation of a plasma process being run in the processing chamber of FIG. 1.
Figure 16:
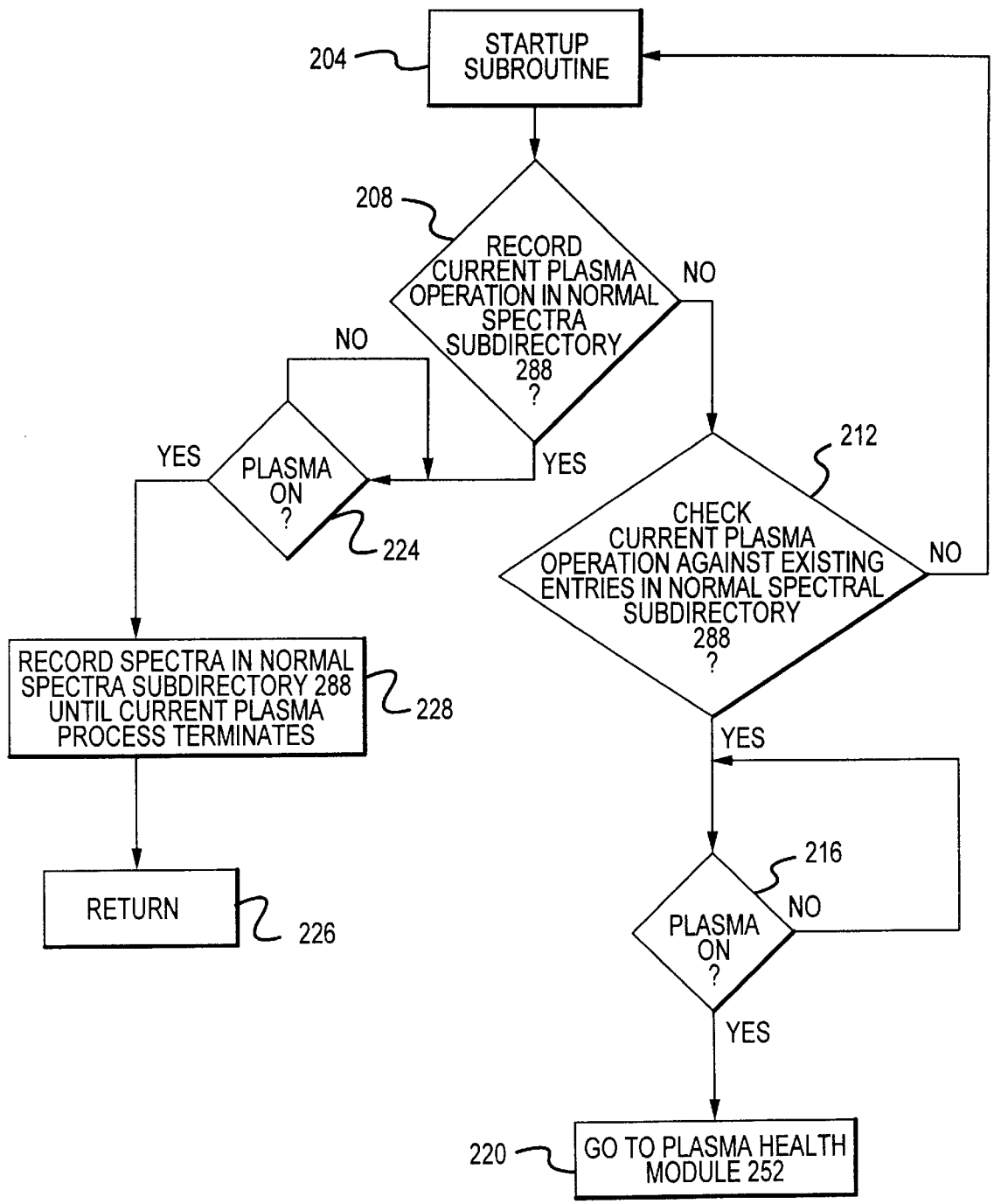
FIG. 16 is a flowchart of one embodiment of a startup subroutine which may be accessed by the startup module of FIG. 15.

Startup Module 202—FIGS. 15–16

Information on what is happening in the processing chamber 36 (e.g., spectra of the plasma in the chamber 36) is made available to the current plasma process module 250 for evaluation of the current plasma process operation through its various "sub-modules" as generally discussed above and as will be addressed in more detail below in relation to the following relevant figures. Access to the various "sub-modules" of the current plasma process module 250 may be controlled through the startup module 202 of FIG. 15. As such, the startup module 202 may be viewed as a main menu of sorts for the various options that are available through the current plasma process module 250.

One embodiment of a startup routine which may be used by the startup module 202 is illustrated in FIG. 15 and provides the above-noted "main menu-like" function. The startup routine 203 basically allows personnel to "enter" in some manner the type of action to be undertaken such that control of the plasma monitoring operations may be transferred to the appropriate sub-module of the current plasma process module 250. "Entry" may be accomplished by providing a listing on the display 130 associated with the PMCU 128 (e.g., FIG. 6) of all of the actions which may be undertaken and allowing personnel to select which option should be pursued with the data entry device 132. Another option would be to allow personnel to input the action to be initiated using the data entry device 132. Still another option would be for the startup routine 203 to sequentially scroll down through a listing of the various options. Finally, no input need be provided as the current plasma process module 250 may just immediately begin comparing the current plasma process to the plasma spectra directory 284 (e.g., using an appropriate order for searching the various subdirectories).

Three "categorical" actions may be initiated through the startup routine 203. First, certain calibration operations may be undertaken through step 136 of the startup routine 203 which accesses a calibration module 562 through execution of step 140. The calibration module 562 will be discussed in more detail below in relation to FIGS. 40–48. Research in relation to the current plasma process to be run in the chamber 36 may be initiated through step 144. For instance, research may be undertaken to identify one or more characteristics which are indicative of the endpoint of a particular plasma process or plasma process step. This is accomplished through execution step 148 of the startup routine 203 which calls a research module 1300 which will be discussed in more detail below in relation to FIGS. 49–51C.

A final option available through the startup routine 203 of FIG. 15 relates to current plasma processes (i.e., any plasma process run in the chamber 36 which is not recorded in the plasma spectra directory 284). Plasma processes such as plasma processing qualification/production wafers (step 230), plasma cleaning operations without first doing a wet clean of the chamber 36 (step 234), plasma cleaning operations conducted after the chamber 36 has been wet cleaned (step 238), and conditioning wafer operations (step 242) each may be accessed through the startup routine 203. The endpoint of these types of plasma processes, a specific portion thereof, or both may be determined through an endpoint detection module 1200 which will be discussed in more detail below in relation to FIGS. 52–58 and which is called by step 240 of the startup routine 203. The "health" of these types of plasma processes may also be evaluated through the plasma health module 252 which will be discussed in more detail below in relation to FIGS. 21–25 and which is called through execution of step 236 of the startup routine 203.

Step 236 of the startup routine 203 of FIG. 15 relates to a plasma health evaluation and calls the startup subroutine 204 of FIG. 16. Two main options may be pursued in relation to "plasma health" through the startup subroutine 204 of FIG. 16. Either a current plasma process may be recorded in the normal spectra subdirectory 288 to be used as a standard for evaluating plasma processes subsequently run in the chamber 36, or the current plasma process may be evaluated against the normal spectra subdirectory 288. In this regard, step 208 of the startup subroutine 204 of FIG. 16 inquires as to whether the plasma process to be conducted in the subject processing chamber 36 should be recorded in the normal spectra subdirectory 288 associated with this chamber 36. If the "response" to the inquiry of step 208 is a "yes", the startup subroutine 204 proceeds to step 224 where a determination is made as to the status of the plasma in the processing chamber 36—specifically whether the plasma is "on" through optical analysis by the current plasma process module 250. One way to determine if the plasma is "on" in the chamber 36 is to determine when the spectra obtained from the processing chamber 36 "matches" any spectra stored in the plasma spectra directory 284 or any of its subdirectories, such as through the pattern recognition module 370 of FIG. 13. Another way in which this may be done is to determine when any of the spectra from the interior of the processing chamber 36 have at least a certain number of discrete peaks of a least a certain intensity. Using the same principles discussed above in relation to the pattern recognition module 370 of FIG. 15 may also identify this type of spectra through the current plasma process module 250. Determining when there is at least a certain change in the optical emissions from within the chamber 36 may also be indicative that the plasma is "on" (e.g., going from a "dark" condition to a "light" condition). Regardless of how the determination is made as to whether plasma exists in the processing chamber 36, the "plasma on" indication may be appropriately conveyed to operations personnel or others in one or more of the above-noted manners.

Once plasma is present in the processing chamber 36, the startup subroutine 204 proceeds to step 228 where at least spectral data of the current plasma process is recorded in the normal spectra subdirectory 288. Preferably this encompasses the Preferred Optical Bandwidth at the Preferred Data Resolution and using the Preferred Data Collection Time Resolution. After the plasma process is terminated, the subroutine 204 returns to the "main menu-like" startup routine 203 of FIG. 15 via step 226.

The other alternative available through the startup subroutine 204 of FIG. 16 is to evaluate the current plasma process to be run in the subject processing chamber 36 against spectral data already recorded in the normal spectra subdirectory 288. In the example presented in FIG. 16, this is accomplished by exiting step 208 of the startup subroutine 204 under a "no" logic condition, which directs the startup subroutine 204 to proceed to step 212. Step 212 inquires as to whether the plasma process to be run in the processing chamber 36 should be evaluated against spectral data in the normal spectra subdirectory 288. Since the two main options available under the startup subroutine 204 are to either record data or evaluate spectral data of the current plasma process against spectral data already recorded in the normal spectra subdirectory 288, and further since the subroutine 204 reached step 212 because a "decision" was made at step 208 of the subroutine 204 to not record data in the normal spectra subdirectory 288, a response of "no" at step 212 merely redirects the startup subroutine 204 to start over. Responding "yes" at step 212, however, directs the startup subroutine 204 to proceed from step 212 to step 216. Step 216 inquires as to whether the plasma is on in the processing chamber 36, and therefore may be identical to step 224 discussed above. Once plasma exists within the processing chamber 36, the startup subroutine 204 proceeds to 220 where control of plasma monitoring operations is transferred to the plasma health module 252 such that the health of the plasma process may be assessed. The "record" or "compare" options may be presented in other ways than as set forth in the start-up subroutine 203.

Plasma Health Evaluations

Figure 32:
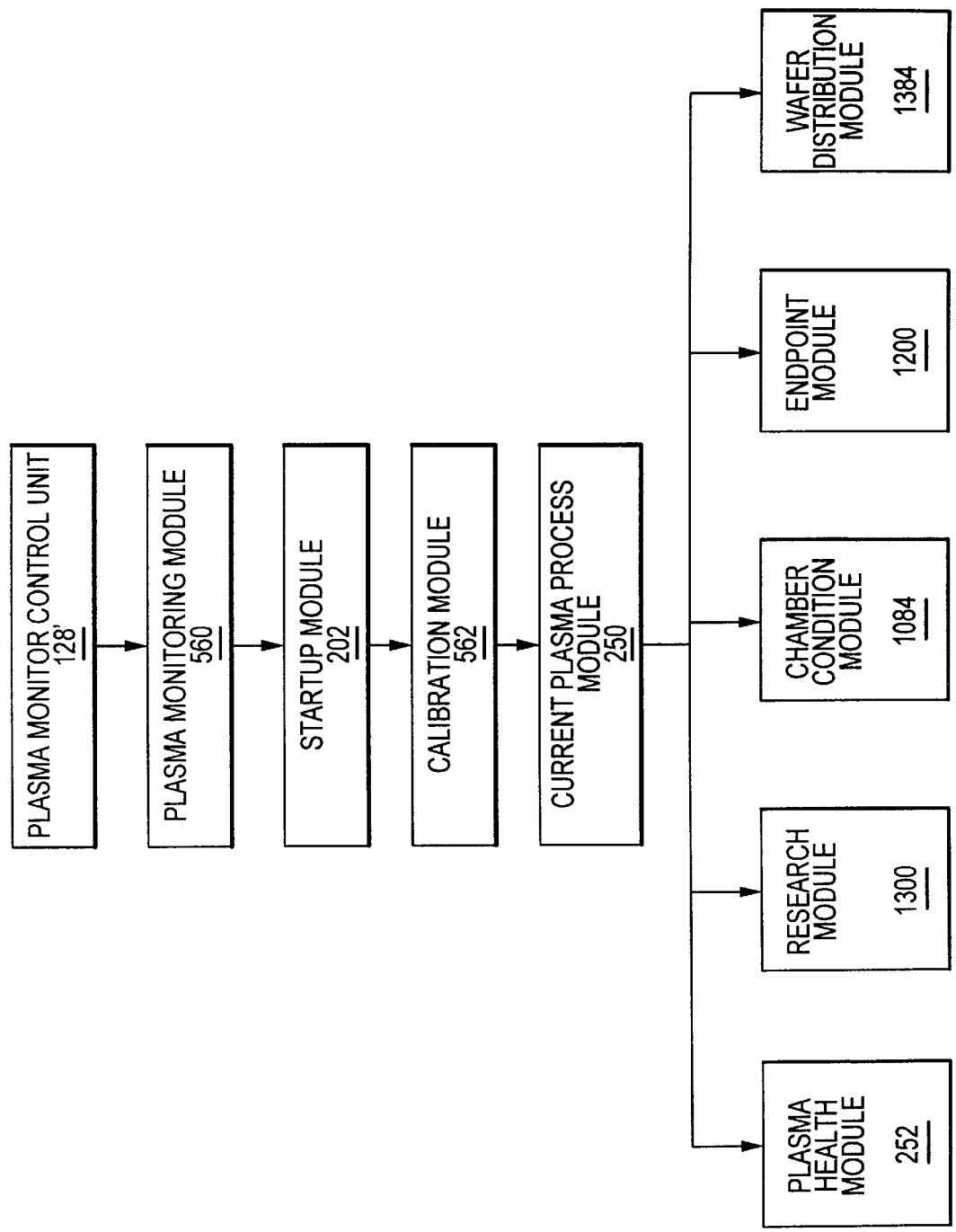
FIG. 32 is a flowchart of one embodiment of a plasma monitoring module which may be used by the plasma monitoring assembly of FIG. 31, as well as by the plasma monitoring assembly of FIG. 37 below.

The plasma health module 252 of FIG. 7 is also included in the embodiment of FIG. 32 and evaluates the overall health of the plasma in the subject chamber 36 or the "plasma health." "Plasma health" as used herein means the state or the condition of the plasma process as it relates to plasma performance when compared to typical "normal" plasma behavior resulting in usable product. The "condition" of the plasma in turn may be characterized as the cumulative result of all parameters having an effect on the plasma in the processing chamber. Stated another way, "plasma health" may be equated with a condition where a current plasma process is proceeding in accordance with one or more plasma processes stored in the normal spectra subdirectory 288. In this regard, the plasma health module 252 is able to determine if the current plasma process being conducted within the processing chamber 36 is progressing "normally" through a comparison of at least a portion of the optical emissions from the processing chamber 36 during the plasma process with the relevant spectra or portion thereof in the normal spectra subdirectory 288. Spectral patterns of the plasma in the chamber 36 will change as the plasma process progresses. Moreover, the spectral patterns of the plasma in the chamber 36 differ in relation to the category of plasma process being run. This is evidenced by a review of exemplary spectra from a plasma recipe, a plasma clean conducted without first wet cleaning the chamber 36, a plasma clean executed after a wet clean of the chamber 36, and a conditioning wafer operation presented below. In each case, "intensity" is plotted along the "y" axis and expressed in "counts" which is reflective of the intensity level, while "wavelength" is plotted along the "x" axis in nanometers.

Figure 17A:
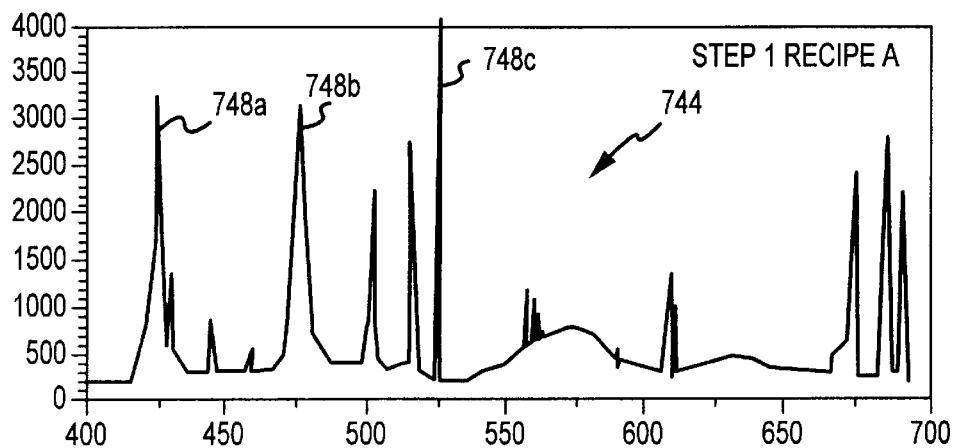
FIGS. 17A–C are exemplary spectra of one type of plasma process that may be run in any of the processing chambers of FIG. 1 and monitored by the current plasma process module, namely a three-step plasma recipe.
Figure 17B:
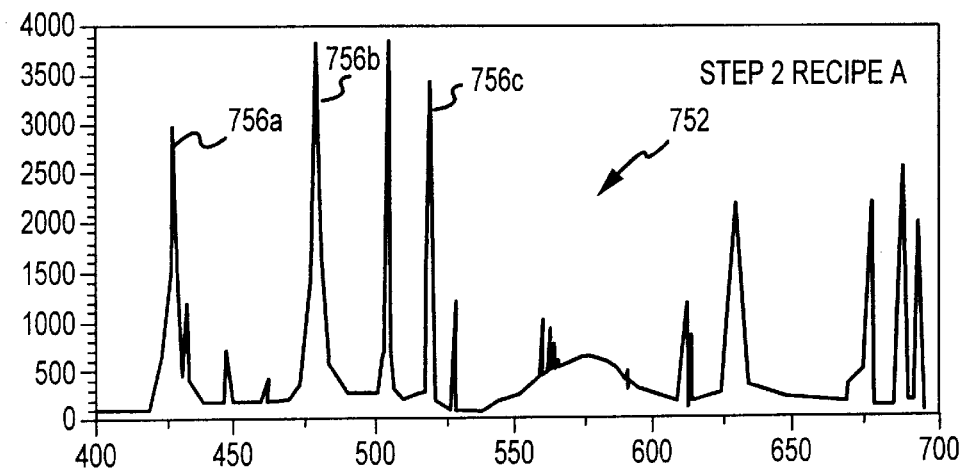
Figure 17C:
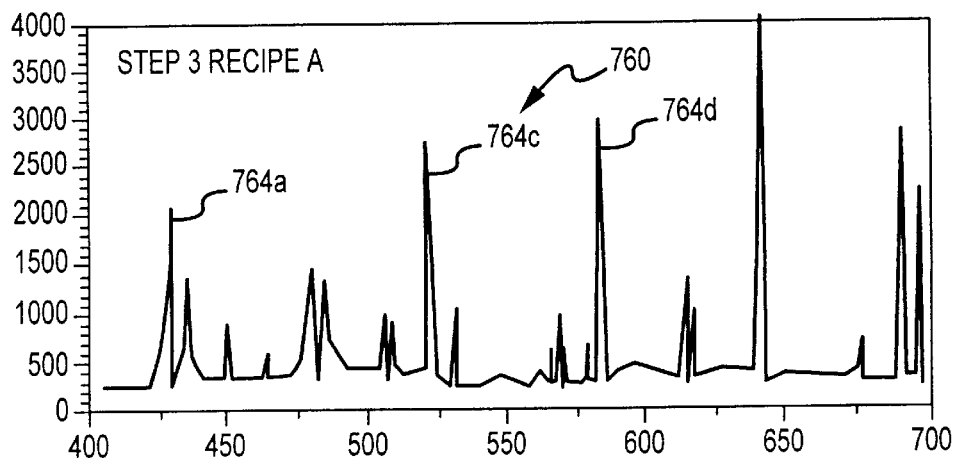

Exemplary Plasma Recipe Spectra—FIGS. 17A–C

An example of a multiple step plasma recipe run on a wafer 18 in the chamber 36 is illustrated in FIGS. 17A–C in which the spectra of the plasma in the processing chamber 36; varies with a change in the current plasma step. FIGS. 17A–C present a spectra 744 of an exemplary first plasma step of an exemplary plasma recipe A, a spectra 752 of an exemplary second plasma step of this same plasma recipe A, and a spectra 760 of an exemplary third plasma step of this same plasma recipe A, respectively. Each of these spectra 744, 752, and 760 are characterized by a number of peaks 748, 756, and 764, respectively, of varying intensities at various wavelengths. A comparison of the spectra 744, 752, and 760 reveals that their associated patterns differ, including without limitation as follows: 1) at about the 425 nanometer wavelength region, peak 748a in the spectra 744 of FIG. 17A has an intensity of about 3,300, peak 756a in the spectra 752 of FIG. 17B has an intensity of about 3,000, and peak 764a in the spectra 760 of FIG. 17C has an intensity of about 2,100; 2) at about the 475 nanometer wavelength region, peak 748b in the spectra 744 of FIG. 17A has an intensity of about 3,200, peak 756a in the spectra 752 of FIG. 17B has an intensity of about 3,900, and there is no peak in the spectra 760 of FIG. 17C, but the corresponding intensity (noise) is about 500; 3) at about the 525 nanometer wavelength region, peak 748c in the spectra 744 of FIG. 17A has an intensity in excess of 4,000, peak 756c in the spectra 752 of FIG. 17B has an intensity of about 3,400, and peak 764c in the spectra 760 of FIG. 17C has an intensity of about 2,750; 4) at about the 587 nanometer wavelength region, there is no peak in the spectra 744 of FIG. 17A, but the intensity is about 500 (noise), there is no peak in the spectra 752 of FIG. 17B, but the intensity is about 490 (noise), and peak 764d in the spectra 760 of FIG. 17C has an intensity of about 3,000. These distinctions between the spectra 744, 752, and 760 show that it is possible to distinguish between the various steps of a plasma recipe, as well to evaluate the progression of a plasma recipe, through an evaluation of the spectral pattern of the plasma in the chamber 36 during the plasma recipe.

Figure 18A:
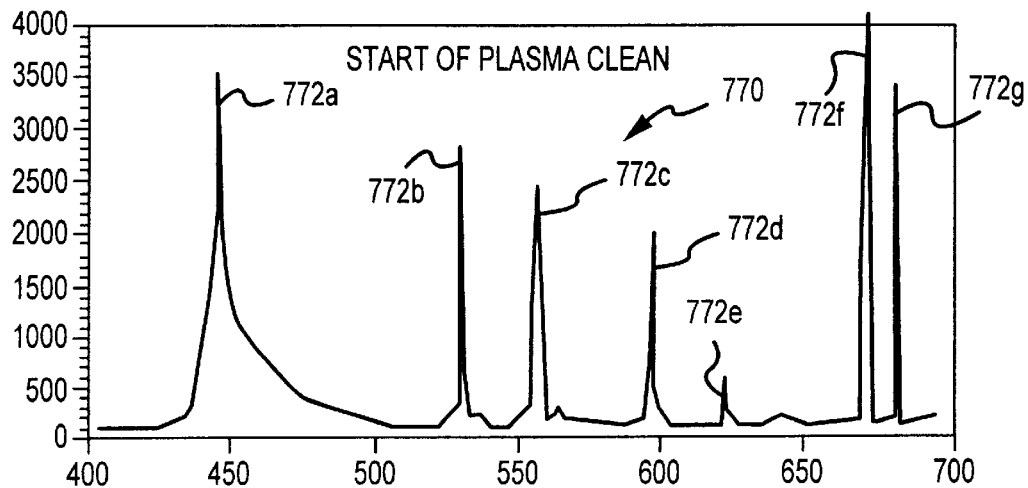
FIGS. 18A–C are exemplary spectra of another type of plasma process that may be run in any of the processing chambers of FIG. 1 and monitored by the current plasma process module, namely a plasma cleaning operation without first wet cleaning the chamber at the start, at an intermediate time, and end of such a plasma cleaning operation, respectively.
Figure 18B:
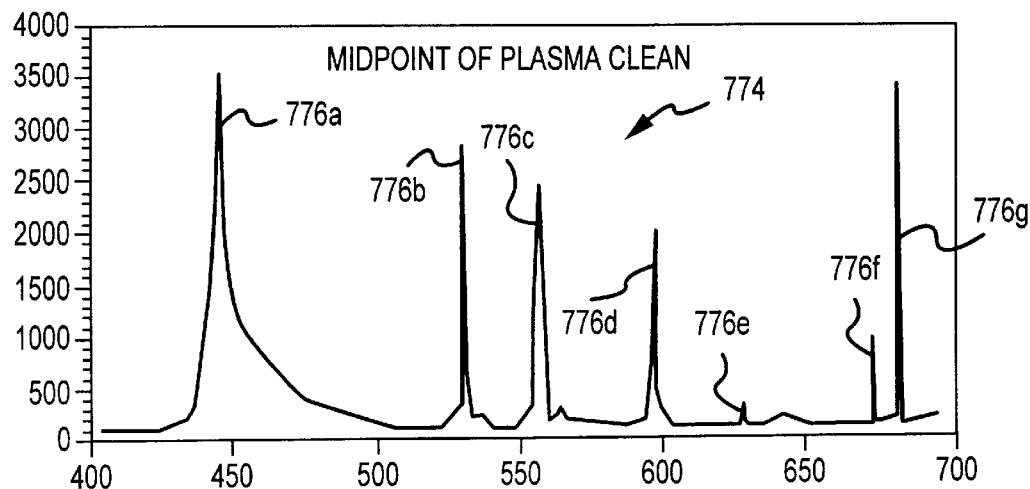
Figure 18C:
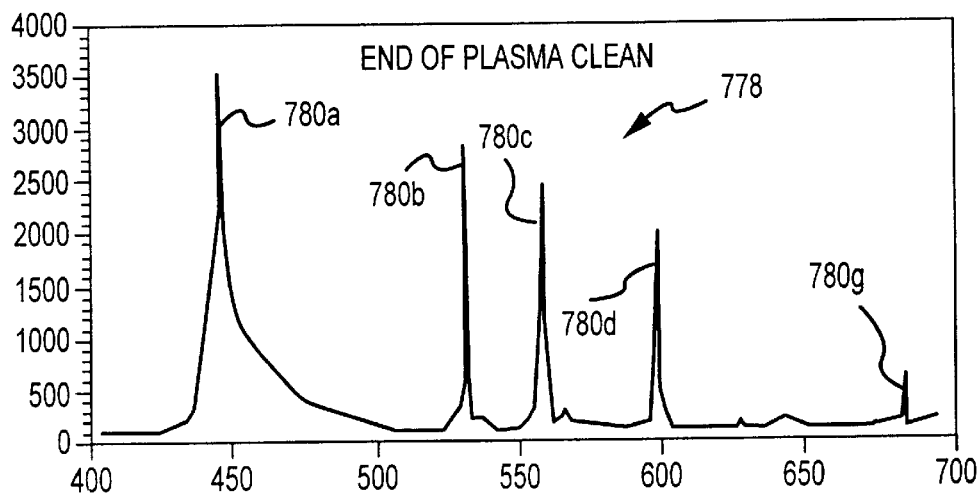

Exemplary Plasma Cleaning Operation Spectra With No Prior Wet Clean—FIGS. 18A–C

Representative spectra are presented in FIGS. 18A–C to illustrate how the optical emissions of the plasma within the processing chamber 36 changes over time during a plasma clean conducted without first doing a wet clean of the chamber 36. FIG. 18A presents a spectra 770 of an exemplary plasma when the processing chamber 36 is in a dirty chamber condition and while plasma is present in tie process chamber 36 without any product therein. FIG. 18B presents a spectra 774 of this same exemplary plasma at an intermediate time of the plasma clean in which the dirty chamber condition has begun to be addressed by the plasma clean. Finally, FIG. 18C presents a spectra 778 of this same exemplary plasma at the end of the plasma clean at which time the interior of the processing chamber 36 is deemed to be in condition to return to commercial production (e.g., to etch integrated circuit designs on a production wafer 18). This spectra 778 may be selected by the operator of the facility implementing the wafer production system 2 as being indicative of the chamber 36 being in proper condition for resumption of production. However, it should be appreciated that there is not necessarily a "bright line" as to when a chamber 474 is in condition to return to production. Therefore, the selection of the spectra 778 as being indicative of a "clean chamber condition" may be somewhat arbitrary.

Each of the spectra 770, 774, and 778 are characterized by a number of peaks 772, 776, and 780, respectively, of varying intensities at various wavelengths. A comparison of the spectra 770, 774, and 778 reveals that their associated patterns are in fact different, including without limitation as follows: 1) at about the 625 nanometer wavelength region, peak 772e in the spectra 770 of FIG. 18A has an intensity of about 500, peak 776e in the spectra 774 of FIG. 18B has an intensity of about 300, and there is no substantial peak in the spectra 778 of FIG. 18C; 2) at about the 675 nanometer wavelength region, peak 772f in the spectra 770 of FIG. 18A has an intensity of about 4,000, peak 776f in the spectra 774 of FIG. 18B has an intensity of about 1,000, and there is no substantial peak in the spectra 778 of FIG. 18C; and 3) at about the 685 nanometer wavelength region, peak 772g in the spectra 770 of FIG. 18A has an intensity of about 3,400, peak 776g in the spectra 774 of FIG. 18B has an intensity of about 2,200, and peak 780g in the spectra 778 of FIG. 18C has an intensity of about 700. These distinctions between the spectra 770, 774, and 778 show the progression of a plasma clean is evident in the spectral pattern of the plasma in the chamber 36 during the plasma clean.

More than one entry of a plasma cleaning may be required in the normal spectra subdirectory 288 depending upon a variety of factors. For instance, the spectral data of a plasma cleaning which is run after the chamber 36 has been running a first type of plasma recipe may look different than a plasma cleaning which is run after the chamber 36 has been running a second type of plasma recipe which is different from the first type of plasma recipe.

Figure 19A:
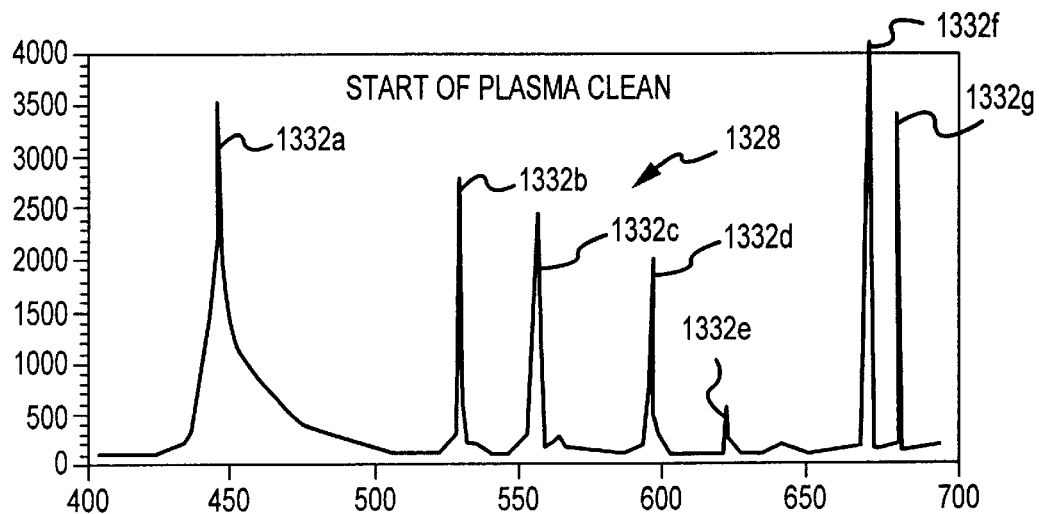
FIGS. 19A–C are exemplary spectra of another type of plasma process that may be run in any of the processing chambers of FIG. 1 and monitored by the current plasma process module, namely a plasma cleaning operation conducting after a wet clean of the chamber at the start, an intermediate time, and end of such a plasma conditioning operation, respectively.
Figure 19B:
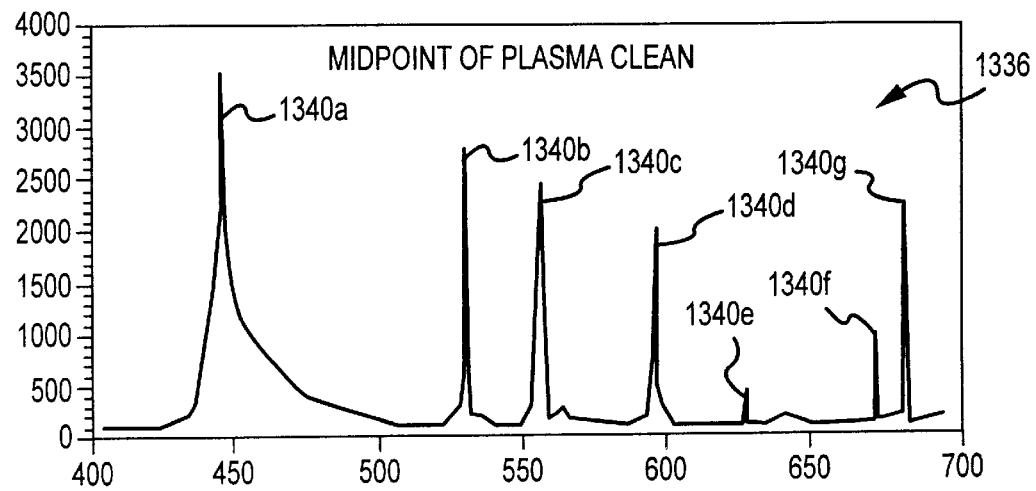
Figure 19C:
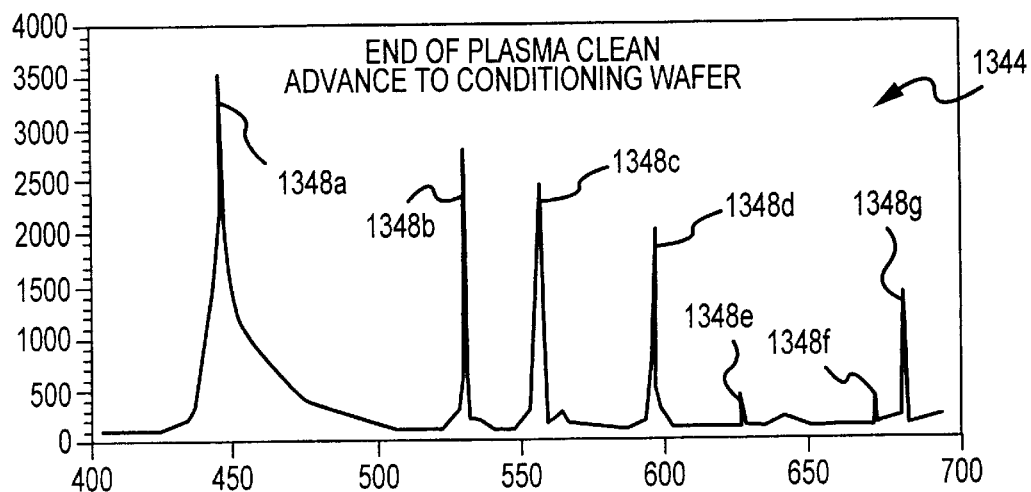

Exemplary Plasma Cleaning Operation Spectra Conducted After Wet Clean—FIGS. 19A–C Representative spectra of one plasma cleaning operation of the chamber 36 after it has been wet cleaned are illustrated in FIGS. 19A–C. FIG. 19A presents a spectra 1328 of the exemplary plasma in the processing chamber at the start of such a plasma cleaning of the chamber 36, while FIG. 19B presents a spectra 1336 of the exemplary plasma at an intermediate point in such a plasma cleaning of the chamber 36, and while FIG. 19C presents a spectra 1344 of the exemplary plasma at the end of such a plasma cleaning of the chamber 36. Each of the spectra 1328, 1336, and 1344 are characterized by a number of peaks 1332, 1340, and 1348, respectively, of varying intensities at various wavelengths. A comparison of the spectra 1328, 1336, and 1344 reveals that their respective patterns are different, including without limitation as follows: 1) at about the 625 nanometer wavelength region, peak 1332e in the spectra 1328 of FIG. 19A has an intensity of about 600, peak 1340e in the spectra 1336 of FIG. 19B has intensity of about 500, and peak 1348e in the spectra 1344 of FIG. 19C has an intensity of about 450; 2) at about the 668 nanometer wavelength region, peak 1332f in the spectra 1328 of FIG. 19A has an intensity in excess of 4,000, peak 1340f in the spectra 1336 of FIG. 50B has intensity of about 1,000, and peak 1348f in the spectra 1344 of FIG. 19C has an intensity of about 400; and 3) at about the 685 nanometer wavelength region, peak 1332g in the spectra 1328 of FIG. 19A has an intensity in excess of 3,400, peak 1340g in the spectra 1336 of FIG. 19B has intensity of about 2,300, and peak 1348g in the spectra 1344 of FIG. 19C has an intensity of about 1,400. These distinctions between the spectra 1328, 1336, and 1344 show that the progression of a plasma cleaning operation is evident in the spectral pattern of the plasma in the chamber 36 during the plasma clean.

More than one entry of a plasma clean may be required in the normal spectra subdirectory 288 depending upon a variety of factors. For instance, the spectral data of a plasma clean run on a chamber 36 after a wet clean may look different than a plasma clean that is run on a new chamber 36 which has not been wet cleaned. Moreover, the spectral data of a plasma clean which is run after the chamber 36 has been running a first type of plasma recipe may look different than a plasma clean which is run after the chamber 36 has been running a second type of plasma recipe which is different from the first type of plasma recipe.

Figure 20A:
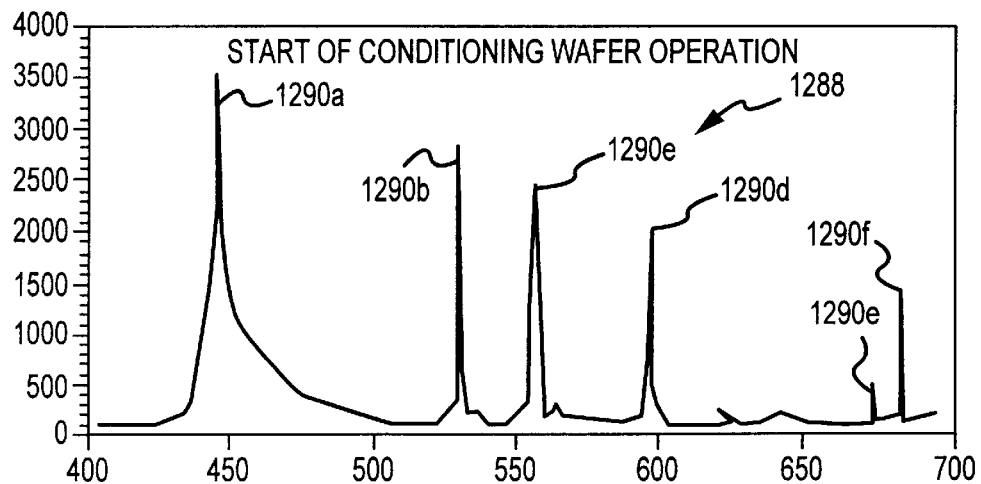
FIGS. 20A–C are exemplary spectra of another type of plasma process that may be run in any of the processing chambers of FIG. 1 and monitored by the current plasma process module, namely a conditioning wafer operation at the start, an intermediate time, and end of such a conditioning wafer operation, respectively.
Figure 20B:
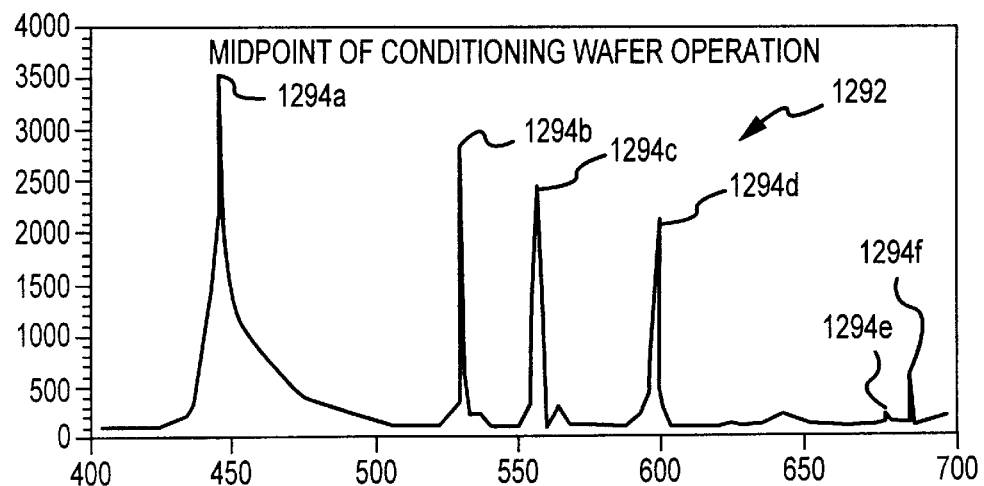
Figure 20C:
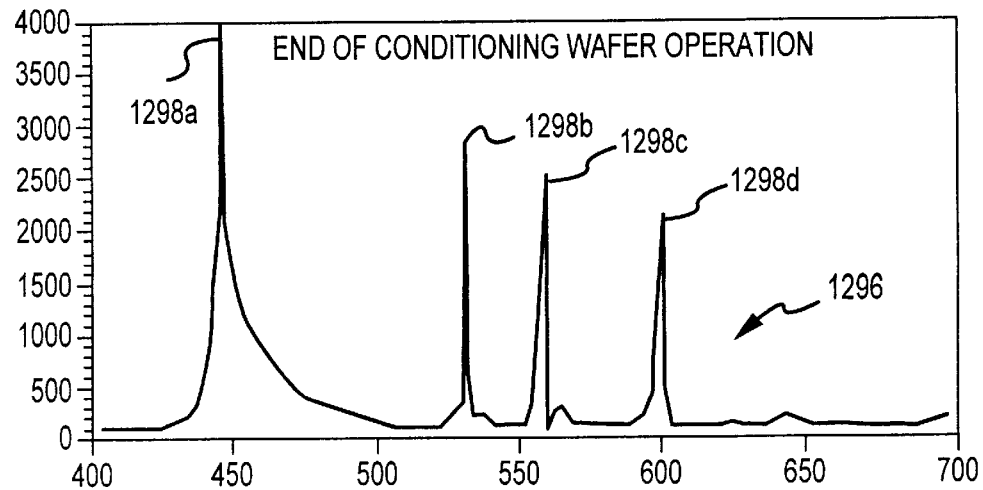

Exemplary Conditioning Wafer Operation Spectra—FIGS. 20A–C

Representative spectra of a conditioning wafer operation are illustrated in FIGS. 20A–C. FIG. 20A presents a spectra

1288 of an exemplary plasma in the processing chamber 36 at the start of a conditioning wafer operation, FIG. 20B presents a spectra 1292 of an exemplary plasma at an intermediate point in the conditioning wafer operation, and FIG. 20C presents a spectra 1296 of an exemplary plasma at the end of the conditioning wafer operation. Each of the spectra 1288, 1292 and 1296 are characterized by a number of peaks 1290, 1294, and 1298, respectively, of varying intensities at various wavelengths. A comparison of the spectra 1288, 1292, and 1296 reveals that there are certain differences in their respective patterns, including without limitation as follows: 1) at about the 440 nanometer wavelength region, peak 1290*a* in the spectra 1288 of FIG. 20A has an intensity of about 3,550, peak 1294*a* in the spectra 1292 of FIG. 20B has an intensity of about 3,750, and peak 1298*a* in the spectra 1296 of FIG. 20C has an intensity of about 4,000; 2) at about the 525 nanometer wavelength region, peak 1290*b* in the spectra 1288 of FIG. 20A has an intensity of about 2,800, peak 1294*b* in the spectra 1292 of FIG. 20B has an intensity of about 2,900, and peak 1298*b* in the spectra 1296 of FIG. 20C has an intensity of about 2,800; 3) at about the 595 nanometer wavelength region, peak 1290*d* in the spectra 1288 of FIG. 20A has an intensity of about 2,100, peak 1294*d* in the spectra 1292 of FIG. 20B has an intensity of about 2,150, and peak 1298*d* in the spectra 1296 of FIG. 20C has an intensity of about 2,125; 4) at about the 675 nanometer wavelength region, peak 1290*e* in the spectra 1288 of FIG. 20A has an intensity of about 600, peak 1294*e* in the spectra 1292 of FIG. 20B has an intensity of about 250, and there is no peak in the spectra 1296 of FIG. 20C; and 5) at about the 685 nanometer wavelength region, peak 1290*f* in the spectra 1288 of FIG. 20A has an intensity of about 1,450, peak 1294*f* in the spectra 1292 of FIG. 20B has an intensity of about 600, and there is no peak in the spectra 1296 of FIG. 20C. These distinctions between the spectra 1288, 1292, and 1296 show that the progression of a conditioning wafer operation is evident in the spectral pattern of the plasma in the chamber 36 during the operation.

More than one entry of a conditioning wafer operation may be required in the normal spectra subdirectory 288 depending upon a variety of factors. For instance, the spectral data of a conditioning wafer operation which is run after the chamber 36 has only been plasma cleaned may look different than the spectral data of a conditioning wafer operation which is run in the chamber 36 after it has been both plasma cleaned, wet cleaned, and then again plasma cleaned. Moreover, the spectral data of a conditioning wafer operation run after the chamber 36 has been running a first type of plasma recipe may look different than a conditioning wafer operation which is run after the chamber 36 has been running a second type of plasma recipe which is different from the first type of plasma recipe.

Plasma Health Module 252—FIGS. 21–25

The current plasma process module 250 of FIGS. 7 and 32 is available for monitoring the health of any plasma process which is conducted within the processing chamber 36 first through a comparison of at least a portion of its spectral data with at least a portion of the spectral data stored in the normal spectra subdirectory 288 (FIG. 9). Plasma recipes (whether run on production wafers 18 or qualification wafers 18), plasma cleans (with or without wet cleans), and conditioning wafer operations, as well as the health of any other plasma process, may each be evaluated through the plasma health module 252. How the plasma health module 252 deals with the presence of having different categories of plasma processes stored in the normal spectra subdirectory 288, as well as in the abnormal spectra subdirectory 292 and the unknown spectra subdirectory 296 which are also used in the plasma health evaluation of a current plasma process being run in the chamber 36, is really a matter of preference. Some ways of dealing with the existence of multiple categories of plasma processes may affect the speed of the evaluation by the plasma health module 252 more than others. For instance, the plasma health module 252 may limit its comparison of the current plasma process to the same category or genus of plasma processes stored in the normal spectra directory 288 and abnormal spectra directory 292. Appropriate "identifying information" may be input into the plasma process genus field 322*h* (FIG. 12A) associated with each plasma process stored in the normal spectra subdirectory 288 and the plasma process genus field 333*e* (FIG. 12B) associated with each plasma process (or portion thereof) stored in the abnormal spectra subdirectory 292. Moreover, the current plasma process to be conducted in the chamber 36 may be identified to the plasma health module 252 in some manner. This may be accomplished through the startup module 202 of FIG. 15 (e.g., through including appropriate process category or genus identifying information in steps 230, 234, 238, and 242 of the startup subroutine 203, which is passed onto step 236 of the subroutine 203, and which may be then passed on to the plasma health module 252). Reducing the number of entries in the normal spectra subdirectory 288 and abnormal spectra subdirectory 292 which are compared with the current plasma process may and typically will increase the speed of evaluation of the health of the current plasma process by the plasma health module 252. However, there may be advantages to not imposing a plasma process category or genus match criterion when selecting data from the normal spectra subdirectory 288 and/or abnormal spectra subdirectory 292 which is to be available for comparison with the current plasma process.

Plasma health is also preferably evaluated by comparing optical emissions from the current plasma process in the chamber 36 with the plasma spectra directory 284 over at least those wavelengths within the Preferred Optical Bandwidth based upon the Preferred Data Resolution, and using the Preferred Analytical Wavelength Resolution. However, in some cases some subset of the optical emissions data of the plasma in the chamber 36 may be used to monitor the plasma health. One such circumstance is when processing speed is or potentially is an issue. There are a number of ways of selecting the amount of optical emissions data to monitor the health of a plasma process. The data within the abnormal spectra subdirectory 292 of FIG. 9 may be used to generate the subset of data which may be reviewed for purposes of monitoring the plasma health. For instance, the plasma health evaluation may be conducted over optical emissions segments which include those wavelengths which are indicative of errors which occurred in processes previously conducted within the chamber 36. One alternative is to define an optical emissions segment ±25 nanometers on each side of each wavelength of a spectra in the abnormal spectra subdirectory 292 which is indicative of an error from a previous plasma process. For instance, if errors from previous runs are reflected at the 325, 425, and 575 wavelengths, the plasma health may be evaluated by looking at each of the 300–350, 400–450, and 550–600 nanometer region. A smaller optical emissions segment for monitoring plasma health may also be selected by defining a range which includes each of those wavelengths which are indicative of errors from the abnormal spectra subdirectory 292. For instance, if errors from previous runs are reflected at the 325, 425, and 575 wavelengths, the plasma health may be evaluated by looking at the wavelength region from about 325 nanometers to about 575 nanometers. It may be desirable to include a "buffer" on each of the endpoints of this range as well (e.g., extend by about 25 nanometers on each end of the range). The above may be further limited by limiting the plasma health evaluation to those optical emissions segments which include only errors from the same type of plasma process which is to be run in the chamber 36 (e.g., same plasma recipe). Finally, information on endpoint of the plasma process or discrete portion thereof may be used to define the wavelengths to be evaluated in relation to plasma health. As will be discussed in more detail below in relation to the endpoint detection module 1200 and FIG. 52, endpoint may be called based upon a change at one or more specific wavelengths. Plasma health may be evaluated by looking at a ±25 nanometer region around each wavelength which is used to call endpoint. Notwithstanding the foregoing, plasma health should be evaluated over at least a 50 nanometer wavelength in which data has been collected at the Preferred Data Resolution, and again is preferably undertaken using the Preferred Optical Bandwidth.

Figure 21:
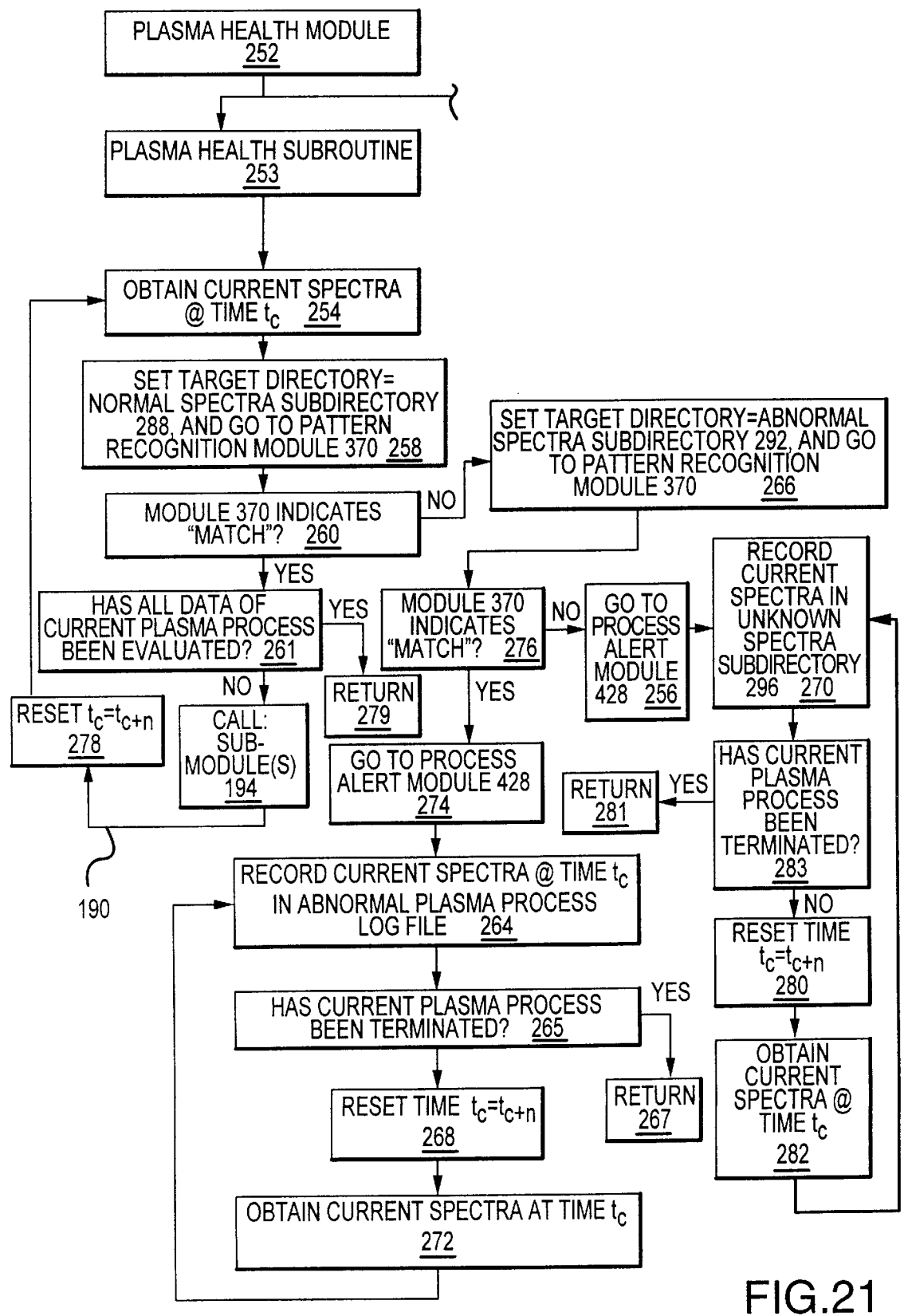
FIG. 21 is a flowchart of one embodiment of a plasma health subroutine which may be used by the plasma health module of FIGS. 7 and 32.

Plasma Health Subroutine 253—FIG. 21

One embodiment of a subroutine is illustrated in FIG. 21 which may be used by the plasma health module 252 to evaluate whether a current plasma process is proceeding in accordance with at least one plasma process stored in the normal spectra subdirectory 288 of FIG. 9 (e.g., indicative of a "healthy" plasma). Summarily, spectral data is taken during and more preferably throughout the entirety of the execution of the current plasma process which is being run within the processing chamber 36. Consideration should be given to the first part of a plasma process being somewhat unstable. Spectral data from the current plasma process is first compared against the normal spectra subdirectory 288 to determine if the current plasma process "matches" any plasma process stored within the normal spectra subdirectory 288. As long as the current plasma process "matches" at least one plasma process stored in the normal spectra subdirectory 288, the current plasma process is characterized as being "normal" or "healthy" and the plasma health subroutine 25:3 will continue to limit its search for "matching" spectra to the normal spectra subdirectory 288. However, oftentimes there is an error or aberration during a plasma process which may have some type of adverse effect on the desired end result of the plasma process, and this should be identifiable from the spectra of the plasma in the chamber 36.

During an error or aberration in a plasma process currently being run, the spectra of the plasma in the chamber 36 should no longer "match" any plasma process stored in the normal spectra subdirectory 288. The plasma health subroutine 253 will then discontinue its search of the normal spectra subdirectory 288 for evaluating the current plasma process and start comparing the current plasma process with the abnormal spectra subdirectory 292 of FIG. 9. Errors or aberrations in plasma processes which have been encountered before by the plasma health subroutine 253 on this same chamber 36, and which have had their corresponding cause or causes identified, are recorded in the abnormal spectra subdirectory 292. Actions which may be initiated if spectral data of the current plasma process "matches" at least one spectra in the abnormal spectra subdirectory 292 range from issuing an appropriate alert to addressing one or more process control features of the wafer production system 2 as discussed above in relation to the process alert subroutine 432 of FIG. 14.

All of the data in the normal spectra subdirectory 288 and the abnormal spectra subdirectory 292 is obtained from the processing chamber 36 on which the plasma health module 252 is being used to evaluate any plasma process currently being run or which was run in this very same chamber 36. Building of the library of information for the normal spectra subdirectory 288 and abnormal spectra subdirectory 292 takes time to allow the plasma health subroutine 253 to "learn" from the chamber 36 and the plasma processes being run therein. Circumstances will therefore likely arise where the spectral data of the plasma from the current plasma process cannot be found in either the normal spectra subdirectory 288 or the abnormal spectra subdirectory 296 by the plasma health subroutine 253. Information of this type is stored for the subroutine 253 in the unknown spectra subdirectory 296 of FIG. 9. It will likely remain an "unknown condition" until the spectral data can be properly analyzed and the "cause" identified, at which time the relevant spectral data may be transferred to either the normal spectra subdirectory 288 or the abnormal spectra subdirectory 292 to upgrade the plasma health subroutine's 253 knowledge of the processing chamber 36 and its associated plasma processes.

Specifics of the plasma health subroutine 253 will now be addressed in the case where the plasma process is a plasma recipe being run on wafers 18 in the chamber 36. An exemplary general procedure for running a plasma recipe on wafers 18 is as follows. First, a cassette 6 having a plurality of production wafers 18 therein, as well as possibly one or more qualification wafers, is transferred into one of the load lock chambers 28 (FIG. 1). The wafer handling assembly 44 will retrieve one of the wafers 18 from the cassette 6 and transport the same into the processing chamber 36. At this time, the plasma in the chamber 36 is off. The chamber 36 is sealed and the plasma is ignited to run a plasma recipe on the wafer 18. Typical practice is to run the same plasma recipe on the entire cassette 6. After the completion of the plasma recipe on the first wafer 18, the plasma is turned off, the chamber 36 is opened, and the wafer handling assembly 44 retrieves the wafer 18 from the chamber 36 and provides the same back to its corresponding slot in the cassette 6. Once all of the wafers 18 of the cassette 6 have been processed in this manner (usually 1–3 qualification wafers are used for a cassette 6 having 24 wafers 18 and may be included anywhere within the cassette 6), the cassette 6 may be removed from the load lock chamber 28 and replaced with another cassette 6 of wafers 18. The qualification wafers 18 from the plasma processed cassette 6 may then be tested (destructively or non-destructively), while semiconductor devices may be formed from the production wafers 18.

Plasma processes, whether are run on qualification or production wafers 18, in the processing chamber 36 are evaluated by the plasma health module 252. Usually no more than a 1 minute time lapse exists between the time one production wafer 18 is removed from the processing chamber 36 and the time the plasma recipe is initiated on the next production wafer 18 which is loaded into the chamber 36. The plasma health module 252 is able to complete its evaluation of a plasma recipe which was run on a production wafer 18 before the plasma recipe is initiated on the next production wafer 18 since the plasma health module 252 effectively relies on pure pattern recognition techniques, and not chemical analysis or chemical species identification techniques. Moreover and as will be discussed in more detail below, the plasma health module 252 is able to not only determine the identify of the plasma process, but to determine that the plasma process is being run on a qualification wafer 18 versus a production wafer 18.

Data which relates to the current plasma process being run on product in the processing chamber 36 at the current time $t_c$ is obtained for evaluation by the plasma health subroutine 253 of FIG. 21 through execution of step 254. Although step 254 is referenced in FIG. 21 in relation to merely a "spectra" or optical emissions data, as noted above, other types of data may be taken at/associated with this time as well (e.g., the time into the plasma recipe at which the associated spectra was obtained from the chamber 36). A comparison is then made at step 258 of the plasma health subroutine 253 between the spectra of the current plasma process obtained at step 254 (current plasma process) and the relevant spectra from the normal spectra subdirectory 288 (stored plasma process). For facilitating the initial understanding of how the health of a plasma process may be evaluated by the process health module 252, the normal spectra directory 288 will hereafter be described as having only a single plasma process stored therein ("Recipe A"). How the health of a current plasma process may be handled by the plasma health module 252 in the situation where multiple plasma processes are stored in the normal spectra subdirectory 288 is addressed in the discussion of the plasma health/process recognition subroutines 790, 852, and 924 presented below in relation to FIGS. 22–24.

Step 258 of the plasma health subroutine 253 calls the pattern recognition module 370 of FIG. 13 to undertake a comparative analysis between the spectra of the plasma in the chamber 36 at the current time $t_c$ and the relevant spectra of Recipe A from the normal spectra subdirectory 288. This is affected by step 258 of the subroutine 253 setting the Target Directory used by the pattern recognition module 370 to the normal spectra subdirectory 288. Only the normal spectra subdirectory 288 is then searched by the pattern recognition module 370 at this time, through execution of step 258 of the plasma health subroutine 253, to determine if there is a "match" between the current spectra at the current time $t_c$ and Recipe A as stored in the normal spectra subdirectory 288. Which spectra of Recipe A is actually compared with the current spectra in this instance is addressed below after the discussion of the loop 190 of the subroutine 253 is completed.

The pattern recognition module 370 of FIG. 13 returns control of the plasma monitoring operation back to the plasma health subroutine 253 of FIG. 21 after the pattern recognition module 370 has determined whether there is a "match" between the spectra at the current time $t_c$ (from step 254 of the plasma health subroutine 253) and the relevant spectra of Recipe A from the normal spectra subdirectory 288 in the subject example. The result ("match" or "no match") of the analysis by the pattern recognition module 370 is actually provided to step 260 of the plasma health subroutine 253 of FIG. 21. If the current spectra at the current time $t_c$ was a "match" with the relevant spectra of Recipe A, the evaluation by the plasma health subroutine 253 will continue in relation to the normal subdirectory 288. In this regard, the plasma health subroutine 253 inquires at step 261 as to whether the current plasma process being conducted in the processing chamber 36 has been terminated, or more accurately if there are any more spectra from the subject current plasma process being run in the chamber 36 to be evaluated by the subroutine 253. Other information on the subject current plasma process may be provided through execution of step 194 of the plasma health subroutine 253 which calls other sub-modules of the current plasma process module 250 as will be discussed in more detail below (e.g., to access a chamber condition evaluation function, to access an endpoint determination function).

Additional optical emissions data on the current plasma process for evaluation by the plasma health subroutine 253 is made available through execution of step 278. At step 278 the "clock" of the subroutine 253 is effectively reset. Step 278 of the subroutine 253 more specifically provides for adjustment of the "clock" by a predetermined increment "n" to thereby increase the current time $t_c$ by an increment of "n." The magnitude of "n" defines that portion of the collected data which will be analyzed. All of the data may be analyzed, or only a portion thereof (e.g., only every other "piece" of optical emissions data may actually be analyzed). Hereafter, this concept will be referred to as the Analytical Time Resolution. In one embodiment, the Analytical Time Resolution in relation to plasma health is at least at every 1 second, and more preferably at least at every 300 milliseconds. The plasma health subroutine 253 then returns to step 254 where the next spectra of the plasma in the processing chamber 36 from the execution of the current plasma process is obtained for the subroutine 253 at the new current time $t_c$ such that the same may be evaluated in accordance with the foregoing.

There are a number of ways to define what is the "relevant spectra" of a plasma process stored in the normal spectra subdirectory 288 for comparison with the current spectra of the plasma in the chamber 36 at the current time $t_c$ through the plasma health subroutine 253. Relevance may be time dependent and will hereafter be referred to as a "time dependency requirement." In the subject example where the only plasma process stored in the normal spectra subdirectory 288 is Recipe A, the relevant spectra of Recipe A to be compared with the spectra of the plasma in the chamber 36 at the current time $t_c$ would be limited to that spectra for Recipe A which is associated with this same current time $t_c$ if a time dependency requirement was used. That is, the spectra of the plasma in the chamber 36 during the current plasma process at time $t_1$ would be compared with Recipe A's spectra which is associated with the same time $t_1$ through execution of step 258 of the plasma health subroutine 253, the spectra of the plasma in the chamber 36 during the current plasma process at time $t_2$ would be compared with the Recipe A's spectra which is associated with the same time $t_2$ through execution of step 258 of the subroutine 253, and so forth. This time dependency requirement for determining what is the "relevant spectra" may be used regardless of which subdirectory of the plasma spectra directory 284 is being "searched" by the pattern recognition module 370.

In theory, a time dependency requirement is an acceptable way to evaluate whether a current plasma process is proceeding in accordance with any one or more plasma processes stored in the normal spectra subdirectory 288. From a practical standpoint this is not necessarily the case. Variations throughout the wafers 18 in a given wafer cassette 6 on which the same plasma recipe is typically run may affect the amount of time required to complete one or more of the plasma steps of the current plasma recipe being run in the chamber 36. For instance, the thickness of a certain layer to be etched away by a certain step of the plasma recipe may vary from wafer 18 to wafer 18 within an acceptable tolerance. Conditions within the chamber 36 may also have an effect on the amount of time required to reach the endpoint of one or more plasma steps of a given plasma recipe or any other plasma process for that matter. For instance, as the interior of the chamber 36 ages by the formation of deposits within the interior, by the etching away of materials from the interior, or both, the performance of the chamber 36 may change. Changing the performance of the chamber 36 may change the amount of time required to reach the endpoint of one or more steps of a given plasma recipe. Other factors may affect timing issues associated with other types of plasma processes run in the chamber 36. Failing to account for these types of factors will result ir the plasma health subroutine 253 issuing false alarms, or more specifically an indication that a current plasma process does not conform with at least one plasma process stored in the normal spectra subdirectory 288 when such is not the case.

Alternatives to the time dependency requirements exist for determining what is the "relevant spectra" of a given plasma process stored in the normal spectra subdirectory 288 for comparison with the spectra of the plasma in the chamber 36 at the current time $t_c$ from the current plasma process. "Relevant" in the context of the plasma health subroutine 253, and in fact for each sub-module of the current plasma process module 250, may simply be whether the current plasma process being run in the chamber 36 is progressing in a manner consistent with at least one of the plasma processes stored in the normal spectra subdirectory 288, although not necessarily at the same speed and therefore not being time dependent. Hereafter this will be referred to as a "progression dependency requirement" and is exemplified by the following. The first spectra obtained for the plasma health subroutine 253 at the current time $t_1$ is compared with one or more spectra of Recipe A in the normal spectra subdirectory 288 in the subject example. The spectra of Recipe A which matched the spectra of the plasma in the chamber 36 at the current time $t_1$, and which has the earliest time associated therewith, is identified as the current status spectra of Recipe A. This accounts for the possible, although likely improbable, situation where a spectra at time $t_1$ in a given plasma process is substantially the same as a spectra at, for instance, time $t_{100}$ in this same plasma process. The next spectra obtained for the plasma health subroutine 253, or the spectra at time $t_2$ in the example, is first compared with this same current status spectra of Recipe A in the normal spectra subdirectory 288. If the current spectra at the current time $t_2$ still matches this current status spectra of Recipe A, the current status spectra of Recipe A remains unchanged. However, if the spectra of the plasma in the chamber :36 from the current plasma recipe being run on product in the chamber 36 at the current time $t_2$ does not match the current status spectra of Recipe A, the pattern recognition module 370 will look to see if this current spectra matches the spectra of Recipe A which follows (in time) the current status spectra in Recipe A. A "match" between the current spectra of the plasma in the processing chamber 36 at the current time $t_c$ and the spectra of Recipe A which follows the current status spectra means that the current plasma process is progressing accordingly, and this later in time "matching spectra" in Recipe A is now the current status spectra of Recipe A. The foregoing logic will continue to repeated so long as the current plasma process is progressing in accordance with Recipe A of the normal spectra subdirectory 288. This progression dependency requirement may be used regardless of which subdirectory of the plasma spectra directory 284 is being searched by the pattern recognition module 370. Moreover, the logic may be that the current spectra is first checked against the next spectra following (in time) the current status spectra, and then back against the current status spectra only if there is not match for purposes of determining if the process is progressing (e.g., assume progression at the same rate and only look back if necessary).

The loop 190 defined by steps 254, 258, 260, 261, and 278 of the plasma health subroutine 253 will continue to be re-executed until one of two events occurs. One event which will cause the plasma health subroutine 253 to exit the loop 190 is when all of the spectral data on the current plasma process has been evaluated by the subroutine 253 in accordance with the foregoing. That is, the entirety of the current plasma process run in the processing chamber 36 proceeded in accordance with at least one of the plasma processes recorded in the normal spectra subdirectory 288 ("at least one" referring to the fact that more than one entry of a given plasma process may be included in the normal spectra subdirectory 288), or in the subject example Recipe A. Control of the plasma monitoring operations is then transferred from the plasma health subroutine 253 back to, for instance, the startup module 202 of FIG. 15 through execution of step 279 of the plasma health subroutine 253. It should be noted that the results of "normal" runs may be recorded in a "normal run" log file. Data such as that presented in FIG. 12A may be included in this "normal run" log file and will provide a historical record of the subject plasma process. If data storage space is an issue, the spectral data may be omitted from the historical record although it is desirable to retain this data. Moreover, this historical data need not be stored for access by the current plasma process module 250. For instance, the historical data may be stored on a network associated with the wafer production system 2 or any other data storage area.

The plasma health subroutine 253 may also exit the loop 100 (the evaluation of the current spectra at the current time $t_c$ in relation to the normal spectra subdirectory 288 of FIG. 9) when this current spectra is no longer a "match" with any plasma process stored in the normal spectra subdirectory 288. This would be the case when at some point in time the current plasma recipe being run on product within *he processing chamber 36 was not a "match" with Recipe A of the normal spectra subdirectory 288 in the subject example. The results of the pattern recognition module 370 of FIG. 13 provided back to step 260 of the plasma health subroutine 253 in this case would cause the subroutine 253 to proceed from step 260 to step 266.

Step 266 of the plasma health subroutine 253 calls the pattern recognition module 370 of FIG. 13 to undertake a comparative analysis between the spectra of the plasma in the chamber 36 at the current time $t_c$ and the relevant spectra of the abnormal spectra subdirectory 292. This is accomplished by step 266 of the subroutine 253 setting the Target Directory used by the pattern recognition module 370 to the abnormal spectra subdirectory 292. Only the abnormal spectra subdirectory 292 is then searched by the pattern recognition module 370 through execution of step 266 to determine if there is a "match" between the current spectra of the plasma in the chamber 36 at the current time $t_c$ and the relevant spectra stored in the abnormal spectra subdirectory 292.

A number of options exist in relation to which spectra of the abnormal spectra subdirectory 292 of FIG. 9 are actually compared with the current spectra of the plasma in the processing chamber 36 at the current time $t_c$ using the above-described analysis provided by the pattern recognition module 370. Each spectra stored within the abnormal spectra subdirectory 292 may and preferably does have a time associated therewith, which is the time into the plasma process in which the spectra was obtained from within the chamber 36 (i.e., its corresponding $t_c$). The search of the abnormal spectra subdirectory 292 for "matches" by the pattern recognition module 370 may be limited to those spectra which were recorded at the same current time $t_c$ or within a predetermined amount of time on each side of the subject current time $t_c$ (e.g., ±"x" seconds of the subject current time $t_c$). For example, if the current spectra was obtained 20 seconds into a plasma process being run in the processing chamber 36, the point-by-point analysis embodied by step 386 of the pattern recognition subroutine 374 of FIG. 13 may be performed in relation to only those spectra within the abnormal spectra subdirectory 292 which were also recorded at the same 20 second time period or within ±10 seconds (or any other desired amount) of this time period.

Another subset of the abnormal spectra subdirectory 292 which may be used as a refining search criteria is the plasma process category/genus, or even the plasma process type or species within a plasma process category/genus having multiple types/species of plasma processes (e.g., a specific type of plasma recipe). That is, only those spectra in the abnormal spectra subdirectory 292 which are associated with a plasma process which is at least possibly the same as that currently being run on product within the processing chamber 36 will be analyzed by the pattern recognition module 370 using a plasma process criterion. "Potential" matching processes is used in this situation because at the time of the error in the current plasma process, the plasma health module 252 may not have narrowed down the identification of the current plasma process to a single plasma process within the normal spectra subdirectory 288. How the plasma health module 252 may identify a current plasma process being run on product in the processing chamber 36 is addressed below in relation to the plasma health/process recognition subroutines 790, 852, and 924 of FIGS. 22–24.

The plasma step of a plasma process may also be used as a refining search criterion for which spectra of the abnormal spectra subdirectory 292 are analyzed by the pattern recognition module 370. That is, only those spectra in the abnormal spectra subdirectory 292 which are associated with a plasma step of a multiple step plasma process which is still possibly a match with a current plasma step being run within the processing chamber 36 will be analyzed by the pattern recognition module 370 in this case. "Potential" is used in relation to matching plasma steps of plasma processes in this situation because at the time of the error in the current plasma process, the plasma health module 252 may not have narrowed down the identification of the current plasma step and process to a single plasma step of a single plasma process within the normal spectra subdirectory 288. How the plasma health module 252 may identify a current plasma step of a current plasma process being run in the processing chamber 36 is through the plasma health/process step recognition subroutine 972 which will be discussed below in relation to FIG. 25.

Any combination of the foregoing may be used as initial search criteria to initially refine the search of the abnormal spectra subdirectory 292. Finally, no refining search criteria need be used. That is, the search of the abnormal spectra subdirectory 292 for "matches" may compare the current spectra at the current time $t_c$ with each spectra within the abnormal spectra subdirectory 292, thereby removing both the time element and plasma process category/plasma process type within a given plasma process category/plasma step element as required "initial match" criteria.

The pattern recognition module 370 returns control of the plasma monitoring operation back to the plasma health subroutine 253 of FIG. 21 after the pattern recognition module 370 has determined whether there is a "match" between the spectra of the plasma in the chamber 36 at the current time $t_c$ (from step 254 of the plasma health subroutine 253) and the relevant spectra from the abnormal spectra subdirectory 292. The result ("match" or "no match") of the analysis by the pattern recognition module 370 is provided to step 276 of the plasma health subroutine 253 of FIG. 21. If the current spectra of the plasma in the processing chamber 36 at the current time $t_c$ was a "match" with at least one spectra in the abnormal spectra subdirectory 292, the plasma health subroutine 253 effectively takes two actions and these actions may be undertaken in any order, including simultaneously. One of these actions is that the plasma health subroutine 253 will proceed to step 274 which calls the process alert module 428 which was discussed above in relation to FIG. 14. Generally, alerts may be issued as to the identification of the abnormal condition, control of the wafer production system 2 may be addressed, or both through the process alert module 428. Another action which is taken by the plasma health subroutine 253 in this type of case is to record data of the remainder of the plasma process in an "abnormal run" log file for historical purposes.

At a minimum, spectral data is recorded in an "abnormal run" log file through execution of step 264 for the current time $t_c$ (the first spectra which did not "match" any relevant plasma process stored in the subdirectory 288, but which did "match" at least one entry in the abnormal spectra subdirectory 292). Proceeding from step 264 to step 265 of the plasma health subroutine 253 of FIG. 21, a determination is made as to the status of the current plasma process. Any termination of the plasma process, or more accurately recordation of data on the remainder of the process, will cause the subroutine 253 to proceed to step 267 where control of the plasma monitoring operations may be returned to, for instance, the startup module 202 of FIG. 15. Continuation of the plasma process after the error is identified will cause the subroutine 253 to proceed from step 265 to step 268 where the current time $t_c$ is increased by a factor of "n" such that another spectra of the plasma in the chamber 36 can be obtained for the subroutine 253 at this new current time $t_c$ through step 272 for recordation in the "abnormal run" log file. The magnitude of "n" may be the Preferred Analytical Time Resolution. Steps 264, 265, 268, and 272 will continue to be repeated in the described manner to continue to record data in the "abnormal run" log file until the current plasma process is terminated, at which time the subroutine 253 will exit at step 267 as described.

Circumstances will be encountered where the current spectra of the plasma in the processing chamber 36 at the current time $t_c$ will not "match" any plasma process stored in the normal spectra subdirectory 288, and further where this current spectra will not "match" any relevant spectra stored in the abnormal spectra subdirectory 292. This is referred to herein as an "unknown condition." The plasma health subroutine 253 of FIG. 21 handles this type of situation by exiting step 276 to where the subroutine 253 effectively takes two actions, and these actions may be undertaken in any order and including simultaneously. One of these actions is that the plasma health subroutine 253 will execute step 256 which calls the process alert module 428 discussed above in relation to FIG. 14. Generally, alerts may be issued as to the existence of the unknown condition, control of the wafer production system 2 may be addressed, or both through the process alert module 428. Another "action" which is taken by the plasma health subroutine 253 in this type of case is to record data of the remainder of the plasma process in the unknown spectra subdirectory 296.

At a minimum, spectral data is recorded in the unknown spectra subdirectory 296 through execution of step 270 for the current time $t_c$ (the first spectra which did not "match" any relevant plasma process stored in the normal spectra subdirectory 288, and which also did not "match" any relevant entry in the abnormal spectra subdirectory 292). Proceeding from step 270 to step 283 of the plasma health subroutine 253, a determination is made if the current plasma process has been terminated (e.g., is the plasma "off" in the chamber 36). Any termination of the plasma process will cause the subroutine 253 to proceed to step 281 where control of the plasma monitoring operations may be returned to, for instance, the startup module 202 of FIG. 15. Continuation of the plasma process after the unknown condition is encountered will cause the subroutine 253 to proceed from step 283 to step 280 where the current time $t_c$ is increased by a factor of "n" (e.g., Preferred Data Collection Time Resolution) such that another spectra of the plasma in the chamber 36 can be obtained for the subroutine 253 at this new current time $t_c$ through step 282 for recordation in the unknown spectra subdirectory 296. Steps 270, 283, 280, and 282 will continue to be repeated in the described manner until the current plasma process is terminated or until data on the remainder of the process has been recorded in the subdirectory 296, at which time the subroutine 253 will exit at step 281 as described.

Plasma process runs which are recorded in the unknown spectra subdirectory 296 are typically subsequently analayzed to attempt to identify the cause of the unknown condition as noted above. If the unknown condition actually turns out to be a new plasma process, the data recorded in the unknown spectra subdirectory 296 may be transferred to the normal spectra subdirectory 288. New spectral patterns from this new plasma process will then be available to assess further runnings of plasma processes on this same processing chamber 36. If the unknown condition turns out to be an error with an associated cause, some or all of the data from the subject run recorded in the unknown spectra subdirectory 296 may be transferred to the abnormal spectra subdirectory 292. At least one new spectral pattern which is representative of the newly identified error condition will then be available to assess further runnings of plasma processes on this same processing chamber 36 through the plasma health module 252.

Figure 22:
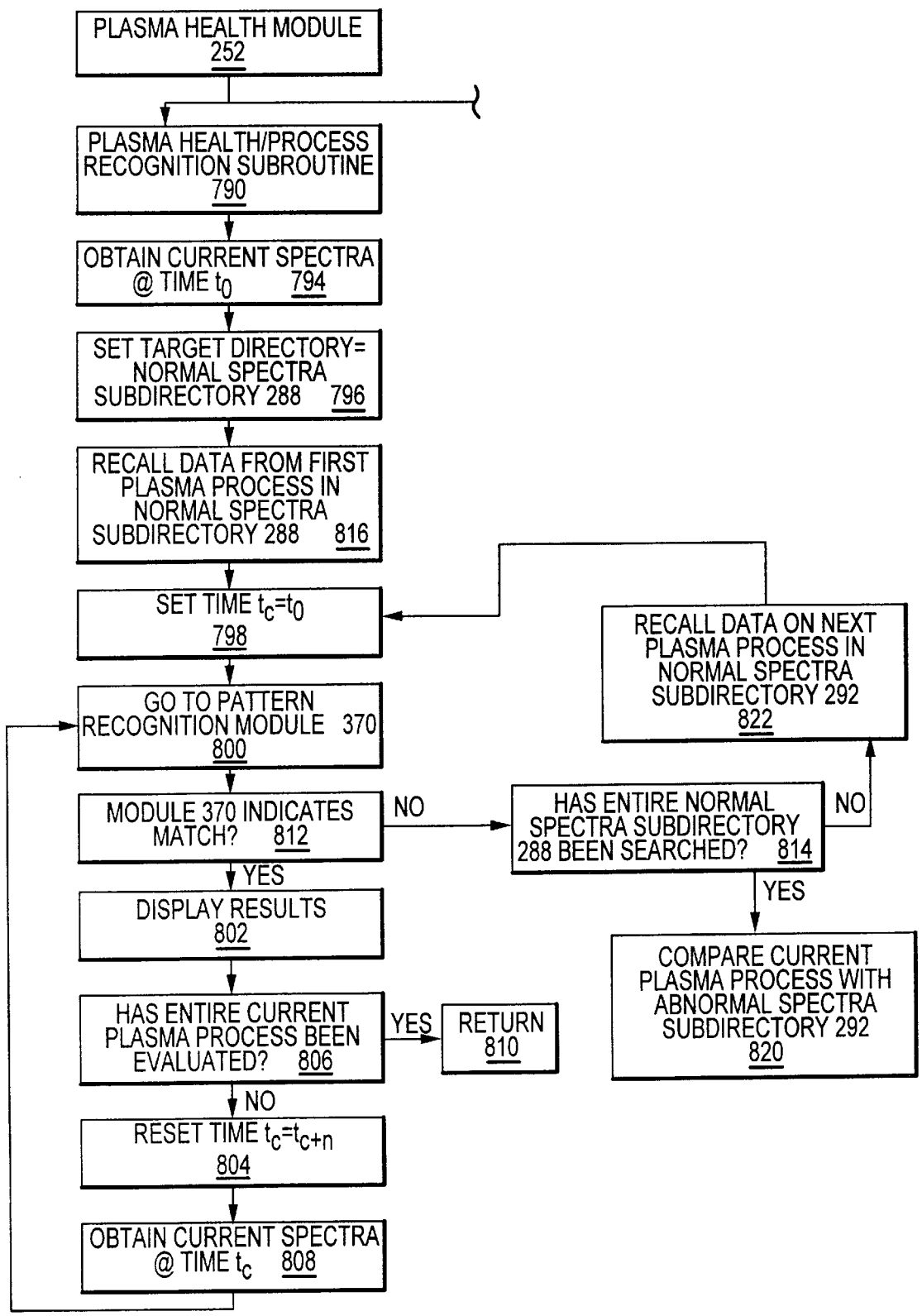
FIG. 22 is a flowchart of another embodiment of a plasma health subroutine which may be used by the plasma health module of FIGS. 7 and 32.

Plasma Health/Process Recognition Subroutine 790—FIG. 22

Another embodiment of a subroutine which may be used by the plasma health module 252 is presented in FIG. 22. Not only is the health or condition of the plasma assessed by the subroutine 790 in FIG. 22, but the particular plasma process which is being run in the chamber 36 is also identified. That is, the subroutine 790 is able to determine the identify of the plasma process (e.g., to distinguish between different types of plasma recipes, to distinguish between the same plasma recipe run on a production wafer 18 and a qualification wafer 18, etc). Consequently, the subroutine 790 is characterized as a plasma health/process recognition subroutine 790. The plasma health/process recognition subroutine 790 also presents one way in which a current plasma process being run in the subject chamber 36 may be evaluated against multiple plasma processes stored in the normal spectra subdirectory 288 of FIG. 9. These very same principles may be implemented in the plasma health subroutine 253 of FIG. 21.

A number of prerequisites are addressed before the plasma health/process recognition subroutine 790 actually initiates its analysis of the current plasma process being run in the processing chamber 36. The order in which these steps are executed is not important to the present invention. Initialization of the plasma health/process recognition subroutine 790 includes setting the Target Directory associated with the pattern recognition module 370 of FIG. 13 to the normal spectra directory 288 of FIG. 9 at step 796 of the subroutine 790. Generally, the pattern recognition module 370 is used by the subroutine 790 to compare the pattern of a "run spectra" (i.e., a spectra of the plasma from the processing chamber 36 during a plasma process being run in the processing chamber 36) with the relevant spectra of the plasma processes stored in the normal spectra subdirectory 288.

Preparation for the analysis of the current plasma process being run in the chamber 36 by the plasma health/process recognition subroutine 790 also requires execution of step 816 which "calls up" or "flags" the first plasma process in the normal spectra subdirectory 288 which is to be compared with the current plasma process by the subroutine 790. The logic of the subroutine 790 is to compare the current plasma process being run in the processing chamber 36 with only one plasma process stored in the normal spectra subdirectory 288 at a time. That is, the subroutine 790 will first compare the current plasma process with Process A in the normal spectra subdirectory 288. If the current plasma process deviates from Process A, then the subroutine 790 will compare the entirety of the subject current plasma process with Process B in the normal spectra subdirectory 288,. Only if the current plasma process deviates from Process B will other plasma processes stored in the normal spectra subdirectory 288 be compared one at a time with the current plasma process by the plasma health/process recognition subroutine 790. As in the case of the plasma health subroutine 253 discussed above in relation to FIG. 21, the plasma health/process recognition subroutine 790 may be configured to make all plasma processes stored in the normal spectra subdirectory 292 available for comparison with the current plasma process, or the above-noted refining criterion/criteria may be used.

The first spectra of the plasma in the processing chamber 36 obtained for the plasma health/process recognition subroutine 790 is through execution of step 794 and which is also part of the initialization of the subroutine 790. This spectra is associated with the time $t_0$ (hereafter "start time $t_0$"), and is stored along with each spectra obtained for the subroutine 790 until its analysis is completed. Any failure to retain the spectra of the current plasma process would not allow the subroutine 790 to use its "one process at a time" comparative logic.

Assume that the first plasma process stored in the normal spectra subdirectory 292 to be compared with the current plasma process being run in the chamber 36 is Process A. The first step of the subroutine 790 which is repeated for each plasma process evaluated by the subroutine 790 is step 798 where a current time $t_c$ variable is introduced, and further where this current time $t_c$ is set equal to the starting time $t_0$. Comparison of the current plasma process being run in the processing chamber 36 with the data from step 816 is undertaken at step 800 where the plasma health/process recognition subroutine 790 is directed to proceed to the pattern recognition module 370 of FIG. 13. An analysis of the spectra of the plasma from the processing chamber 36 at the current time $t_c$ is undertaken at step 800 to determine if the pattern of this current spectra is a "match" with the relevant spectra of Process A of the normal spectra subdirectory 288. As discussed above in relation to FIG. 13, the "match determination" is effectively a comparison of the patterns of the two noted spectra to determine if the pattern of the current spectra is sufficiently similar to the pattern of the relevant spectra of Process A from the normal spectra subdirectory 288 to be considered a "match" therewith. "Relevance" in terms of which spectra of a given plasma process from the normal spectra subdirectory 288 is compared with the spectra of the plasma in the chamber 36 at the current time $t_c$ by the subroutine 790 may be determined in accordance with either the time dependency requirement or the progression dependency requirement discussed above in relation to the plasma health subroutine 253 of FIG. 21.

The results of the analysis from step 800 are evaluated at step 812 of the plasma health/process recognition subroutine 790. If the spectra of the plasma in the processing chamber 36 associated with the current plasma process at the current time $t_c$ is a "match" with the relevant spectra of Process A in the normal spectra subdirectory 288, the subroutine 790 proceeds to step 802 where the results are displayed. For instance, an indication may be provided to operations personnel on the display 130 (FIG. 6), or by any of the other methods described above, that the plasma health/process recognition subroutine 790 has determined that the current plasma process being run in the processing chamber 36 corresponds, through the current time $t_c$, with Process A. It may be inaccurate and therefore inadvisable at this point in time to indicate that the plasma process currently being run in the processing chamber 36 is definitively Process A. Specifically, the comparison o0 the current plasma process with the normal spectra subdirectory 288 up to this time has been limited to Process A. The spectra of the plasma in the chamber 36 up through the current time $t_c$ could in fact also "match" the relevant spectra of one or more other plasma processes stored in the normal spectra subdirectory 288. However, this has not yet been determined as the logic employed by the plasma health/process recognition subroutine 790 is to evaluate the current plasma process being run in the processing chamber 36 against only a single plasma process in the normal spectra subdirectory 288 at a time. Therefore, at this time all that should be said is that the current plasma process is potentially Process A.

The status of the evaluation of the current plasma process is checked at step 806 of the plasma health/process recognition subroutine 790. Execution of step 806 determines if all of the data from the current plasma process has been evaluated by the subroutine 790 (e.g., has all the data obtained up until the plasma goes "off" been evaluated). Any continuation of the current plasma process or a failure to have examined all of its optical emissions data will cause the plasma health/process recognition subroutine 790 to proceed to step 804 which causes the current time $t_c$ to be adjusted by an increment of "n." The magnitude of "n" defines the Analytical Time Resolution, and preferably the Preferred Analytical Time Resolution is implemented. For instance, if the start time $t_0$ was set at one second (where the initial spectra reading was obtained for the subroutine 790 at step 794) and the variable "n" was set at two seconds, the current time $t_c$ upon exiting step 804 would be 3 seconds. The spectra at this new current time $t_c$ from the processing chamber 36 is then obtained for the subroutine 790 at step 808, and the subroutine 790 returns to step 800 where the pattern of this new spectra is compared with the pattern of the relevant spectra of Recipe A to determine if they "match" in accordance with the foregoing.

Steps 800, 812, 802, 806, 804, and 808 define a loop 818 which continues to be executed to compare the current plasma process being run in the processing chamber 36 wits one of the plasma processes stored in the normal spectra subdirectory 288 (Process A in the subject example) until one of two conditions exists. One of these conditions is where the current plasma process has been completed and "matched" an entire plasma process stored in the normal spectra subdirectory 288. In this case, the subroutine will exit from step 806 to step 810. Control of the plasma monitoring operations may be returned by step 810 to, for instance, the startup module 202 of FIG. 15.

Another condition where the subroutine 790 will exit the loop 818 is when the spectra of the plasma in the processing chamber 36 at the then current time $t_c$ does not "match" with the relevant spectra of the plasma process stored in the normal spectra subdirectory 288 currently being used by the plasma health/process recognition subroutine 790 (Process A in the subject example). In this case, the subroutine 790 will exit from step 812 to step 814. Step 814 basically inquires as to whether each plasma process stored in the normal spectra subdirectory 288 has been compared with the current plasma process by the subroutine 790 through the loop 818. If at least one plasma process stored in the normal spectra subdirectory 288 has not yet been used as a comparative standard for the current plasma process after the subroutine 790 has exited the loop 818, the plasma health/process recognition subroutine 790 will proceed from step 814 to step 822 where data on the next plasma process stored in the normal spectra subdirectory 288 is recalled in some manner for use by the subroutine 790. This data on a plasma process stored in the normal spectra subdirectory 288 is recalled for evaluation by the subroutine 790 against the current plasma process from the time $t_0$ through the latest current time $t_c$ (i.e., from the very beginning of this plasma process). That is, the subroutine 790 returns to step 798 from step 822 where the current time $t_c$ is returned to the start time $t_0$, and the loop 818 of the subroutine 790 is entered to evaluate the current plasma process against the next plasma process stored in the normal spectra subdirectory 288 in the above-described manner.

There will be cases where the current plasma process being run in the chamber 36 does not "match" any plasma process stored in the normal spectra subdirectory 288. In this case the plasma health/process recognition subroutine 790 will exit step 814 and proceed to step 820. The protocol of step 820 generally directs the plasma health/process recognition subroutine 790 to determine if the current plasma recipe has encountered a known error/aberration which is stored in the abnormal spectra subdirectory 292. Therefore, the plasma health/process recognition subroutine 790 may include the portion of the plasma health subroutine 253 of FIG. 21 which pertains to the abnormal spectra subdirectory 292 and the unknown spectra subdirectory 296 for that matter (i.e., starting with step 266 of the subroutine 253 and including everything thereafter).

The spectra of the current plasma process which is compared with the abnormal spectra subdirectory 292 in the manner discussed in relation to the plasma health subroutine 253 of FIG. 21 would be the spectra following (in time) the spectra of the last current time $t_c$ which matched any of the plasma processes stored in the normal spectra subdirectory 288. Consider an example in which $t_0$ is 1 second and "n" is 2 seconds, and further where the current plasma process "matched" with Process A up until time $t_{39}$, the current plasma process "matched" with Process B until the $t_{61}$, and the current plasma process "matched" with Process C until only time $t_3$. The spectra from the current plasma process being run in the processing chamber 36 which proceeded the longest time into any of the plasma process stored in the normal spectra subdirectory 288 before any deviation was identified would be the spectra at time $t_{61}$ from Process B.

Therefore, the spectra at the time $t_{63}$ would be that which is compared with the abnormal spectra subdirectory 292 in the manner described above in relation to the plasma health subroutine 253 of FIG. 21.

If the plasma process identified by the plasma health/process recognition subroutine 790 was a plasma recipe stored in the normal spectra subdirectory 288, a variation of the subroutine 790 may be implemented which may enhance the speed of the plasma health evaluation. Once the subroutine 790 identifies that the current plasma process being run in the chamber 36 is a plasma recipe (only one of the categories of plasma processes which may be evaluated by the plasma health/process recognition subroutine 790), the logic of the subroutine 790 may be modified such that the subroutine 790 would thereafter at least start its analysis of each subsequent plasma process run in the chamber 36 with that plasma recipe from the normal spectra subdirectory 288 which was previously identified by the subroutine 790. If the "matching" plasma process from the normal spectra subdirectory 288 happened to be the last one which was evaluated against the current plasma process by the subroutine 790, significant plasma health evaluation time could be saved by having it be the first plasma process from the normal spectra subdirectory 288 which is compared with the next plasma process run in the chamber 36. This could be particularly useful when using the plasma health/process recognition subroutine 790 to evaluate plasma recipes run on a cassette 6 of production wafers 18 since the same plasma recipe is typically run on each production wafer 18 from a given cassette 6. The ability of the subroutine 790 to distinguish between the same plasma recipe run on a qualification wafer 18 versus a production wafer 18 provides for further variations along this same line. Assume that the first wafer 18 was actually a production wafer 18 and that the plasma recipe was identified in the first running of this plasma recipe as being for a production wafer 18. Each wafer 18 subsequently processed could first be checked against the plasma recipe run for a production wafer 18 from the normal spectra subdirectory 288, and then against the plasma recipe run for a qualification wafer 18 from the normal spectra subdirectory 288.

Figure 23:
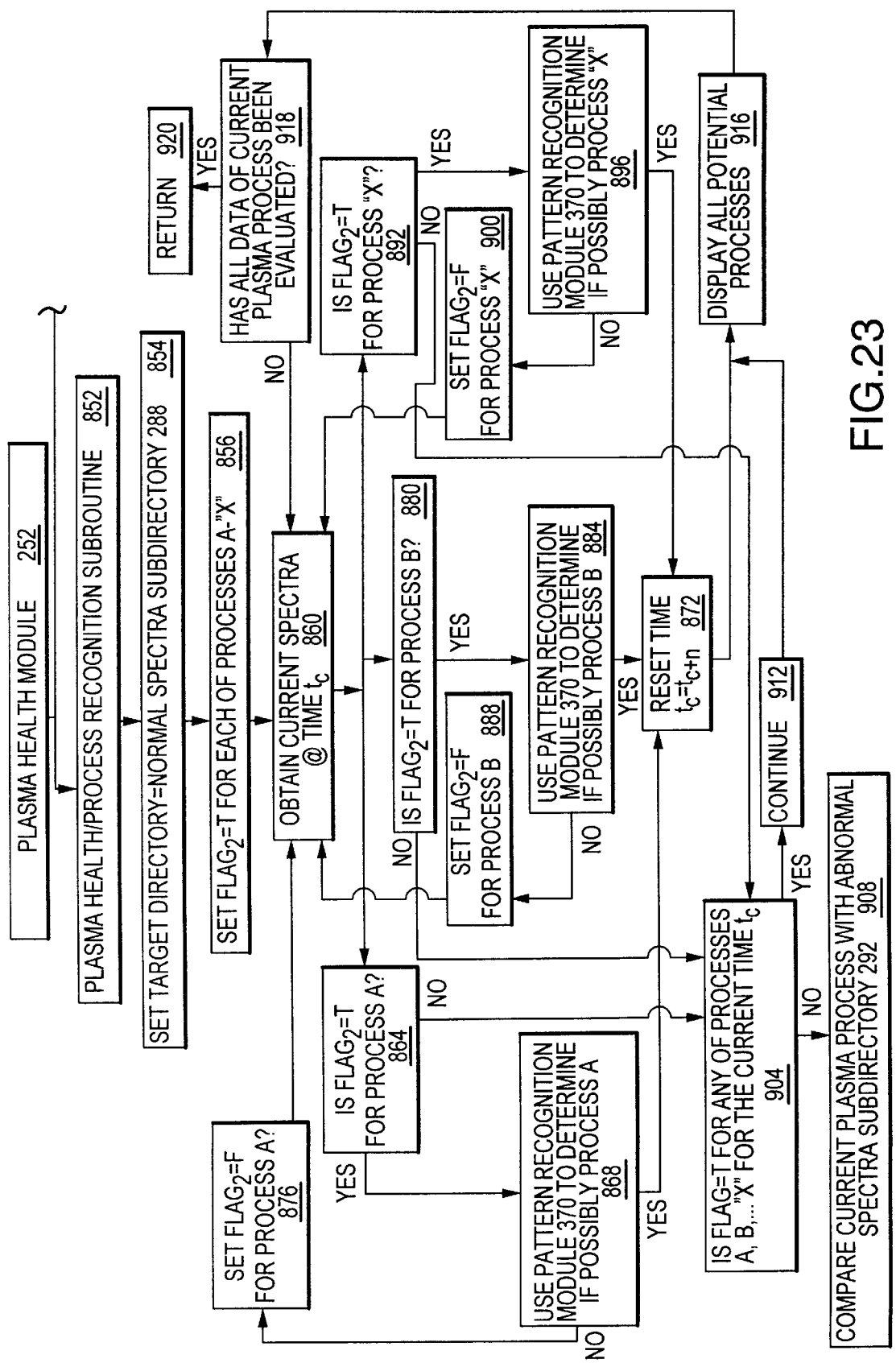
FIG. 23 is a flowchart of one embodiment of a plasma health/process recognition subroutine which may be used by the plasma health module of FIGS. 7 and 32.

Plasma Health/Process Recognition Subroutine
852—FIG. 23

The plasma health/process recognition subroutine 790 of FIG. 22 may be described as incorporating a "series" logic. That is, the comparison of the current spectra of the plasma in the processing chamber 36 at the current time $t_c$ is made in relation to only one plasma process stored in the normal spectra subdirectory 288 at a time. A plasma health/process recognition subroutine which may be used by the process health module 252 and which proceeds with a "parallel" logic is presented in FIG. 23. The plasma health/process recognition subroutine 852 of FIG. 23 begins at step 854 where the Target Directory for the pattern recognition module 370 of FIG. 13 is set to the normal spectra subdirectory 288 (i.e., the search for "matching" spectra will initiate in the normal spectra subdirectory 288). Another preliminary step of the plasma health/process recognition subroutine 852 is at step 856 where a logic operator Flag$_2$ is set to "T" for each of the plasma processes stored in the normal spectra subdirectory 288 to be evaluated through the subroutine 852. The order in which steps 854 and 856 are executed is not particularly important in relation to the present invention.

Data relating to the current plasma process being run on product in the processing chamber 36 is obtained for the plasma health/process recognition subroutine 852 at step 860. Included in this data is at least a spectra of the plasma within the processing chamber 36 during the execution of a plasma process within the processing chamber 36 at the current time $t_c$ which was obtained from the chamber 36 over the Preferred Optical Bandwidth and at the Preferred Data Resolution. Basically, a comparison is thereafter made of the pattern of this current spectra at the current time $t_c$ with the relevant spectra of each plasma process stored in the normal spectra subdirectory 288 which has matched the current plasma process being run in the processing chamber 36 up until the now current time $t_c$, and this comparison is made before spectra associated with a later current time $t_c$ is compared with these plasma processes stored in the normal spectra subdirectory 288. Stated another way, the current plasma process is effectively concurrently compared with each plasma process stored in the normal spectra subdirectory 288 which has "matched" the current plasma process being run in the processing chamber 474 up until the current point in time. If the current spectra at a current time $t_c$ does not match a particular plasma process stored in the normal spectra subdirectory 288, this plasma process is dropped from the list of possible plasma processes and spectra at new, later in time, current times $t_c$ are no longer compared with this plasma process. "Relevance" in terms of which spectra of a given plasma process stored in the normal spectra subdirectory 288 is compared with the spectra of the plasma in the chamber 36 at the current time $t_c$ by the subroutine 852 may be determined in accordance with either the time dependency requirement or the progression dependency requirement discussed above in relation to the plasma health subroutine 253 of FIG. 21. Moreover, as in the case of the plasma health subroutine 253 discussed above in relation to FIG. 21, the plasma health/process recognition subroutine 852 of FIG. 23 may be configured to make all plasma processes stored in the normal spectra subdirectory 292 available for comparison with the current plasma process, or the subroutine 852 may be configured such that only those certain plasma processes are made available to the plasma health/process recognition subroutine 852.

The spectra at the current time $t_c$ from step 860 of the plasma health/process recognition subroutine 852 is effectively concurrently compared with each of the relevant plasma process stored in the normal spectra subdirectory 288 the first time through the main body of the plasma health/process recognition subroutine 852. The logic operator "Flag$_2$" associated with each such plasma process has been set to "T" at the previous step 856, so the subroutine 852 will proceed through steps 864 (Process A), 880 (Process B), and 892 (Process "X") to steps 368 (Process A), 884 (Process B), and 892 (Process "X") to where the subroutine 852 is directed to proceed to the pattern recognition module 370 of FIG. 13. The pattern recognition module 370 determines if the pattern of the current spectra at the current time $t_c$ is a "match" with the relevant spectra of the subject plasma process stored in the normal spectra subdirectory 288 (Process A in the case of step 868, Process B in the case of step 884, and Process "X" in the case of step 896). If the current spectra at the current time $t_c$ "matches" the relevant spectra of the subject plasma process, the subroutine 852 proceeds to step 872 where the "clock" of the subroutine 852 is adjusted by increasing the current time $t_c$ by a factor of "n". The magnitude of "n" defines the Analytical Time Resolution. The subroutine 852 then proceeds from step 872 to step 916 where all of the plasma processes from the normal spectra subdirectory 288 which are still a potential "match" for the current plasma process being run in the processing chamber 36 are displayed to the appropriate personnel (e.g., on display 132 in FIG. 6). Another spectra at this new current time $t_c$ is then obtained for the plasma health/process recognition subroutine 852 back at step 860 and the foregoing is repeated so long as the evaluation of the entirety of the current plasma process has not yet been completed by the plasma health/process recognition subroutine 852 as noted in its step 918. When the current plasma process is terminated and all spectral data has been evaluated by the plasma health/process recognition subroutine 852, the subroutine 852 proceeds from step 918 to 920 where control of plasma monitoring operations may be returned to, for instance, the startup module 202 of FIG. 15.

Some plasma processes stored in the normal spectra subdirectory 288 being used by the subroutine 852 sooner or later will fail to "match" the current plasma process being run in the processing chamber 36. That is, the pattern recognition module 370 will determine that the pattern of the spectra at the current time $t_c$ does not match the relevant spectra of the subject plasma process stored in the normal spectra subdirectory 288. One or more of steps 868, 884, and 896 will then exit in such a manner that the logic operator "Flag$_2$" of their respective plasma process will be set to "F" (at step 876 for Process A, at step 888 for Process B, at step 900 for Process "X"). Any plasma process in the normal spectra subdirectory 288 having its logic operator "Flag$_2$" set to "F" will no longer be compared to the current plasma process being run in the processing chamber 36 by the pattern recognition module 370 through the subroutine 852. Step 868 associated with Process A will be bypassed through step 864 when the logic operator "Flag$_2$" for Process A is set to "F", step 884 associated with Process B will be bypassed through step 880 when the logic operator "Flag$_2$" for Process B is set to "F", and step 896 associated with Process "X" will be bypassed through step 892 when the logic operator "Flag$_2$" for Recipe "X" is set to "F".

As long as at least one plasma process stored in the normal spectra subdirectory 288 has "matched" each spectra at each new incremental time $t_c$ from step 860, the plasma health/process recognition subroutine 852 will continue via steps 904 and 912. However, if this is not the case, the plasma health/process recognition subroutine 852 will exit from step 904 to step 908. The protocol of step 908 is directed to determining if the current plasma process being run in the processing chamber 36 has encountered a known error/aberration that is stored in the abnormal spectra subdirectory 292. Therefore, the plasma health/process recognition subroutine 852 may include the portion of the plasma health subroutine 253 of FIG. 21 which pertains to the abnormal spectra subdirectory 292 and the unknown spectra subdirectory 296 for that matter (i.e., starting with step 266 of the subroutine 253 and including everything thereafter, but not shown). The spectra compared with the abnormal spectra subdirectory 292 in step 266 of the plasma health subroutine 253 would be the spectra associated with the last current time $t_c$ from step 860 of the plasma health/process recognition subroutine 852.

Now consider an example where there are three plasma processes recorded in the normal spectra subdirectory 288 (e.g, Process "X" is Process C), where "n" from step 872 is one second, where step 860 was first executed for time $t_1$, where a time dependency requirement is being used by the subroutine 852 to define what is the relevant spectra from a given plasma process stored in the normal spectra subdirectory 288, and where the current plasma process being run in the processing chamber 36 has matched each of Processes A, B, and C through the current time $t_{10}$ (i.e., steps 868 (Process A), 884 (Process B), and 896 (Process C) have each been executed 10 times). The "clock" of the subroutine 852 is then adjusted at step 872 to $t_{11}$, the spectra of the plasma in the processing chamber 36 at this new time $t_{11}$ is obtained for the subroutine 852 at step 860, and the subroutine 852 proceeds to steps 868, 884, and 896 since the logic operator "Flag$_2$" associated with each plasma process stored in the normal spectra subdirectory 288 is still "T" (steps 864, 880, and 892 each exit as a "yes" condition). Assume that the current plasma process still matches Processes A and B from the normal spectra subdirectory 288 at the now current time $t_{11}$, but no longer matches Process C of the subdirectory 288 at the now current time $t_{11}$. In this case, step 868 for Process and step 884 for Process B would each still exit "yes" and proceed to step 872 where the clock of the subroutine 852 would be adjusted to $t_{12}$. The logic operator "Flag$_2$" for Processes A and B would also still be "T", while step 896 for Process C would exit to step 900 where the logic operator "Flag$_2$" for Process C would be set to "F". As such, step 916 would indicate that the current plasma process was now only potentially Processes A and B.

The spectra for the new time t12 is obtained for the subroutine 852 at step 860 in the subject example, and the subroutine 852 proceeds to the logic operator check for each of the plasma processes stored in the normal spectra subdirectory 288. The subroutine 852 would continue the comparison of the current plasma process being run in the processing chamber 86 with Processes A and B in the subject example, through steps 864 and 868 for Process A and through steps 880 and 884 for Process B. However, Process C would no longer be compared with the current plasma process at the current time $t_{12}$ since step 892 associated with Process C would bypass its associated comparison step 896, and would instead proceed to step 904. The subroutine 852 would proceed with the comparison of the current plasma process being run in the processing chamber 36 with the normal spectra subdirectory 288 since the logic operator "Flag$_2$" for each of Process A and B at step 904 was still "T" at the now current time $t_{12}$ based upon the logic from step 904.

Now consider that the spectra at the current time $t_{12}$ matches the spectra at this same time $t_{12}$ for Process A (via step 868), but not for Process B (via step 884). The logic operator "Flag$_2$" for Process B would then be set to "F" at step 888. Moreover, the "clock" of the subroutine 852 would be adjusted to $t_{13}$ at step 872, and step 916 would indicate that Process A from the normal spectra subdirectory 288 was the only remaining possibility for the current plasma process being run within the processing chamber 36. The spectra for the new current time $t_{13}$ is obtained for the subroutine 852 at step 860 in the subject example, and the subroutine 852 proceeds to the logic operator check for each of the plasma processes stored in the normal spectra subdirectory 288 which are available to the subroutine 852. The subroutine 852 would continue the comparison of the current plasma process being run in the processing chamber 36 only with Process A through its associated steps 864 and 868. Plasma Processes B and C would no longer be compared with the current plasma process since step 880 associated with Process B would bypass its comparison step 884 and direct the subroutine 852 to instead proceed to step 904, and since step 892 associated with Process (C would bypass its comparison step 896 and direct the subroutine 852 to proceed to step 904. The subroutine 852 would proceed with the comparison of the current plasma process being run in the processing chamber 36 with the normal spectra subdirectory 288 via step 904 since the logic operator "Flag$_2$" for Process A is still "T" at the now current time $t_{13}$.

Completion of an entire plasma process which was run in the processing chamber 36 while matching at least one plasma process stored in the normal spectra subdirectory 288 (Process A in the above-noted example) will cause the subroutine 852 to exit from step 918 and proceed to step 920. Control of the plasma monitoring operations may then be returned by step 920 of the plasma health/process recognition subroutine 852 to, for instance, the startup module 202 of FIGS. 13.

Figure 24:
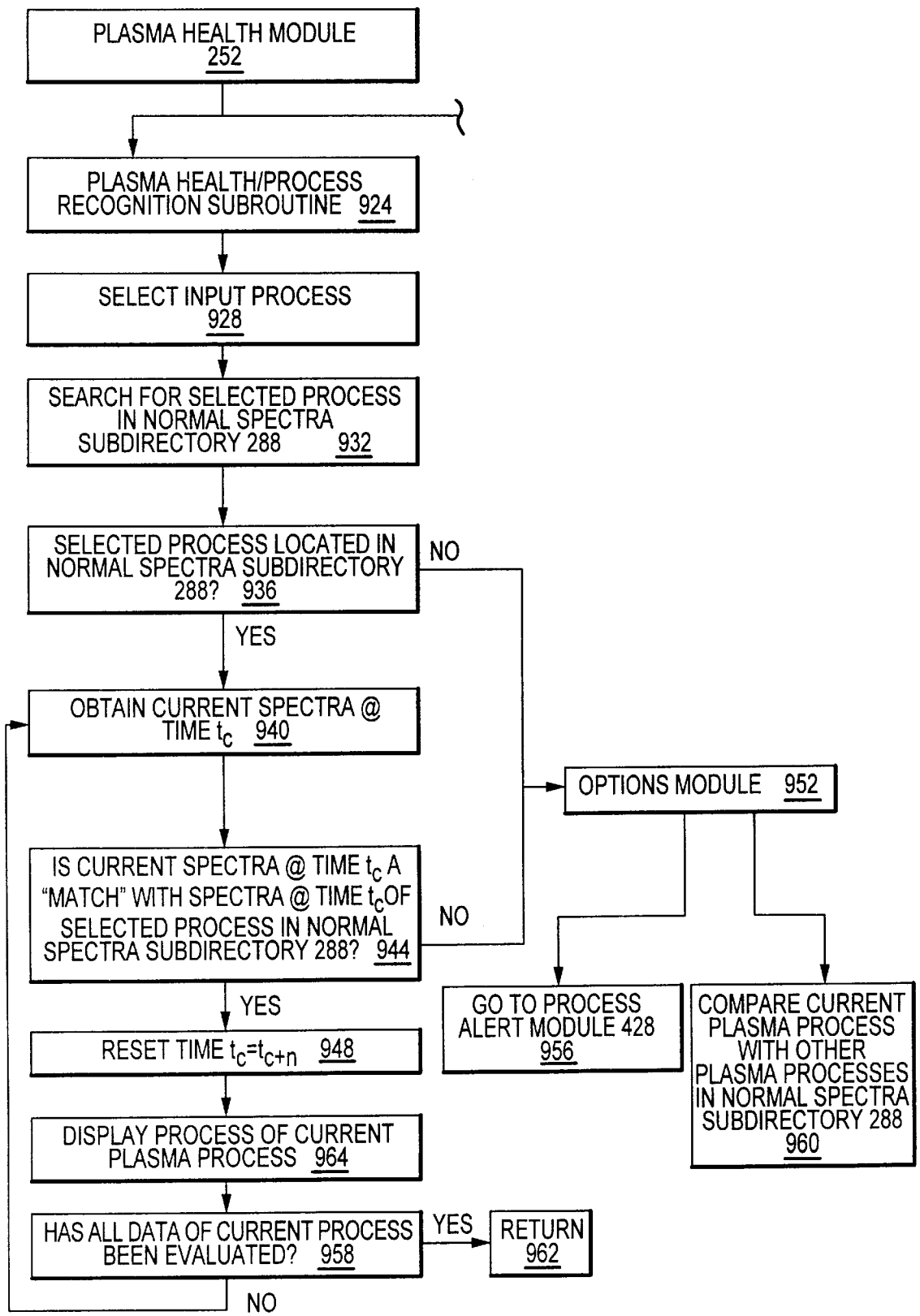
FIG. 24 is a flowchart of another embodiment of a plasma health/process recognition subroutine which may be used by the plasma health module of FIGS. 7 and 32.

Plasma Health/Process Recognition Subroutine
924—FIG. 24

Yet another embodiment of a plasma health subroutine which may be used by the plasma health module 252 is illustrated in FIG. 24. The plasma health/process recognition subroutine 924 is generally directed to achieving an increase in the speed of the comparison between the current plasma process being run in the processing chamber 36 and the normal spectra subdirectory 288 by at least initially limiting the search within the subdirectory 288 to a single plasma process of the subdirectory 288. In this regard, personnel are allowed to indicate which plasma process is to be run in the processing chamber 36. For instance, the data entry device 60 for the main control unit 58 (FIG. 1) may be used to select a plasma recipe to be run from a list of plasma recipes on the display 130. The startup module 202 could prompt personnel to input the recipe if desired through execution of step 230 of the startup routine 203 of FIG. 16. More typically, the recipe to be run on a certain lot of wafers 18 will be input somewhere in the fabrication facility (e.g., main control panel), and when the chamber 36 "reads" the lot from this wafer 18, the plasma recipe which was input in association with this lot will be automatically run.

Once the selection has been made at step 928, the plasma health/process recognition subroutine 924 proceeds to step 932 to confirm that this plasma process is in fact stored in the normal spectra subdirectory 288. Information in the process genus field 322h (e.g., plasma recipe, plasma clean, conditioning wafer) and/or process species type field 322c (e.g., a specific plasma recipe) of FIG. 12A may be used by step 932 of the plasma health/process recognition subroutine 924 of FIG. 24.

A spectra of the plasma in the processing chamber 36 at the current time $t_c$ is obtained for the subroutine 924 at step 940 if the process selected or input at step 928 was located in the normal spectra subdirectory 288 through execution of step 936. This current spectra is compared with the relevant spectra of the selected plasma process in the normal spectra subdirectory 288. The comparison at step 944 of the recipe recognition subroutine 924 determines if the pattern of the current spectra at the current time $t_c$ (from the current plasma process being run in the processing chamber 36) is a "match" with the relevant spectra of the selected plasma process stored in the normal spectra subdirectory 288. "Matches" in accordance with step 944 may be evaluated through the pattern recognition module 370 of FIG. 15. "Relevance" in terms of which spectra of the selected plasma process in the normal subdirectory 288 is compared with the spectra of the plasma in the chamber 36 at the current time $t_c$ by the pattern recognition module 370 may be determined in accordance with either the time dependency requirement or the progression dependency requirement discussed above in relation to the plasma health subroutine 253 of FIG. 21.

A number of actions are undertaken if there is a "match" at step 944 of the plasma health/process recognition subroutine 924, and the order of execution of these steps is relatively insignificant in relation to the present invention. Initially, the "clock" of the plasma health/process recognition subroutine 924 is adjusted by a factor of "n" (which defines the Analytical Time Resolution) at step 948 to provide a new current time $t_c$. Moreover, the identification of the plasma process of the current operation is displayed to appropriate personnel through execution of step 964 (e.g., on the display 130 of FIG. 6). Finally, step 958 inquires as to whether all of the data of the current plasma process has been evaluated.

Steps 940, 944, 948, 964, and 958 of the plasma health/process recognition subroutine 924 are repeated so long as the current plasma process being run on product within the processing chamber 36 is a "match" with the selected plasma process from step 928 and until all of the data on the current plasma process has been evaluated by the subroutine 924, in which case control of plasma monitoring operations is transferred to, for instance, the startup module 202 of FIG. 15 through execution of step 962 of the subroutine 924. Any failure of the current plasma process to "match" the process from step 928 will cause the plasma health/process recognition subroutine 924 to proceed from step 944 to an options module 952. It should be noted that the options module 952 may also be accessed if the plasma process selected in step 928 is not initially located in the normal spectra subdirectory 299. How the plasma health/process recognition subroutine 924 proceeds in these type of circumstances will likely be determined by the operator of the facility which implements the wafer production system 2. Access to the entirety of the normal spectra subdirectory 288 for comparison against the current plasma process may be implemented by step 960 including protocol to call the plasma health subroutine 253 of FIG. 21, the plasma health/process recognition subroutine 790 of FIG. 22, or the plasma health/process recognition subroutine 852 of FIG. 2:3. Notification of the deviation of the current plasma process from the process selected in step 928 of the plasma health/process recognition subroutine 924 may be provided through execution of step 956 which calls the process alert module 428 discussed above in relation to FIG. 14 and which may also offer one or more protocols in relation to this condition if the process control feature is enabled at step 436 of the process subroutine 432. Other options such as allowing the present plasma process to be terminated (even though it may be a valid plasma process) may also be provided (not shown).

A variation of the subroutine 924 relates to the fact that the same plasma recipe is typically run on an entire cassette 6, and that the cassette 6 may have one or more qualification wafers 18 in with the production wafers 18. Even though the same plasma recipe is run on these wafers 18, certain differences between the production wafers 18 and the qualification wafer(s) 18 may produce differences in their respective spectral patterns. The logic of the subroutine 924 may be to first compare the current plasma process against the same plasma recipe associated with a production wafer 18 in the normal spectra subdirectory 288, and to compare the current plasma recipe against the same plasma recipe associated with a qualification wafer 18 in the normal spectra subdirectory 288 only if the current plasma recipe does not "look" like a plasma recipe for a production wafer 18. Moreover, entries for both production and qualification wafers of this same plasma recipe could be simultaneously evaluated in the manner presented above in relation to the plasma health/process recognition subroutine 852 of FIG. 23 when the plasma recipe is input to the subroutine 924.

Figure 25:
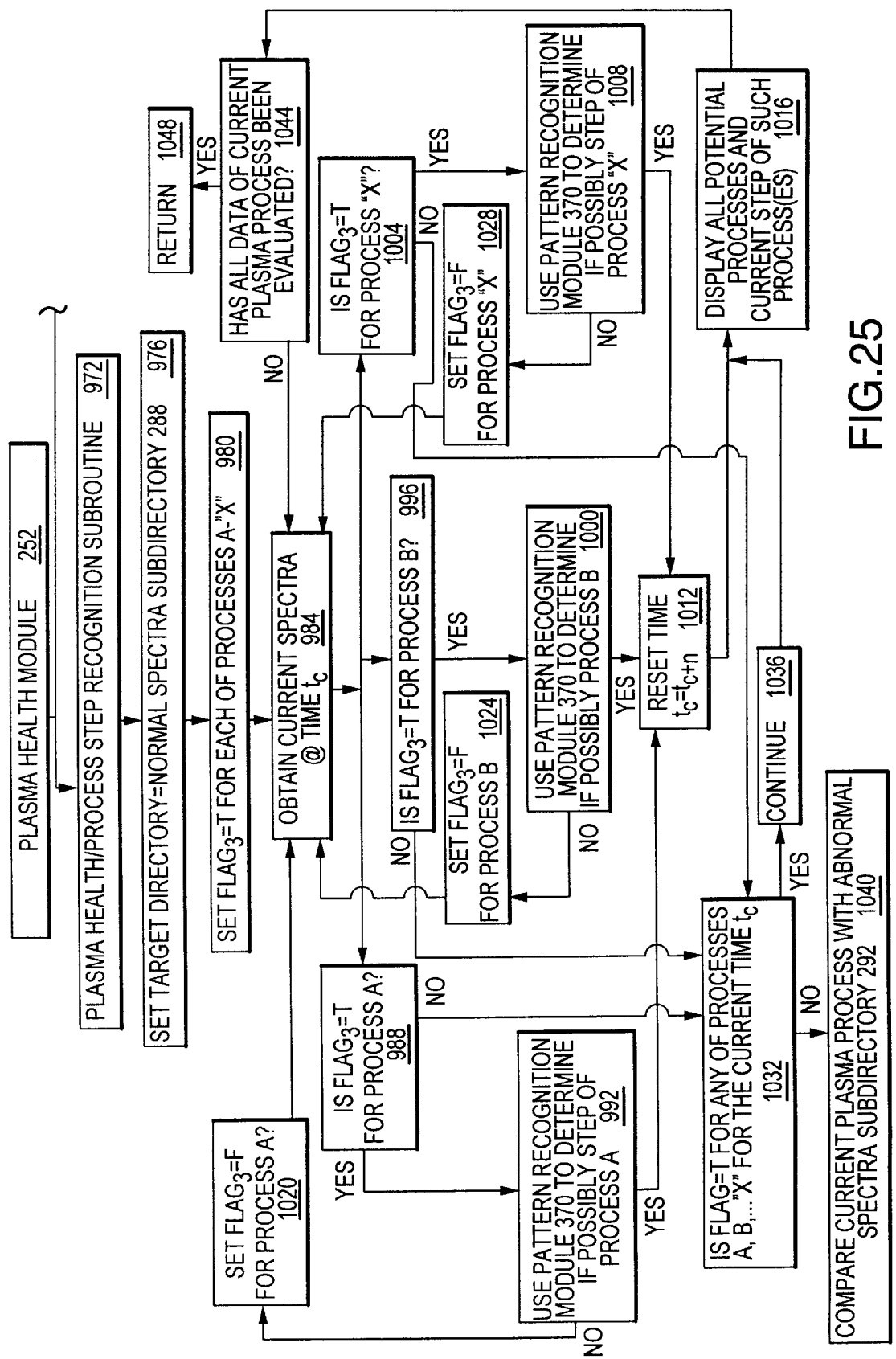
FIG. 25 is a flowchart of one embodiment of a plasma health/process step recognition subroutine which may be used by the plasma health module of FIGS. 7 and 32.

Plasma Health/Process Step Recognition Subroutine
972—FIG. 25

Another embodiment of a subroutine which may be used by the plasma health module 252 is presented in FIG. 25.

Not only does the subroutine 972 of FIG. 25 monitor or evaluate the health of the plasma from a plasma process being run in the processing chamber 36, but the subroutine 972 is also able to identify the current plasma step of the current plasma process being run in the processing chamber 36. As such, the subroutine 972 is characterized as a plasma health/process step recognition subroutine 972. Two factors are key to providing this plasma step identification function. One is that the steps of the subject plasma process actually differ sufficiently in relation to their subject spectra such that they can be distinguished as is the case of the multi-step recipe illustrated in FIGS. 17A–C above. Another is that the identify of the plasma step be associated in some manner with its corresponding spectra, such as through inputting information to the plasma step field 322e discussed above in relation to FIG. 12A.

The plasma health/process step recognition subroutine 972 proceeds with a "parallel" logic and in the same manner as the plasma health/process recognition subroutine 852 of FIG. 23. The plasma health/process step recognition subroutine 972 of FIG. 25 begins at step 976 where the Target Directory for the pattern recognition module 370 of FIG. 13 is set to the normal spectra subdirectory 288 (i.e., the search for "matching" spectra will initiate in the normal spectra subdirectory 288). Another preliminary step of the plasma health/process step recognition subroutine 972 is at step 980 where a logic operator Flag$_3$ is set to "T" for each of the plasma processes stored in the normal spectra subdirectory 288. The order in which steps 976 and 980 are executed is not particularly important to the present invention.

Data relating to the current plasma process being run in the processing chamber 36 is obtained for the subroutine 972 at step 984. Included in this data is a spectra of the plasma within the processing chamber 36 during execution of a plasma process being run within the processing chamber 36 at the current time $t_c$. Basically, a comparison is thereafter made of the pattern of this current spectra at the current time $t_c$ with the pattern of the relevant spectra of each plasma process stored in the normal spectra subdirectory 288 which has matched the current plasma process up until the now current time $t_c$ and which has been made available to the subroutine 972. This comparison is made before the pattern of spectra associated with a later in time current time $t_c$ is compared with these same processes stored in the normal spectra subdirectory 288. Stated another way, the current plasma process is effectively concurrently compared with each plasma process stored in the normal spectra subdirectory 288 which has "matched" the current plasma process up until the current point in time and which is made available to the subroutine 972. If at any time the spectra at the current time $t_c$ from the current plasma process does not match a particular process in the normal spectra subdirectory 288, this plasma process is dropped from the list of possible plasma processes and spectra at new, later in time, current times $t_c$ are no longer compared with this particular plasma process. "Relevance" in terms of which spectra of the selected plasma process is compared with the spectra of the plasma in the chamber 36 at the current time $t_c$ by the subroutine 972 may be determined in accordance with either the time dependency requirement or the progression dependency requirement discussed above in relation to the plasma health subroutine 253 of FIG. 21. Moreover, as in the case of the plasma health subroutine 253 discussed above in relation to FIG. 21, the plasma health/process step recognition subroutine 972 of FIG. 25 may be configured to make all plasma processes stored in the normal spectra subdirectory 292 available for comparison with the current plasma process, or the subroutine 972 may be configured such that only those certain of these plasma processes are made available to the subroutine 972 in any of the above-described manners.

The spectra at the current time $t_c$ from step 984 of the plasma health/process step recognition subroutine 972 is effectively concurrently compared with each plasma process stored in the normal spectra subdirectory 288 the first time through the main body of the subroutine 972. The logic operator "Flag$_3$" associated with each plasma process has been set to "T" at the previous step 980, so the subroutine 972 will proceed through steps 988 (Process A), 996 (Process B), and 1004 (Process "X") to steps 992 (Process A), 1000 (Process B), and 1008 (Process "X") to where the subroutine 972 is directed to proceed to the pattern recognition module 370 of FIG. 13. The pattern recognition module 370 determines if the pattern of the current spectra at the current time $t_c$ is a "match" with the pattern of the relevant spectra of the subject plasma process stored in the normal spectra subdirectory 288 (Process A in the case of step 992, Process B in the case of step 1000, and Process "X" in the case of step 1008). If the pattern of the current spectra at the current time $t_c$ "matches" the pattern of the relevant spectra of the subject plasma process from the subdirectory 288, the subroutine 972 proceeds to step 1012 where the clock of the subroutine 972 is adjusted by increasing the current time $t_c$ by a factor of "n". The magnitude of "n" defines the Analytical Time Resolution (i.e., what portion of the collected data is actually analyzed). The subroutine 972 then proceeds from step 1012 to step 1016 where all of the plasma processes from the normal spectra subdirectory 288 which are still a potential "match" for the current plasma process being run in the processing chamber 36 are displayed to the appropriate personnel (e.g., on display 130 in FIG. 6). Moreover, the specific process step, if any, of each of these potential plasma processes is also displayed at step 1016. Another spectra at the new current time $t_c$ is then obtained back at step 984 and the foregoing is repeated so long as the evaluation of the entirety of the current plasma process has not yet been completed by the plasma health/process step recognition subroutine 972 as noted in step 1044. When the plasma process is terminated and all spectral data has been evaluated by the plasma health/process step recognition subroutine 972, the subroutine 972 will proceed from step 1044 to 1048 where control of plasma monitoring operations may be returned to, for instance, the startup module 202 of FIG. 15.

Some plasma processes in the normal spectra subdirectory 288 sooner or later will fail to "match" the current plasma process being run in the processing chamber 36. That is, the pattern recognition module 370 will determine that the pattern of the spectra at the current time $t_c$ does not match the pattern of the relevant spectra of the subject plasma process stored in the normal spectra subdirectory 288. One or more of steps 992, 1000, and 1008 will then exit in such a manner that the logic operator "Flag$_3$" of their respective plasma process will be set to "F" (at step 1020 for Process A, at step 1024 for Process B, at step 1028 for Process "X"). Any plasma process stored in the normal spectra subdirectory 288 in which its logic operator "Flag$_3$" is set to "F" will no longer be compared to the current plasma process by the pattern recognition module 370. Step 992 associated with Process A will be bypassed through step 988 when the logic operator "Flag$_3$" for Process A is set to "F", step 1000 associated with Process B will be bypassed through step 996 when the logic; operator "Flag$_3$" for Process B is set to "F", and step 1008 associated with Process "X" will be bypassed through step 1004 when the logic operator "Flag₃" for Process "X" is set to "F".

As long as at least one plasma process from the normal spectra subdirectory 288 has "matched" each spectra at each new incremental time $t_c$ from step 984, the plasma health/process step recognition subroutine 972 will continue via steps 1032 and 1036. However, if this is not the case, the subroutine 972 will proceed from step 1032 to step 1040. The protocol of step 1040 is directed to determining if the current plasma process being run in the processing chamber 36 has encountered a known error/aberration that is stored in the abnormal spectra subdirectory 292. Therefore, the plasma health/process recognition subroutine 972 may include the portion of the plasma health subroutine 253 of FIG. 21 which pertains to the abnormal spectra subdirectory 292 and the unknown spectra subdirectory 296 (i.e., starting with step 266 of the subroutine 253 and including everything thereafter). The spectra compared with the abnormal spectra subdirectory 292 would then be the spectra associated with the last current time $t_c$ from step 984 of the plasma health/process step recognition subroutine 972.

Figure 26A:
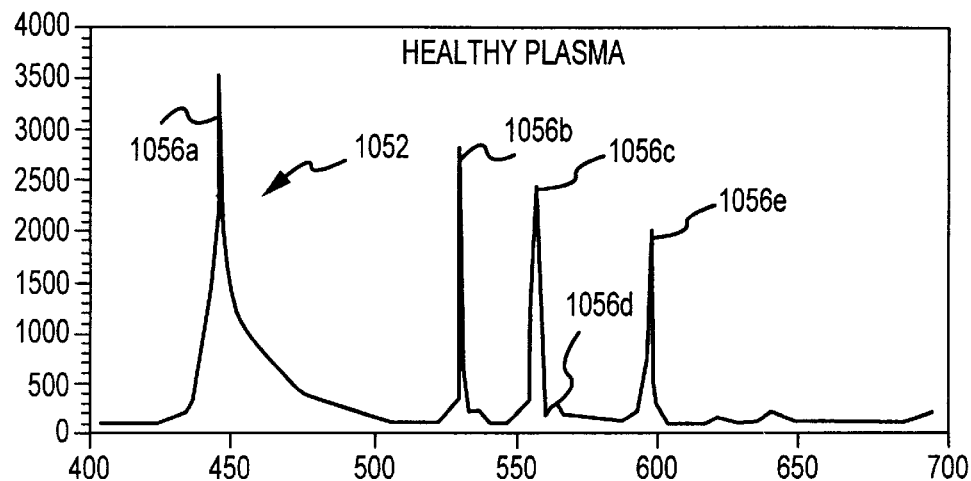
FIGS. 26A–C are exemplary spectra from a "clean" processing chamber, from an "aging" processing chamber, and from a "dirty" processing chamber, respectively.
Figure 26B:
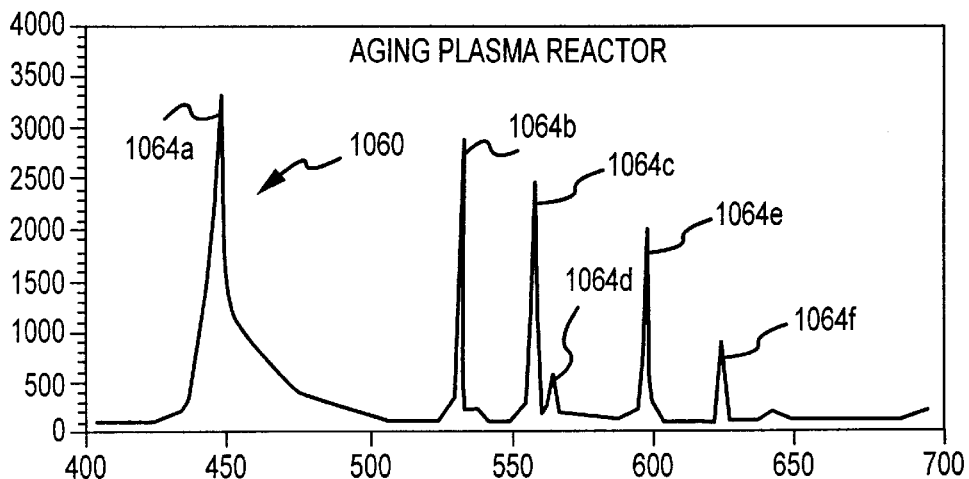
Figure 26C:
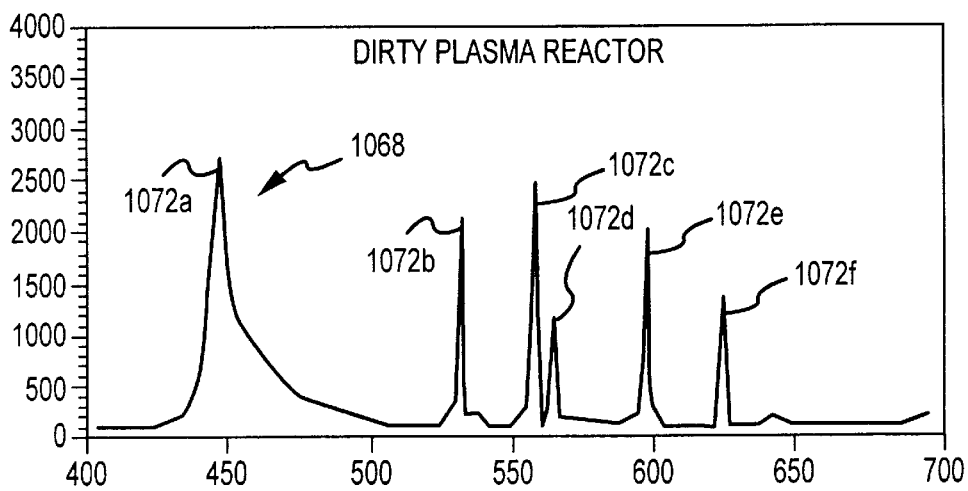

Exemplary "Aging Chamber" Spectra—FIGS. 26A–C

The primary purpose of the plasma health module 252 is to monitor the health of the plasma used to execute a plasma process within the chamber 36. As noted above, the running of plasma processes on product in the chamber 36 will eventually start to adversely impact its performance. This "aging" chamber condition is often, if not always, reflected by the spectra of the plasma in the chamber 36 during a plasma process. How the pattern of the spectra of the plasma may change over time as the chamber 36 "ages" is illustrated in FIGS. 26A–C.

FIG. 26A presents a spectra 1052 of an exemplary plasma when the processing chamber 36 is in a clean condition and while running a corresponding plasma recipe on product (e.g., a "healthy" plasma). FIG. 26B presents a spectra 1060 of this same exemplary plasma after a number of plasma recipes have been conducted within the processing chamber 36 and while this same plasma recipe is actually being run on product in the chamber 36. Although the plasma recipes run in the chamber 36 between the times associated with FIGS. 26A and 26B have started to age the chamber 36, the interior of the chamber 36 has not sufficiently degraded the health of plasma to the point where the chamber 36 needs to be cleaned. Finally, FIG. 26C presents a spectra 1068 of this same exemplary plasma, during the running of the same plasma recipe on product in the same chamber 36 as presented in FIGS. 26A–B, and where the running of the previous plasma recipes on product in the processing chamber 36 has further deteriorated the condition of the interior of the processing chamber 36. This spectra 1068 may be selected by the operator of the facility implementing the wafer production system 2 as being indicative of the chamber 36 being in condition for cleaning (e.g., "dirty/unhealthy plasma", a "dirty chamber" condition). For instance, if the product processed in the chamber 36 was defective in some manner, and if analysis of the product traced the cause back to the condition of the chamber 36, spectral data from the run associated with this defective product may be selected as being indicative of the subject condition. However, it should be appreciated that it may be desirable to have a dirty chamber condition identified before it starts ruining product processed in the chamber 36. That is, it may be desirable to identify a trend which is that the condition of the chamber 36 is degrading and associate this trend with a dirty chamber condition such that product is not lost because of a dirty chamber condition. This may be implemented by associating spectral data from runs previous to that where the defective product was produced with a dirty chamber condition (even though the product produced thereby was not yet defective). Each of the spectra 1052, 1060, and 1068 are characterized by a number of peaks 1056, 1064, and 1072, respectively, of varying intensities (plotted along the "y" axis and expressed in "counts" which is reflective of the intensity level) at various wavelengths (plotted along the "x" axis in nanometers). A comparison of the spectra 1052, 1060, and 1068 reveals that their associated patterns are in fact different, including without limitation as follows: 1) at about the 440 nanometer wavelength region, peak 1056a in the spectra 1052 of FIG. 26A has an intensity of about 3,300, peak 1064a in the spectra 1060 of FIG. 26B has an intensity of about 3,300, and peak 1072a in the spectra 1068 of FIG. 26C has an intensity of about 2,700; 2) at about the 525 nanometer wavelength region, peak 1056b in the spectra 1052 of FIG. 276A has an intensity of about 2,800, peak 1064b in the spectra 1060 of FIG. 26B has an intensity of about 2,900, and peak 1072b in the spectra 1068 of FIG. 26C has an intensity of about 2,100; 3) at about the 560 nanometer wavelength region, peak 1056d in the spectra 1052 of FIG. 26A has an intensity of about 400, peak 1064d in the spectra 1060 of FIG. 26B has intensity of about 700, and peak 1072d in the spectra 1068 of FIG. 26C has an intensity of about 1,200; 4) at about the 595 nanometer wavelength region, peak 1056e in the spectra 1052 of FIG. 26A has an intensity of about 2,100, peak 1064e in the spectra 1060 of FIG. 26B has intensity of about 2,000, and peak 1072e in the spectra 1068 of FIG. 26C has an intensity of about 2,000; and 5) at about the 625 nanometer wavelength region, there is substantially no peak in the spectra 1052 of FIG. 26A, although this region has an intensity of about 200 (noise), peak 1064f in the spectra 1060 of FIG. 26B has intensity of about 900, and peak 1072f in the spectra 1068 of FIG. 26C has an intensity of about 1,500. These are but a few examples, as it should be clear that the peaks 1056 of spectra 1052 of FIG. 26A, the peaks 1064 of the spectra 1060 of FIG. 26B, and the peaks 1072 of the spectra 1068 of FIG. 26C differ as to one or more of their respective wavelengths and intensities in a manner which would allow these types of spectra to be used as a basis to determine when to clean the chamber 36. That is, the distinctiveness of the patterns between the spectra 1052, 1060, and 1068 may be utilized to apprise the appropriate personnel of the condition of the processing chamber 36 in relation to cleaning schedules.

At least two options exist for implementing the spectra in the plasma spectra directory 284 of FIG. 9 which are at least deemed indicative of a chamber 36 which is in need of cleaning. Spectra of plasma in a dirty chamber condition may be included in the abnormal spectra subdirectory 292 of FIG. 9. In this case, the plasma health subroutine 253 of FIG. 21, the plasma health/process recognition subroutine 790 of FIG. 22, the plasma health/process recognition subroutine 852 of FIG. 23, the plasma health/process recognition subroutine 924 of FIG. 24, and the plasma health/process step recognition subroutine 972 of FIG. 25 would each then include "chamber condition monitoring" capabilities in the manner presented above. How one or more spectra which is indicative of a dirty chamber condition may be obtained is as follows. Consider the situation where a plasma recipe being run on product in the processing chamber 36 does not "match" any plasma recipe stored in the normal spectra subdirectory 288, and further does not "match" any of the known errors/aberrations stored in the abnormal spectra subdirectory 292 such as discussed above in relation the plasma health subroutine 253 of FIG. 21. The spectra of the plasma from this plasma recipe would then be stored in the unknown spectra subdirectory 296. When spectra from this plasma recipe are subsequently examined and determined to be associated with a dirty chamber condition, at least one of the spectra from this plasma recipe which did not "match" any entry in the normal spectra subdirectory 288 or the abnormal spectra subdirectory 292 may be selected as being indicative of the dirty chamber condition. This spectra may then be transferred to the abnormal spectra subdirectory 292 such that this spectra will be identified as a known error condition. The protocol which may be implemented (either automatically or manually) upon encountering this same condition in subsequent executions of plasma processes in this same chamber 36 may be as set forth above in the discussion of the process alert subroutine 432 of FIG. 14. One or more alerts of the dirty chamber condition may also be issued consistent with the above discussion.

Figure 27:
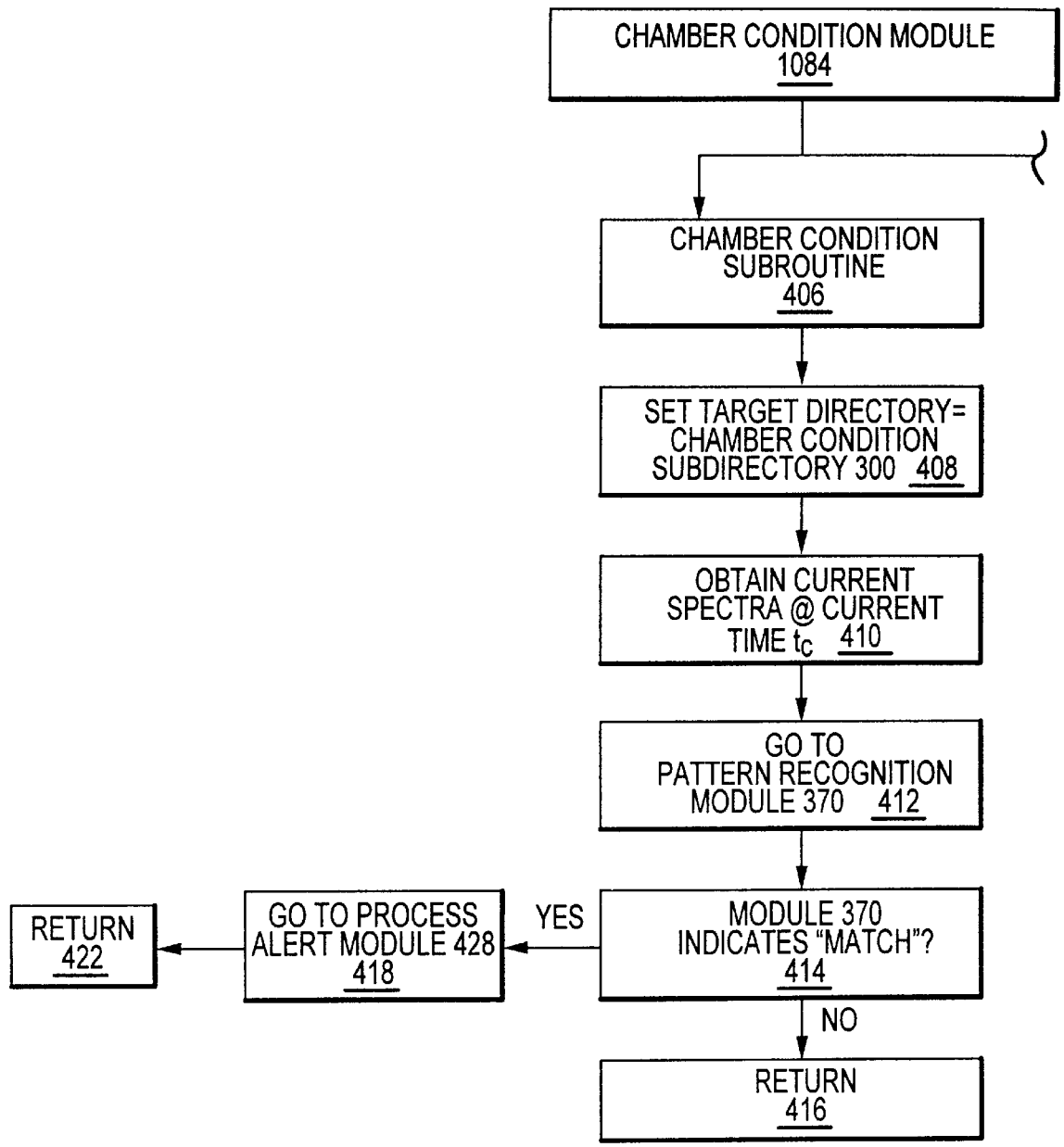
FIG. 27 is a flowchart of one embodiment of a chamber condition subroutine which may be incorporated in the chamber condition module of FIGS. 7 and 32.
Figure 28:
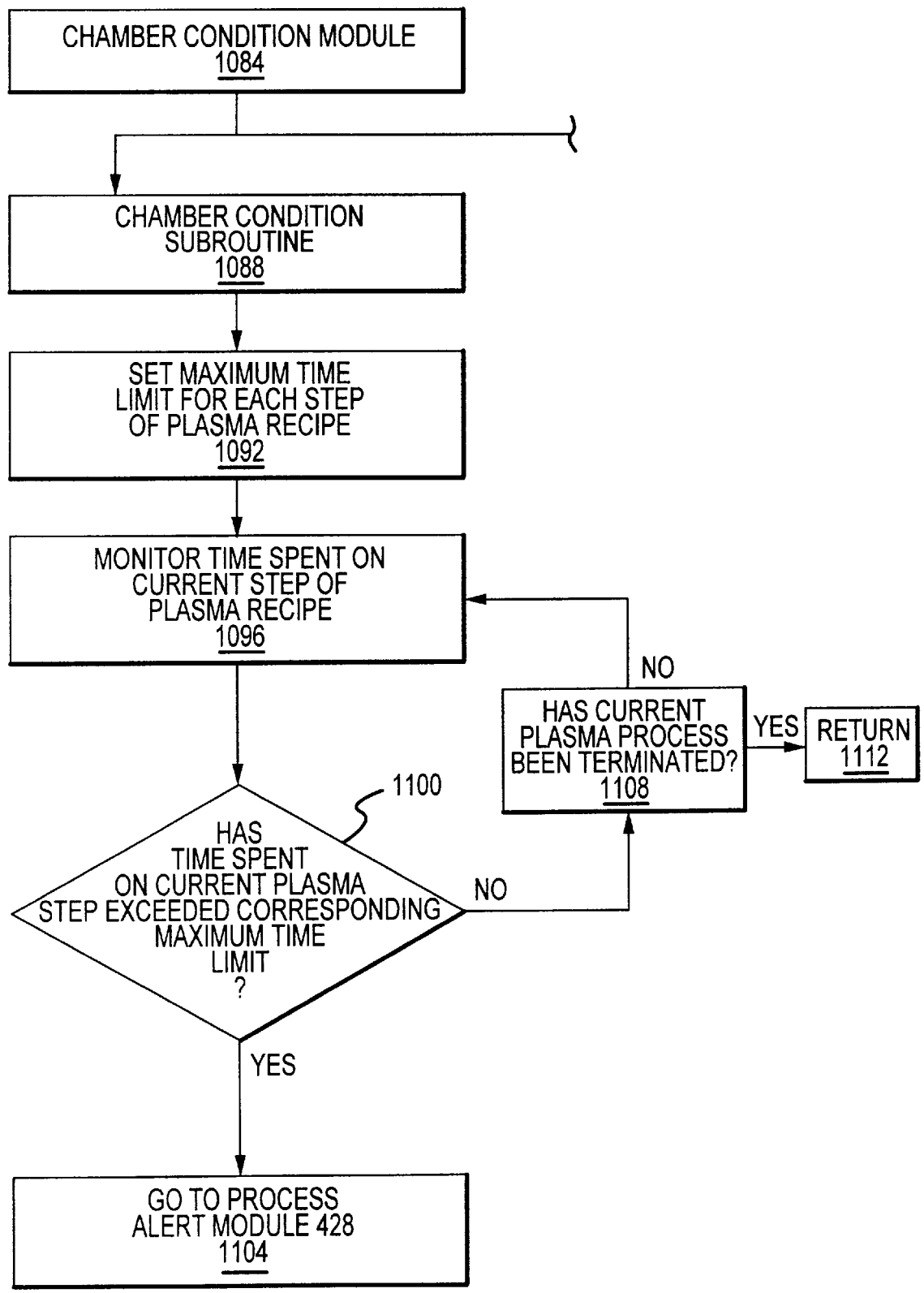
FIG. 28 is a flowchart of another embodiment of a chamber condition subroutine which may be incorporated in the chamber condition module of FIGS. 7 and 32.
Figure 29:
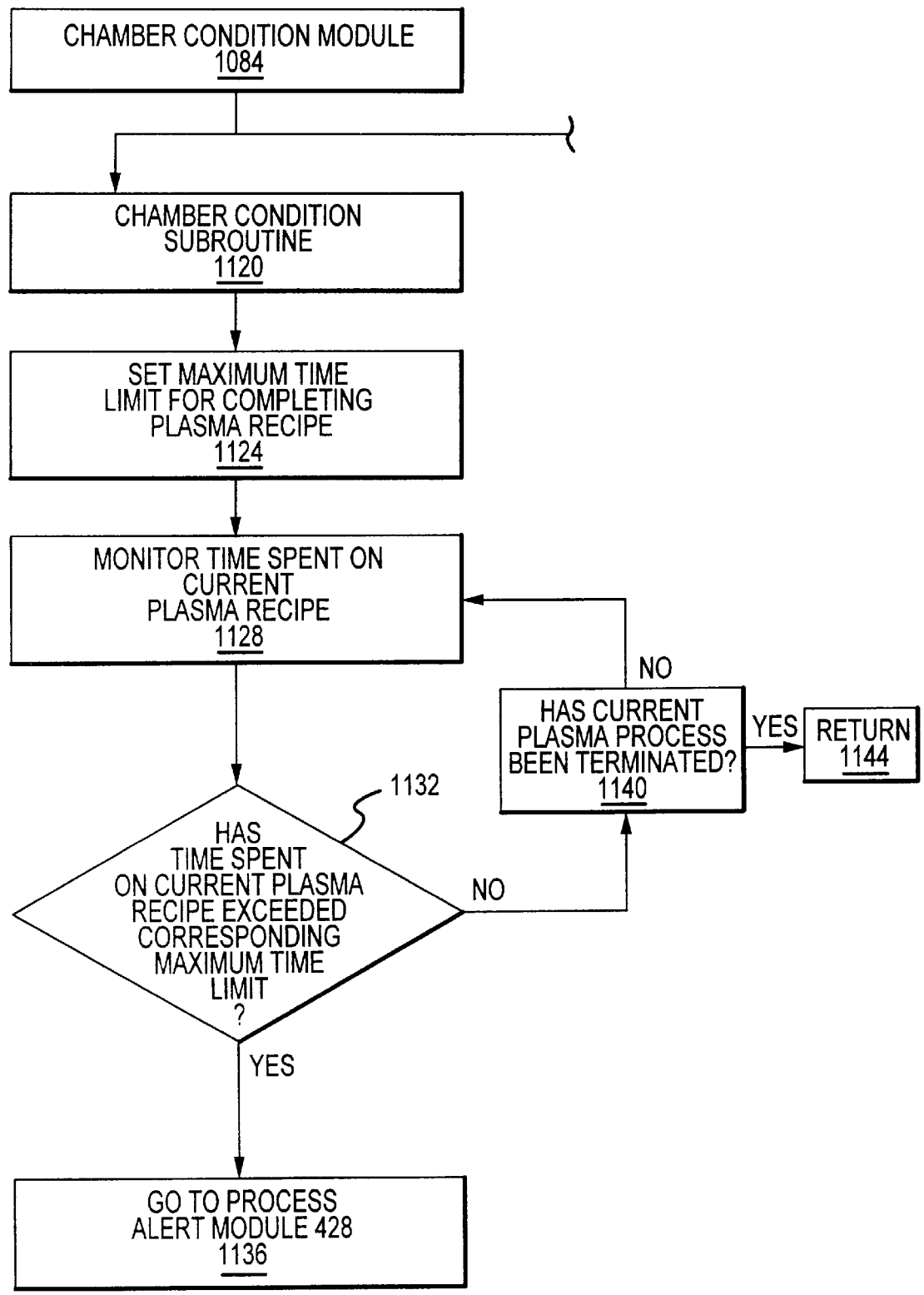
FIG. 29 is a flowchart of another embodiment of a chamber condition subroutine which may be incorporated in the chamber condition module of FIGS. 7 and 32.

Chamber Condition Module 1084—FIGS. 27–29

Another way of implementing spectra indicative of a dirty chamber condition is to include this data in a chamber condition subdirectory 300 and to utilize a chamber condition module 1084 which is separate from the plasma health module 252. One embodiment of a subroutine which may be used to monitor the condition of the chamber 36 through a comparative analysis with the chamber condition subdirectory 300 is illustrated in FIG. 27. There are a number of ways in which the chamber condition subroutine 406 of FIG. 27 may be implemented to monitor current plasma processes being run in the chamber 36. The loop 190 of the plasma health subroutine 253 of FIG. 16 may include protocol in its step 194 to call the chamber condition subroutine 406 of FIG. 27. That is, the subroutine 406 may be called by the plasma health subroutine 253 for each execution of step 254 of the subroutine 253 where a current spectra at the current time $t_c$ is obtained for the subroutine 253. This same spectra may then be made available to the chamber condition subroutine 406 through execution of step 410 of the subroutine 406. The pattern of this spectra may then compared with the pattern of spectra in the chamber condition subdirectory 300 at step 412 (step 408 of the subroutine 406 sets the Target Directory for the pattern recognition module 370 of FIG. 13 to the chamber condition subdirectory 300). More specifically, step 412 of the chamber condition subroutine 406 directs the subroutine 406 to go to the pattern recognition module 370 of FIG. 13. If the pattern of the spectra of the plasma in the processing chamber 36 at the then current time $t_c$ does not "match" the pattern of any spectra in the chamber condition subdirectory 300, the chamber condition subroutine 406 will proceed from step 414 to step 416. Control is then returned to the loop 190 of the plasma health subroutine 253 of FIG. 21 where the "clock" is adjusted by an increment of "n" at its step 278. Another spectra is then obtained for the chamber condition subroutine 406 at this new current time $t_c$ when step 194 of the loop 190 from the plasma health subroutine 253 of FIG. 21 is again encountered, which calls the chamber condition subroutine 406 of FIG. 27 for a repetition of the above-described analysis. Any of the subroutines 790, 852, 924, and 972 for providing plasma health evaluations may include this type of feature (not shown).

The chamber condition subroutine 406 of FIG. 27 will continue to execute in the above-noted manner until one of two conditions is met. The first is when plasma monitoring operations are terminated through the plasma health subroutine 253 of FIG. 21, such as when all of the data on the current plasma process has been evaluated and the plasma processing operations have been terminated. The second condition which will cause the termination of the chamber condition subroutine 406 in the above-described manner is when the pattern recognition module 370 indicates that there is a match between the spectra of the plasma in the processing chamber 36 at the then current time $t_c$ and at least one spectra in the chamber condition subdirectory 300. In this case the subroutine 406 will proceed from step 414 to step 418 where the chamber condition subroutine 406 of FIG. 44 transfers control to the process alert module 428 where any of the actions described above in relation to a dirty chamber condition may be initiated.

The chamber condition subroutine 406 may be run in parallel with the plasma health module 252 each time the plasma health module 252 is accessed (e.g., by having step 236 of the startup routine 203 also include protocol to call the chamber condition subroutine 4013). In this case, an additional step of adjusting the clock would have to be included, as well as a loop defined by this step as well as steps 410, 412, and 414 in a manner similar to the other subroutines presented herein.

There are ways of determining when the interior of the processing chamber 36 is in condition for cleaning other than comparing a pattern of a current spectra of the plasma in the chamber 36 against the pattern of a spectra which has been previously associated with a dirty chamber condition. One such way is implemented by the chamber condition subroutine 1088 presented in FIG. 28. The premise employed by the chamber condition subroutine 1088 is that the interior of the processing chamber 36 has degraded to the point where a cleaning operation should be employed when the time required to complete any plasma step of a multiple step plasma process takes longer than a time limit previously established for the plasma step. The time required to complete a plasma step may increase as the condition of the interior of the processing chamber 36 degrades. As an example, a given plasma step may take 30 seconds to achieve its desired/predetermined end result in a "clean" processing chamber 36, may take 50 seconds in a chamber 36 which is at an intermediate time in relation to a "cleaning" cycle, and may take in excess of 70 seconds under dirty chamber conditions. In some cases the processing chamber 36 may actually degrade to the point where the result of the plasma step may never be realized. Therefore, the chamber condition subroutine 1088 assumes that when a given plasma step takes longer than its associated time limit, the associated cause is the existence of a dirty chamber condition.

Since the chamber condition subroutine 1088 needs to "know" the identify of both the plasma process and the process step to execute its analysis, the chamber condition subroutine 1088 may be integrated in some manner with the operation of any one or more of the plasma health/process recognition subroutine 790 of FIG. 22, the plasma health/process recognition subroutine 852 of FIG. 23, or the plasma health/process recognition subroutine 924 of FIG. 24 (e.g., by being incorporated therein, by being called simultaneously therewith). In each of these cases, once the identity of the plasma process is determined, one will know each of the particular plasma steps which are included in this plasma process. In addition, the chamber condition subroutine 1088 may also be integrated in some manner with the plasma health/process step recognition subroutine 972 of FIG. 25 which identifies the current plasma step being executed in the chamber 36.

Referring to FIG. 28, a maximum time limit for each plasma step, if any, of the plasma process to be run in the chamber 36 should be obtained by the chamber condition subroutine 1088 at its step 1092. Personnel may manually input the maximum time limit for the subject plasma step(s) of the plasma process with the data entry device 132 for purposes of step 1092 of the chamber condition subroutine 1088. A more preferred approach is to include these time limits in the maximum total process step time field 322$f$ for the main data entry 350 of the plasma process as stored in the normal spectra subdirectory 288 (FIG. 12A). The maximum time limit may be empirically determined and input to the subject maximum total process step time field 322$f$. Alternatively, the limits referred to in step 1092 may simply coincide with a time in which the operator of the fabrication facility employing the wafer production system 2 has determined is necessary to maintain a desired production rate, which would then be input to the subject maximum total process step time field 322$f$. Information for step 1092 of the chamber condition subroutine 1088 may then be automatically retrieved from the corresponding maximum total process step time field 322$f$ of FIG. 12A which is associated with the current plasma process step being run in the chamber 36.

The amount of time required to complete each plasma step of the current plasma process being run in the processing chamber 36 is monitored at step 1096 of the chamber condition subroutine 1088. A process step clock (not shown) is started once the subject plasma step is initiated and will not stop until the termination of this plasma step. Step 1096 may utilize the endpoint detection module 1200 to be discussed below in relation to FIGS. 52–58 to identify the endpoint of the current plasma step. A comparison is made at step 1100 of the chamber condition subroutine 1088 between the time spent on the current plasma step from step 1096 and its associated maximum time limit from step 1092. So long as this limit has not yet been exceeded, the chamber condition subroutine 1088 will proceed to step 1108 where a determination is made as to whether the current plasma process has been terminated. Any continuation of the plasma process will allow the chamber condition subroutine 1088 to continue its analysis through execution of steps 1096 and 1100 as described. When the plasma process is terminated, however, the subroutine 1088 will proceed from step 110E, to step 1112 where control of plasma monitoring operations may be returned to, for instance, the startup module 202 of FIG. 15.

The chamber condition subroutine 1088 will continue to execute in the above-noted manner unless the time spent on the current plasma process step exceeds its corresponding maximum time limit. In this case the chamber condition subroutine 1088 will proceed from step 1100 to step 1104 where the process alert module 428 of FIG. 14 is called for a dirty chamber condition, and where the above-noted types of actions may then be undertaken. If the process alert module 428 of FIG. 14 is configured to return control to the module which called the module 428, the chamber condition subroutine 1088 may include a step after step 1104 to return control of plasma monitoring operations to, for instance, the startup module 202 of FIG. 15.

Another way of determining when the interior of the processing chamber 36 is in condition for cleaning is embodied by the chamber condition subroutine 1120 presented in FIG. 29 and which may be implemented in the same way as the chamber condition subroutine 1088 described above in relation to FIG. 28. The premise employed by the chamber condition subroutine 1120 is that the interior of the processing chamber 36 has degraded to the point where a cleaning operation should be employed when the time required to complete an entire plasma process (all of the plasma steps) takes longer than a time limit previously established for completing the plasma process. The time required to complete an entire plasma process may increase as the condition of the interior of the processing chamber 36 degrades, such as by the formation of deposits on its interior surfaces. As an example, a given plasma process may take 180 seconds to achieve its desired/predetermined result in a "clean" processing chamber 36, may take 220 seconds in a chamber 36 which is at an intermediate time in relation to a "cleaning" cycle, and may take in excess of 300 seconds when in a dirty chamber condition. In some cases the processing chamber 36 may actually degrade to the point where the desired end result of the plasma process may never be realized. Therefore, the chamber condition subroutine 1120 assumes that when a given plasma process takes longer than its associated time limit, the associated cause is the existence of a dirty chamber condition.

Since the chamber condition subroutine 1120 needs to "know" the identify of plasma process to execute its analysis, the chamber condition subroutine 1120 may be integrated in some manner with the operation of any one or more plasma health/process recognition subroutine 790 of FIG. 22, the plasma health/process recognition subroutine 852 of FIG. 23, or the plasma health/process recognition subroutine 924 of FIG. 24 (e.g., by being incorporated therein, by being called simultaneously therewith). In addition, the chamber condition subroutine 1088 may also be integrated in some manner with the plasma health/process step recognition subroutine 97:2 of FIG. 25 which also identifies the current plasma process being executed in the chamber 36, as well as the individual process step.

Referring to FIG. 29, a maximum time limit for the plasma process to be run in the chamber 36 is input to the chamber condition subroutine 1120 at its step 1124. Personnel may manually input the maximum time limit for the subject plasma process with the data entry device 132 for purposes of step 1124 of the chamber condition subroutine 1120. A more preferred approach is to include this time limit in the maximum total process time field 322$g$ for the main data entry 350 of the subject plasma process as stored in the normal spectra subdirectory 288. The maximum time period may be empirically determined and input to the subject maximum total recipe time field 322$g$. Alternatively, the limit referred to in step 1124 may simply coincide with a time in which the operator of the fabrication facility employing the wafer production system 2 has determined is necessary to maintain a desired production rate, which would then be input to the subject maximum total recipe time field 322$g$. Information for step 1124 may then be automatically retrieved from the corresponding maximum total process time field 322$g$ of FIG. 12A which is associated with the current plasma process being run in the chamber 36.

The amount of time required to complete the current plasma process being run in the processing chamber 36 is monitored at step 1128 of the chamber condition subroutine 1120. A recipe clock (not shown) is started once the plasma process is initiated (e.g., when the plasma comes "on" in the chamber 36) and will not stop until the plasma process is terminated (e.g., when the plasma goes "off" in the chamber 36). Step 1128 may also utilize the endpoint detection module 1200 to be discussed below in relation to FIGS. 52–58. A comparison is made at step 1132 of the chamber condition subroutine 1120 between the time spent on the current plasma process from step 1128 and its associated maximum time limit from step 1124. So long as this limit has not yet been exceeded, the chamber condition subroutine 1120 will proceed to step 1140 where a determination is made as to whether the current plasma process has been terminated. Any continuation of the plasma process will allow the chamber condition subroutine 1120 to continue its analysis through execution of steps 1128 and 1132 in the described manner. When the plasma process is terminated, however, the subroutine 1120 will proceed from step 1140 to step 1144 where control of plasma monitoring operations may be returned to, for instance, the startup module 202 of FIG. 15.

The chamber condition subroutine 1120 will continue to execute in the above-noted manner unless the time spent on the current plasma process exceeds its corresponding maximum time limit. In this case the chamber condition subroutine 1120 will proceed from step 1132 to step 1136 where the process alert module 428 of FIG. 14 is called based upon a dirty chamber condition, and where the above-noted actions may be undertaken. If the process alert module 428 of FIG. 14 is configured to return control to the module which called the module 428, the chamber condition subroutine 1120 may include a step after step 1136 to return control of plasma monitoring operations to, for instance, the startup module 202 of FIG. 15.

Exemplary Spectra of Cleaning Procedure—FIGS. 30A–D)

Figure 30A:
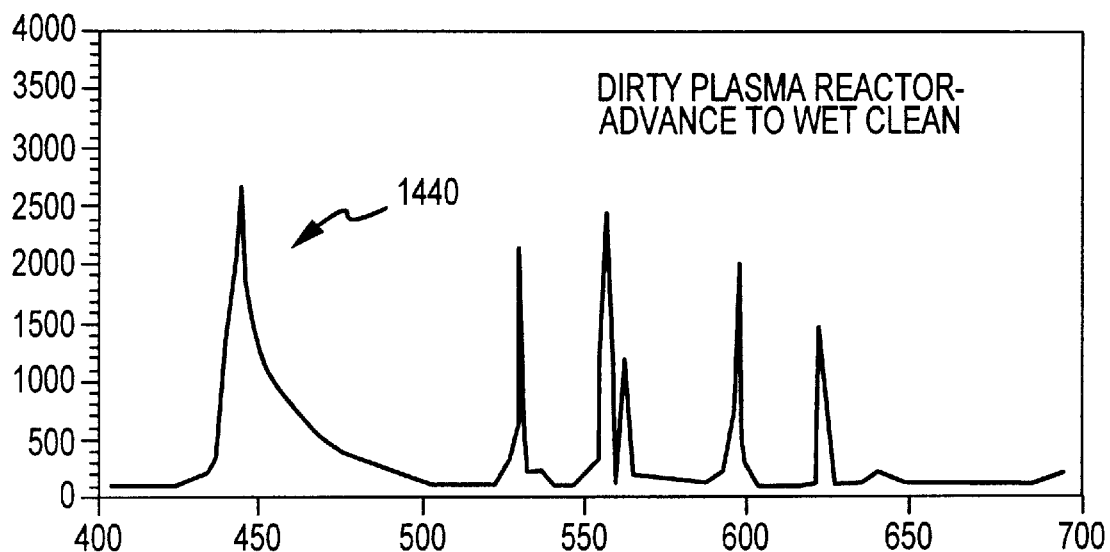
FIGS. 30A–D are exemplary spectra from the processing chamber in a "dirty chamber" condition, at the end of a wet clean, at the end of a plasma clean, and at the end of a conditioning wafer operation, respectively.
Figure 30B:
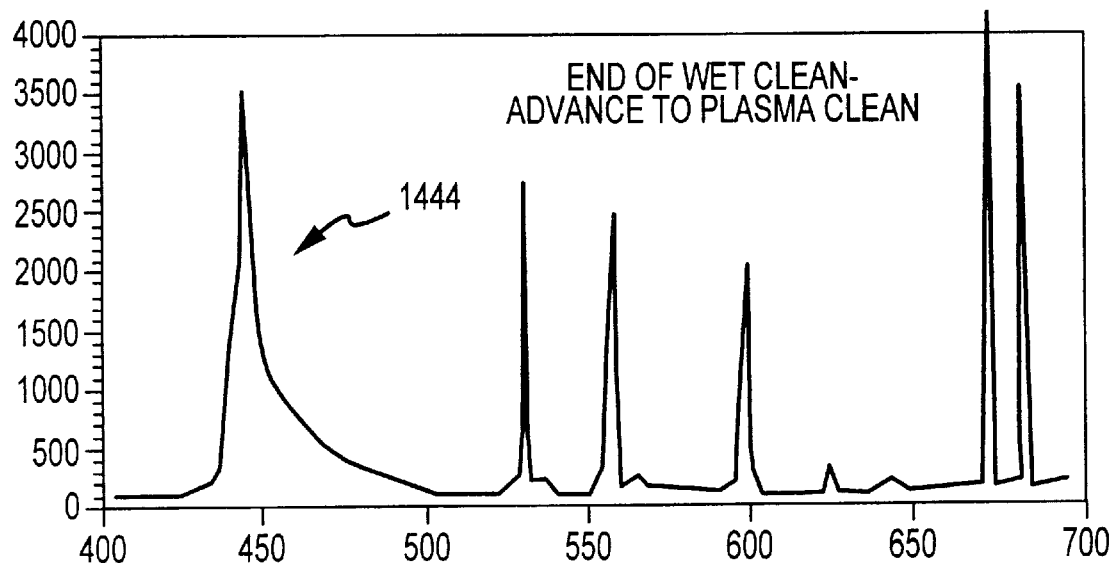

Some time after a "dirty chamber condition" has been identified in any of the above-noted manners, the chamber 36 will undergo a cleaning operation of some type. FIGS. 30A–D illustrate the differences in the spectral patterns of the plasma in the chamber 36 at various stages to illustrate how the current plasma process module 250 not only can evaluate the health of the subject plasma process, but how it can distinguish between different types of plasma processes through spectral analysis. FIG. 30A is an exemplary spectra of a plasma recipe being conducted in a processing chamber 36 which has been determined to be in need of a cleaning operation. Compare this spectra 1440 of FIG. 30A with the spectra 1450 of FIG. 30D which is this same plasma recipe in this same processing chamber 36, but when in a clean condition and after a conditioning wafer operation has been completed to prepare the chamber 36 for processing production wafers 18. Note the different intensities of the peaks in these two spectras 1440 and 1450 at the various wavelengths. There are two strong peaks around the 550 nanometer wavelength region in the spectra 1440 of FIG. 30A, compared to only one strong peak in this wavelength region of the spectra 1450 of FIG. 30D. Also note the existence of a strong peak in the spectra 1440 of FIG. 30A at about the 625 nanometer wavelength region, compared with no strong peak in the spectra 1450 of FIG. 30D. These differences can be readily identified to in turn identify when the processing chamber 36 should be cleaned in at least some manner.

The cleaning protocol illustrated in FIG. 30 starts with a wet clean where the chamber 36 is vented and opened such that interior surfaces of the chamber 36 may be wiped with one or more appropriate solvents. A plasma cleaning operation may have been previously run in the chamber 36, but may have been unable to adequately address the condition of the interior of the chamber 36 to the desired degree. After the wet clean, the chamber 36 is resealed and a plasma is introduced into the chamber 36 with no product therein. The spectra 1444 of FIG. 30B is of an exemplary plasma within the processing chamber 36 with no product therein at the start of such a plasma cleaning operation. Compare this spectra 1444 from FIG. 30B with the spectra 1448 of FIG. 30C; which is this same plasma in this same processing chamber 36, but after all of the residuals from the wet clean have been removed by the plasma clean. Note the different intensities of the peaks in these two spectras 1444 and 1448 at the various wavelengths, particularly between the 650 and 750 nanometer wavelength region where the spectra 1444 FIG. 30B has two substantial peaks and where the intensity of these same peaks are significantly reduced in the spectra 1448 of FIG. 30C.

Figure 30C:
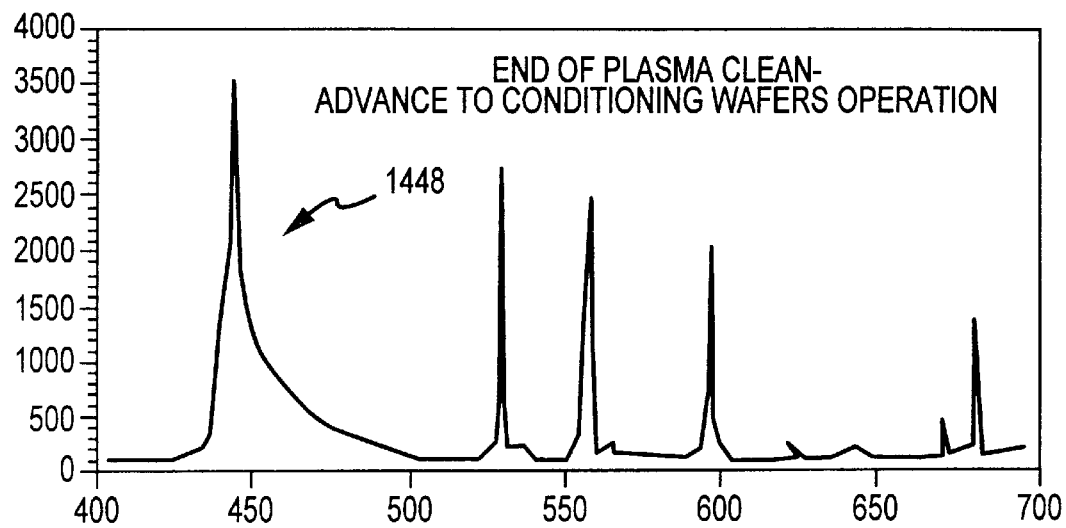
Figure 30D:
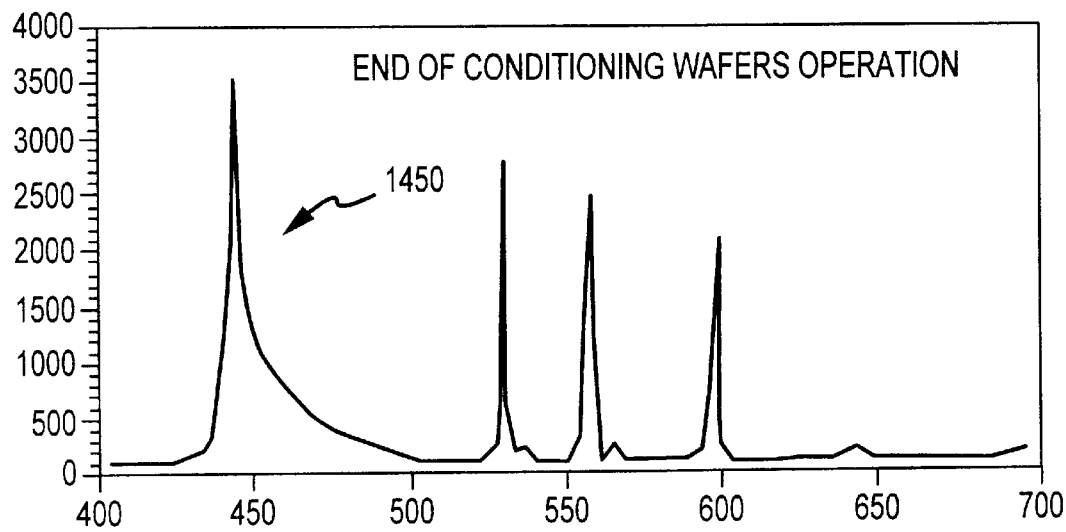

Finally, compare the spectra 1448 at the end of plasma clean and the spectra 1450 at the end of a conditioning wafer operation. The spectra 1448 of FIG. 30C is of an exemplary plasma within the processing chamber 36 at the end of a plasma clean of the chamber 36 which has appropriately addressed the residuals of the wet clean. Compare this spectra 1448 from FIG. 30C with the spectra 1450 of FIG. 30D which is this same plasma in this same processing chamber 36, but after a number of conditioning wafers have been processed in the chamber 36. Note the different intensities of the peaks in these two spectras 1448 and 1450 at the various wavelengths, particularly between the 650 and 750 nanometer wavelength region where the spectra 1448 of FIG. 30C has two peaks and where the spectra 1450 of FIG. 30D has no peaks in this region.

Plasma Monitoring Assembly 500—FIGS. 31–36

Degradation of the interior of the processing chamber 36 from plasma processes run therein also degrades the inner surface 40 of the window 38 on the chamber 36 which is exposed to the plasma (the outer surface 42 being isolated from the plasma, and thereby not affected by the plasma). Recall that data for the current plasma process module 250 in the nature of optical emissions of the plasma in the chamber 38 is obtained through the window 38. Therefore, as the window 38 degrades, so to may the reliability of the results of the current plasma process module 250. An embodiment which addresses this condition, as well as other conditions which may adversely impact the reliability of the results provided by the current plasma process module 250, is presented in FIG. 31 in the nature of the plasma monitoring assembly 500.

Figure 31:
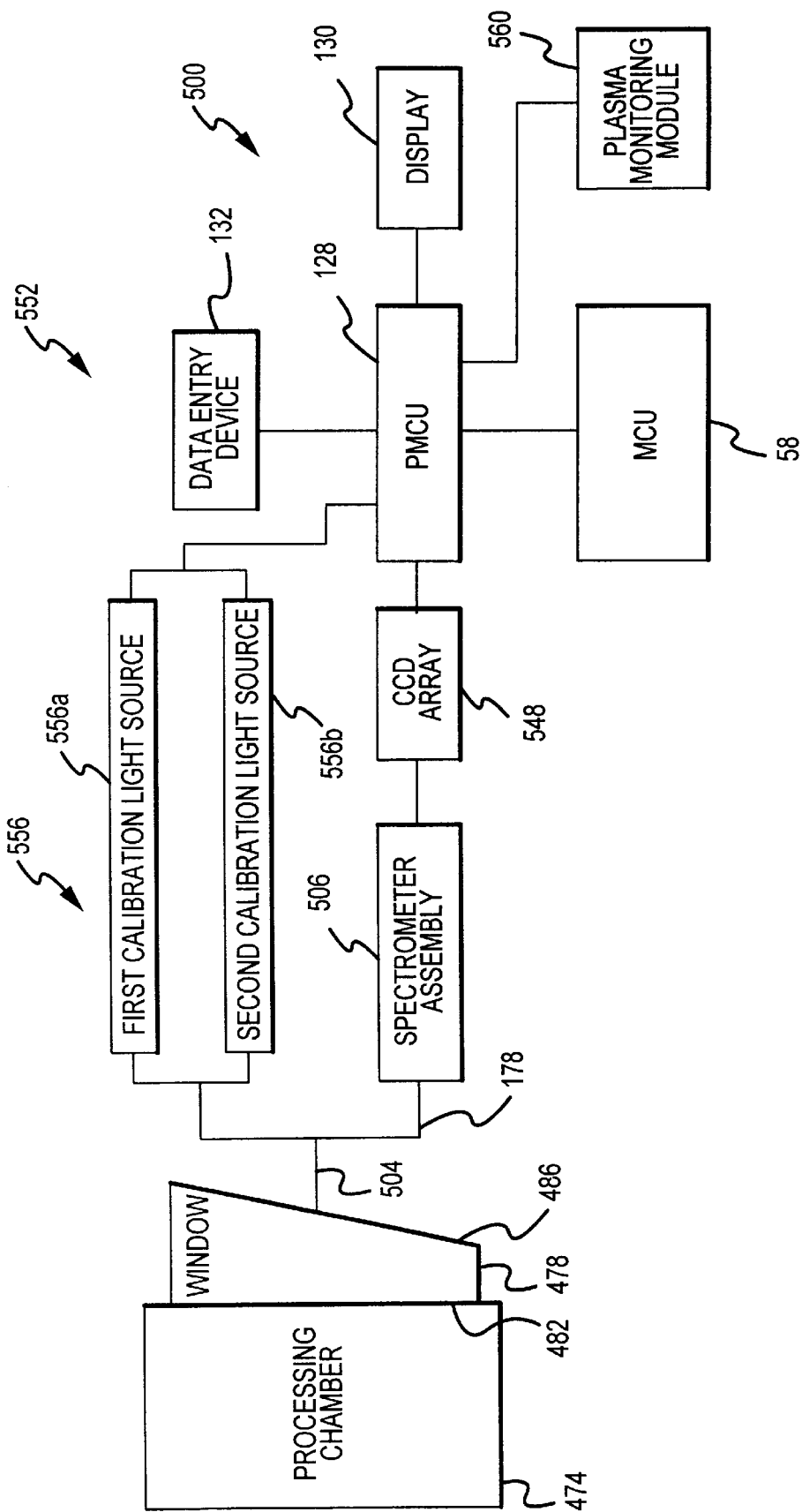
FIG. 31 is a schematic view of another embodiment of a plasma monitoring assembly which may be incorporated in the wafer production system of FIG. 1, which includes the current plasma process module from FIG. 7 above, and which also includes a calibration module.

The plasma monitoring assembly 500 of FIG. 31 includes all of the features discussed above in relation to the plasma monitoring assembly 174 of FIG. 6. In this regard, the plasma monitoring assembly 500 includes a plasma monitoring module 560 (FIGS. 31–32), which includes all of the same modules as identified above in relation to the plasma monitoring module 200 of FIG. 7 and which is part of the PMCU 128' (e.g., the same current plasma process module 250 and all of its submodules). Moreover, the spectrometer assembly 506 and CCD array 548 are also the same in relation to the similarly identified components of the plasma monitoring assembly 174 of FIG. 6. Increases in the accuracy of the evaluation of plasma processes by the current plasma process module 250 are available by obtaining the data for the module 250 through the plasma monitoring assembly 500 because of its calibration capabilities. Specifically, the plasma monitoring assembly 500, and more specifically its plasma monitoring module 560, includes a window monitoring or calibration assembly 552 which includes a window monitoring or calibration module 562 which is also part of the plasma monitoring module 560 as illustrated in FIG. 32. The PMCU 128' is therefore the same as presented above in relation to the plasma monitoring assembly 174 of FIG. 6, except that it includes this additional feature in relation to the calibration module 562. As such, the "prime" designation is utilized in relation to the PMCU 128 of FIG. 31.

The calibration assembly 552 provides certain advantages for the plasma monitoring assembly 500 of FIG. 31 over the plasma monitoring assembly 174 of FIG. 6. The calibration assembly 552 of FIG. 31 provides two main functions. One of these functions is to calibrate the current plasma process module 250 (FIGS. 7 and 32) for any wavelength shift of the spectra of the plasma within the processing chamber 36. Wavelength shifts may be attributed to the spectrometer assembly 506, but may also exist for other reasons. Another function provided by the calibration assembly 552 of FIG. 31 is to calibrate the current plasma process module 250 for any intensity shift of the spectra of the plasma within the processing chamber 36. Intensity shifts may be due to an "aging" of the window 38 on the chamber 36 through which optical emissions are obtained, but may also be due to other conditions. Since the window 478 in FIG. 31 has a different configuration than the window 38 presented in FIG. 6, a different reference numeral is used not only for the window, but for the processing chamber as well. Therefore, the processing chamber of FIG. 31 identified by the reference number 474 may b e used in place of one or more of the chambers 36 presented in FIG. 1.

The calibration assembly 552 of FIG. 31 includes a calibration light source 556 which is operatively interfaced with the window 478 of the processing chamber 474 by a fiber optic cable assembly 504. In one embodiment this calibration light 556 source actually has e first calibration light source 556*a* and a second calibration light source 556*b*. The first calibration light source 556*a* uses a first type of light to identify wavelength shifts associated with the plasma monitoring assembly 500. Intensity shifts are identified through the second calibration light source 556*b* which uses a second type of light which is different than the first type of light. Benefits associated with the use of two different types of light for identifying wavelength and intensity shifts, respectively, will be addressed in relation to the calibration module 562 and FIGS. 40–48. Although not preferred, the same type of light could be used to identify both intensity and wavelength shifts (e.g., light having a plurality of discrete intensity peaks).

The fiber optic cable assembly 504 also operatively interfaces the window 478 with the spectrometer assembly 50 6 such that the window monitoring assembly 552 is able to directly monitor the condition of the window 478. Generally, a calibration light is directed to the window 478 from the calibration light source 556 through the fiber optic cable assembly 504, preferably when there is no plasma within the processing chamber 474. As such, operation of the calibration assembly 552 is not dependent in any manner on the plasma within the chamber and its data is in fact independent of any data relating to the plasma. A portion of the calibration light is reflected by the window 478 and is directed by the fiber optic cable assembly 504 to the spectrometer assembly 506.

Figure 33:
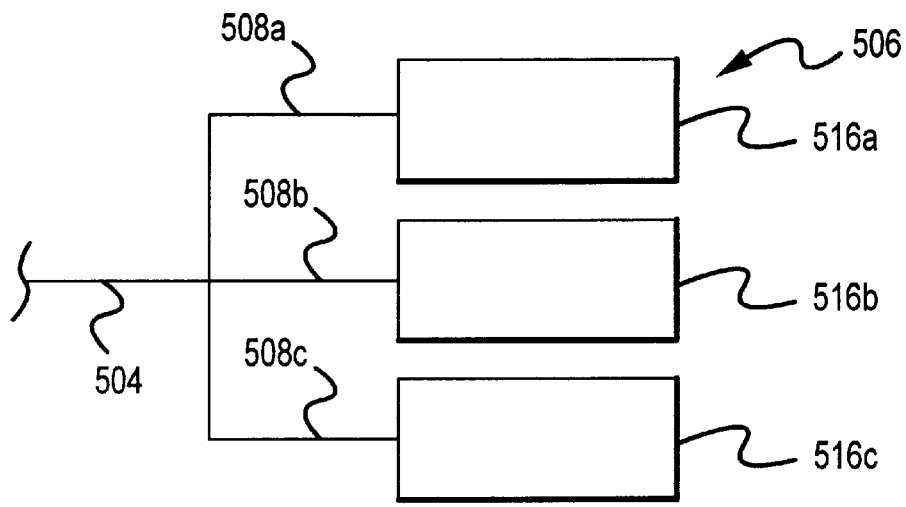
FIG. 33 is a schematic view of one embodiment of the spectrometer assembly of FIG. 31.
Figure 35:
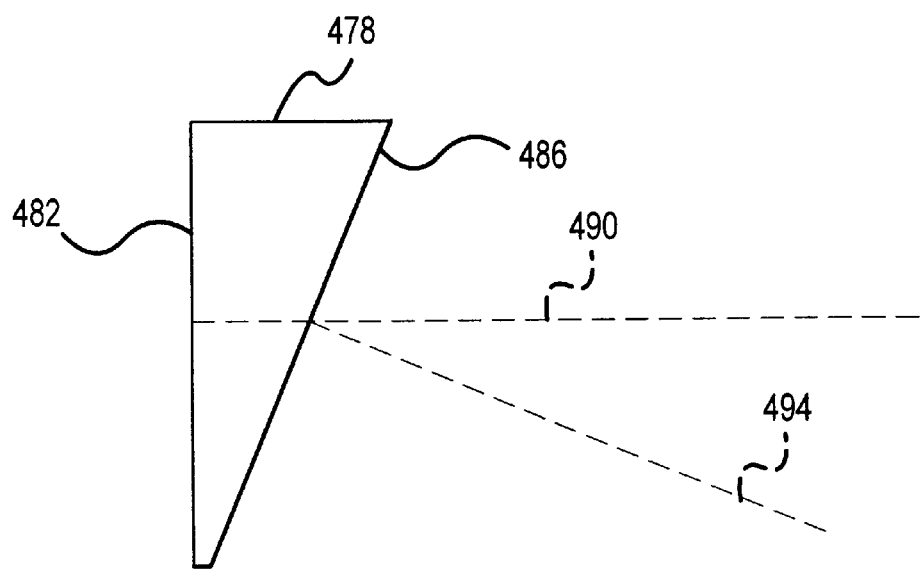
FIG. 35 is a schematic view of the axes of the calibration light sent and reflected by the inner and outer surfaces of the window of FIG. 31.

The spectrometer assembly 506 of FIG. 31 preferably is of the solid-state type, and in one embodiment includes three individual solid state spectrometers 516*a–c*, each of which analyzes a different wavelength region and as illustrated in FIG. 33. In this case, the spectrometer 516*a* may analyze the 246 nanometer to 570 nanometer region, the spectrometer 516*b* may analyze the 535 nanometer to 815 nanometer region, and the spectrometer 516*c* may analyze the 785 nanometer to 1014 nanometer region. The overlap between these individual spectrometers 516 once again facilitates alignment of the three spectral segments and reduces the potential for losing optical emissions data at the transition zones. Each of these spectrometers 516 are interconnected in effectively parallel relation by the fiber optic cable assembly 504 which is illustrated in more detail in FIG. 34.

Figure 34:
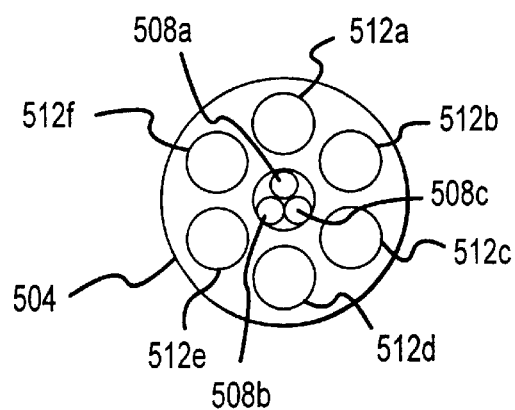
FIG. 34 is one embodiment of the fiber optic cable assembly which operatively interfaces the window and plasma monitoring assembly in FIG. 31.

The fiber optic cable assembly 504 of FIG. 34 includes three inner cables 508 surrounded by six outer cables 512. Light from the calibration light source 556 is directed to the window 478 through the outer cables 512 during calibration operations to be discussed below in relation to the calibration module 562 of FIGS. 40–48, while light reflected by the window 478 (as well as light from within the chamber 474 during the running of plasma processes within the chamber 474 for that matter, at which time the calibration assembly 552 is not activated or running) is directed to the spectrometer assembly 506 through the inner cables 508 of the fiber optic cable assembly 504. One inner cable 508 of the fiber optic cable assembly 504 is directed to each of the spectrometers 516 of the spectrometer assembly 506 as illustrated in FIG. 33. This data received by the spectrometer assembly 506 from the calibration light source 556 is directly from the inner surface 482 of the window 474, and therefore it is proper to characterize the calibration assembly 552 as directly monitoring the condition of the inner surface of the window 478.

One function of the calibration assembly 552 is to determine the effect, if any, that the inner surface 482 of the window 478 is having on the light being emitted from the processing chamber 474 during plasma processes since this light is used by the current plasma process module 250. The calibration assembly 552 also addresses the presence of the outer surface 486 of the window 478. As can be seen in FIG. 31 and in FIG. 35, the outer surface 486 and inner surface 482 of the window 478 are disposed in a non-parallel relationship. Stated another way and as illustrated in both FIGS. 31 and 35, the inner surface 482 of the window 478 is disposed at least substantially perpendicular to a reference axis 490 which coincides with the primary axis of the light from the calibration light source 556 as it is directed toward the window 478, whereas the outer surface 486 of the window 478 is disposed in non-perpendicular relation to this reference axis 490. In one embodiment, the angle between the reference axis 490 and the outer surface 486 of the window 478 is within the range of about 2° to about 45°, and in another embodiment this angle is less than the critical angle. This relative positioning of the inner surface 482 and outer surface 486 of the window 478 has the effect of having that portion of the calibration light, which is reflected by the outer surface 486 of the window 478, be directed away from the axis 490 and thereby away from the inner cables 508 of the fiber optic cable assembly 504 which lead to the spectrometer assembly 506. Therefore, when a calibration light is sent from the calibration light source 556 to the window 478 through the outer cables 512 of the fiber optic cable assembly 504, the only significant portion of light which the inner cables 508 of the fiber optic cable assembly 504 "sees" is the light which is reflected by the inner surface 482 of the window 478—not from the outer surface 486 of the window 478. The inner surface 482 of the window 478 is that which is affected by conducting plasma processes within the processing chamber 474, and which thereby affects the light which is emitted from the processing chamber 474 through the window 478. Therefore, the light received by the spectrometer assembly 506 during calibration operations by the window monitoring assembly 552 presents a more accurate depiction of the condition of the inner surface 482 of the window 486. Further enhancement may be realized by incorporating a broad band anti-reflection coating (e.g., of multiple-layer or laminated construction) on the outer surface 486 of the window 478 at least in that region where the calibration light impacts the outer surface 486. These types of coatings increase the amount of the calibration light which passes through the outer surface 486 of the window 478 to the inner surface 482 by reducing the amount of the calibration light which is reflected by the outer surface 486.

Figure 36:
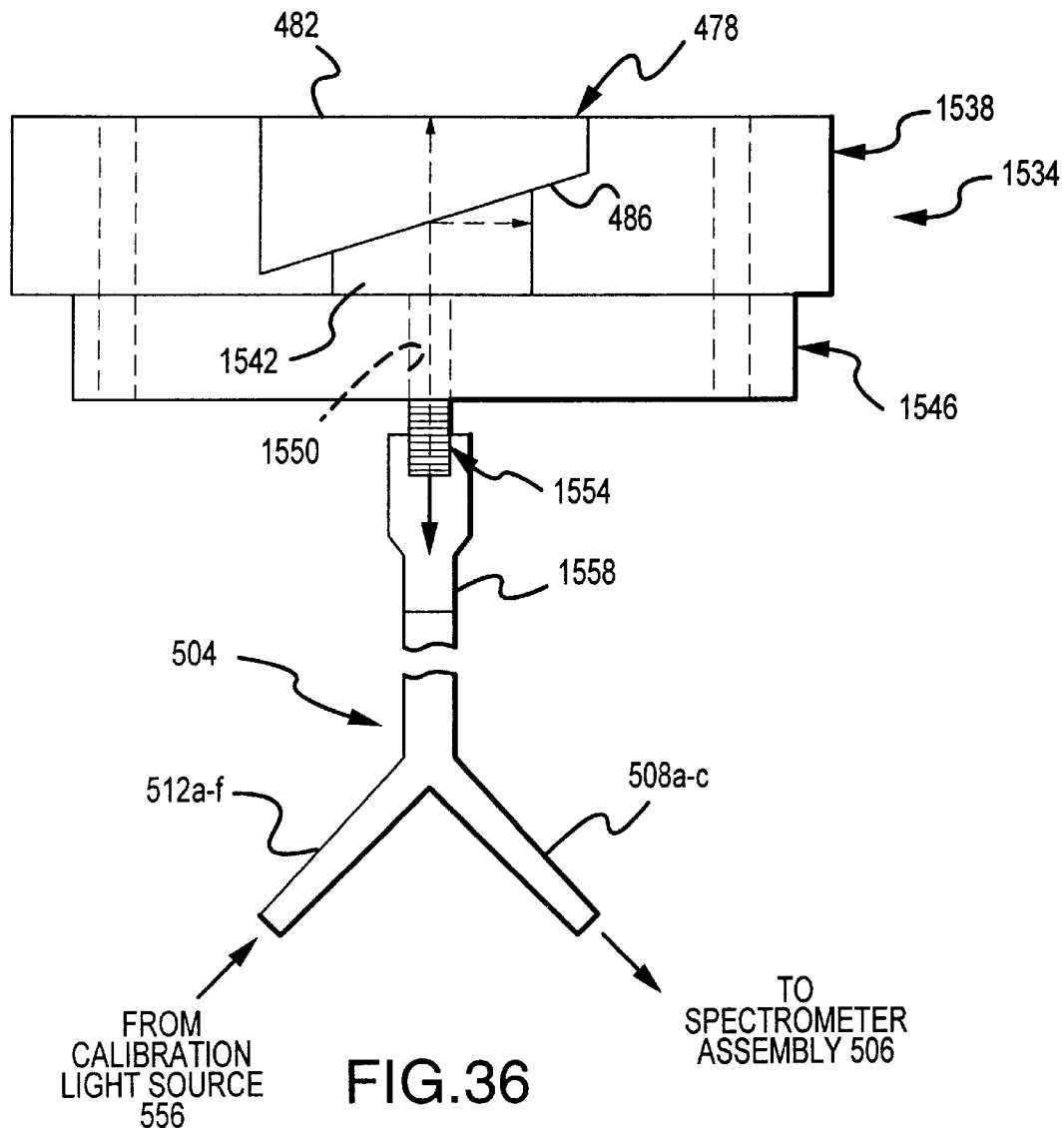
FIG. 36 is one embodiment a fixture assembly for interconnecting the fiber optic cable assembly of FIG. 34 with the window on the processing chamber presented in FIG. 31.

Maintaining a proper relative positioning between the fiber optic cable assembly 504 and the window 478 on the chamber 474 is important to the operation of not only the calibration module 562, but the current plasma process module 250 as well. One way of interconnecting the fiber optic cable assembly 504 and the window 478 is illustrated in FIG. 36 in the nature of a fixture assembly 1534. The fixture assembly 1534 includes a window fixture 1538 which securely retains the window 478 and allows for detachable interconnection of the same with the processing chamber 474 (e.g, via one or more threaded fasteners). A cavity or recess 1542 exists within an interior portion of the window fixture 1538 and interfaces with the outer surface 486 of the window 478. Surfaces of the window fixture 1538 which define the recess 1542 are black anodized so as to absorb any portion of the calibration light from the calibration light source 506 which is reflected by the outer surface 486 of the window 478 during calibration operations. Light absorbing coatings could also be utilized to provide this function.

The fixture assembly 1534 also includes a fiber fixture 1546 which is appropriately interconnected (e.g., detachably) with the window fixture 1538 (e.g., via one or more threaded fasteners). The recess 1542 in the window fixture 1538 is thereby a closed space in the assembled condition via the outer surface 486 of the window 478 and a portion of the back side of the fiber fixture 1546. Appropriate treatment of the portion of the fiber fixture 1546 which closes the recess 1542 may also be implemented to reduce the potential for that portion of the calibration light which is reflected by the outer surface 486 of the window 478 interfering with that portion of the calibration light which is reflected by the inner surface 482 of the window 478 and provided to the spectrometer assembly 506 via the fiber optic cable assembly 504.

The fiber optic cable assembly 504 is removably or detachably interconnected with the fiber fixture 1546 by a fiber fixture coupling 1554 on the fiber fixture 1546 and a cable coupling 1558 on an end of the fiber optic cable assembly 504 which houses both the inner cables 508 and the outer cables 512 (FIG. 34). The ends of the inner cables 508 and outer cables 512 project toward the outer surface 486 of the window 478 in axial alignment with a port 1550 which extends through the fiber fixture 1546 to intersect the recess 1542 in the window fixture 1538. Therefore, calibration light from the calibration light source 556 is directed through the outer cables 512, through the port 1550 in the fiber fixture 1546, through the recess 1542 in the window fixture 1538, and to the outer surface 486 of the window 478. Calibration light which is reflected by the inner surface 482 of the window 478 travels through the recess 1542 in the window fixture 1538, through the port 1550 in the fiber fixture 1546, into the inner cables 508 of the fiber optic cable assembly 504, and to the spectrometer assembly 506. The particular manner in which calibration operations are undertaken using the foregoing arrangement is addressed in relation to the calibration module 562 of FIGS. 40–48.

Figure 37:
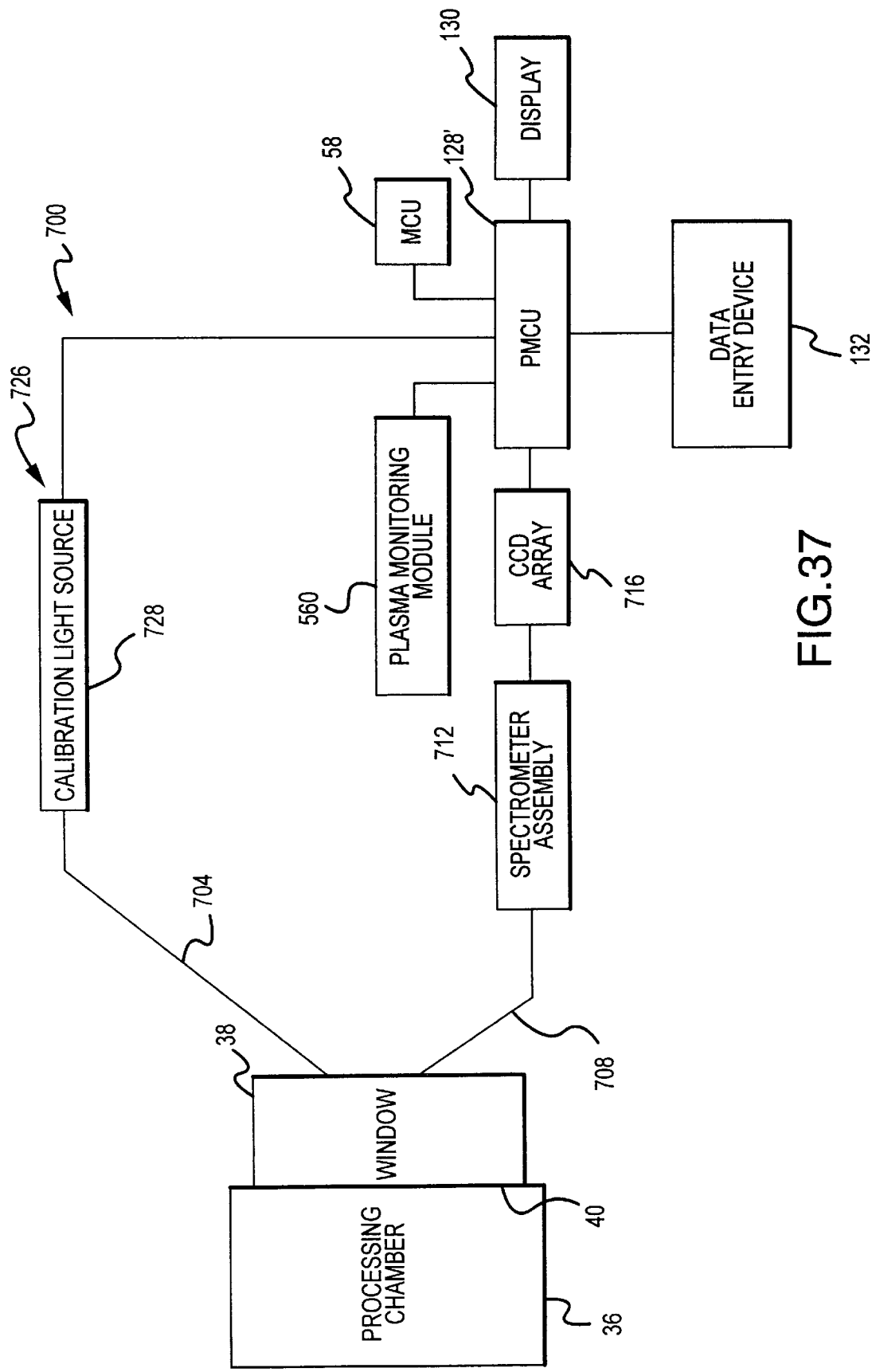
FIG. 37 is a schematic view of another embodiment of a plasma monitoring assembly which may be incorporated in the wafer production system of FIG. 1, which includes the current plasma process module from FIG. 7 above, and which also includes a calibration module.
Figure 38:
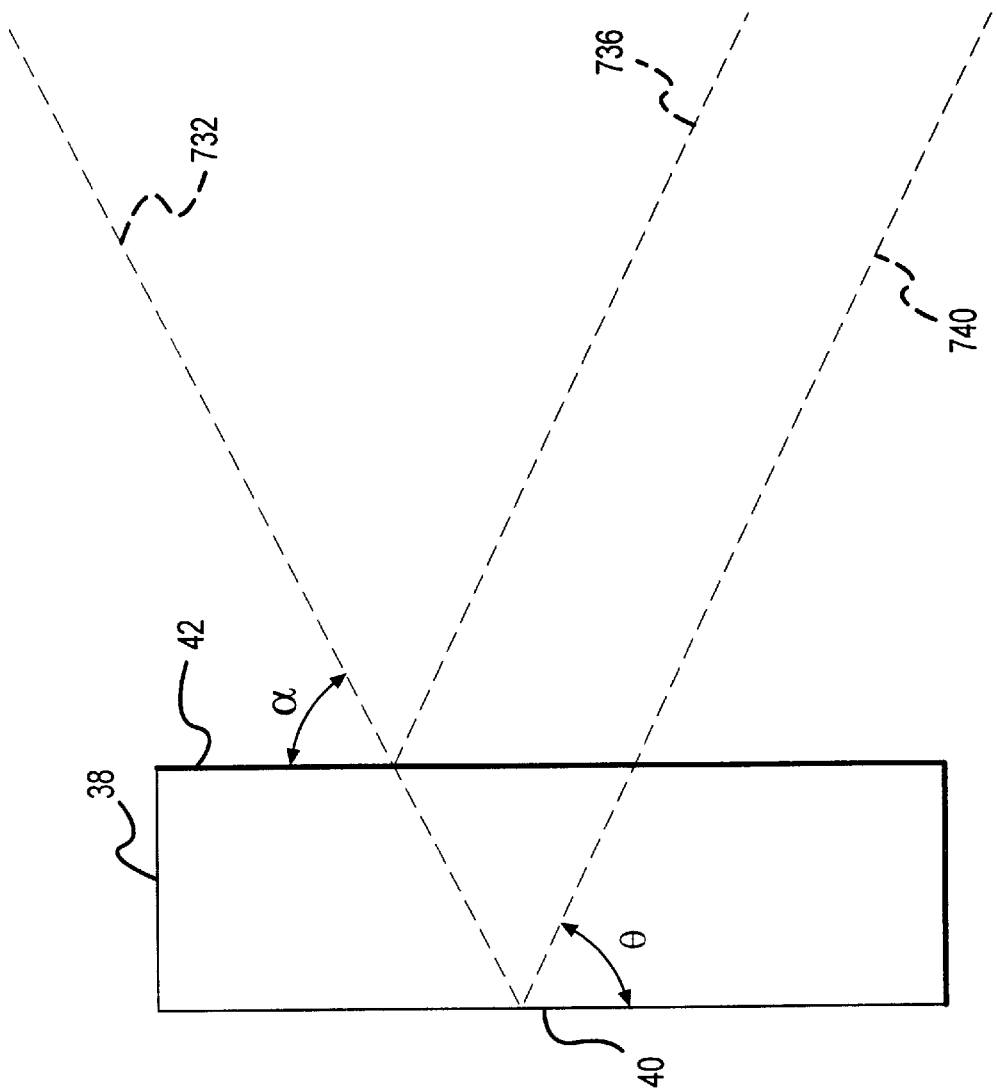
FIG. 38 is a schematic view of the axes of the calibration light sent and reflected by the inner and outer surfaces of the window of FIG. 37.
Figure 39:
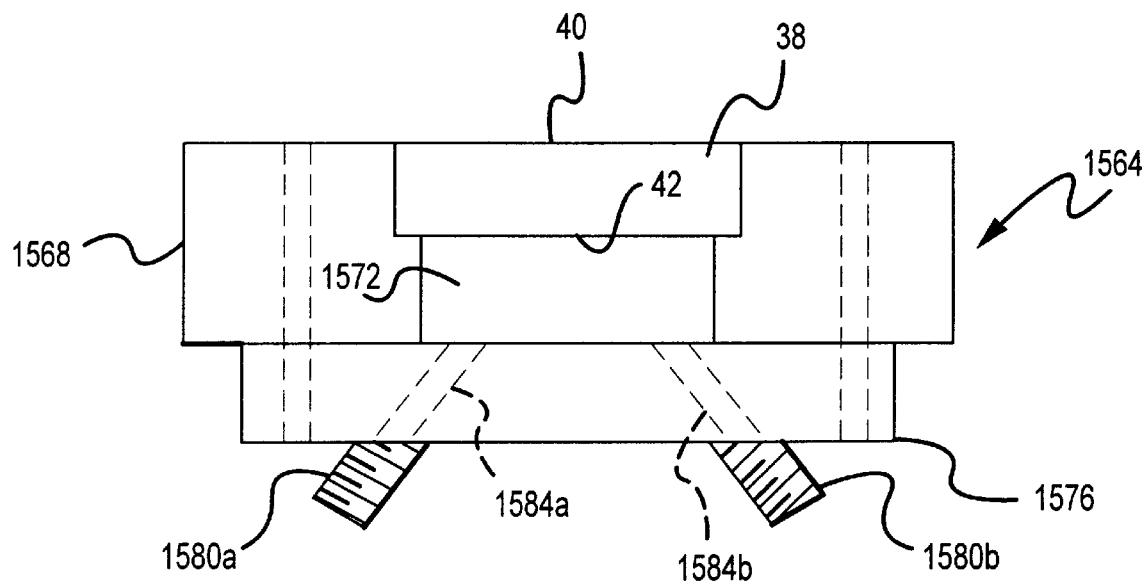
FIG. 39 is one embodiment a fixture assembly for interconnecting the fiber optic cables with the window on the processing chamber in the configuration presented in FIG. 37.

Plasma Monitoring Assembly 700—FIGS. 37–39

Another embodiment of a plasma monitoring assembly which also reduces the potential for that portion of the calibration light which is reflected by the outer surface of the window interfering with that portion of the calibration light which is reflected by the inner surface of the window and provided to the calibration module 562 (FIG. 32) is illustrated in FIG. 37. This embodiment may be used in place of the plasma monitoring assembly 500 of FIG. 31 although the configuration presented in FIG. 31 is more preferred. The plasma monitoring assembly 700 of FIG. 37 generally includes a calibration assembly 726, the calibration module 562 (FIG. 32) which is part of the PMCU 128' (FIG. 1 and 32), and the plasma monitoring module 560 (FIGS. 32 and 37). The spectrometer assembly 712, CCD array 716, and calibration light source 728 are the same in relation to the similarly identified components of the FIG. 31 embodiment. Consequently, the plasma monitoring assembly 700 of FIG. 37 differs from the plasma monitoring assembly 500 of FIG. 31 principally in relation to the optical arrangement of the calibrating componentry.

One function of the calibration assembly 726 is to determine the effect, if any, that the inner surface 40 of the window 38 is having on the light being emitted from the processing chamber 36. The calibration assembly 726 also addresses the presence of the outer surface 42 of the window 38. As illustrated in FIGS. 37–38, the window 38 on the processing chamber 36 includes an inner surface 40 and outer surface 42 which are disposed in substantially parallel relation (as illustrated in FIGS. 1 and 6). In order to reduce the effects that light reflected by the outer surface 42 will have on the calibration module 562, the calibration assembly 726 uses a fiber optic cable 704 to operatively interface the calibration light source 728 and the window 38, and another fiber optic cable 708 to operatively interface the window 38 and the spectrometer assembly 712. The fiber optic cable 704 is disposed to have light from the calibration light source 728 impact the outer surface 42 of the window 38 at an angle other than perpendicular, and the fiber optic cable 708 is disposed to receive only that portion of the calibration light which is reflected by the inner surface 40 of the window 38 and not any light which is reflected by the outer surface 42 of the window 38. This is illustrated in FIG. 38 where the axis 732 corresponds with the orientation of the light from the calibration light source 728 as it impacts the window 38, where the axis 736 corresponds with that portion of the calibration light which will be reflected by the outer surface 42 of the window 38, and where the axis 740 corresponds with that portion of the calibration light which will be reflected by the inner surface 40 of the window 38 (refraction not being shown). In one embodiment, the angle α between the axis 732 and the outer surface 42 of the window 38 ranges from about 10° to about 70°, the angle θ between the axis 740 and the inner surface 40 of the window 38 ranges from about 10° to about 70°, and the axes 736 and 740 are offset by an amount ranging from about 2 mm to about 20 mm.

The above-noted relative positioning of the inner surface 40 of the window 38, the outer surface 42 of the window 38, the fiber optic cable 704, and the fiber optic cable 708 has the effect of having that portion of the calibration light, which is reflected by the outer surface 42 of the window 38, be reflected in a manner so as to not enter the fiber optic cable 708. Therefore, when a calibration light is sent from the calibration light source 728 to the window 38 through the fiber optic: cable 704, the only significant portion of light which the fiber optic cable 708 "sees" is the light which is reflected by the inner surface 40 of the window 38—not light from the outer surface 42 of the window 38. The inner surface 40 of the window 38 is that which is affected by conducting plasma processes within the processing chamber 36, and which thereby affects the light which is emitted from the processing chamber 36 through the window 38. Therefore, the light received by the spectrometer assembly 712 during calibration operations by the window monitoring assembly 700 presents a more accurate depiction of the condition of the inner surface 40 of the window 36.

Further enhancement of the arrangement presented in FIG. 37 may be realized by incorporating a broad band anti-reflection coating (e.g., of multiple-layer or laminated construction) on the outer surface 42 of the window 38 at least in that region where the calibration light impacts the outer surface 42. These types of coatings increase the amount of the calibration light which passes through the outer surface 42 of the window 38 to the inner surface 40 by reducing the amount of the calibration light which is reflected by the outer surface 42. In fact, the embodiment presented in FIG. 31 could be used with the type of window presented in the FIG. 37 embodiment where the above-noted coating is included on the window 38 and with the ends of the fiber optic cable assembly 504 projecting toward the window 38 to form at least a substantially perpendicular angle relative to both the outer surface 42 and the inner surface 40. This arrangement is less preferable in that notwithstanding the presence of an anti-reflection coating on the outer surface 42 of the window 38, some portion of the calibration light will still be reflected back toward the inner cables 508 of the fiber optic cable assembly 504 in this variation (not shown). There will thereby be some interference with that portion of the calibration light which is reflected by the inner surface 40 of the window 38 back to the inner cables 508.

Maintaining a proper relative positioning between the fiber optic cable 704, the fiber optic cable 708, and the window 38 on the chamber 36 with the FIG. 37 embodiment is important to the operation of not only the calibration module 562, but the current plasma process module 250 as well. One way of interconnecting the foregoing is illustrated in FIG. 39 in the nature of a fixture assembly 1564. The fixture assembly 1564 includes a window fixture 1568 which securely retains the window 38 and allows for interconnection of the same with the processing chamber 36 (e.g, via one or more threaded fasteners). A cavity or recess 1572 exists within an interior portion of the window fixture 1568 and interfaces with the outer surface 42 of the window 38.

The fixture assembly 1564 also includes a fiber fixture 1576 which is appropriately interconnected with the window fixture 1568 (e.g., via one or more threaded fasteners). The recess 1572 in the window fixture 1568 is thereby a closed space in the assembled condition via the outer surface 42 of the window 38 and a portion of the back side of the fiber fixture 1576. Each of the fiber optic cables 704 and 708 are removably interconnected with the fiber fixture 1576. A fiber fixture coupling 1580b on the fiber fixture 1576 is disposed in the proper orientation for establishing an appropriate interconnection with the fiber optic cable 704 from the calibration light source 704, while a fiber fixture coupling 1580a on the fiber fixture 1576 is disposed in the proper orientation for establishing an appropriate interconnection with the fiber optic cable 708 leading to the spectrometer assembly 712. The ends of the fiber optic cables 704 and 708 project toward the outer surface 42 of the window 38 at the proper angle and in axial alignment with a port 1584a and 1584b, respectively. The ports 1584a and 1584b each extend through the fiber fixture 1576 to intersect the recess 1572 in the window fixture 1568. Therefore, calibration light from the calibration light source 728 is directed through the fiber optic cable 704, through the port 1584b in the fiber fixture 1573, through the recess 1572 in the window fixture 1568, and to the outer surface 42 of the window 478. Calibration light which is reflected by the inner surface 40 of the window 38 travels through the recess 1572 in the window fixture 1568, through the port 1584a in the fiber fixture 1576, into the fiber optic cable 708, and to the spectrometer assembly 712. The particular manner in which calibration operations are undertaken using the foregoing arrangement is addressed in relation to the calibration module 562 of FIGS. 40–48.

Calibration Module 562—FIGS. 40–48

Figure 40:
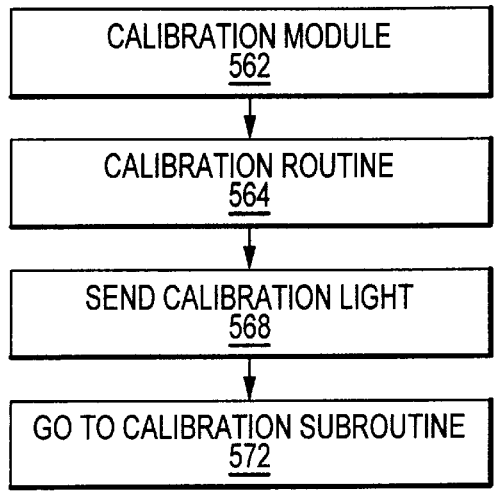
FIG. 40 is a flowchart of one embodiment of the calibration module from FIG. 32.

Both the calibration assembly 552 of FIG. 31 and the calibration assembly 726 of FIG. 37 include the calibration module 562 which is illustrated in FIG. 40. This module 562 may be used to calibrate the output from each of the spectrometer assembly 506 of FIG. 31 and the spectrometer assembly 712 of FIG. 37. For convenience, the discussion will continue with regard to only the spectrometer assembly 506 of FIG. 31, although such will be equally applicable to the spectrometer assembly 712 of FIG. 37 as well.

Output from the spectrometer assembly 506 may have a tendency to "drift" over the life of the spectrometer assembly 506 due to various factors such as temperature. Any drifting of the output from the spectrometer assembly 506 will cause a wavelength shift in the spectra which is evaluated by the current plasma process module 250. An example of drifting would be that a peak in a spectra from the processing chamber 474 which is actually at the 490 nanometer wavelength, may appear at the 491 nanometer wavelength from the output of the spectrometer assembly 506 due to this drifting. Moreover, the window 478 may have an effect on the spectra of the plasma from the current plasma process which is passing through the window 474 to the spectrometer assembly 506, namely by providing an intensity shift in one or more regions of the spectra representative of the plasma in the processing chamber 474. Failure to address either of these conditions may adversely affect the performance of the current plasma process module 250.

One embodiment of the calibration module 562 of FIG. 32 is presented in more detail in FIG. 40 and accounts for both the wavelength and intensity shift conditions noted above. The calibration module 562 includes a calibration routine 564 which is run without any plasma in the processing chamber 474 and which is run at times determined by the facility using the wafer production system 2 (e.g., once a day, on every shift change). Instructions may be included in the calibration routine 564 to detect the existence of plasma in the processing chamber 474 in any of the above-noted manners, and to exit the calibration routine 564 if any such plasma is detected (not shown). Step 568 of the calibration routine 564 directs the calibration light source 556 to send the calibration light to the window 478. Thereafter, step 572 directs the calibration routine 564 to proceed to an appropriate calibration subroutine.

Figures 41, 45:
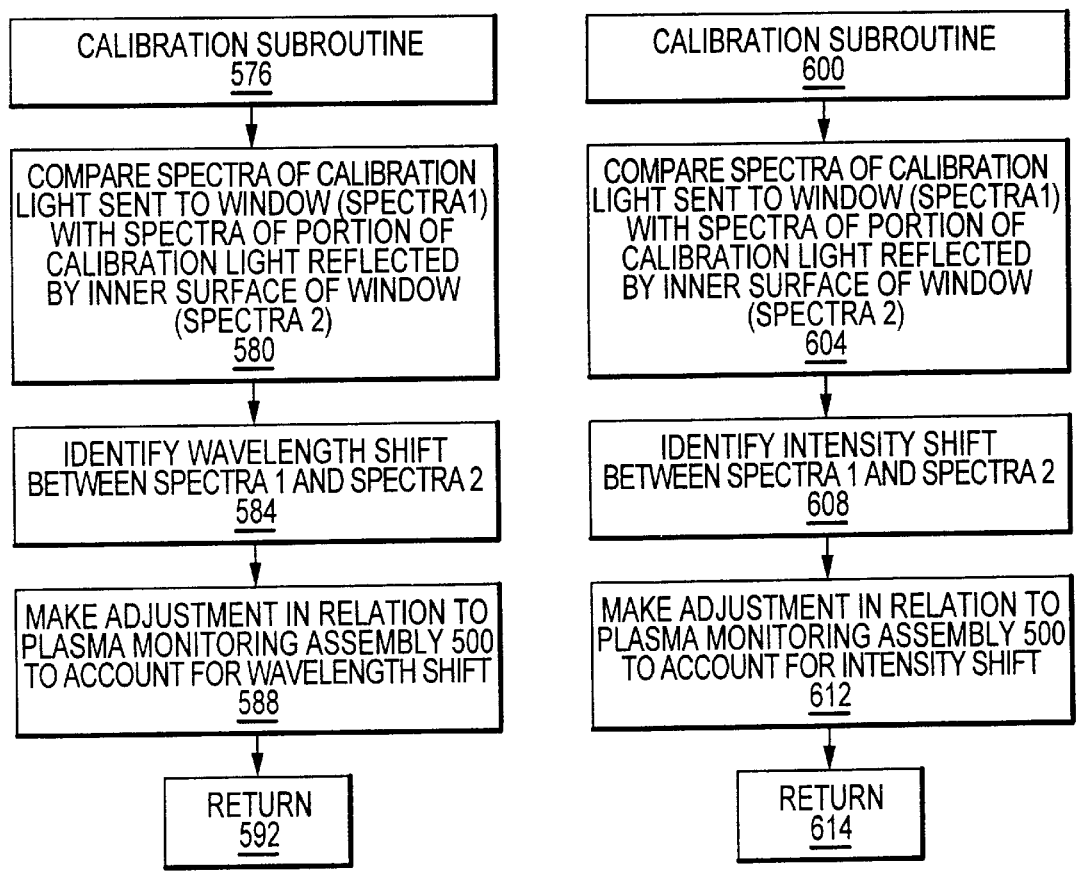
FIG. 41 is a flowchart of one embodiment of a calibration subroutine which may be used by the calibration module of FIG. 40.
FIG. 45 is a flowchart of another embodiment of a calibration subroutine which may be used by the calibration module of FIG. 40.

The calibration subroutine referred to in step 572 of FIG. 40 may include the calibration subroutine 576 which is illustrated in FIG. 41. Generally, the calibration subroutine 576 is directed toward making at least one adjustment in relation to the spectrometer assembly 506 to compensate for a wavelength shift associated with the spectral data obtained through the window 478. A comparison is undertaken by step 580 of the calibration subroutine 576 between the spectra of the calibration light from the calibration light source 556 which is directed to the window 478 and the spectra of the calibration light which is reflected from the inner surface 482 of the window 478 and provided to the spectrometer assembly 506. Since no plasma exists in the processing chamber 474 during calibration operations, the light received by the spectrometer assembly 506 should be limited to that portion of the calibration light which is reflected by the inner surface 482 of the window 478 which is therefore a direct monitoring of a condition of the window 478, specifically its inner surface 482. Any wavelength shift from the comparison of step 580 will be noted in step 584 of the calibration subroutine 576, an adjustment will be made in relation to the plasma monitoring assembly 500 to account for this shift at step 588 of the subroutine 576, and control of the plasma monitoring operations will be turned over to the startup module 202 of FIG. 32 by step 592 of the calibration subroutine 576.

The comparison of the subject spectra at step 580 of the calibration subroutine 576 and the identification of any wavelength shift in step 584 of the subroutine 576 may be implemented in the following manner. The spectra of the calibration light which is sent to the window 478 may be obtained from the calibration light subdirectory 310 of FIG. 9. This spectra is analyzed to identify the location of one or more of the intensity peaks in this spectra and possibly the relative wavelength positioning of these intensity peaks. A "peak" may be equated as any portion of the spectra with an intensity greater than a predetermined amount (e.g., at least about 100 intensity units) which exists over a predetermined wavelength range (e.g., no more than about 2 nanometers). Therefore, the above-referenced analysis of the spectra of calibration light sent to the window 478 may simply entail noting the intensity over at least a portion of this spectra using an appropriate wavelength resolution. For example, one or more peaks in this spectra may be identified by noting the intensity of the spectra of the calibration light from the calibration light subdirectory 310 at every 0.5 nanometer increment over at least a portion of this spectra to identify any intensity peaks as defined above. After identifying these peaks, it may be beneficial to then note their relative wavelength positionings.

Any intensity peaks in the calibration light which is sent to the window 478 which are identified in the above-noted manner should appear at the same wavelength and "same" intensity level (taking into consideration certain principles of optics noted below and assuming that there is no intensity shift due to the window 478 also noted below) in that portion of the calibration light which is reflected by the inner surface 482 of the window 478 if there is no wavelength shift. Since the location and intensity of one or more peaks was noted for the calibration light that was sent to the window 478, the amount of wavelength shift may be identified simply by finding these same peaks in the portion of the calibration light that is reflected by the inner surface 482 of the window 478 and noting any corresponding wavelength shift. Although the intensity of the peaks alone may be sufficient to identify the corresponding peaks in that portion of the calibration light that is reflected by the inner surface 482 of the window 478 (e.g., by looking for the largest peak around a certain wavelength), the relative positioning of the identified peaks may be desirable/required in some cases.

Figure 42:
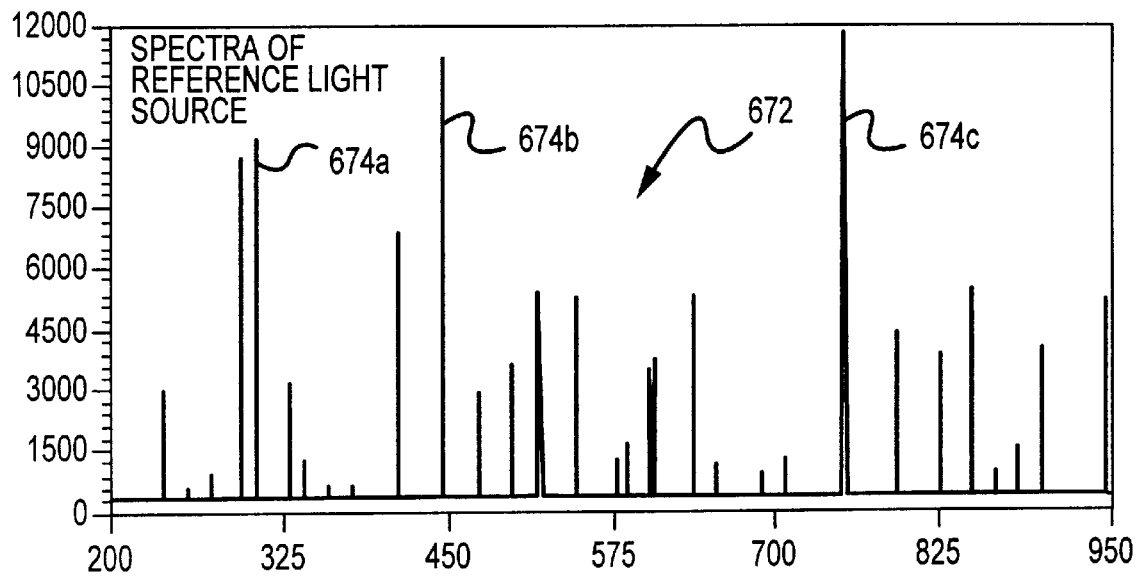
FIG. 42 is one embodiment of a spectra of a calibration light which may be used by the calibration module of FIG. 40.
Figure 43:
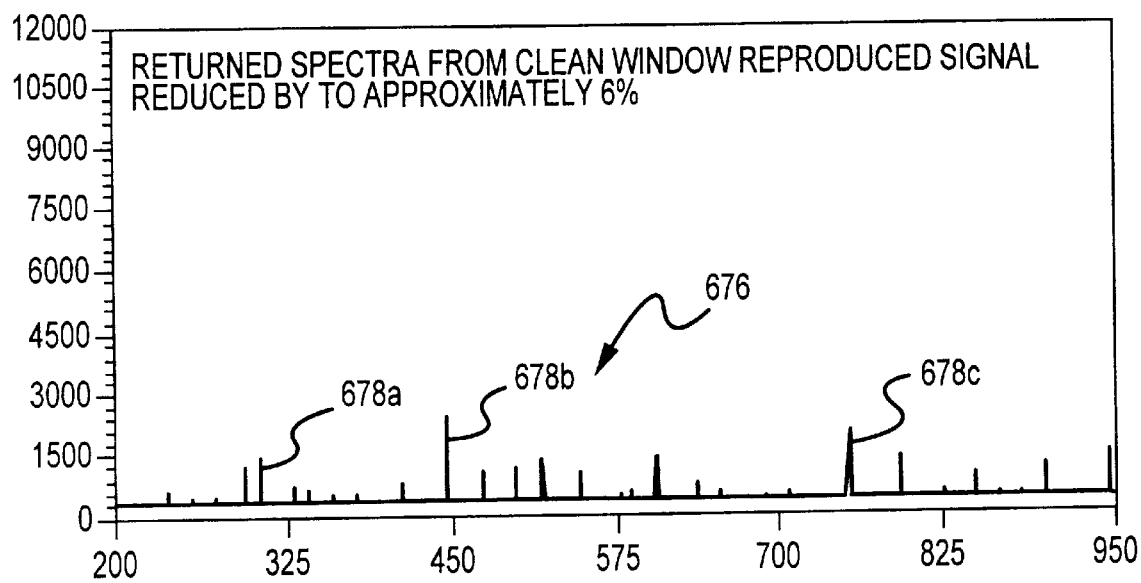
FIG. 43 is one embodiment of a spectra of that portion of the calibration light of FIG. 42 which is reflected by the inner surface of the processing chamber window when there are at least substantially no deposits formed thereon.

The wavelength shift concept addressed in relation to the calibration subroutine 574 of FIG. 41 is further addressed in relation to FIGS. 42–43. One embodiment of a spectra 672 of a calibration light which is appropriate for identifying a wavelength shift is illustrated in FIG. 42, and this calibration light may be used by the calibration light source 556 of the calibration assembly 552 (FIG. 31) and by the calibration subroutine 576 of FIG. 41. The spectra 672 is characterized by a plurality of discrete intensity peaks 674 of varying intensity which is desirable for detecting a wavelength shift, and in one embodiment is from a mercury light source and comprises the above-noted first calibration light source 556a. Other light sources having these characteristics may be utilized as well. "Intensity" is plotted along the "y" axis and is expressed in "counts" which is reflective of the intensity level, while "wavelength" is plotted along the "x" axis and is illustrated in nanometers. FIG. 42 depicts the actual pattern of calibration light which is sent to the window 478 in the subject example. One embodiment of a spectra 676 which is output by the spectrometer assembly 506, due to a reflection of the calibration light represented in FIG. 42 from the inner surface 482 of a "clean" window 478 on the processing chamber 474, is presented in FIG. 43 (when the window 478 has not yet been exposed to any plasma processes). The spectra 676 is characterized by a plurality of peaks 678 of varying intensity, with "intensity" again being plotted along the "y" axis and expressed in "counts" which is reflective of the intensity level, and with "wavelength" again being plotted along the "x" axis in nanometers.

Initially, the comparison of the spectra 672 of FIG. 42 with the spectra 676 of FIG. 43 indicates that their respective intensities vary rather significantly. This is due to certain principles of optics. Generally, materials which would typically be used to form the window 478 will reflect about 6% of the calibration light which is directed toward the window 478. More specifically, 6% of the calibration light which is originally sent to the window 478 from the calibration light source 556 will be reflected by the outer surface 486 of the window 478 along the axis 494 illustrated in FIG. 35, and the remaining 94% of the light will continue through the window 478. When this light encounters the inner surface 482 of the window 478, 6% of this light will be reflected by the inner surface 482 back toward the outer surface 486, and the remaining 94% of this light will then enter the processing chamber 474 (i.e., 5.64%). This light reflected by the inner surface 482 will once again hit the outer surface 486 which will reflect 6% of this light back toward the chamber 474, while 94% will pass through the outer surface 486. Therefore, only about 5.3% of the light originally sent by the calibration light source 445 for calibration of the output of the spectrometer assembly 506 will actually enter the inner cables 508 of the fiber optic cable assembly 504 and be provided to the spectrometer assembly 506. This principle of optics thereby accounts for the difference in intensity between the spectra 676 of FIG. 43 and the spectra 672 of FIG. 42, and would have to be taken into account in the calibration procedure.

The spectra 676 of FIG. 43 may be compared with the spectra 672 of FIG. 42 in the above-described manner to determine if the output from the spectrometer assembly 506 needs to be calibrated for a wavelength shift. The peaks 678 of the spectra 676 of FIG. 43 should appear at the same wavelengths as the corresponding peaks 674 of the spectra 672 of FIG. 43. For example, the peak 678a from FIG. 43 and the peak 674a from FIG. 42 should be at the same wavelength, the peak 678b from FIG. 43 and the peak 674b from FIG. 42 should be at the same wavelength, the peak 678c from FIG. 43 and the peak 674c from FIG. 42 should be at the same wavelength, and so forth. In the illustrated example, the corresponding peaks from the spectras 676 and 672 are properly aligned or are at the same wavelengths. Therefore, no wavelength shift would be identified by steps 580 and 584 of the calibration subroutine 576 of FIG. 41.

Moreover, with no wavelength shift being identified through execution of step 584 of the calibration subroutine 576, no adjustment in relation to the plasma monitoring assembly 500 is undertaken through execution of step 588 of the subroutine 576. Control of the plasma monitoring operations is then transferred to, for instance, the startup module 202 of FIG. 15 by execution of step 592 of the subroutine 576.

Having the peaks of the spectra 672 and 676 be at the exact same wavelength improves the accuracy of the current plasma process module 250. If the wavelength shift limit associated with steps 580 and 584 is "0" and if the peaks of the noted spectra are offset by even a small amount, the adjustment made in relation to the plasma monitoring assembly 500 at step 588 will be correspondingly "small." The amount of wavelength shift which will initiate an adjustment in relation to the plasma monitoring assembly 500, however, need not be zero. That is, a certain amount of wavelength shift may be tolerated before an adjustment is made in relation to the plasma monitoring assembly 500 at step 588. For instance, in one embodiment no adjustments are made in relation to the plasma monitoring assembly 500 unless a wavelength shift of at least a certain amount is identified by steps 580 and 584 of the subroutine 576 (e.g., a wavelength shift of at least about 0.25 nanometers is required before any adjustment is made).

Figure 44:
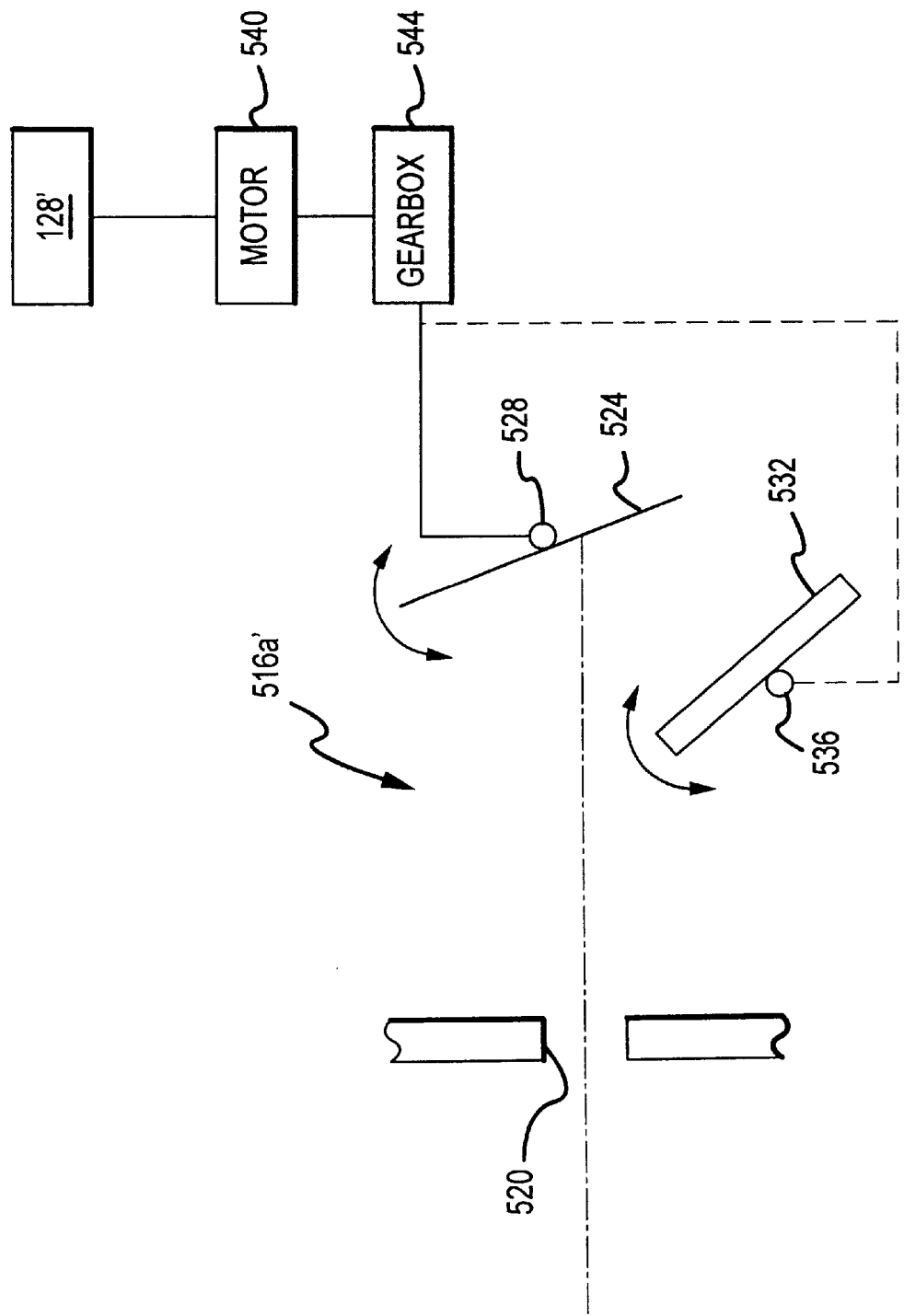
FIG. 44 is a cutaway view of another embodiment of a spectrometer which may be used by the spectrometer assembly of FIG. 31 and which is operatively interfaced with the calibration module of FIG. 40.

If more than the allowed amount wavelength shift is identified in step 584 of the calibration subroutine 576 of FIG. 41, as noted step 588 of the subroutine 576 provides for the adjustment in relation to the plasma monitoring assembly 500. At least two options exist for this "making at least adjustment in relation to the plasma monitoring assembly 500." One alternative is to physically adjust the spectrometer assembly 506 if such is of the scanning type. FIG. 44 presents one embodiment of the spectrometer 516$a'$ which is of the scanning-type. The spectrometer 516$a'$ includes an aperture 520 through which light from the inner cable 508$a$ of the fiber optic cable 504 assembly enters the spectrometer 516$a'$. Light passing through the aperture 520 is reflected by a mirror 524 onto a grating 532. Both the mirror 524 and grating 532 may be mounted for pivotal movement through a mirror pivot 528 and a grating pivot 536, respectively. Movement of the mirror 524 and the grating 532 would be affected by the motor 540 and the gearbox 544. The motor 540 is operatively interfaced with the PMCU 128'. Movement of one or more of the mirror 524 and grating 532 may be utilized such that the peaks 678 of the spectra 676 in FIG. 43 will be appropriately aligned with the corresponding peaks 674 of the spectra 672 in FIG. 42. Thereafter, the presence of the wavelength shift being caused by the spectrometer assembly 506 will not adversely affect the reliability of the results provided by the current plasma process module 250 since the wavelength shift has now been alleviated.

Another way to make the adjustment referred to in step 588 of the calibration subroutine 576 of FIG. 41 is to "regression fit" the data in some way. This option may be used regardless of what type of spectrometer is implemented for the spectrometer assembly 506. Consider the example where the comparison between the spectra 676 of FIG. 43 and the spectra 672 of FIG. 42 identifies the existence of a wavelength shift (not shown since the corresponding peaks 674 and 678 are properly aligned). The output from the spectrometer assembly 506 may be regression fit to account for the noted wavelength shift. It should be appreciated that if a solid state spectrometer assembly 506 is used which is actually multiple spectrometers such as the multiple spectrometers 516 illustrated in FIG. 33, only that portion of the spectra which has shifted due to its associated spectrometer 516 need be regression fit in the above-noted manner.

Information on the presence of any wavelength shift identified by the calibration subroutine 576 also may be input to the current plasma process module 250, more specifically the pattern recognition module 370 of FIG. 13 to account for this wavelength shift when comparing spectra from a current plasma processing operation with spectra in the plasma spectra directory 284. Consider the situation where the 200 nanometer wavelength of the current spectra from the processing chamber 474 is being evaluated, and where a 1 nanometer wavelength shift has been identified by the calibration assembly 552 at the 200 nanometer wavelength. When looking to compare this data point with spectra in the plasma spectra directory 284, the "inputting" to the pattern recognition module 370 of the 1 nanometer wavelength shift for the 200 nanometer wavelength directs the pattern recognition module 370 to actually look at the 201 nanometer wavelength of the corresponding spectra in this case to determine if the two intensities are within the intensity match limit of the pattern recognition module 370. Therefore, the presence of the wavelength shift will not adversely affect the reliability of the results provided by the current plasma process module 250 of FIG. 32.

The calibration assembly 552 of FIG. 31, and including the calibration module 574 of FIG. 40, may also be used to calibrate the output from the spectrometer assembly 506 when there is an intensity shift in the spectra of the plasma in the processing chamber 474. Intensity shifts in the spectra will typically be due to "aging" of the window 478. "Aging" of the window 478 as used herein means that the plasma processes which have been conducted within the processing chamber 474 have affected the inner surface 482 of the window 478 in some manner (e.g., by forming deposits on the inner surface 482, by etching the inner surface 482, by a combination of forming deposits on and etching the inner surface 482). Oftentimes these deposits will reduce the intensity of the light from the chamber 474 which passes through the window 478 and is directed to the spectrometer assembly 516 (FIG. 31). Failing to account for an intensity shift in the spectra due to the window 478 in these cases may also adversely affect the reliability of the results provided by the current plasma process module 250. Consider the situation where the pattern recognition subroutine 374 of FIG. 13 with its point-by-point analysis is employed by the pattern recognition module 370 to compare the pattern of the current spectra with the spectra in the plasma spectra directory 284 (FIG. 9), and where the intensity "match limit" is set on 10% (a percentage difference basis). Also assume that certain deposits have formed on the inner surface 482 of the window 478 such that the intensity of light emitted through the window 478 is reduced by 30%. In this case, even if the plasma in the processing chamber 474 is healthy, the light that is emitted through the window 478 will only be 70% of the actual intensity of the plasma inside the chamber 474. The pattern recognition subroutine 374 will therefore indicate that the current spectra is not a "match" with any spectra in the relevant subdirectory of the plasma spectra directory 284 (because its "match limit" is a 10% variation in the intensity of corresponding wavelengths in the subject spectra, and because the window deposits have reduced the intensity of light from the chamber 474 by 30%), even though the plasma is in fact healthy. Therefore, a "false negative" would be reported by the pattern recognition subroutine 374 and the current plasma process module 250.

The calibration module 574 of FIG. 40 may also include a calibration subroutine which is generally directed toward making an adjustment to account for the above-noted type of intensity shift in the spectra of the plasma in the chamber 474 as emitted through its window 478. One embodiment of such a subroutine is illustrated in FIG. 45 in the nature of the calibration subroutine 600. No plasma exists in the chamber 474 during the execution of the calibration subroutine 600 or at least when obtaining data therefore. Moreover, detection of plasma in accordance with the foregoing may automatically terminate calibration operations through the subroutine 600. Finally, the subroutine 600 may be executed on a periodic basis which is established by the operator of the facility using the wafer production system 2 (e.g., daily).

A comparison is undertaken at step 604 of the calibration subroutine 600 between the spectra of the calibration light from the calibration light source 556 which is directed to the window 478 and which may be stored in the calibration light spectra subdirectory 310, and the spectra of that portion of the calibration light which is reflected from the inner surface 482 of the window 478 and provided to the spectrometer assembly 506. Since there is no plasma in the chamber 474 at this time, the light provided to the spectrometer assembly 506 should be limited to that portion of the calibration light which is reflected by the inner surface 482 of the window 478. As such, the calibration subroutine 600 actually monitors/evaluates the condition of that portion of the window 478 which may be adversely affected by plasma processes conducted in the chamber 474.

The comparison of the subject spectra at step 604 of the calibration subroutine 600 and the identification of any intensity shift in step 608 of the subroutine 600 may be implemented in the following manner. The spectra of the calibration light which is sent to the window 478 may be obtained from the calibration light subdirectory 310 of FIG. 9. Its intensity peaks are identified in the manner discussed above in relation to the calibration subroutine 576 of FIG. 41, as well as possibly their relative wavelength positionings. These same peaks should appear at the same wavelength (assuming that there is no wavelength shift) and "same" intensity level (taking into consideration the above-noted principles of optics) in that portion of the calibration light which is reflected by the inner surface 482 of the window 478. Since the location and intensity of one or more peaks was identified for the calibration light that was sent to the window 478, the amount of intensity shift may be identified simply by finding these same peaks in that portion of the calibration light which is reflected by the inner surface 482 of the window 478 and noting any corresponding intensity shift. Although the intensity of the peaks alone may be sufficient to identify the corresponding peaks in that portion of the calibration light that is reflected by the inner surface 482 of the window 478 (e.g., by looking for the largest peak around a certain wavelength), the relative positioning of the identified peaks may be desirable/required in some cases.

Figure 46A:
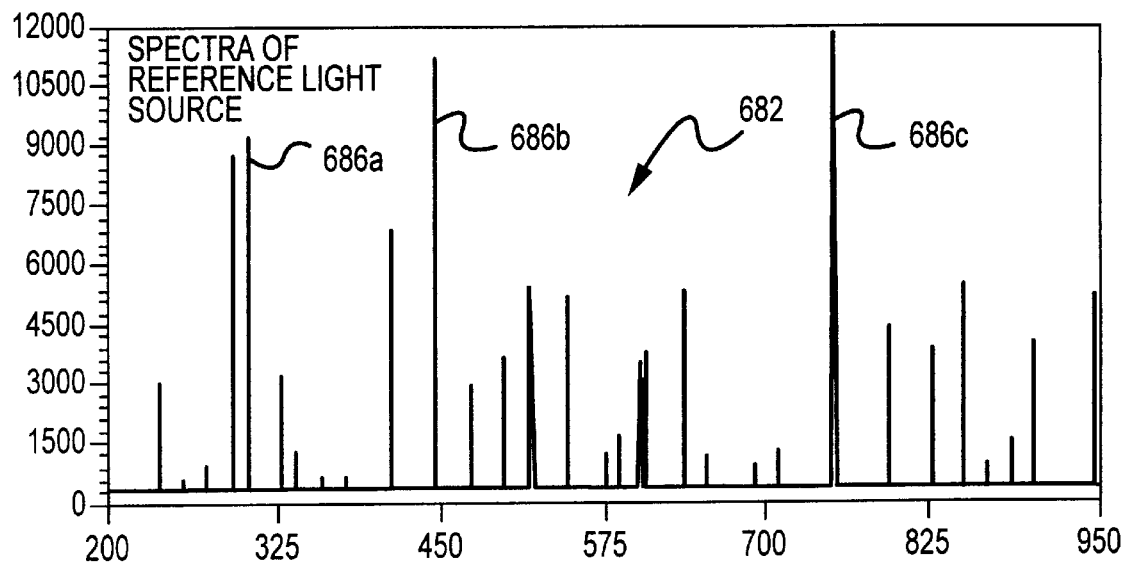
FIG. 46A is one embodiment of a spectra of a calibration light which may be used by the calibration module of FIG. 40 to identify an intensity shift condition.
Figure 47A:
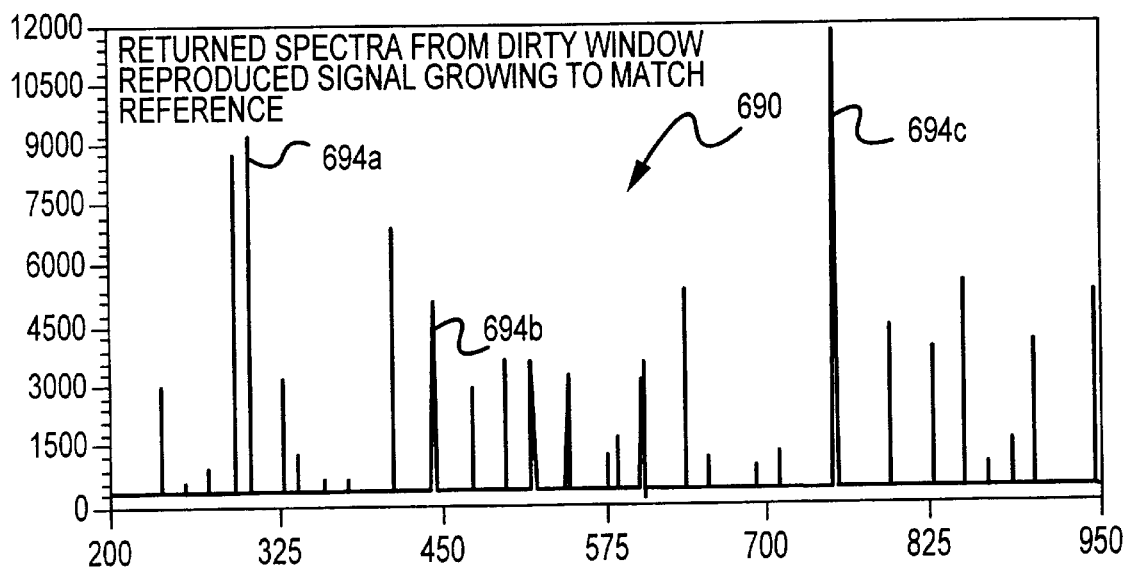
FIG. 47A is one embodiment of a spectra of that portion of the calibration light of FIG. 46A which is reflected by the inner surface of the processing chamber window when in a degraded or aged condition.

The intensity shift concept addressed in relation to the calibration subroutine 600 of FIG. 45 is further addressed in relation to FIGS. 46A and 47A. One embodiment of a spectra 682 of a calibration light is illustrated in FIG. 46A (e.g., a mercury lamp or other similar calibration light source with light defined by wavelengths from about 200 nanometers to about 1,000 nanometers), and this calibration light may be used by the calibration light source 556 of the calibration assembly 552 (FIG. 31) and by the calibration subroutine 600 (FIG. 45) to identify an intensity shift. The spectra 682 of FIG. 46A is characterized by a plurality of discrete intensity peaks 686 of varying intensity. "Intensity" is plotted along the "y" axis and is expressed in "counts" which is reflective of the intensity level, while "wavelength" is plotted along the "x" axis and is in nanometers. FIG. 46A depicts the actual pattern of light which is sent to the window 478 in the subject example and when the window 478 has been exposed to a plurality of plasma processes (e.g., an "aged" window 478). One embodiment of a spectra 690 which is output by the spectrometer assembly 506 is presented in FIG. 47A after the above-noted principles of optics has been accounted for and which is representative of that portion of the calibration light which is reflected from the inner surface 482 of the aged window 478 on the processing chamber 474. The spectra 690 is characterized by a plurality of discrete peaks 694 of varying intensity, with "intensity" again being plotted along the "y" axis and expressed in "counts" which is reflective of the intensity level, and with "wavelength" being plotted along the "x" axis in nanometers.

The spectra 690 of FIG. 47A may be compared with the spectra 682 of FIG. 46A to determine if the output from the spectrometer assembly 506 needs to be calibrated for an intensity shift, such as due to an aging window 478. This comparison is again undertaken at step 604 of the calibration subroutine 600 of FIG. 45. The peaks 694 of the spectra 690 of FIG. 47A should appear not only at the same wavelengths as the corresponding peaks 686 of the spectra 682 of FIG. 46A (as discussed above in relation to calibrating the output of the spectrometer assembly 506 for a wavelength shift), but they should also be at the same level of intensity. For example, the peak 694a from FIG. 47A and the peak 686a from FIG. 46A should be at the same intensity level, the peak 694b from FIG. 47A and the peak 686t from FIG. 46A should be at the same intensity level, the peak 694c from FIG. 47A and the peak 686c from FIG. 46A should be at the same intensity level, and so forth. However, this is not the case.

Peak 694a of the spectra 690 from FIG. 47A is at substantially the same intensity (about 9300) as its corresponding peak in the spectra 682 of FIG. 46A, namely peak 686a. However, peak 694b of the spectra 690 from FIG. 47A has an intensity of about 5,100, whereas the intensity of its corresponding peak in the spectra 682 from FIG. 46A, namely peak 686b, has an intensity of about 11,100. That is, there was a intensity drop of about 6000 intensity units or about a 54% drop in intensity at about the 450 nanometer wavelength region. Moreover, peak 694c of the spectra 690 from FIG. 47A has an intensity of about 9,600, whereas the intensity of its corresponding peak in the spectra 682 from FIG. 46A, namely peak 686c, has an intensity of about 12,000. That is, there was an intensity drop of about 2,400 intensity units or about a 20% drop in intensity at about the 760 nanometer wavelength region. Therefore, the window 478 is not having the same dampening effect on the entire spectra being obtained through the window 478. Instead, the window 478 is having at least a first dampening effect on one part of the spectra (e.g., the 450 nm region) and a second dampening effect on another part of the spectra (e.g., the 760 nm region) which is identifiable by comparing the patterns in the noted manner. Step 612 of the calibration subroutine 600 will make at least one adjustment in relation to the plasma monitoring assembly 500 to account for these types of intensity shifts, and then control will be turned over to the startup module 202 of FIG. 32 by step 614 of the calibration subroutine 600 of FIG. 45.

The adjustment referred to in step 612 of the calibration subroutine 572 may be generally viewed as normalizing the spectra 690 of FIG. 47A (calibration light reflected by the inner surface 482 of the window 478) to the spectra 682 of FIG. 46A (calibration light sent by the calibration light source 556 to the window 478). One way of "normalizing" the data is by "regression fitting." This option may be used regardless of what type of spectrometer is implemented for the spectrometer assembly 506, such that this option may be employed for both scanning-type spectrometers and solid state spectrometers. Another way of characterizing the subject adjustment is through the concept of calibration factors or gain. If there is a "uniform" intensity shift, one calibration factor or gain may be applied to the optical emissions data which is collected on the current plasma process. Multiple dampening effects identified in accordance with the foregoing may then be addressed through multiple calibration factors or gains. One or more parts of the spectra of reflected light may require the application of one calibration factor or gain thereto, while one or more parts of the subject spectra may require the application of another calibration factor or gain thereto, and so forth. Finally, the spectrometer assembly 506 may be manipulated in some manner to obtain more light, although such is not as preferred as the foregoing.

Consider the example where the comparison between the spectra 690 of FIG. 47A and the spectra 682 of FIG. 46A indicates the existence of an intensity shift. The output from the spectrometer assembly 506 may be regression fit to account for the intensity shift which was identified. Alternatively, information on the presence of this intensity shift may be input to the current plasma process module 250, more specifically the pattern recognition module 370 of FIG. 13, to account for this intensity shift when comparing spectra from a current plasma process with spectra in the plasma spectra directory 284.

Limits may be utilized for adjustments made in relation to the plasma monitoring assembly 500 by any of the calibration subroutines noted herein. For instance, in the event that the amount of calibration or gain required to address an intensity shift exceeds a first limit (or a wavelength shift for that matter), a message may be displayed to the appropriate personnel that the window 478 has degraded or aged to the degree where the accuracy of the results provided by the plasma monitoring assembly 500 may be affected to an undesirable degree. Alternatively, exceeding this first limit may in fact disable the plasma monitoring assembly 500 and a corresponding indication may be provided to operations personnel. Imposing a higher limit than the noted first limit may also be used to trigger disabling of the plasma monitoring assembly 500 (i.e., warn when a first limit is exceeded, and disable when a second, higher limit is exceeded).

Figure 46B:
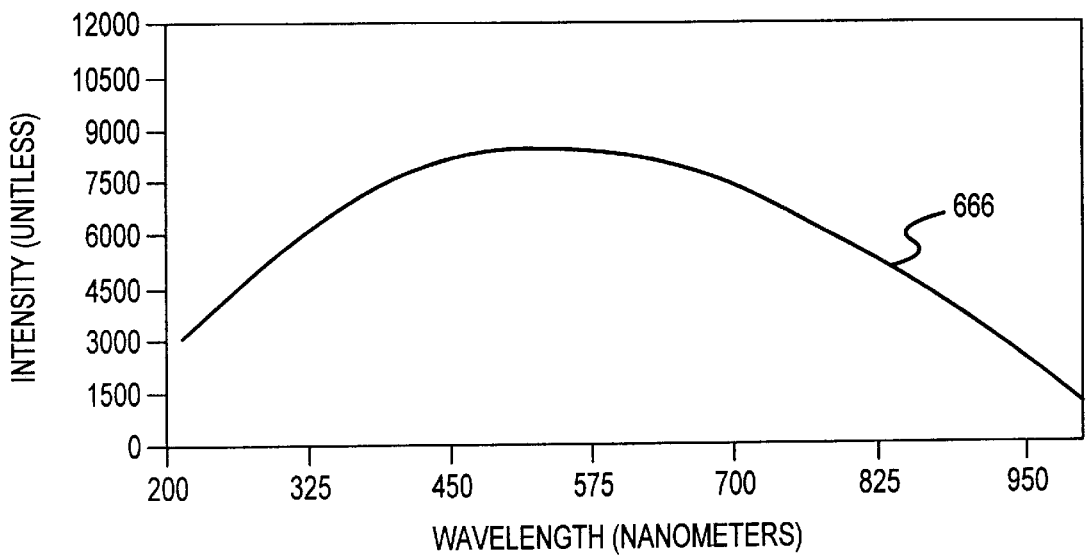
FIG. 46B is another embodiment of a spectra of a calibration light which may be used by the calibration module of FIG. 40 to identify an intensity shift condition.

The calibration light illustrated in FIG. 46A and discussed above has a plurality of discrete intensity peaks. Therefore, only 31 data points may be evaluated by the subroutine 600 of FIG. 45 to identify the effect that the window 478 is having on the optical emissions passing therethrough (i.e., there are only 31 intensity peaks, and the remainder is merely noise). Assumptions would have to be made as to the effect that the window 478 is having on optical emissions at those wavelengths between these peaks. An embodiment of a calibration light which may be used by the calibration light source 556 (FIG. 31) and the calibration subroutine 600 (FIG. 45) to identify an intensity shift, which alleviates the need for these types of assumptions, is presented in FIG. 46B. The calibration light of FIG. 46B is of a different type than that illustrated in FIG. 46A in that the calibration light of FIG. 46B presents a continuum of intensity, while the calibration light of FIG. 46A has a plurality of discrete intensity peaks. This light may be the second type used by the second calibration light source 556b noted above (the first type being the calibration light of FIGS. 42/46A to identify a wavelength shift). In one embodiment, the calibration light for identifying an intensity shift is a white light source defined by wavelengths which include at least the Preferred Optical Bandwidth. Therefore, the calibration light source 556 may actually include one type of light source for identifying a wavelength shift (e.g., FIGS. 42/46A), and may use a different light source for identifying an intensity shift (e.g., FIG. 46B).

Figure 47B:
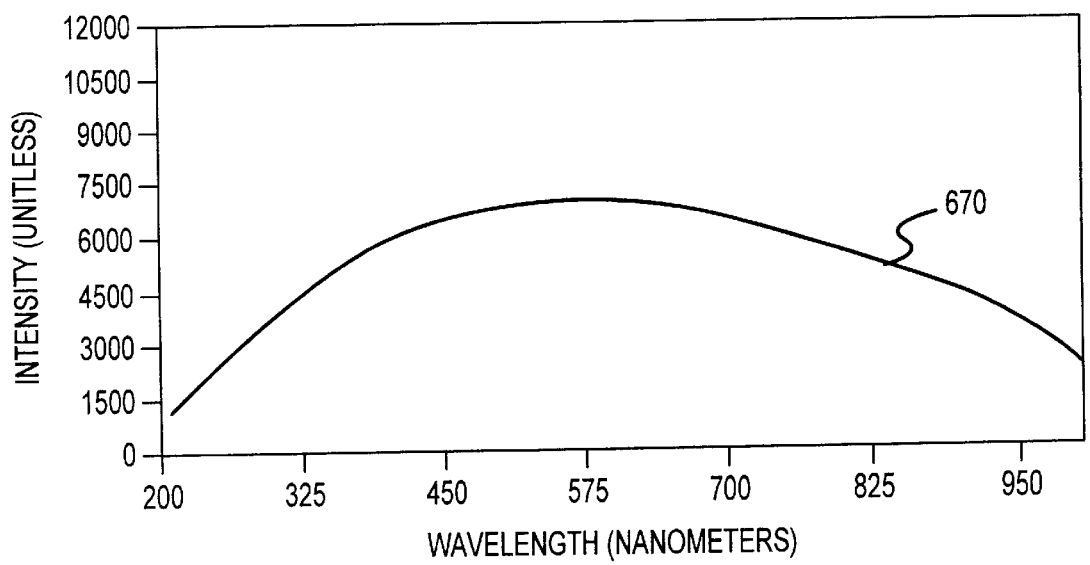
FIG. 47B is one embodiment of a spectra of that portion of the calibration light of FIG. 46B which is reflected by the inner surface of the processing chamber window when in a degraded or aged condition.

The comparison of the spectra 666 of FIG. 46B (calibration light sent to the window 478) with the spectra 670 of FIG. 47B (that portion of the calibration light which is reflected by the inner surface 482 of the window 478 and provided to the spectrometer assembly 506) may be done in the same manner as discussed above in relation to FIGS. 46A and 47A. However, a more complete "picture" of the behavior of the window 478 is provided by using a calibration light having a continuum of intensity since there are more data points available for comparison than in the case of a spectra which only has a plurality of intensity peaks with effectively "noise" therebetween (e.g., FIGS. 42/46A). Moreover, a comparison of the spectra 666 of FIG. 46B and the spectra 670 of FIG. 47B indicates how the window 478 is having a different effect on different portions of the spectrum. Note how the shapes of the spectra 666 and the spectra 670 are generally the same between about the 200 nm and 575 nm wavelengths although with different intensities, but how the shapes of the spectra 666 and the spectra 670 differ between about the 575 nm and 950 nm wavelengths. Specifically, the profile of the spectra 670 of FIG. 47B between about the 575 nm and 950 nm wavelengths is "flatter" than the corresponding portion of the spectra 666 of FIG. 46B. Therefore, the window 478 is having one type of effect on optical emissions generally between about the 200 nm and 575 nm wavelength region, and another different effect on optical emissions generally between about the 575 nm and 900 nm wavelength region.

Figure 48:
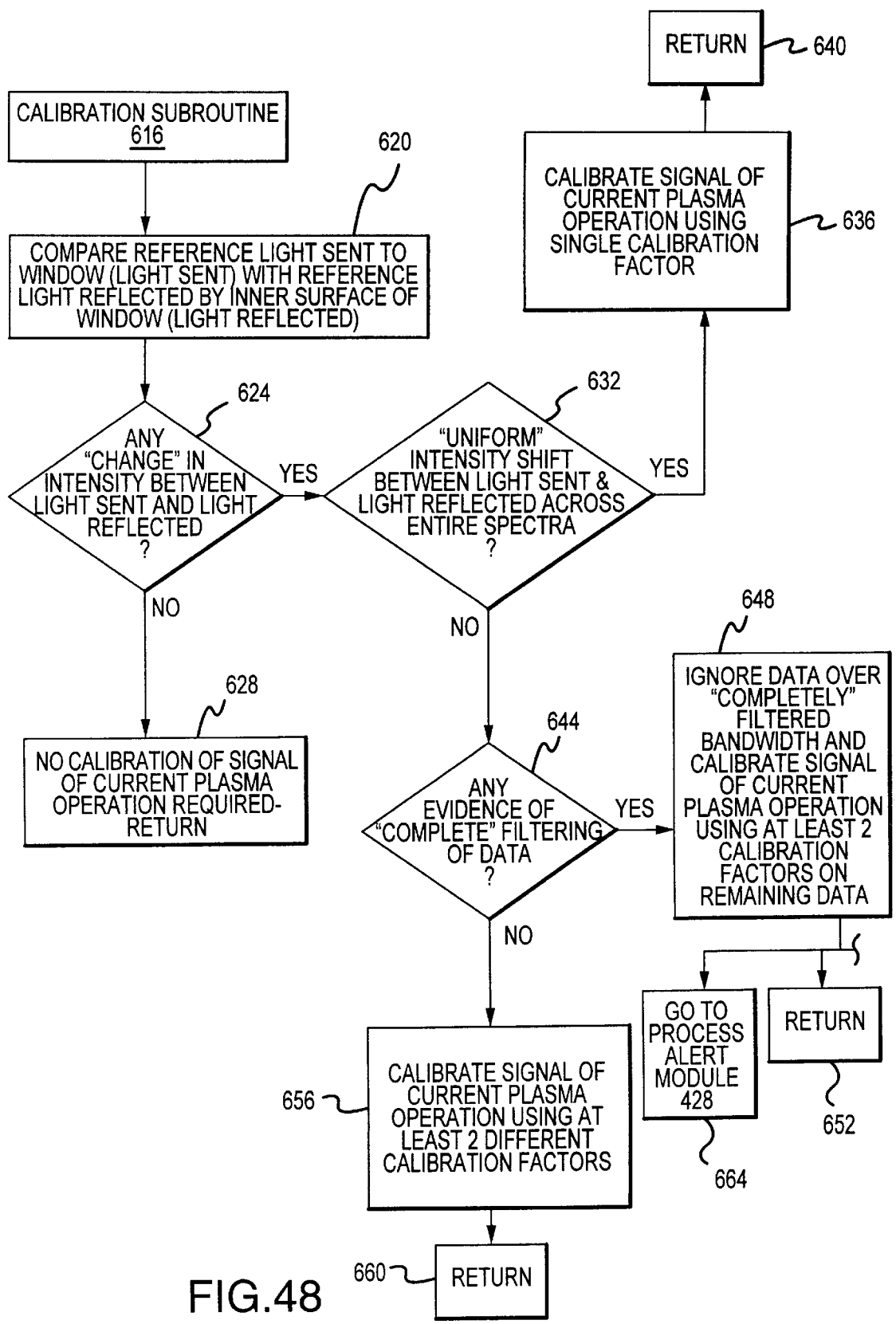
FIG. 48 is a flowchart of another embodiment of a calibration subroutine which may be used by the calibration module of FIG. 40.
Figure 49:
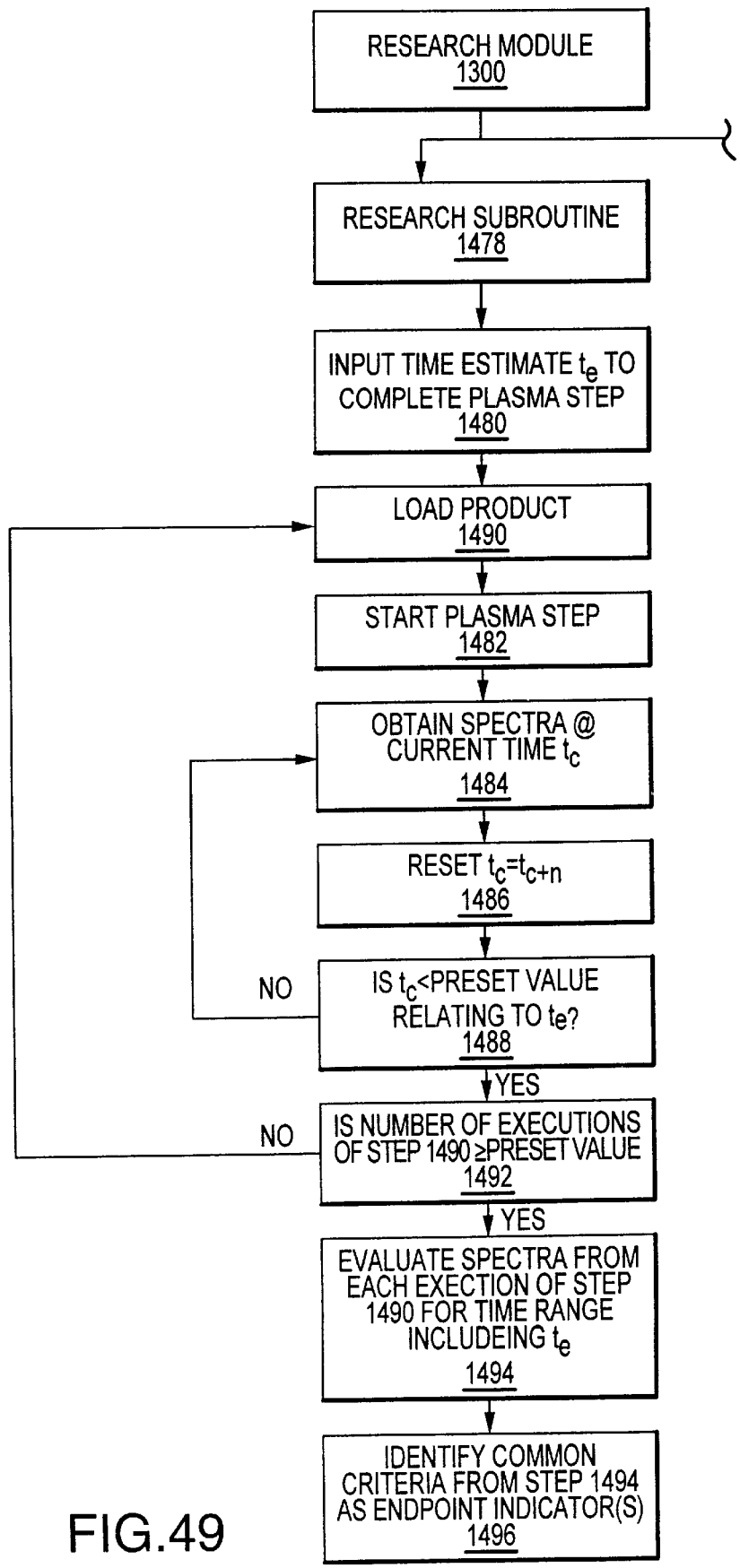
FIG. 49 is a flowchart of one embodiment of a research subroutine which may be used by the research module of FIGS. 7 and 32.

Another embodiment of a calibration subroutine which may be utilized by the calibration module 574 of FIG. 40 is illustrated in FIG. 48. The calibration subroutine 616 is able to identify when the window 478 is having different dampening effects on different portions of the spectral data being emitted through the window 478. Moreover, the subroutine 616 is also able to identify when the window 478 is completely filtering yet different portions of the spectral data being emitted through the window 478. Preferably, the calibration subroutine 616 uses a light source which has a continuum of intensity to provide these functions, such as the light source depicted in FIG. 46B.

Referring now to FIG. 48, the calibration subroutine 616 starts with step 620 which initiates a comparison between the spectra of the calibration light which is sent by the calibration light source 556 to the window 478 (hereafter "reference spectra" for purposes of the subroutine 616) (e.g., FIG. 46B), and the spectra of that portion of the calibration light which is reflected by the inner surface 482 of the window 478 (hereafter "reflected spectra" for purposes of the subroutine 616) (e.g., FIG. 47B). Any "change" in intensity between the reference spectra and the reflected spectra is noted at step 624 of the calibration subroutine 616. Steps 620 and 624 may employ the same type of logic as presented by steps 580 and 584 of the calibration subroutine 576 of FIG. 41 and steps 604 and 608 of the calibration subroutine 600 of FIG. 45. The "change" in intensity referenced in step 624 of the calibration subroutine 616 of FIG. 48 may be a predefined tolerance or a "match limit" as discussed above in relation to the pattern recognition module 370 of FIG. 13. That is, if each "point" of the reflected spectra is within the "match limit" of the corresponding "point" in the reference spectra, the calibration subroutine 616 will proceed to step 628. Step 628 indicates that no calibration of the plasma monitoring assembly 500 is required, and that the control is passed to the startup module 202 of FIG. 15.

If there is a "change" in intensity between the reflected spectra and the reference spectra (e.g., exceeding the "match limit" in the comparison of the reflected spectra and reference spectra at one or more points in the point-by-point analysis), the calibration subroutine 616 will proceed from step 624 to step 632. Step 632 analyzes the manner in which the reflected spectra differs from the reference spectra in relation to the subject intensity criteria. If there was a "uniform" intensity shift of the reflected spectra in relation to the reference spectra, the calibration subroutine 616 proceeds to step 636 where a single calibration factor or uniform gain is applied to the entirety of the reflected spectra (and thereby to optical emissions data obtained during a current plasma process) to "normalize" the same to the reference spectra. Control is then transferred to the startup module 202 of FIG. 15 via step 640 of the calibration subroutine 616. "Uniform" in relation to step 632 of the calibration subroutine 616 need not be limited to a fixed number of intensity units (e.g., the entirety of the reflected spectra need not differ from the entirety of the reference spectra by the same amount), but instead may utilize a raw difference, a percentage difference, or a combination thereof as the "match limit" as those terms are used in relation to the pattern recognition module 370 of FIG. 13. For instance, any change in intensity between each wavelength in the reflected spectra which is within ±5% of the intensity of the corresponding wavelength in the reference spectra may be considered a "uniform" intensity shift for purposes of step 632 of the calibration subroutine 616.

If the comparison between the reflected spectra and the reference spectra at step 632 of the calibration subroutine 616 indicates that there is not a "uniform" intensity shift of tie reflected spectra in relation to the reference spectra, the subroutine 616 proceeds from step 632 to step 644. Generally, step 644 is directed to determining if there is any evidence of complete filtering of data over any wavelength range within the reflected spectra. Under certain conditions, the inner surface 482 of the window 478 may be affected such that light emissions over a certain wavelength range will be completely blocked (e.g., the window 478 will become opaque over this wavelength range which would be evident by an effectively horizontal line in the subject spectra at a relatively low intensity and including a zero intensity level). An example would be where the window 478 is opaque in relation to light emissions over the wavelength range of about 300–400 nanometers, but is transparent to at least a degree over other wavelengths of light being collected and provided to the spectrometer assembly 506 (FIG. 31).

Any "complete filtering" of any wavelength range in the reflected spectra as discussed herein will cause the calibration subroutine 616 to proceed from step 644 to step 648. Data within the completely filtered region is ignored in any analysis subsequently provided by the current plasma process module 250 of FIG. 32 as set forth in step 648 of the calibration subroutine 616. Moreover, at least two different calibration factors are applied to different portions of the remainder of the data in the reflected spectra as set forth in this same step 648, or the reflected spectra is normalized in relation to the reference spectra over that portion which is not being filtered. Again recall that it was determined that the intensity shift in the reflected spectra, in relation to the reference spectra, was "non-uniform" in step 632 of the subroutine 616 such that the application of a single calibration factor to the reflected spectra would not be appropriate to "normalize" the reflected spectra in relation to the reference spectra in this case.

As noted, the analysis of any plasma process thereafter performed which is analyzed by the current plasma process module 250 will be limited to only part of the desired optical emissions data. Data within the wavelength region which is being completely filtered by the window 478 is ignored. As such, the calibration subroutine 616 may be programmed to proceed from step 64E, to the process alert module 428 of FIG. 14 as well. One or more alerts may be issued through the process alert subroutine 432. For instance, it may be appropriate to apprise operations personnel at this time that the window 478 is aging and should be replaced, that the results provided by any further executions of the current plasma process module 250 may provide inaccurate results since certain data from the current plasma process will be ignored in the comparative analysis, or both. Alternatively and if desired by the operator of the facility incorporating the wafer production system 2, any exiting of step 644 of the calibration subroutine 616 as a "yes" condition may call upon the process alert module 428 to terminate all further plasma processing operations until the window 478 is replaced (not shown).

Control of the calibration subroutine 616 of FIG. 48 may pass from step 644 to step 656 if there was no complete filtering of data in the reflected spectra. Calibration of the reflected spectra pursuant to step 656 would then entail the application of at least two different calibration factors or a plurality of gains throughout the reflected spectra, or alternatively the normalization as discussed above. Again recall that it was determined in step 632 that the intensity shift in the reflected spectra in relation to the reference spectra was non-uniform such that application of a single calibration factor would not be appropriate to "normalize" the reflected spectra to the reference spectra. In the case of step 656, one calibration factor may be applied to the reflected spectra over the 200 nanometer to 500 nanometer wavelength region, while a different calibration factor may be applied to reflected spectra over the 501–900 nanometer wavelength region. Calibration subroutine 616 then exits step 656 to step 660 where control may be transferred to, for instance, the startup module 202 of FIG. 15.

The calibration subroutine 616 of FIG. 48 may be characterized as monitoring the window 478, and based upon these results specifying how subsequent plasma processes should be evaluated. If the monitoring of the condition of the window 478 through the subroutine 616 determines that there is no significant dampening of optical emissions from the chamber 474 through the window 478 or there is only dampening and not any complete filtering, the calibration subroutine 616 provides that plasma monitoring operations proceed normally by comparing the "normalized" output from the spectrometer assembly 506 with spectra in the plasma spectra directory 284. Situations where some dampening of the optical emissions from the chamber 474 through the window 478 and where some complete filtering of spectral data over a certain wavelength range is identified by execution of the calibration subroutine 616 dictates that a different evaluation technique be utilized. Specifically, some of the desired data is ignored in the analysis.

Research Module 1300—FIGS. 49–51C

All of the evaluations described so far in relation to the current plasma process module 250 of FIGS. 7 and 32 have related in one manner or another to the "health" of the plasma process. Another type of evaluation which is available through the current plasma process module 250 relates to the endpoint of a plasma process or a certain portion thereof. Plasma cleans, conditioning wafer operations, and each step of a plasma recipe (whether run on a qualification wafer 18 or a production wafer 18) each will typically have an endpoint associated therewith (when the intended/ predetermined result has been achieved, such as the complete removal of a layer of material in a plasma etch) which will typically be reflected in the optical emissions of the plasma in the chamber 36 and which thereby may be used to call "endpoint." The following will discuss endpoint in relation to a plasma step of a plasma recipe run on a production wafer 18, although it is equally applicable to any plasma process having one or more endpoints, including without limitation those identified above.

One way of identifying endpoint through the current plasma process module 250 for a given plasma step requires that some analysis be undertaken of at least one previous execution of this same plasma step in the same processing chamber 36. In this regard, the current plasma process module 250 includes a research module 1300 which is a submodule thereof and which is presented in FIG. 49. The research module 1300 includes a research subroutine 1478 which is run to identify which characteristic(s) of those optical emissions of the plasma in the processing chamber 36 may be indicative of the endpoint of the subject plasma step, and which may then be used by the endpoint detection module 1200 of FIGS. 7 and 32 to identify the occurrence of the endpoint of the subject plasma step.

The research module 1300 may be accessed through the startup module 202 of FIG. 15 through execution of steps 144 and 148. The research subroutine 1478 of FIG. 49 typically is set to evaluate multiple executions of the same plasma step and identifies the optical emissions data of the plasma in the chamber 36 which may be used to call endpoint. Some information about endpoint may be obtained by looking at the optical emissions data from only a single run. The research subroutine 1478 of FIG. 49 utilizes, but does not necessarily require, some knowledge of the plasma step, such as a time estimate of the length of time required to reach the endpoint of the plasma step. In one embodiment, this a priori knowledge may be used such that optical emissions data is obtained on the plasma step at a point in time which should include this endpoint. In this regard, a time estimate $t_e$ for completing the subject plasma step (reaching its endpoint) is input to the subroutine 1478 by execution of step 1480. This time estimate for reaching endpoint may be calculated based upon, for instance, knowing the etch rate of the subject process and the thickness of the layer to be etched away. Another way of identifying a time associated with the subject endpoint uses the data on the current plasma process. In this regard, each time optical emissions are obtained for the subroutine 1478 (e.g., over the Preferred Optical Bandwidth and at the Preferred Data Resolution), the total intensity of these optical emissions is calculated by adding the intensity of each individual wavelength in these optical emissions. Any time there is a significant change in the above-noted sum between two adjacent-in-time optical emissions may be indicative that endpoint occurred at that time.

Step 1490 of the subroutine 1478 directs that product be loaded into the processing chamber 36 and step 1482 directs that the plasma step thereafter be initiated by the introduction of plasma into the processing chamber 36 under the appropriate conditions to initiate the desired plasma step.

Optical emissions of the plasma in the processing chamber 36 during the plasma step are obtained for the subroutine 1478 at a current time $t_c$ for the subroutine 1478 through execution of step 1484, preferably using the Preferred Optical Bandwidth at the Preferred Data Resolution. Adjustment of the "clock" of the subroutine 1478 occurs at step 1486 where the current time $t_c$ is increased by an increment of "n." Preferably, "n" is set at the Preferred Data Collection Time Resolution. If the new current time $t_c$ is less than a preset value relating to the time estimate $t_e$, step 1488 of the subroutine 1478 causes the subroutine 1478 to exit step 1488 and return to step 1484 for repetition in accordance with the foregoing. Although the "preset value" referred to in step 1488 may be the time estimate $t_e$ from step 1480, it may be desirable to use a larger value to ensure that optical emissions data is obtained for the time when endpoint of the plasma step is actually reached. Another way of characterizing the foregoing is that optical emissions data should be recorded until the plasma goes off in the chamber 36 to be able to identify one or more wavelengths which may be indicative of endpoint.

Steps 1484, 1486, and 1488 of the research subroutine 1478 are basically directed to obtaining optical emissions data of the entirety of the subject plasma step within the Preferred Data Collection Bandwidth, at the Preferred Data Resolution, and at the Preferred Data Collection Time Resolution. This data could be analyzed at this time to identify characteristics in the optical emissions data which are candidates for being an indicator of endpoint. Preferably, however, data is obtained in accordance with the foregoing on multiple executions of this same plasma step in the same processing chamber 36. This is implemented through execution of step 1492 of the subroutine 1478 which directs that the foregoing be repeated for the desired amount of executions of the plasma step (at least 2 runs). Once the desired amount of data is obtained (the desired number of runs), the data is analyzed through execution of step 1496 of the research subroutine 1478 to identify that optical emissions data or a portion thereof which may be used as an indicator of endpoint. This analysis is currently done manually.

The analysis referred to in step 1496 of the research subroutine 1478 may be generally directed to identifying those optical emission lines (e.g., individual wavelengths) which undergo some type of a recognizable or discernible change around the time that the endpoint of the plasma step is supposed to have occurred. One type of change which would make a particular wavelength a3 possible candidate for being an indicator of endpoint is illustrated by a review of the optical emissions data presented in FIGS. 50A–C. Each of these figures represents a plot of intensity versus time through a time which should include the endpoint of the subject plasma step for three specific wavelengths $\lambda_1$, $\lambda_2$, and $\lambda_3$. The plots were generated from optical emissions data which was obtained from one execution of the subject plasma step on a wafer 18 in the processing chamber 36. Preferably, a plot of this type is obtained for each wavelength of light which is obtained based upon the optical resolution being used in collecting the optical emissions data.

Figure 50A:
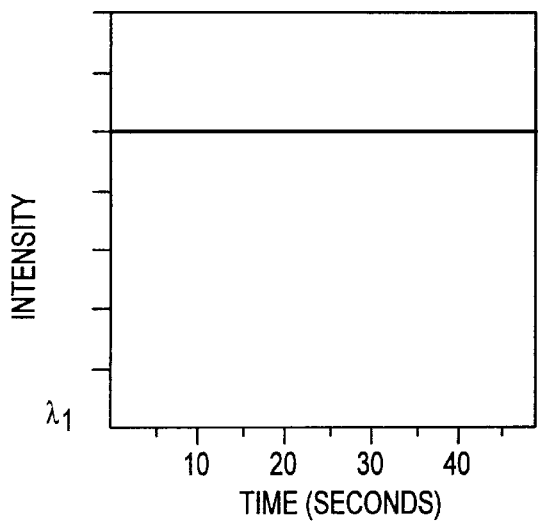
FIGS. 50A–C are exemplary plots of intensity versus time for 3 wavelengths generated by the research subroutine of FIG. 49 from one running of a plasma recipe on product in one of the chambers from FIG. 1.

An examination of FIG. 50A for the wavelength $\lambda_1$ from this first running of the plasma step reveals that there is no real discernible change at any time during the plasma step. That is, the line for wavelength $\lambda_1$ is at least substantially horizontal in FIG. 50A. However, the plot for the wavelength $\lambda_2$ in FIG. 50B reveals two distinct changes in its emissions line. One change occurs at about the 15 second mark, while another change appears at about the 40 second mark. The plot for the wavelength $\lambda_3$ of FIG. 50C also has two distinct changes in its emissions line. One change occurs at about the 20 second mark, while another change appears at about the 40 second mark. Therefore, although the wavelength $\lambda_1$ can be ruled out as not being indicative of endpoint for the subject step since there is no discernible change in its entire emissions line over the relevant time period, both the wavelengths $\lambda_2$ and $\lambda_3$ remain candidates for being endpoint indicators because they each have at least one distinct change in their respective emission lines.

Having some knowledge of the plasma step, such as a time estimate of its endpoint, may eliminate some of the wavelengths of data obtained on the subject plasma process, some of the changes which occur in the plot for a particular wavelength, or both. For instance, if the time estimate for reaching endpoint of the subject plasma step was somewhere around 40 seconds, the changes which occurred at the 15 and 20 second time intervals in the intensity versus time plots for the wavelengths $\lambda_2$ and $\lambda_3$, respectively, could be eliminated due to their temporal spacing from the time estimate for endpoint. However, both of the wavelengths $\lambda_2$ and $\lambda_3$ would still be candidates for being an indicator of endpoint because there is a change in each of these plots at about the 40 second mark. No definitive determination should be made at this point without obtaining additional data in the nature of data on another running of the plasma step in the same processing chamber 36. It is important to note that all changes in the plasma are important in monitoring the plasma health and should be noted, even though they may be ignored in relation to establishing an endpoint indicator(s).

Figure 50B:
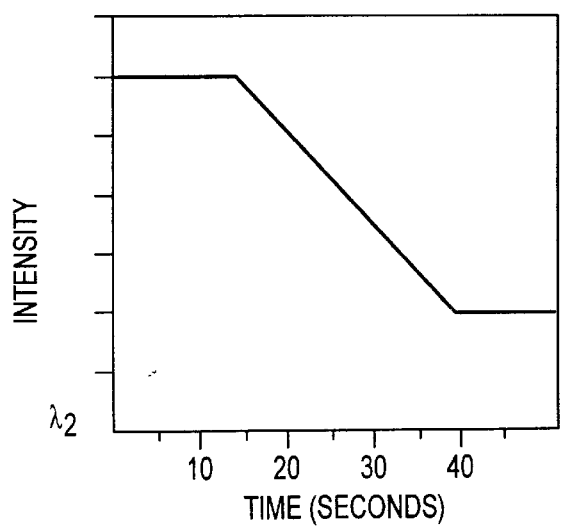
Figure 50C:
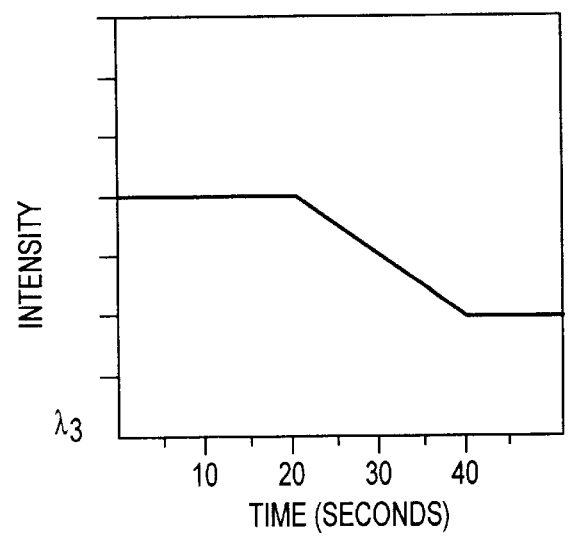
Figure 51A:
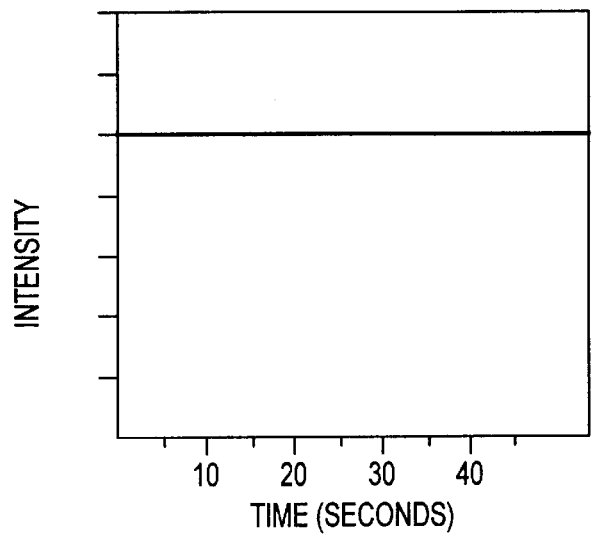
FIGS. 51A–C are exemplary plots of intensity versus time for same 3 wavelengths presented in FIGS. 50A–C, but from another running of the same plasma recipe on product in the same processing chamber.
Figure 51B:
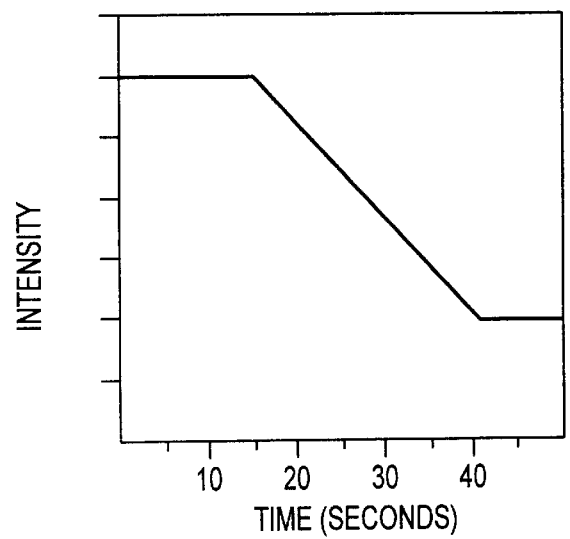
Figure 51C:
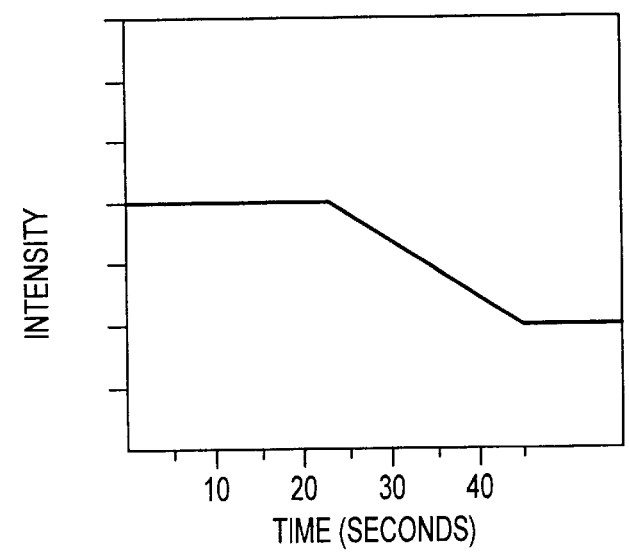

FIGS. 51A–C present the optical emissions data for the same wavelengths $\lambda_1$, $\lambda_2$, and $\lambda_3$ that are presented in FIGS. 50A–C, but from another running of the same plasma step in the processing chamber 36. The plot of the wavelength $\lambda_1$ in FIG. 51A still indicates that nothing about endpoint can be derived from this wavelength $\lambda_1$. The plot for the wavelength $\lambda_2$ in FIG. 51B is at least substantially the same as presented in FIG. 50B. The two distinct changes in its emissions line may be due, for instance, to certain changes in the process such as the opening/closing of a valve(s). Although the plot for the wavelength $\lambda_3$ in FIG. 51C has the same general pattern, the two distinct changes occur about 5 seconds later than they did in the run depicted in FIG. 50C. This may be an indication that the wavelength $\lambda_3$ is reflective of the endpoint of the subject plasma step where endpoint may vary in time by some acceptable time differential.

Summarizing the foregoing, wavelengths which may undergo a change which corresponds with endpoint of the subject step may be identified by comparing the plots of the various wavelengths from run to run and identifying those patterns which are generally the same from run to run, but which have some type of change. For instance, this change may be one or more of a temporal shift, an intensity shift, an expansion of the pattern, and a reduction in the pattern. These types of changes may be due to factors which vary from run to run, such as the thickness of the layer which is being addressed by the plasma step which may cause a temporal shift. Therefore, one way to to identify a particular wavelength which is indicative of endpoint is to run the same plasma step on multiple products, each having a different thickness of the layer to be etched away such that the time at which endpoint will occur will also vary. Wavelengths which have changes which may indicative of endpoint are those where the subject change ("around" endpoint) also shifts in time.

Once the wavelength(s) changes that are potentially indicative of endpoint are identified through the research module 1300, an endpoint detection technique is still required to use this information to identify endpoint. One such techniques entails defining the pattern of that portion of the plot of intensity versus time for the subject wavelength (s) up to where the change occurred which was selected as being indicative of endpoint. Definition of this portion of the plot may be through an equation or a function (e.g., linear function, first order polynomial, second order polynomial). Endpoint may then be deemed to have been reached for subsequent executions of this same plasma step when the corresponding wavelength(s) no longer fits the equation or function. Another option is to take the first or second derivative of this function to identify the slope of the resulting line. The change in slope over time of the current optical emissions data may be plotted. Endpoint may be called when this plot deviates by more than a predetermined amount from that identified by the first or second derivative of the subject function.

There are other ways of characterizing which wavelength (s) may provide some type of indication that endpoint has been reached from the optical emissions data collected on the current plasma process. The optical emissions data obtained for the research subroutine 1478, more specifically the plot of intensity versus time, may be reviewed to identify a peak which changes throughout the process and then reaches a steady state at about the time that endpoint is to have occurred. Moreover, these plots may be reviewed to identify a peak which remains at a steady state for the process and then begins to change at about the time that endpoint is to have occurred. A small subset of this behavior includes behavior in which a suspect wavelength or wavelengths diminish to background or a new wavelength appears at about a time where endpoint was suspected to occur.

Endpoint Detection Module 1200—FIGS. 52–58

The actual detection of the endpoint of a plasma process (e.g., plasma clean, conditioning wafer operation) or discrete portion thereof (e.g., one or more steps of a plasma recipe; all steps of a multi-step plasma recipe) is realized through use of the current plasma process module 250 of FIGS. 7 and 32, and more specifically through the endpoint detection module 1200. Some initial comments are warranted on the module 1200. Initially, the endpoint detection module 1200 may be used to identify the endpoint of a plasma process having only a single endpoint. Multi-step plasma processes having corresponding multiple endpoints may also be evaluated through the endpoint detection module 1200. Two or more plasma steps of a multiple step plasma process may each have their respective endpoints identified through the endpoint detection module 1200. All steps of a multiple step plasma process having endpoints also may each be identified through the endpoint detection module 1200 as well.

Multiple techniques may be simultaneously employed by the endpoint detection module 1200 to identify the occurrence of the endpoint(s) of a plasma process or portion thereof. One way in which this may be implemented is to utilize two or more different endpoint detection techniques and to call endpoint when any one of these techniques identifies the subject endpoint. Different in this context means that the techniques themselves are different, and not merely the data which is used by the technique. Another way in which this may be implemented is to utilize two or more endpoint detection techniques and to call endpoint when at least two of these techniques have identified the subject endpoint. This option provides a more "robust" endpoint detector by increasing the confidence that endpoint has actually been appropriately identified (e.g., statistically more confident that endpoint occurred).

The endpoint detection module 1200 may interface with the process alert module 428 of FIG. 14. For instance, when endpoint is identified through the endpoint detection module 1200, information on the endpoint condition may be provided to the appropriate personnel through the "alert" function of the process alert subroutine 432 of FIG. 14. Control of the plasma process in relation to the identification of endpoint through the endpoint detection module 1200 may also be affected through the "process control" function of the process alert subroutine 432. The identification of endpoint through the module 1200 may be used to terminate the current plasma process or discrete portion thereof (e.g., a plasma step), to initiate the next aspect of the current plasma process (e.g., the next plasma step), or both through the process alert subroutine 432 and in the above-described manner.

Preferably, the current plasma process is evaluated both in relation to its health (i.e., the plasma health in accordance with the plasma health module 252 discussed above) and in relation to endpoint through the endpoint detection module 1200. Although it is beneficial to monitor the health of the plasma process throughout substantially the entirety thereof (except possibly the initial portion thereof when the plasma first comes on and when the plasma is rather unstable), the endpoint detection module 1200 need not be initiated at the start of the plasma process. Instead, the endpoint module 1200 preferably begins its evaluation of the current plasma process to identify its endpoint(s) at an intermediate time in the process (e.g., at least ½ way into the subject process or portion thereof). However, there is nothing inherently wrong with having the module 1200 evaluate the entirety of the plasma process to identify one or more of its endpoints. It just unnecessarily "consumes" processing time/capabilities. Moreover, the plasma health evaluation and endpoint evaluation need not be executed at the same frequency or Analytical Time Resolution. The amount of time between which the health of the plasma process is checked may be greater than the time between which the plasma process is checked to identify endpoint. For instance, the optical emissions of the plasma may be checked at least at every 1 second for a plasma health evaluation, and may be checked at least at every 300 milliseconds to identify endpoint.

Another feature may be included in each of the endpoint detection subroutines to be addressed below which also relates to plasma health evaluations by the plasma health module 252. If the plasma health module 252 identifies either an error or unknown condition in relation to the current plasma process, this may have an effect on the operation of the endpoint detection module 1200. For instance, the endpoint detection module 1200 may be configured to respond to such a condition by displaying information to the appropriate personnel that endpoint will not be called because of the identification of the error or unknown condition by the plasma health module 252. Moreover, if the endpoint detection module 1200 is interfaced with the controls of the processing chamber 36, identification of an error or unknown condition through the plasma health module 252 may terminate the ability of the endpoint detection module 1200 to affect any changes in the plasma process, to terminate a current plasma process after identifying its endpoint, to initiate the next plasma process, or both. That is, the endpoint detection module 1200 may be "shut off" or disabled if the plasma health is found to be unacceptable by the plasma health module 252 since endpoint information obtained under these circumstances may be unreliable.

One or more of the above-noted types of features may be incorporated ir each of the endpoint detection subroutines to be addressed below. The remainder of the discussion presented herein on endpoint detection through the endpoint detection module 1200 will only be in relation to a plasma step of a plasma recipe. However, it is equally applicable to endpoint detection fog any type of plasma-related process.

Figure 52:
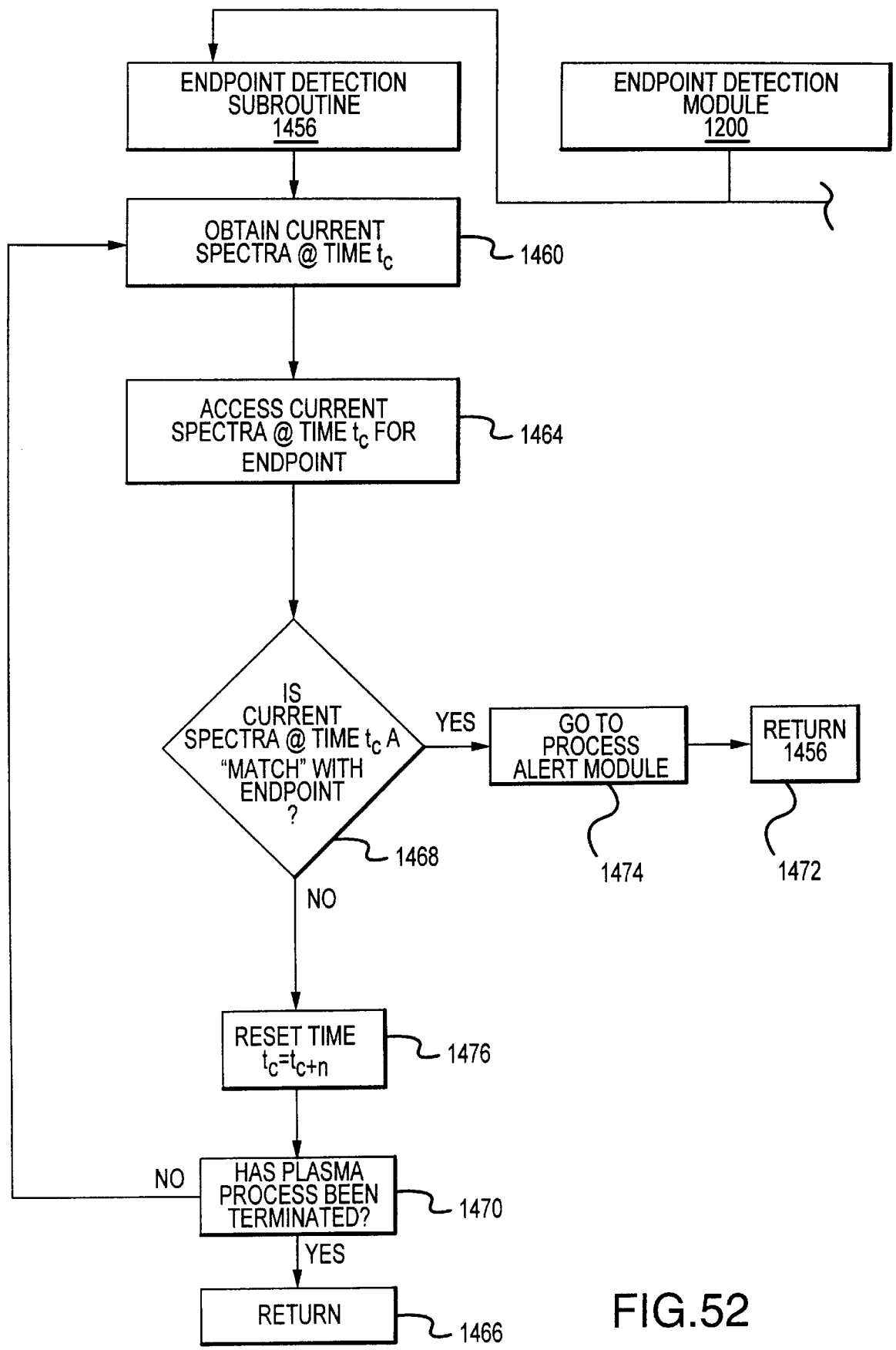
FIG. 52 is a flowchart of one embodiment of an endpoint detection subroutine which may be used by the endpoint detection module of FIGS. 7 and 32.

One embodiment of an endpoint detection subroutine which may be called by the endpoint module 1200 of FIGS. 7 and 32 is presented in FIG. 52. The endpoint detection subroutine 1456 is used to determine when a given plasma step of a plasma recipe has affected its intended purpose or achieved the desired result. A current spectra of the plasma in the processing chamber 36 at the current time $t_c$ is obtained for the subroutine 1456 through execution of step 1460. An assessment of this spectra from the processing chamber 36 with the endpoint subdirectory 316 is undertaken at step 1464 to determine if endpoint has been reached. One technique contemplated by step 1464 is to determine if this spectra from the processing chamber 36, or at least a portion thereof, is a "match" with at least one spectra in the endpoint subdirectory 316 of FIG. 9. Optical emissions data over a wavelength range (e.g., the Preferred Optical Bandwidth using the Preferred Data Resolution) may be stored in the endpoint subdirectory 316, such as a spectra obtained from the same processing chamber 36 during a previous execution of the same plasma step at a time when endpoint should have been reached. The pattern of the spectra of the plasma in the processing chamber 36 will typically remain substantially constant for a time after endpoint has been reached. Analyzing the data from a previous execution of this plasma step in the same processing chamber 36 may therefore allow for identification of a plurality of spectra at about the time which endpoint should occur and which are undergoing no real significant change. These spectra may be defined by the Preferred Optical Bandwidth and Preferred Data Resolution. One or more of these "steady state" spectra may then be included in the endpoint subdirectory 316 for comparison with the current spectra for purposes of identifying a "match" in step 1468 of the endpoint detection subroutine 1456. Utilization may be made of the pattern recognition module 370 of FIG. 13 by step 1464 and 1468 to see if there is a "match."

There are other ways of identifying a "match" indicative of endpoint in step 1468 of the endpoint detection subroutine 1456 of FIG. 52. One or more wavelengths which were identified by the research module 1300 of FIG. 49 may have their respective plots of intensity versus time from a previous execution of the same plasma step in the same processing chamber 36 defined by an equation or function. In this case, the assessment through step 1464 may be to plot the optical emissions data of this wavelength in the subsequent execution of the same plasma process in the same chamber 36 and to determine if this data indeed fits with this equation or function. If so, endpoint may be called when the current optical data no longer "fits" the equation or function (e.g., employing linear fit techniques, polynomial fit technique, etc) which should be at about the time where the "change" discussed above in relation to the research module 1300 occurred. Other techniques which may be used to assess this type of current data would be to utilize a first derivative or a second derivative of this equation or function to define a linear function, such that deviations from this function may be more readily identified in some cases as noted above (i.e., when the plot of the change in slope over time of the current optical data deviates from the slope defined by the first or second derivative).

Features may be incorporated in the present invention to enhance the ability to call endpoint based upon the behavior of one or more specific wavelengths. When the wavelengths which are indicative of endpoint are identified through the research module 1300 of FIG. 49, certain relational characteristics of these particular wavelengths may be noted as well. Consider the case where only a single wavelength has been selected as an endpoint indicator. The intensity of the peak of this wavelength may be noted to identify the same in any subsequent executions of the same plasma process. For instance, the subject wavelength may represent the largest peak within a certain wavelength region. Therefore, the subject wavelength may be found in these subsequent executions by looking for the largest peak in a certain area of the spectrum. In addition, the "position" of the peak of the subject wavelength may be identified in relation to one or more other peaks. For instance, the subject wavelength may be represented by a peak which is located between two larger peaks in a certain wavelength region. Therefore, the subject wavelength may be found in the subsequent executions by looking for this pattern in the optical emissions of the plasma.

If the assessment of the spectra of the plasma in the processing chamber 36 at the current time $t_c$ indicates that endpoint has not yet been reached, the endpoint detection subroutine 1456 proceeds from step 1468 to steps 1476 and 1470 which may be executed in any order. Step 1476 resets the "clock" of the subroutine 1456 by increasing the current time $t_c$ by a factor of "n." The magnitude of "n" defines the Analytical Time Resolution. Step 1470 makes a determination as to whether the current plasma process has been terminated. The same types of techniques discussed above in relation to determining when the plasma is "on" in the chamber 36 may be used in step 1470. So long as the current plasma process has not been terminated, the subroutine 1456 returns to step 1460 where another spectra is obtained for the subroutine 1456 at this new current time $t_c$ for a repetition of the above-described analysis. If the plasma process has been terminated, the subroutine 1456 proceeds from step 1470 to step 1466 where control of the plasma monitoring operations may be returned to, for instance, the start-up module 202 of FIG. 15. If no endpoint has been detected by the time at which the plasma process is terminated, information may be provided to personnel that endpoint was not detected and that there may have been some error or aberration in the process, even though the plasma health module ,52 did not necessarily identify this condition.

The endpoint detection subroutine 1456 of FIG. 52 will continue to execute in the above-noted manner until step 1468 identifies endpoint through steps 1464 and 1468. At this time the subroutine 1456 will proceed from step 1468 to step 1474 where the process alert module 428 of FIG. 14 is called. There, actions may be taken to apprise personnel that the endpoint of the subject plasma step has been reached (through execution of steps 454 and 458 of the process alert subroutine 432), actions may be taken in relation to control of the plasma process (e.g., initiating the next plasma step or terminating the plasma recipe if the subject step is the last step of the recipe), or both. Whether through the process alert module 428 or through step 1472 of the endpoint detection subroutine 1456, control of plasma monitoring operations may then be returned to, for instance, the startup module 202 of FIG. 15.

Figure 53:
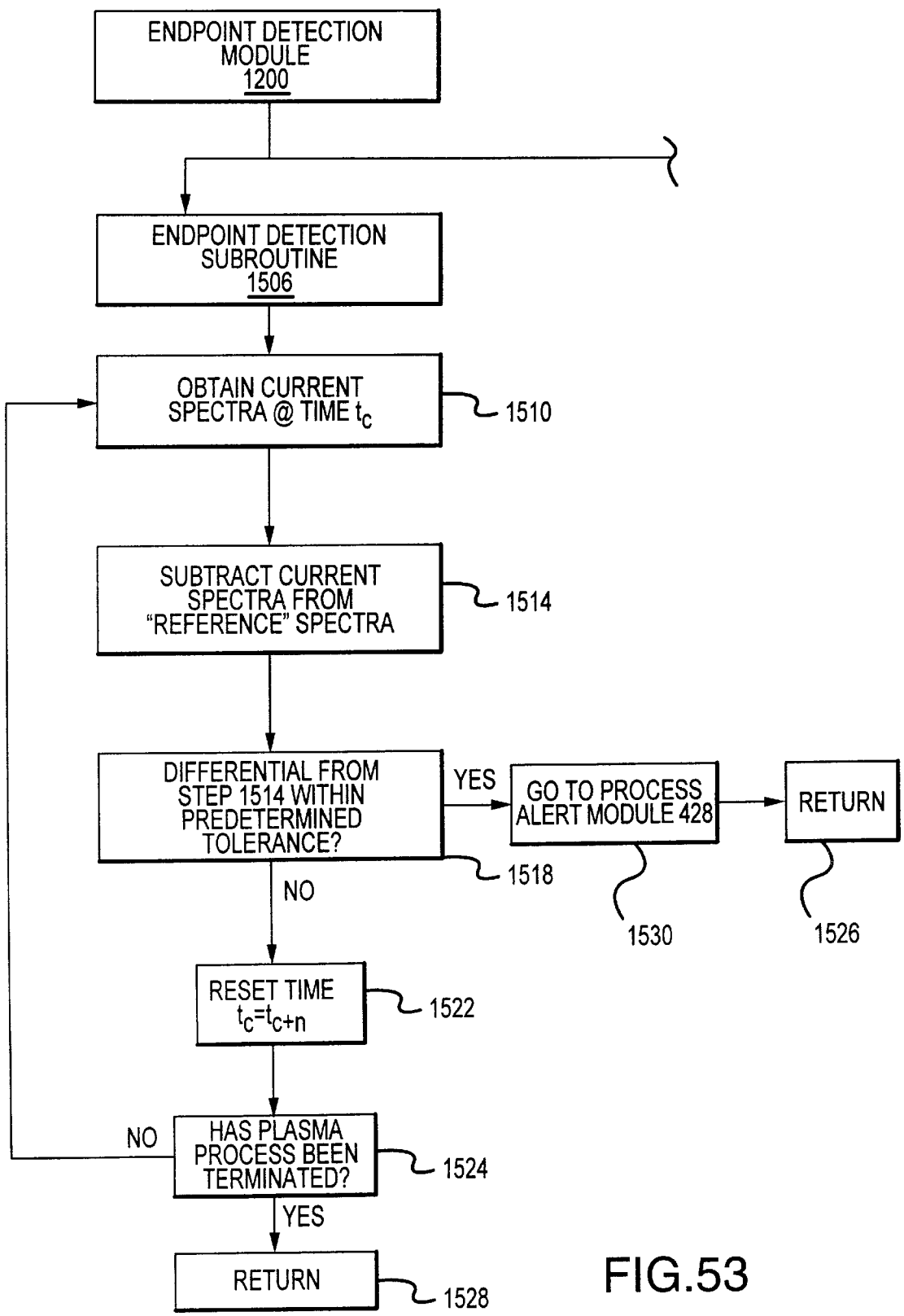
FIG. 53 is a flowchart of another embodiment of an endpoint detection subroutine which may be used by the endpoint detection module of FIGS. 7 and 32.

Another embodiment of an endpoint detection subroutine which may be accessed through the endpoint module 1200 is presented in FIG. 53. The endpoint detection subroutine 1506 of FIG. 53 initiates at step 1510 where a spectra of the plasma in the processing chamber 36 at the current time $t_c$ is obtained for the subroutine 1506. This spectra and a "reference" spectra are subtracted from each other at step 1514. Only the differential is important in relation to step 1514. That is, it is not of particular importance whether the current spectra is subtracted from the "reference" spectra or vice versa. Preferably, both the reference spectra and the spectra on the current plasma process which is obtained are defined by the Preferred Optical Bandwidth and Preferred Data Resolution.

At least two alternatives may be implemented for the "reference" spectra from step 1514 of the endpoint detection subroutine 1506. The "reference" spectra for step 1514 may be retrieved from the endpoint subdirectory 316 of FIG. 9. Preferably, the spectra from the endpoint subdirectory 316 which is the "reference" spectra for step 1514 of the endpoint detection subroutine 1506 is a spectra which is associated with the same plasma process. That is, the spectra in the endpoint subdirectory 316 which is involved in the "subtraction" of step 1514 would be a spectra from a previous execution of the same plasma process in the same processing chamber 36 at a time in the plasma process when endpoint is at least assumed to have occurred. How this spectra is selected for inclusion in the endpoint subdirectory 316 may be in accordance with the discussion presented above. Moreover, information provided by the operator, by direct communications between the wafer production system 2 and the current plasma process module 250, or by the pattern recognition module 370 in which identifies the recipe, recipe step, etc, are detected, on the plasma process to be run in the processing chamber 36 may be used to select this spectra from the endpoint subdirectory 316 for use in the "subtraction" associated with step 1514. Another option for the "reference" spectra for purposes of step 1514 is a previous-in-time spectra from the same plasma process in which the current spectra is obtained at step 1510 (e.g., the immediately preceding current time $t_c$). For instance, the spectra at the current time $t_c$ and the spectra at the current time $t_{c-n}$ may be subtracted from each other at step 1514.

The subtraction operation involving the current spectra of the plasma in the processing chamber 36 at the current time $t_c$ and the "reference" spectra through execution of step 1514 of the endpoint detection subroutine 1514 generates an output which is indicative of the differential. If the subroutine 1506 determines that this differential is within a certain predetermined tolerance at step 1518, endpoint will be deemed to have been reached and the subroutine will proceed from step 1518 to step 1530 where control is transferred to the process alert module 428 for action in accordance with the foregoing. Otherwise, the subroutine 1506 will proceed from step 1518 to execute steps 1522 and 1524. The order in which steps 1522 and 1524 are executed is of no particular relevance. Step 1522 resets the "clock" of the subroutine 1506 by increasing the current time $t_c$ by a factor of "n." The magnitude of "n" defines the Analytical Time Resolution. Step 1524 makes a determination as to whether the current plasma process has been terminated. The same types of techniques discussed above in relation to determining when the plasma is "on" in the chamber 36 may be used in step 1524. So long as the current plasma process has not been terminated, the subroutine 1506 returns to step 1510 where another spectra is obtained for the subroutine 1506 at this new current time $t_c$ for a repetition of the above-described analysis. If the plasma process has been terminated, the subroutine 1506 proceeds from step 1524 to step 1528 where control of the plasma monitoring operations may be returned to, for instance, the start-up module 202 of FIG. 15.

The "differential" referred to in step 1518 of the endpoint detection subroutine 1506 of FIG. 53 may be compared with a predetermined tolerance, such as baseline intensity. A raw difference basis, a percentage difference basis, or both may be used for establishing this tolerance. For example, when all of the data points involved in the "subtraction" of step 1514 are within ±"x" intensity units of each other, the subroutine 1506 may be directed to proceed from step 1518 to step 1530. Another way of saying this is that endpoint is deemed to have been reached for purposes of the endpoint detection subroutine 1506 when there are no longer any substantial peaks in the differential defined by step 1514. These types of concepts are illustrated by reference to FIGS. 54A–C, 55A–C, and 56A–C.

Figure 54A:
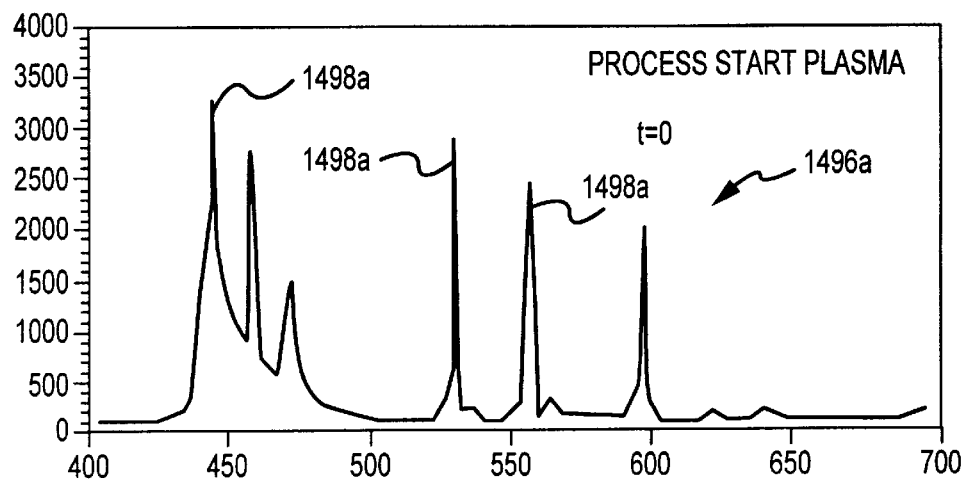
FIG. 54A is an exemplary spectra from a processing chamber at the start of a plasma process step.
Figure 54B:
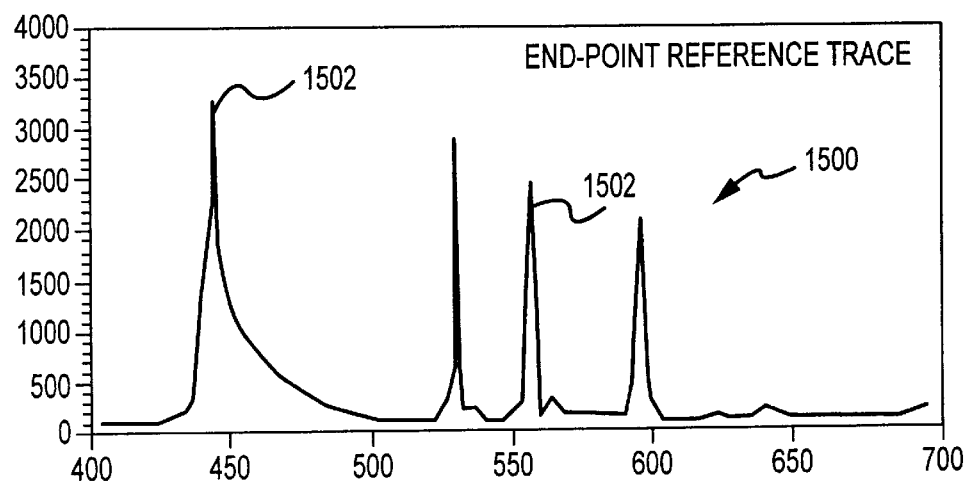
FIG. 54B is an exemplary spectra which has been selected as being indicative of endpoint of the plasma process step from FIG. 54A for use as a reference by the endpoint detection subroutine of FIG. 53.
Figure 54C:
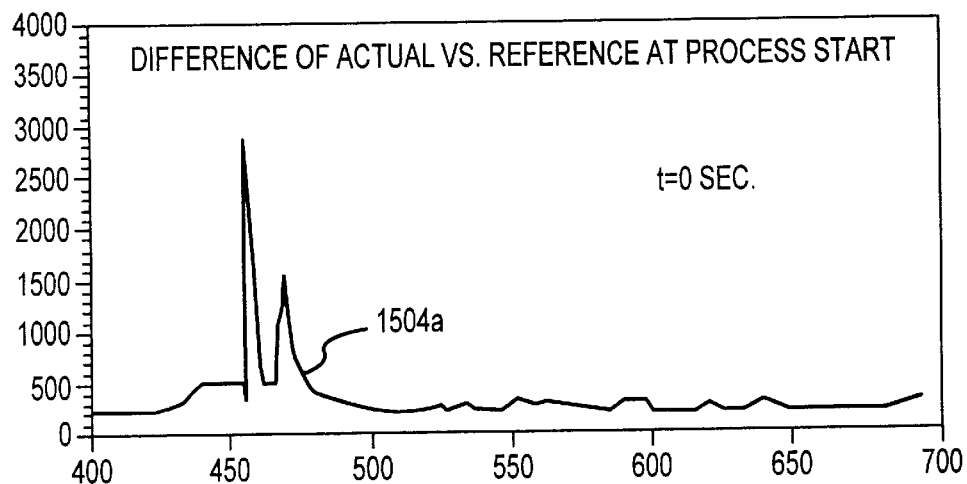
FIG. 54C is the difference between the spectra of FIGS. 54A and 54B in accordance with the endpoint detection subroutine of FIG. 53.

The spectra 1496a of FIG. 54A is representative of plasma in the processing chamber 36 in the initial part (e.g., for a current time $t_0$) of a plasma step being run on product within the processing chamber 36 (e.g., the spectra of FIG. 54A is the spectra at the current time $t_c$ from step 1510 of the endpoint detection subroutine 1506 of FIG. 53). Spectra 1496a has a plurality of intensity peaks 1498a at various wavelengths and at various intensities. The spectra 1500 of FIG. 54B is the "reference" spectra from step 1514 of the endpoint detection subroutine 1506 and is defined by a plurality of peaks 1502 at various wavelengths and with various intensities. FIG. 54C is an illustration of the "difference" between the spectra 1496a of FIG. 54A and the spectra 1500 of FIG. 54C which is presented in the nature of an output 1504a. Note that the output 1504a in FIG. 54C has substantial peaks therein which is indicative that endpoint has not yet been reached based upon the logic of the endpoint detection subroutine 1506 of FIG. 53.

Figure 55A:
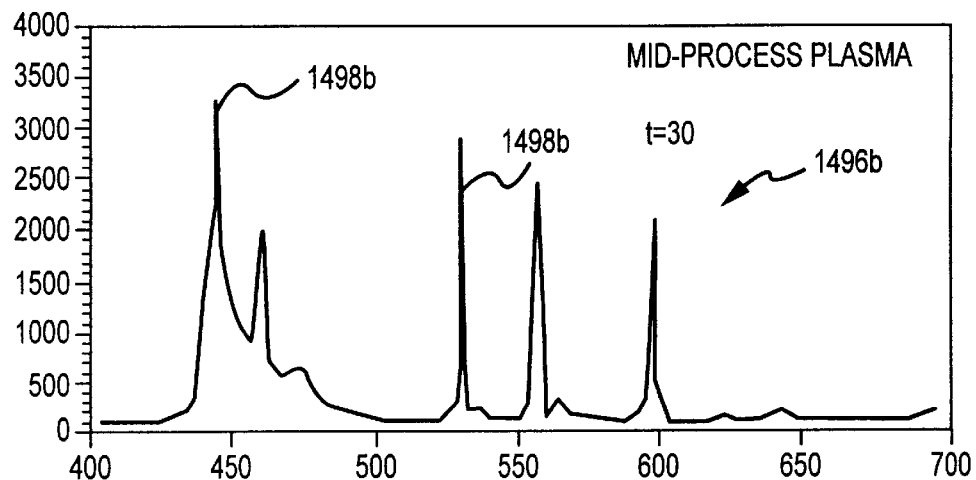
FIG. 55A is an exemplary spectra from a processing chamber at an intermediate time of the plasma process step presented in FIG. 54A.
Figure 55B:
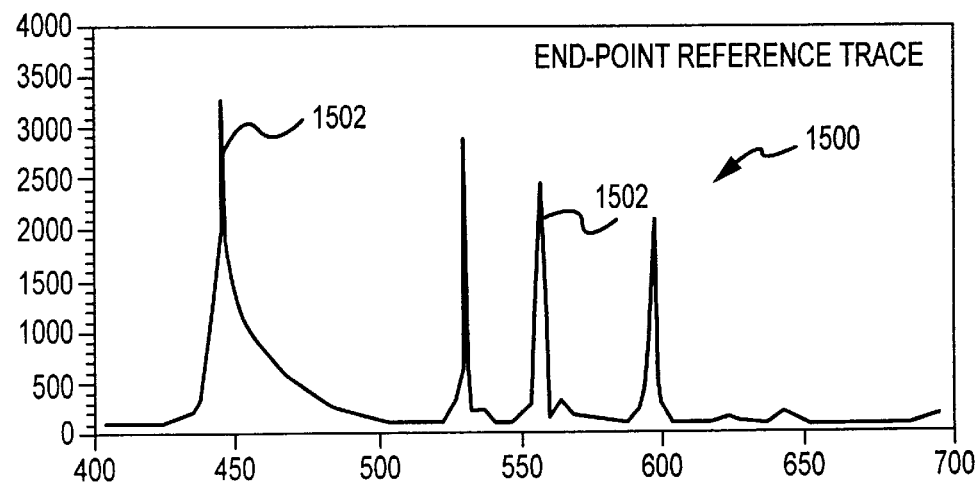
FIG. 55B is the same spectra from FIG. 54B.
Figure 55C:
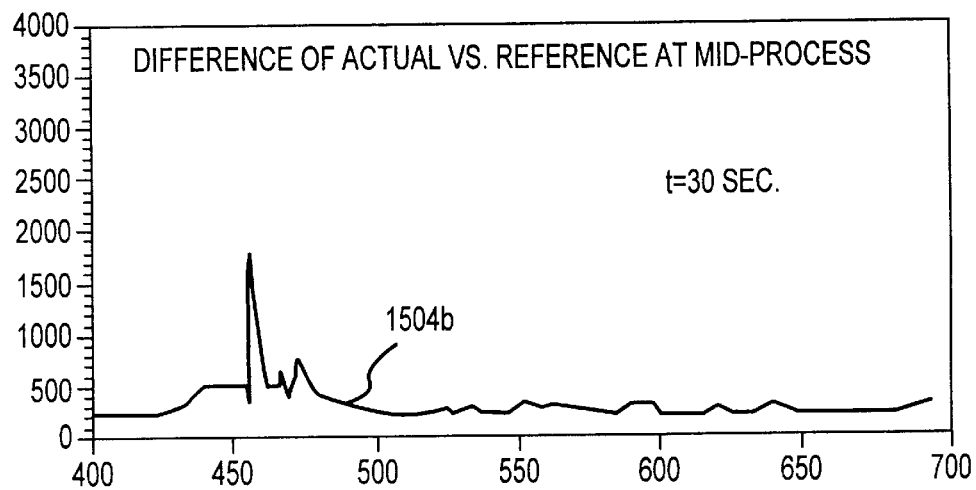
FIG. 55C is the difference between the spectra of FIGS. 55A and 55B in accordance with the endpoint detection subroutine of FIG. 53.

The spectra 1496b of FIG. 55A is representative of plasma in the processing chamber 36 at an intermediate time (e.g., for a current time $t_{30}$) in the same plasma step presented in FIG. 54A (i.e., the spectra of FIG. 55A is the spectra at the current time $t_c$ from step 1510 of the endpoint detection subroutine 1506 of FIG. 53). The spectra 1500 of FIG. 55B is again the "reference" spectra from step 1514 of the endpoint detection subroutine 1506, and FIG. 55C is an illustration of the "difference" between the spectra 1496b of FIG. 55A and the spectra 1500 of FIG. 55B which is presented in the nature of an output 1504b. Note that the output 1504b in FIG. 55C still has substantial peaks therein which is indicative that endpoint has not yet been reached based upon the logic of the endpoint detection subroutine 1506. However, note that the plasma step has progressed in that the size of the peaks in the output 1504b of FIG. 55C is less than the size of the peaks from the output 1504a of FIG. 54C.

Figure 56A:
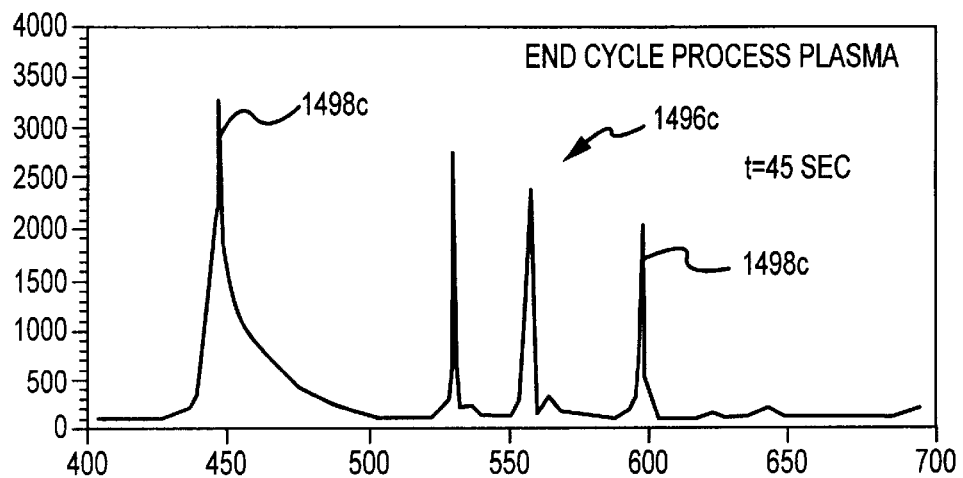
FIG. 56A is an exemplary spectra from a processing chamber at the endpoint of the plasma process step presented in FIG. 54A.
Figure 56B:
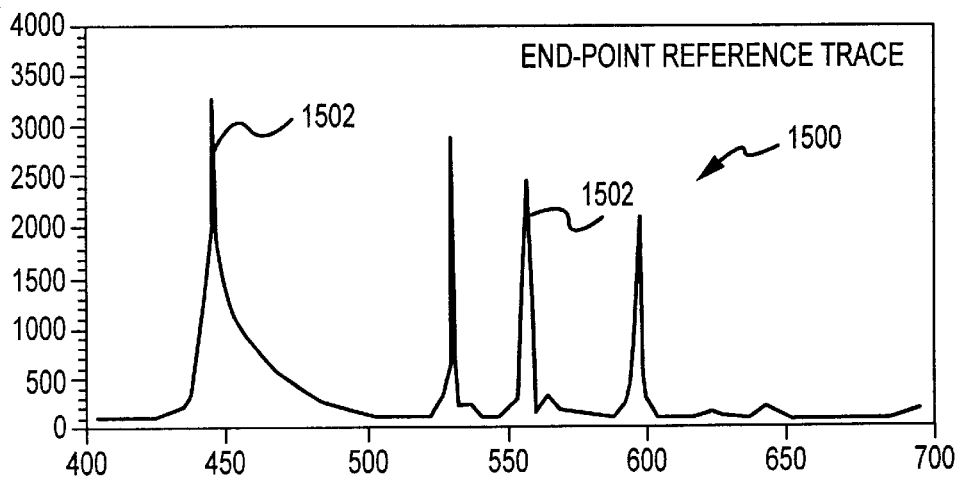
FIG. 56B is the same spectra from FIG. 54B.
Figure 56C:
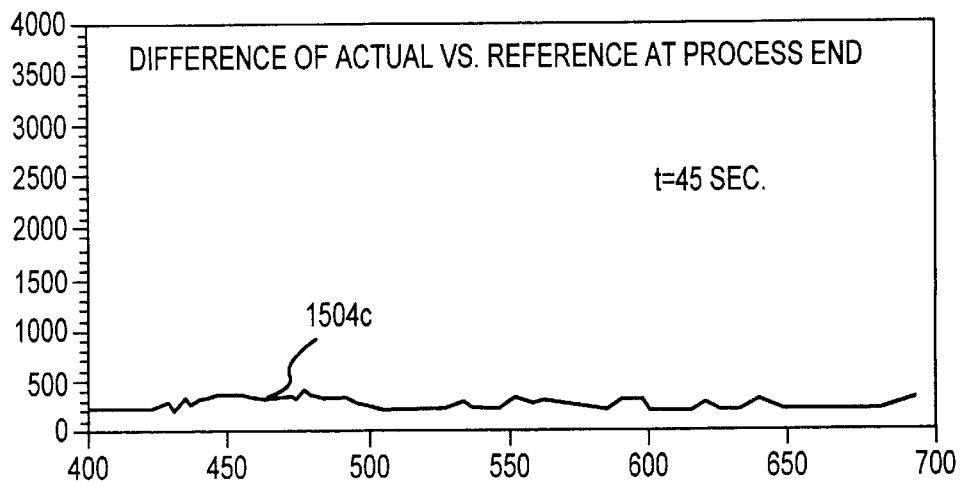
FIG. 56C is the difference between the spectra of FIGS. 55A and 55B in accordance with the endpoint detection subroutine of FIG. 53.

The spectra 1496c of FIG. 56A is representative of plasma in the processing chamber 36 toward the end (e.g., for a current time $t_{45}$) in the same plasma step presented in FIGS. 54A and 55A (i.e., the spectra of FIG. 56A is the spectra at the current time $t_c$ from step 1510 of the endpoint detection subroutine 1506 of FIG. 53). The spectra 1500 of FIG. 56B is again the "reference" spectra from step 1514 of the endpoint detection subroutine 1506, and FIG. 56C is an illustration of the "difference" between the spectra 1496c of FIG. 56A and the spectra 1500 of FIG. 56B which is presented in the nature of an output 1504c. Note that the output 1504c in FIG. 56C now has no substantial peaks therein which is indicative that endpoint has been reached based upon the logic of the endpoint detection subroutine 1506. Therefore, endpoint would be called by the subroutine 1506 when the spectra of FIG. 56A is encountered for action in accordance with the foregoing.

Figure 57:
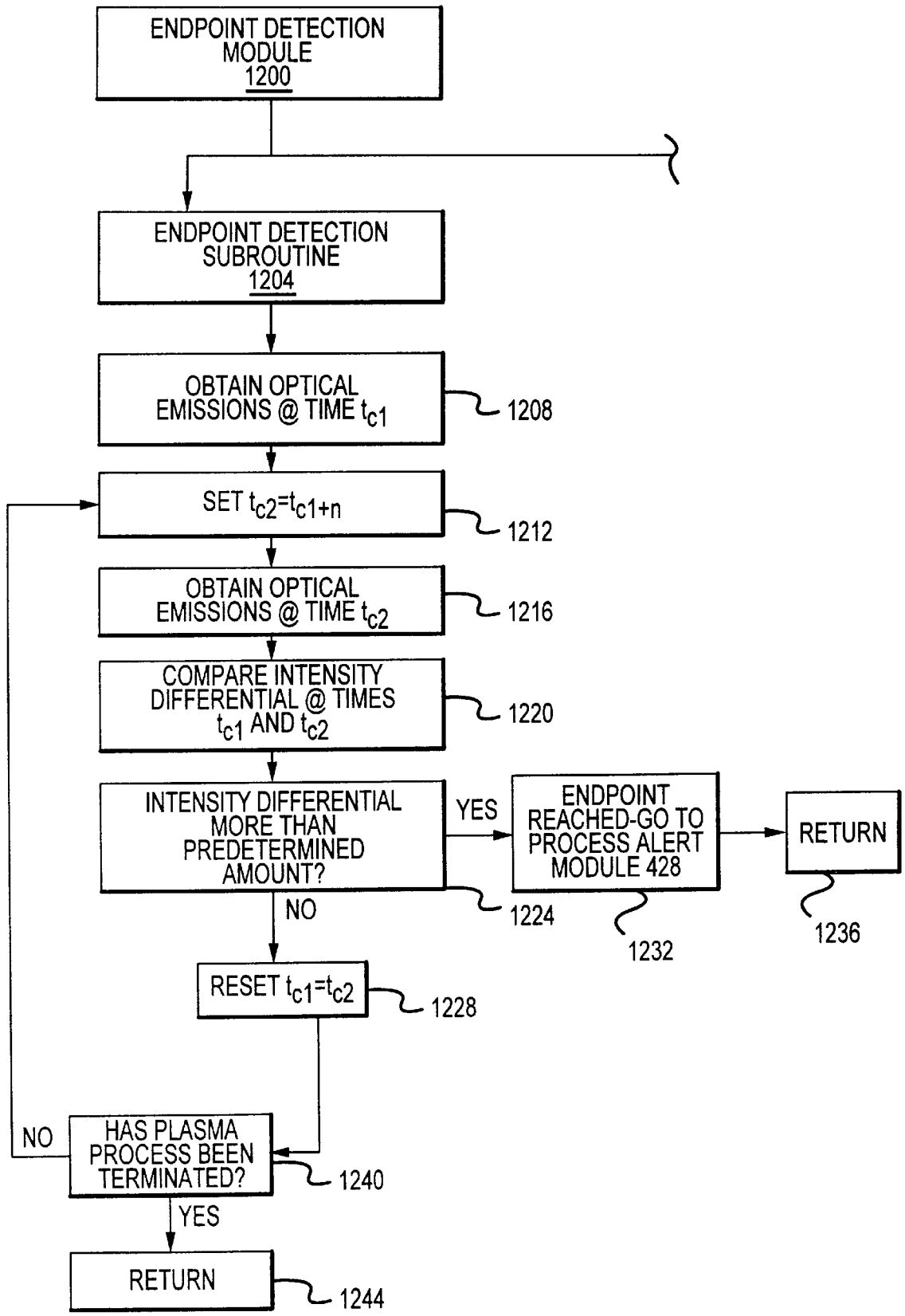
FIG. 57 is a flowchart of another embodiment of an endpoint detection subroutine which may be used by the endpoint detection module of FIGS. 7 and 32.

Another embodiment of a subroutine which may be utilized by the endpoint detection module 1200 of FIGS. 7 and 32 is presented in FIG. 57. Generally, the endpoint detection subroutine 1204 of FIG. 57 associates the endpoint of a given plasma process or a discrete portion thereof (e.g., a plasma step) with a "modal" change in the plasma within the chamber 36 or a portion thereof around the time when endpoint has occurred. In many cases there is a change in impedance associated with the processing chamber 36 at the time that endpoint is reached. This change in impedance oftentimes is reflected by a "modal" change in the plasma within the processing chamber 36 or a portion thereof. Changes in the plasma are in turn reflected in its optical emissions. Endpoint could be called based upon this modal change alone (i.e., solely through the endpoint detection subroutine 1204 of FIG. 57). However, preferably this "modal" change for identifying endpoint is used in combination with another endpoint identification technique (e.g., through the endpoint detection subroutine 1456 of FIG. 52, through the endpoint detection subroutine 1506 of FIG. 53).

Optical emissions data are obtained for the endpoint detection subroutine 1204 of FIG. 57 at its step 1208. These optical emissions data are more specifically of the plasma in the processing chamber 36 at a time $t_{c1}$. Two other time-related variables are introduced at step 1212. A time $t_{c1+n}$ is set equal to a time $t_{c2}$ at step 1212. As such, the time $t_{c2}$ is greater than the time $t_{c1}$ by an increment of "n." The magnitude of "n" for the subroutine defines the Analytical Time Resolution. Optical emissions of the plasma in the processing chamber 36 are obtained for this time $t_{c2}$ through execution of step 1216 of the endpoint detection subroutine 1204.

The intensities of the optical emissions from the current values for the times $t_{c1}$ and $t_{c2}$ are compared with each other at step 1220 of the endpoint detection subroutine 1204. If the differential between the optical emissions at these two times is less than a predetermined amount (e.g., an increase or a decrease of a certain magnitude), determined through execution of step 1224, the subroutine 1204 proceeds from step 1224 to step 1228. The time $t_{c2}$ is set equal to the time $t_{c1}$ at step 1228 and spectral data for a new time $t_{c2}$ is obtained by the endpoint detection subroutine 1204 returning to step 1212 for repetition in accordance with the foregoing. In order to allow the subroutine 1204 to exit the foregoing if the plasma process is terminated, a step 1240 is incorporated which will provide this function by proceeding to a step 1244 where control may be returned to, for instance, the start-up module 202 of FIG. 15. Control may also be returned to the start-up module 202 after endpoint is called in accordance with the following and through execution of step 1236.

If the differential between the optical emissions associated with the times $t_{c1}$ and $t_{c2}$ is ever more than the predetermined amount associated with step 1224 of the endpoint detection subroutine 1204, this may be an indication of the above-noted "modal" change in the plasma which is in turn indicative of endpoint. It is not definitively indicative of the type of "modal" change at this point in time however. Only those "modal" changes associated with the plasma which occur at about the time that endpoint is estimated to occur, which appear quickly or abruptly, and which are persistently observed in subsequent executions of the same plasma process are indicative of a change in impedance which occurs at endpoint. Therefore, it may be desirable to execute a plurality of runs for each particular plasma process in which the subroutine 1204 is used before relying upon the subroutine 1204 to call endpoint by execution of the process alert module 428 through execution of step 1232. The subroutine 1204 may also be implemented to confirm or increase the confidence level that endpoint has been reached when another endpoint detection technique is being used to call endpoint as well.

Figure 58:
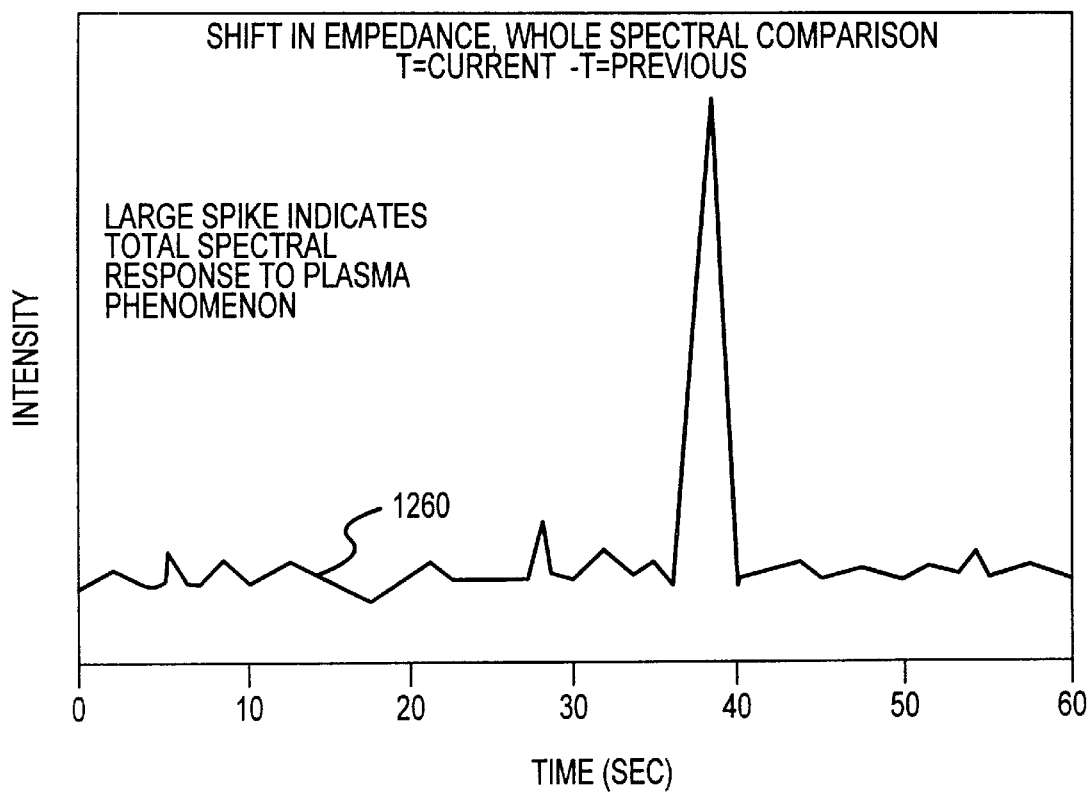
FIG. 58 is an exemplary optical emissions output which would be indicative of the endpoint of a plasma process step in accordance with the endpoint detection subroutine of FIG. 57.

The "modal" change associated with the endpoint detection subroutine 1204 of FIG. 57 may be monitored in relation to one or more specific wavelengths, but by definition impacts plasma performance and is detectable throughout the optical emissions range (although some wavelengths may demonstrate a stronger effect of the modal change than others). For instance, the optical emissions associated with the differential referred to in step 1224 may be in relation to a single wavelength. Moreover, the optical emissions associated with the differential referred to in step 1224 may be from a plurality of wavelengths, and the "differential" which is potentially indicative of a change in impedance may be when one or more of these wavelengths demonstrates the above-noted "modal" change. Another option is to monitor or the "modal" change over a certain bandwidth. In this regard, the output 1260 presented in FIG. 58 illustrates the change in intensity of the plasma in the chamber 36 over time throughout the plasma step. More specifically, each point of the output 1260 illustrates the differential between the optical emissions of the plasma in the chamber 36 over the Preferred Optical Bandwidth and at the Preferred Data Resolution of a current time (e.g., $t_c$) and a preceding time (e.g., $t_{c-n}$) Preferably, each data point which defines the output 1260 is the differential between two adjacent times where optical emissions data is obtained from the chamber 36. A, can be seen in the output 1260 from FIG. 58, there is a significant change in the intensity of the plasma from about the 35 second mark and the 40 second mark. This is the type of "modal" change which may be associated with a change in impedance associated with the processing chamber 36, which in turn the endpoint detection subroutine 1204 of FIG. 57 associates with endpoint.

Figure 59:
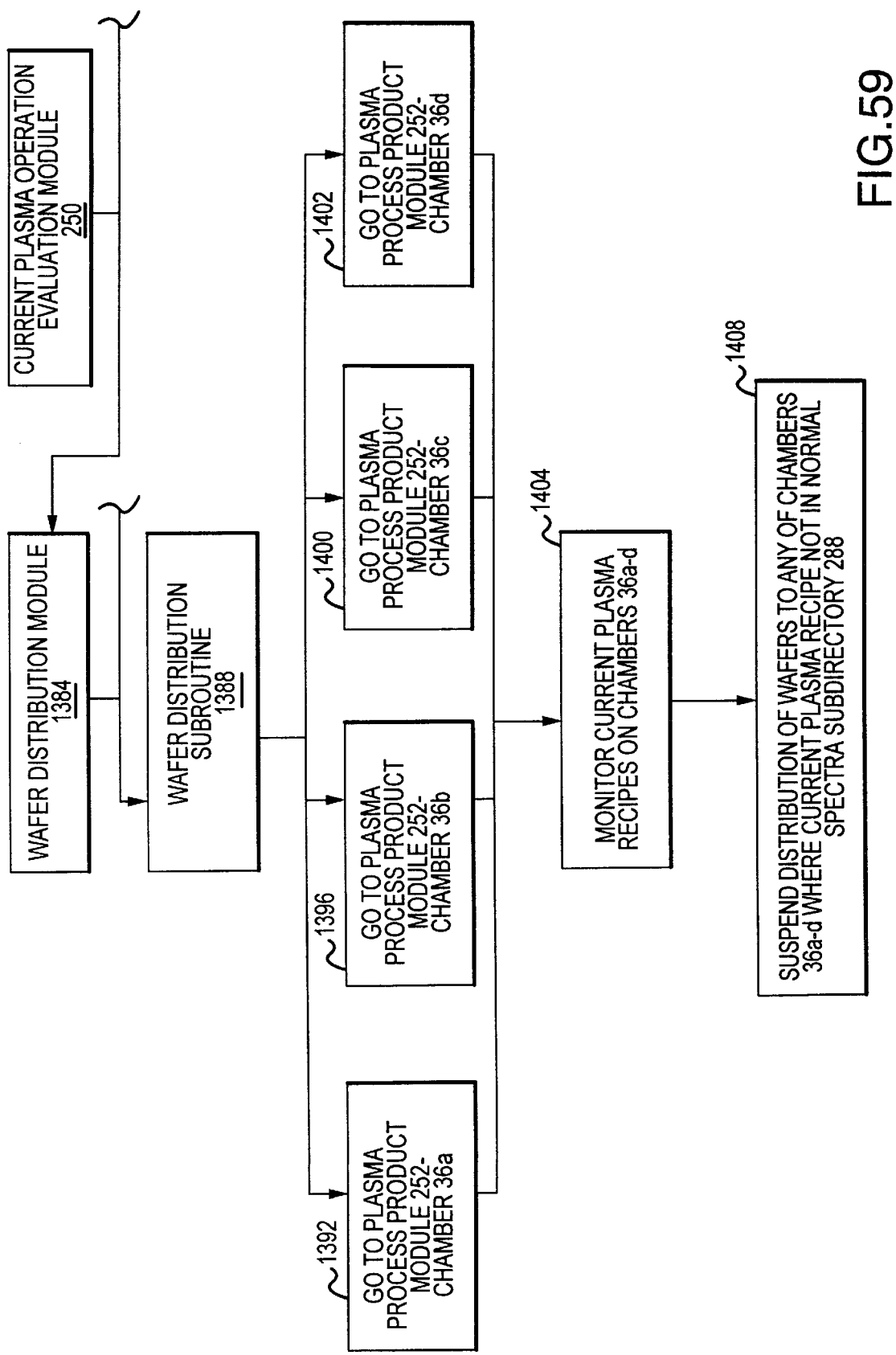
FIG. 59 is a flowchart of one embodiment of a wafer distribution subroutine which may be incorporated in the wafer distribution module of FIGS. 7 and 32.
Figure 60:
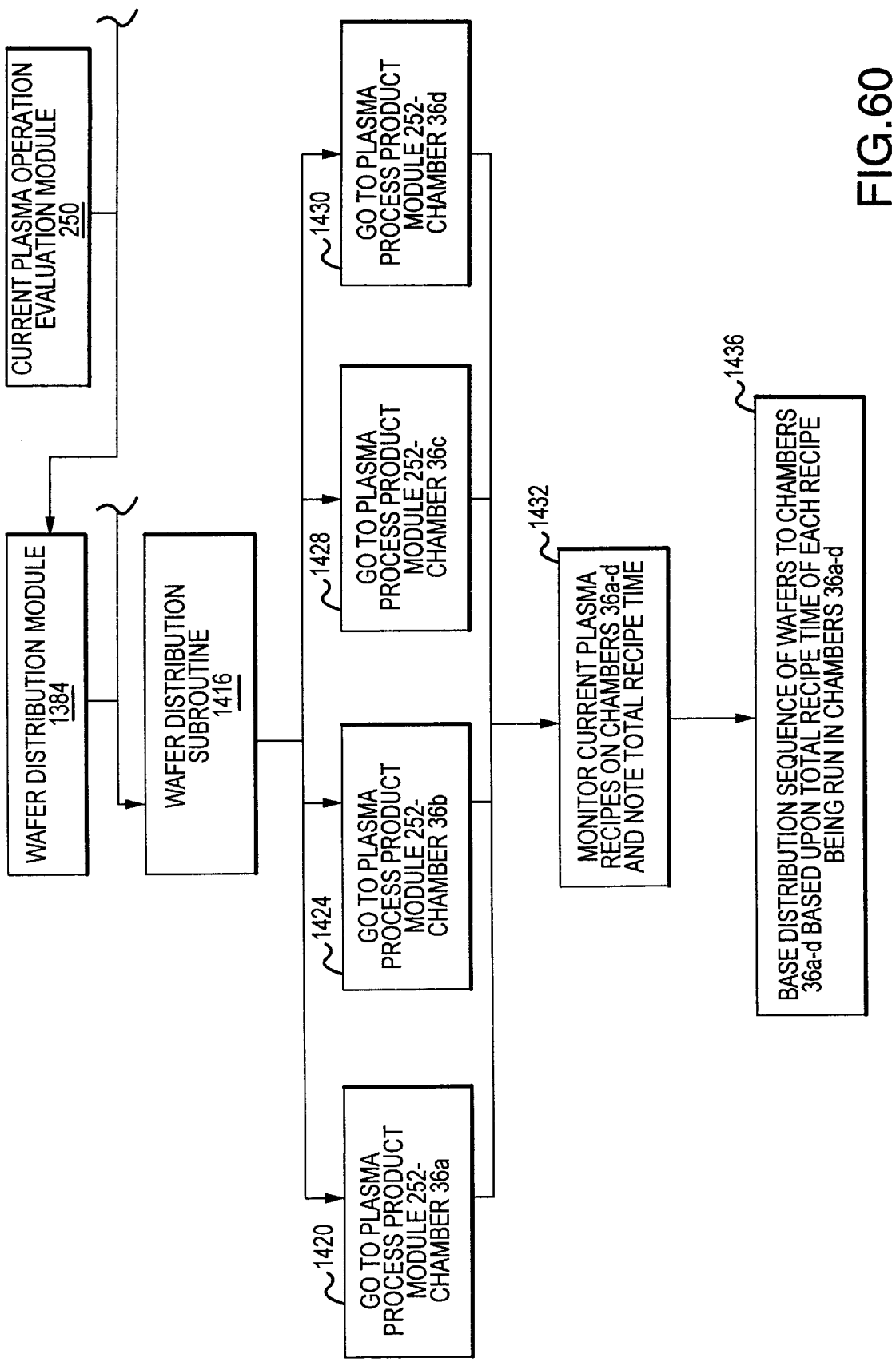
FIG. 60 is a flowchart of another embodiment of a wafer distribution subroutine which may be incorporated in the wafer distribution module of FIGS. 7 and 19.

Wafer Distribution Module 1384—FIGS. 59–60

Various of the above-noted evaluations provided by the current plasma process module 250 may provide information to the wafer distribution module 1384 of FIGS. 59–60 to have some type of effect on the distribution of wafers to the various process chambers 36 of the water production system 2. One embodiment of a subroutine which may be used by the wafer distribution module 1384 is illustrated in FIG. 59. The subroutine 1388 of FIG. 55 includes steps 1392, 1396, 1400, and 1402 in which the protocol is for the wafer distribution subroutine 1388 to proceed to the plasma process product module 252 for each of chambers 36a–d (FIG. 1). The subroutine 1338 may of course accommodate wafer production systems having different numbers of processing chambers 36. Monitoring of the current plasma recipes being run on product in each of these processing chambers 38a–d is included in the protocol of 1404. Any deviation from the normal spectra subdirectory 288 of the current plasma recipe being run on product in any of the chambers 36a–d is noted at step 1408. In the case where the current plasma recipe being run on product in a given processing chamber 36 does not "match" any plasma recipe within the normal spectra subdirectory 288, the distribution of wafers 18 to this chamber 36 is suspended. This may be due to an error in the subject plasma recipe identified by the plasma process product module 252 of FIGS. 21–25, the identification of an unknown condition in the subject plasma recipe by the plasma process product module 252 of FIGS. 21–25, or the identification of a dirty chamber condition by the chamber condition module 1084 of any of FIGS. 27–29. Although suspension may be implemented on the first occurrence of this type of event, the wafer distribution subroutine 1388 may be structured such that there is no suspension until a predetermined number of consecutive plasma recipes have deviated from the normal spectra subdirectory 288 on a given chamber 36 or when a certain percentage of a fixed number of plasma recipes have deviated from the normal spectra subdirectory 288 on a given chamber 36 (e.g., when at least one out of three runs have not matched any plasma recipe in the normal spectra subdirectory 288).

Another embodiment of a subroutine which may be used by the wafer distribution module 1384 of FIGS. 7 and 32 is illustrated in FIG. 60. The subroutine 1416 includes steps 1420, 1424, 1428, and 1430 in which the protocol is for the wafer distribution subroutine 1416 to proceed to the plasma process product module 252 for each of the respective processing chambers 36a–d (FIG. 1). The subroutine 1416 may of course accommodate wafer production systems having different numbers of processing chambers 74. Monitoring of the current plasma recipes being run on product in each of these processing chambers 36a–d is included in the protocol of step 1432. The total time required to execute each plasma recipe on each of the chambers 36 is also noted at step 1432. Step 1432 may thereby use the plasma process product module 252 discussed above in relation to FIGS. 21–25, as well as the endpoint module 1200 discussed above in relation to FIGS. 52–58. The distribution sequence of wafers 18 to these chambers 36 is based upon the total time required to complete each plasma recipe as noted in step 1436.

The logic of step 1436 of the wafer distribution subroutine 1416 may be that a priority is given to the processing chamber 36 which is executing the plasma recipe in the shortest amount of time. That is, the distribution sequence of wafers 18 to the chamber 36 may be to utilize the "fastest" processing chamber 36 the most. If the "fastest" chamber was 36a and is available (i.e., no product therein), the logic of step 1436 would instruct the wafer handling assembly 44 to provide a wafer 18 to this chamber 36a even though another chamber (e.g., chamber 36b) is "scheduled" to receive the next wafer 18. Alternatively, the logic of step 1436 may be that a priority is given to the processing chamber 36 which is executing the plasma recipe over the longest period of time. Lengthening of the time required to execute a plasma recipe may indicate that the chamber 36 is becoming dirty, and may be in need of "cleaning" in the near future as discussed above in relation to the chamber condition module 1084 of FIGS. 27–29. Since this is the case, the operator of the facility incorporating the wafer production system 2 may decide to maximize the runs on a given chamber 36 once it has been determined that it will be taken "off-line" in the near future for cleaning.

Conclusion

The plasma monitoring assemblies 174, 500, and 700 as described above offers numerous advantages. One advantage is that the logic of the current plasma process module 250 and its various sub-modules can be used with any type of plasma chamber and further can be used to evaluate any type of plasma process. No significant adaptation of the logic of the module 250 or any of its sub-modules is required to use the module 250 on one chamber type/design, and then to turn around and use this same module 250 on another chamber type/design. Similarly, no adaptation of the module 250 or any of its sub-modules is required to use the module 250 on one type of plasma process, and then to turn around and use this same module 250 on a plasma process which is somehow different. In this sense the module 250 is a generic plasma monitoring tool.

Another advantage of the plasma monitoring assemblies 174, 500, 700 is that the data which is used to evaluate the plasma processes conducted within a processing chamber is taken from this very same processing chamber when running the very same type of plasma process. In this sense when the assemblies 174, 500, and 700 are installed on a particular processing chamber, the assemblies 174, 500, 700 become specific to the chamber. The fact that a given plasma recipe will behave in one way on one chamber and another way on another chamber is of no significance to the plasma monitoring assemblies 174, 500, 700. Each assembly 174, 500, 700 adapts to the idiosyncrasies of its associated chamber and learns about the chamber through the running of actual plasma processes on the chamber to build up the plasma spectra directory 284 for that particular chamber. Again, each chamber will have its own plasma spectra directory 284 or the like in that all information used to evaluation a given plasma process on a given plasma chamber will have been obtained from this very same processing chamber.

Significant information on the current plasma process is made available pursuant to the current plasma process product module 250 and its various submodules. The module 250 has the ability to: determine if the current plasma process is proceeding like one or more previous runnings of this same plasma process on this same chamber; determine if the endpoint of a given plasma step has been reached; determine if the endpoint of each plasma step in a plasma recipe has been reached; identify the current plasma recipe to operations personnel; identify the current plasma step to operations personnel; determine when a chamber should be cleaned; and to determine when each of a plasma cleaning, and conditioning wafer operation may be terminated. How this information is used will typically be left up to the discretion of the operator of the facility incorporating the wafer production system 2. For instance, the current plasma process module 250 may simply be used a source of information on the current plasma process. The current plasma process module 250 may also take a more active roll in the operation of the wafer production system 2 by integrating the module 250 with process controls for the system 2, such as to automate control of plasma process operations based upon information provided by the module 250. Various combinations may also be employed in that any sub-module may be "programmed" to be for information only, for process control only, or for both. Flexibility to deal with these types of issues is provided by the modular construction of the current plasma process module 250 where the module 250 and each of its sub-modules are again preferably stored on a computer-readable data storage medium (e.g., computer-readable memory such as one or more hard disks, floppy disks, zip-drive disks, CDs). Therefore, changes to the structure of the current plasma process module 250 may be readily implemented.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A system for running a plasma process, said system comprising:

a processing chamber;

a plasma generator in said plasma chamber, wherein a plasma process may be run on product in said processing chamber when said plasma generator is activated;

a plasma monitoring assembly operatively interfaced with said processing chamber and comprising a computer-readable storage medium, said computer-readable storage medium comprising a first data structure comprising a plurality of data entries, wherein each said data entry corresponds with a plasma process previously run in said processing chamber, wherein each said data entry is associated with one of first, second, and third categories, wherein each said data entry which has been associated with said first category means that its corresponding said plasma process which was previously run in said processing chamber was at least assumed to have proceeded without substantially any error, wherein each said data entry which has been associated with said first category comprises optical emissions data of at least a portion of a plasma used in its corresponding said plasma process at least every second during at least a first time period of its corresponding said plasma process, said first time period being after said plasma has stabilized and until at least substantially an end of its corresponding said plasma process wherein each said data entry which has been associated with said second category means that its corresponding said plasma process which was previously run in said processing chamber encountered at least one error and further that said at least one error has since been identified in said first data structure of said computer-readable storage medium, wherein each said data entry which has been associated with said second category comprises optical emissions data of at least a portion of a plasma used in its corresponding said plasma process at least at a time of the occurrence of said at least one error and which is indicative of said at least one error, and wherein each said data entry which has been associated with said third category means that its corresponding said plasma process which was previously run in said processing chamber encountered an unknown condition to said plasma monitoring assembly, wherein being a said unknown condition to said plasma monitoring assembly means that at least a portion of said data entry which has been associated with said third category failed to correspond with any said data entry which has been previously associated with either of said first category or said second category, and wherein each said data entry which has been associated with said third category comprises optical emissions data of a plasma used in the corresponding said plasma process at least from a time in the corresponding said plasma process after which the corresponding said plasma process encountered a said unknown condition to said plasma monitoring assembly.

2. A system, as claimed in claim 1, wherein:

said optical emissions data in each said data entry which has been associated with said first category comprises wavelengths from about 250 nanometers to about 1,000 nanometers at least at every 1 nanometer.

3. A system, as claimed in claim 1, wherein:

a first portion of said plurality of data entries is associated with said first category, wherein at least one said data entry of said first portion is from a first plasma recipe previously run on product in said processing chamber, and wherein at least one said data entry of said first portion is from a second plasma recipe previously run on product in said processing chamber, said first plasma recipe being different from said second plasma recipe.

4. A system, as claimed in claim 1, wherein:

a first portion of said plurality of data entries is associated with said first category, wherein at least two said data entries of said first portion are from two separate executions of the same plasma recipe previously run on product in said processing chamber.

5. A system, as claimed in claim 1, wherein:

each said data entry associated with said first category is available for use by said plasma monitoring assembly as a standard to assess future said plasma processes run in said processing chamber.

6. A system, as claimed in claim 1, wherein:

a first portion of said plurality of data entries is associated with said second category, wherein at least one said data entry of said first portion is from a first plasma recipe previously run on product in said processing chamber, and wherein at least one said data entry of said first portion is from a second plasma recipe previously run on product in said processing chamber, said first plasma recipe being different from said second plasma recipe.

7. A system, as claimed in claim 1, wherein:

a first portion of said plurality of data entries is associated with said second category and comprises first and second said data entries, wherein said first and second said data entries are from two separate executions of the same plasma recipe previously run on product in said processing chamber, wherein said first said data entry is indicative of a first error and said second said data entry is indicative of a second error, said first and second errors being different.

8. A system, as claimed in claim 1, wherein:

a first said data entry which has been associated with said third category is from one said plasma process which has been previously run in said processing chamber, during which a first error occurred, and in which said first error has yet to be identified.

9. A system, as claimed in claim 1, wherein:

a first said data entry which is associated with said third category is from one said plasma process which has been previously run on product in said processing chamber and which proceeded without substantially any error but which was not yet contained in said first data structure of said computer-readable medium in association with said first category.

10. A system, as claimed in claim 1, further comprising:

means for transferring at least a portion of any said data entry which is associated with said third category to any one of said first and second categories.

11. A system, as claimed in claim 1, wherein:

said plasma monitoring assembly further comprises means for comparing a current said plasma process against said first data structure of said computer-readable storage medium.

12. A system, as claimed in claim 1, wherein:

said first data structure is available for said plasma processes selected from the group consisting of plasma recipes which are run on at least one product in said processing chamber, plasma cleaning operations, plasma conditioning operations, and qualification wafer operations.

13. A plasma monitoring system for a plasma process run in a processing chamber, said system comprising:

a computer-readable storage medium comprising:

a first data structure comprising a plurality of data entries on a plurality of plasma processes previously run in said processing chamber, wherein each said data entry is associated with one of first, second, and third categories, respectively, wherein each said data entry which has been associated with said first category means that its corresponding said plasma process which was previously run in said processing chamber was at least assumed to have proceeded without substantially any error, wherein each said data entry which has been associated with said first category comprises optical emissions data of at least a portion of a plasma used in its corresponding said plasma process at least every second during at least a first time period of its corresponding said plasma process, said first time period being after said plasma has stabilized and until at least substantially an end of its corresponding said plasma process, wherein each said data entry which has been associated with said second category means that its corresponding said plasma process which was previously run in said processing chamber encountered at least one error and in which said at least one error has since been identified in said first data structure of said computer-readable storage medium, wherein each said data entry which has been associated with said second category comprises optical omissions data of at least a portion of a plasma used in its corresponding said plasma process at least at a time of the occurrence of said at least one error and which is indicative of said at least one error, and wherein each said data entry which has been associated with said third category means that its corresponding said plasma process which was previously run in said processing chamber encountered an unknown condition to said plasma monitoring system, wherein being a said unknown condition to said plasma monitoring system means that at least a portion of said data entry which has been associated with said third category failed to correspond with any said data entry which has been previously associated with either of said first category or said second category, and wherein each said data entry which has been associated with said third category comprises optical omissions data of a plasma used in the corresponding said plasma process at least from a time in the corresponding said plasma process after which the corresponding said plasma process encountered a said unknown condition to said plasma monitoring system; and means for comparing a current said plasma process against at least one said data entry in said first data structure.

14. A system, as claimed in claim 13, wherein:

said means for comparing comprises means for comparing said current said plasma process against each said data entry associated with said first category before comparing said current said plasma process against any said data entry associated with said second category.

15. A method for initializing a system for running plasma processes, said system comprising a processing chamber and a plasma monitoring assembly which is operatively interfaced with said processing chamber and which comprises a computer-readable storage medium, said computer-readable storage medium comprising a first data structure comprising a plurality of data entries, wherein each said data entry is associated with one of a first category, a second category, or a third category, wherein each said data entry which has been associated with said first category is from one said plasma process which has been previously run in said processing chamber and which is at least assumed to have proceeded without substantially any error, wherein each said data entry which has been associated with said second category is from one said plasma process which has been previously run in said processing chamber where at least one error occurred and in which said at least one error has since been identified in said first data structure of said computer-readable storage medium, wherein each said data entry which has been associated with said third category is from one said plasma process which has been previously run in said processing chamber and which is an unknown condition to said first data structure, wherein being a said unknown condition to said first data structure means that at least a portion of said data entry which has been associated with said third category failed to correspond with any said data entry which has been previously associated with either said first category or said second category, wherein a conducting a plasma process step comprises the steps of generating a plasma in said processing chamber, obtaining optical emissions data of said plasma within said processing chamber, and terminating said generating step, and wherein said method comprises the steps of:

executing a first said conducting step;

executing a first recording step comprising recording a first said data entry in said first data structure of said computer-readable storage medium, said first said data entry comprising said optical emissions data of at least a portion of said plasma from said executing a first said conducting step at least every second during a least a first time period of said executing a first said conducting step, said first time period being after said plasma has stabilized and until at least substantially an end of said executing a first said conducting step;

executing a first assigning step comprising assigning said first said data entry to said first category;

executing a second said conducting step;

executing a first evaluating step comprising determining if said optical emissions data from said executing a second said conducting step corresponds with optical emissions data from at least one said data entry which is assigned to said first category or said second category;

executing a second recording step comprising recording at least a portion of said optical emissions data from said executing a second said conducting step in a second said data entry in said first data structure of said computer-readable storage medium, said optical emissions data associated with said executing a second recording step being at least from a time when said optical emissions data from said executing a second said conducting step failed to correspond with optical emissions data from said at least said one data entry which is assigned to said first category or said second category and is thereby a first said unknown condition;

analyzing at least a portion of said optical emissions data from said executing a second recording step, said analyzing step being executed after said executing a second recording step;

identifying a first error in said executing a second said conducting step, said identifying step using said analyzing step;

retaining at least a portion of said optical emissions data from said executing a second recording step in said second said data entry from a time of an occurrence of said first error and which is indicative of said first error;

executing a second assigning step comprising assigning said second said data entry to said second category after said identifying step;

executing a third said conducting step;

executing a second evaluating step comprising determining if said optical emissions data from said executing a third said conducting step corresponds with optical emissions data from said at least one data entry which is assigned to said first category or said second category;

executing a third recording step comprising recording at least a portion of said optical emissions data from said executing a third said conducting step in a third said data entry in said first data structure of said computer-readable storage medium, said optical emissions data associated with said executing a third recording step being at least from a time when said optical emissions data from said executing a third said conducting step failed to correspond with optical emissions data from said at least one said data entry which is assigned to said first category or said second category and is thereby a second said unknown condition;

executing a third assigning step comprising assigning said third said data entry to said third category.

16. A method, as claimed in claim 15, wherein:

said conducting a plasma process step comprises conducting a plasma process selected from the group consisting of plasma recipes which are run on at least one product in said processing chamber, plasma cleaning operations, plasma conditioning operations, and qualification wafer operations.

17. A method, as claimed in claim 15, wherein:

said optical emissions data associated with said conducting a plasma process step comprise obtaining wavelengths from about 250 nanometers to about 1,000 nanometers and at least at every 1 nanometer.

18. A method, as claimed in claim 15, wherein:

said obtaining step comprises obtaining optical emissions at least every 1 second during at least a substantial portion of said conducting a plasma process step.

19. A method, as claimed in claim 15, further comprising the step of:

confirming that said executing a first said conducting step proceeded without substantially any error after a completion of said executing a first said conducting step.

20. A method, as claimed in claim 15, further comprising the steps of:

analyzing at least a portion of said optical emissions data from said executing a third said conducting step.

21. A method, as claimed in claim 20, further comprising the steps of:

identifying a second error in said executing a third said conducting step, said identifying a second error step comprises using said analyzing step which is associated with said executing a third said conducting step; and retaining at least those said optical emissions data from said executing a third said recording step in said third said data entry from a time of an occurrence of said second error and which is indicative of said second error.

22. A method, as claimed in claim 15, further comprising the steps of:

analyzing at least a portion of said optical emissions data from said executing a third recording step, and reassigning said third said data entry from said third category to said first category after said analyzing step.

* * * * *

UNITED STATES PATENT AND TRADEMARK OFFICE
CERTIFICATE OF CORRECTION

PATENT NO. : 6,123,983
DATED : September 26, 2000
INVENTOR(S) : Smith et al.

Page 1 of 1

It is certified that error appears in the above-identified patent and that said Letters Patent is hereby corrected as shown below:

Column 121,
Lines 62-63, please delete "with optical emissions data from said" and insert therefor -- with said optical emissions data from --;

Column 122,
Line 17, please delete "data from said" and insert therefor -- data from --.

Signed and Sealed this

Thirteenth Day of August, 2002

Attest:

Attesting Officer

JAMES E. ROGAN
Director of the United States Patent and Trademark Office